(12) United States Patent
Wentland et al.

(10) Patent No.: US 7,308,139 B2
(45) Date of Patent: Dec. 11, 2007

(54) METHOD, SYSTEM, AND APPARATUS FOR COLOR REPRESENTATION OF SEISMIC DATA AND ASSOCIATED MEASUREMENTS

(75) Inventors: Robert Wentland, Boulder, CO (US); Jawad Mokhtar, Boulder, CO (US)

(73) Assignee: Chroma Energy, Inc., Houston, TX (US)

( * ) Notice: Subject to any disclaimer, the term of this patent is extended or adjusted under 35 U.S.C. 154(b) by 581 days.

(21) Appl. No.: 10/308,928

(22) Filed: Dec. 3, 2002

(65) Prior Publication Data

US 2004/0098200 A1    May 20, 2004

Related U.S. Application Data

(60) Provisional application No. 60/395,960, filed on Jul. 12, 2002, provisional application No. 60/398,959, filed on Jul. 12, 2002.

(51) Int. Cl.
*G06K 9/00* (2006.01)
*G01V 3/38* (2006.01)
*G01V 1/00* (2006.01)
*G01V 9/34* (2006.01)

(52) U.S. Cl. .................. 382/181; 382/109; 702/5; 702/14; 703/5

(58) Field of Classification Search ........ 382/181, 382/109; 702/5, 14; 703/5
See application file for complete search history.

(56) References Cited

U.S. PATENT DOCUMENTS

| | | | | |
|---|---|---|---|---|
| 4,015,366 A | | 4/1977 | Hall, III | 47/1 R |
| 4,500,972 A | * | 2/1985 | Kuhn et al. | 382/167 |
| 4,601,055 A | * | 7/1986 | Kent | 382/303 |
| 4,866,637 A | * | 9/1989 | Gonzalez-Lopez et al. | 345/426 |
| 5,933,540 A | * | 8/1999 | Lakshminarayanan et al. | 382/260 |
| 6,018,587 A | | 1/2000 | Cabib | 382/165 |
| 6,240,218 B1 | * | 5/2001 | Michael et al. | 382/289 |
| 6,307,961 B1 | * | 10/2001 | Balonon-Rosen et al. | 382/167 |
| 6,570,575 B1 | * | 5/2003 | Wittenbrink | 345/592 |
| 6,963,425 B1 | * | 11/2005 | Nair et al. | 358/1.9 |
| 2003/0076320 A1 | * | 4/2003 | Collodi | 345/426 |
| 2003/0216897 A1 | * | 11/2003 | Endres et al. | 703/10 |

OTHER PUBLICATIONS

Dayton, Linnea et al, Photoshop 5/5.5 WOW! book, 2000, peachpit press, all pages.*
International Search Report (PCT/US03/21724), Oct. 10, 2003.

(Continued)

*Primary Examiner*—Bhavesh M Mehta
*Assistant Examiner*—Kathleen Yuan
(74) *Attorney, Agent, or Firm*—Baker Botts L.L.P.

(57) ABSTRACT

The present invention is a method, system, and apparatus for visually displaying digitized information in a way that allows a human operator to detect easily patterns and characteristics within the data. A personal computer is used to extract raw data and to perform Boolean operations at the behest of a user. The manipulated information is then converted into a false-color image and displayed on an output screen. The images can be compared to known data, called a template, in order to detect one or more desired patterns that indicate desirable features. The desired pattern can then be highlighted (or illuminated) and be displayed to the operator so that the location of the desired feature may be identified.

1 Claim, 63 Drawing Sheets

OTHER PUBLICATIONS

Turner, K., et al., *Robust Combining of Disparate Classifiers Through Order Statistics*, Nov. 1, 2001., pp. 1-21.

Berge, T.B., *Seismic Inversion Successfully Predicts Reservoir, Porosity, and Gas Content in Ibhubesi Field, Orange Basin, South Africa*, Apr. 2002., pp. 338-348.

Pramanik, A.G., *Leveraging Seismic Technologies for Stratigraphic/Subtle Trap Exploration: An Overview*, Mar. 1999, pp. 1-22.

International Search Report (PCT US03/22078), Oct. 28, 2003.

Zeng, He Yao et al., *A Pattern Recognition Approach to Detect Oil/Gas Reservoirs in Sand/Shale Sediments*, Aug. 1992, pp. 462-465.

Vadim Mottl, Sergey Dvoenko et al., *Pattern Recognition in Spatial Data: A New Method of Seismic Explorations for Oil and Gas in Crystalline Basement Rocks*, Sep. 2000, pp. 315-318.

Balagurunathan, Yoganand, et al., *Morphological Granulometric Analysis of Sediment Images*, Apr. 18, 2001, pp. 87-99.

International Search Report from PCT/US03/21723, Oct. 10, 2003.

Yoshii, Hiroto, *Pyramid Architecture Classification Tree*, Proceedings of the 1996 International Conference on Pattern Recognition (ICPR '96), IEEE 1015-4651, pp. 310-314, 1996.

\* cited by examiner $$A_{RMS} = \frac{1}{b-a} \sum_{i=a}^{b} A_i^2$$

Where:

$A_{RMS}$ = RMS amplitude for the fragment a = sample index for the start of the fragment b = sample index for the end of the fragment $A_i$ = $i^{th}$ data value

FIGURE 26c

$$S_{hape} = \frac{2}{b-a} \left[ \frac{\sum_{i=a}^{b} i A_i}{\sum_{i=a}^{b} A_i} - \left(\frac{b-a}{2}\right) \right]$$

Where:

$S_{hape}$ = first statistical moment = shape feature a = sample index for the start of the fragment b = sample index for the end of the fragment $A_i$ = $i^{th}$ data value

FIGURE 26d

$$H_{Comp} = \frac{1}{n}\sum_{i=a}^{n}(V_i - \overline{V})^2 = \frac{1}{n}\sum_{i=1}^{n}V_i^2 - \left(\frac{1}{n}\sum_{i=1}^{n}V_i\right)^2$$

Where:

$H_{Comp}$ = Horizontal Complexity $V_i$ = $i^{th}$ observation value $\overline{V}$ = average of the observation values in the coordinate neighborhood n = number of observations in the coordinate neighborhood The two observers see different amounts of variation thus the feature or feature-function is anisotropic at this location.

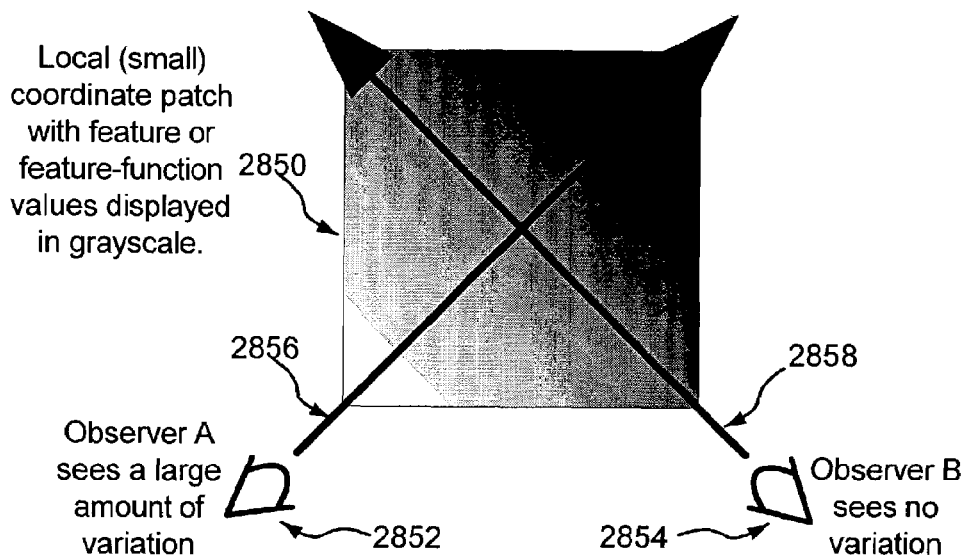

Local (small) coordinate patch with feature or feature-function 2850 values displayed in grayscale.

2856

Observer A sees a large amount of variation 2852  2854

Observer B sees no variation

The two observers see the same amount of variation thus the feature or feature-function is isotropic at this location.

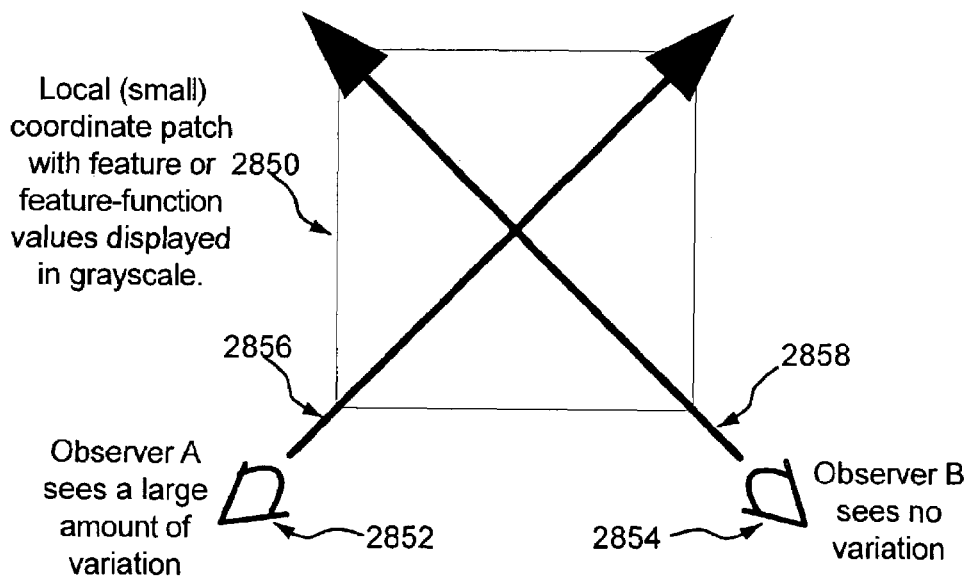

Local (small) coordinate patch with feature or 2850 feature-function values displayed in grayscale.

2856

Observer A sees a large amount of variation 2852  2854

Observer B sees no variation

Direction of maximum anisotropy $\phi_1 = \tan\left(\dfrac{\beta_2}{\beta_1}\right)$ Magnitude of maximum anisotropy $M = \sqrt{\beta_1^2 + \beta_2^2}$ Where:

$$\beta_1 = \dfrac{\sum_{j=1}^{n} X_{1,j} Y_j}{\sum_{j=1}^{n} X_{1,j}^2} \qquad \beta_2 = \dfrac{\sum_{j=1}^{n} X_{2,j} Y_j}{\sum_{j=1}^{n} X_{2,j}^2}$$

$X_{inline,j}$ = inline coordinate of the observation - inline
    coordinate of the neighborhood center $X_{xline,j}$ = xline coordinate of the observation - xline
    coordinate of the neighborhood center i = inline or xline number (1 = inline, 2 = xline)

j = observation number (1 to n)

n = number of observations

FIGURE 28d

Direction to pattern location $= \alpha = \tan\left(\dfrac{L}{U}\right)$

Distance to pattern location $= M = \sqrt{L^2 + U^2}$

Where:

U = coordinate of the upper feature in pattern space

L = coordinate of lower feature in pattern space

FIGURE 30c

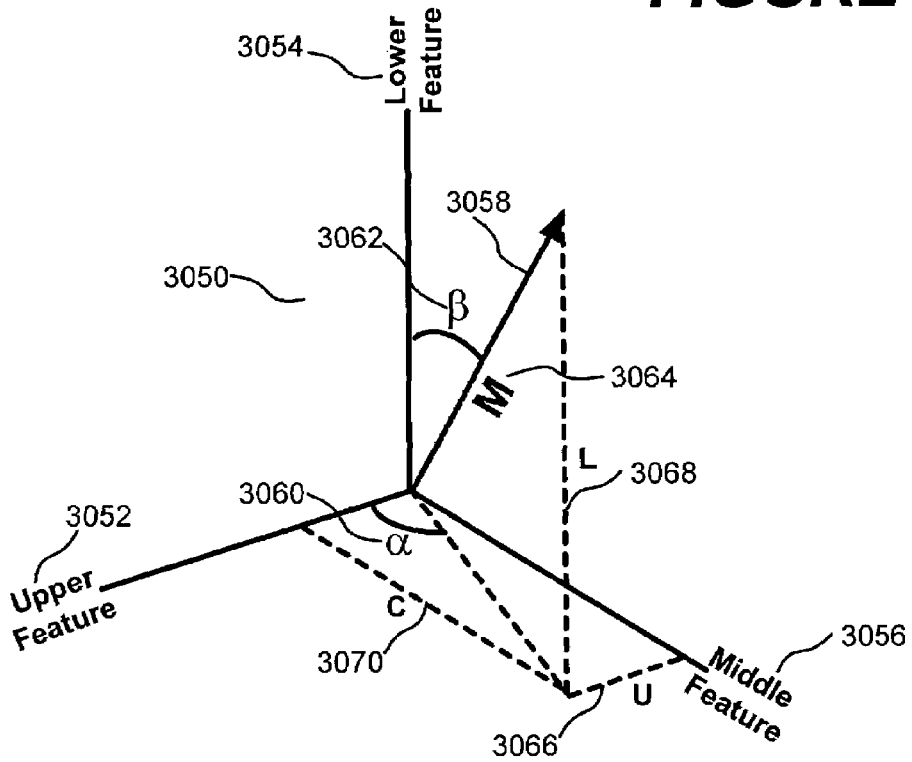

Direction to pattern location $= \alpha = \tan\left(\dfrac{C}{U}\right)$

Direction to pattern location $= \beta = \cos\left(\dfrac{L}{\sqrt{L^2 + C^2 + U^2}}\right)$ Distance to pattern location $= M = \sqrt{L^2 + C^2 + U^2}$ Where:

U = coordinate of the upper feature in pattern space

C = coordinate of middle feature in pattern space

L = coordinate of the lower feature in pattern space

FIGURE 30d

METHOD, SYSTEM, AND APPARATUS FOR COLOR REPRESENTATION OF SEISMIC DATA AND ASSOCIATED MEASUREMENTS

RELATED APPLICATIONS

This application is a conversion of U.S. Provisional Applications 60/395,960 entitled "PATTERN RECOGNITION APPLIED TO SEISMIC PROCESSING" filed on Jul. 12, 2002. and 60/395,959 entitled "PATTERN RECOGNITION APPLIED TO GRAPHIC IMAGING" filed on Jul. 12, 2002. This application is related to co-pending patent application Ser. No. 09/070,110, entitled "METHOD AND APPARATUS FOR BIOMATHEMATICAL PATTERN RECOGNITION," filed on Apr. 29, 1998; U.S. Provisional Application Ser. No. 60/395,960 entitled "PATTERN RECOGNITION APPLIED TO OIL EXPLORATION AND PRODUCTION" by Robert Wentland, et al., that was filed on Jul. 12, 2002; U.S. Provisional Application Ser. No. 60/395,959 entitled "PATTERN RECOGNITION APPLIED TO GRAPHIC IMAGING" filed on Jul. 12, 2002, by inventors Robert Wentland, et al.; and entitled "PATTERN RECOGMTION TEMPLATE CONSTRUCTION APPLIED TO OIL EXPLORATION AND PRODUCTION" by Robert Wentland, et al, that was filed contemporaneously with this application; and entitled "PATTERN RECOGNITION TEMPLATE APPLICATION APPLIED TO OIL EXPLORATION AND PRODUCTION" by Robert Wentland, et al, that was filed contemporaneously with this application, and the latter five applications are hereby incorporated by reference herein for all purposes.

BACKGROUND OF THE INVENTION

1. Field of the Invention

The present invention relates generally to oil exploration and production. More particularly, the present invention relates to using color representation of a previously computed pattern database or other attributes for visualization of geological, geophysical and engineering data for processing, analysis and interpretation for hydrocarbon exploration, development, or reservoir management on digital computers.

2. Description of the Related Technology

Exploring for hydrocarbon reservoirs is a very competitive process. Decisions affecting large amounts of capital investment are made in a time-constrained environment based on massive amounts of technical data. The process begins with physical measurements that indicate the configuration and selected properties of subsurface strata in an area of interest. The technical data include many forms of geophysical measurements including seismic signals (acoustic waves) that are introduced into the subsurface and reflected back to measurement stations on or near the surface of the earth. A variety of mathematical manipulations of the data is performed by computer to form displays that are used by an interpreter who interprets the data in view of facts and theories about the subsurface. The interpretations may lead to decisions for bidding on leases or drilling of wells.

Processing of seismic data has progressed in parallel with the increased availability and capabilities of computer hardware. Calculations performed per mile of seismic data collected have increased many-fold in the past few years. Display hardware for observation by a human interpreter has become much more versatile.

An interpreter uses data from the seismic process with some knowledge of the geology of the area being investigated. This knowledge consists of a general model of the types of depositional processes that were laying sediment, and how these processes relate to the formation of a hydrocarbon deposit. This knowledge is often called a play concept. Although the interpreter has one or a collection of play concepts, the details and specific location of specific occurrences are not known. To identify the specific occurrences, the interpreter usually visually explores the data until one or more locations exhibiting an occurrence of the play concept are identified. These occurrences are called leads. The interpreter then isolates the occurrence as an object by drawing or autotracking the outside edges of the object. The outside edge is also called its boundary representation. A coordinate system called object space can be defined on a boundary representation. A less common method is autotracking the entire object, including its interior. This process is called segmentation.

After an object has been created, the interpreter verifies it by analyzing it visually. This includes visually studying the shape of the exterior of the object and studying the interior. To study the exterior of the object, either the boundary representation of the object is displayed or the entire object is displayed as a set of opaque voxels, with all of the voxels outside the object either not displayed or turned transparent.

Understanding the internal characteristics of an object is usually accomplished by displaying the intersection of the objects boundary representation with a data slice then scanning through the data set one slice at a time looking at only one data type at a time. Relationships between internal details of the object and between data types have to be remembered while comparing. Some voxel based applications volume render a single data set during which all of the voxels outside the object are transparent resulting in the visual affect of the object being sculpted out of the data set. In addition, some of the voxel based applications also allow multiple data sets to be both overlain and blended through, thereby giving the same result as overlaying several translucent images on a light table. This allows multiple pieces of data to appear in a sculpted object as overlays. Opacity control allows the object to be dissected.

As more sophisticated analysis tools are developed, a large number of derivative (also called attribute) volumes are being created such as Hilbert attributes, coherence cubes, and others. In addition, pattern analysis technologies including feature, pattern, and texture extraction tools, are becoming available. The result is that there is now a growing need for simultaneous visualization of multiple data types. The multiple data types need to be viewed together with the objects, both in slice views and as volumerendered sculpted objects.

Most visualization and interpretation applications display only on type of data at a time. Some, for example VoxelGeo, overlay multiple data type as layers and then blend through the layers during visualization. They are not capable of merging the overlays into a single display that retains both the information of the individual data sets, nor do they show how they interact.

When auto-tracking based on multiple data sets, the auto-tracking is done blindly as a batch process. It is not possible to preview the data in the way that the auto-tracker perceives the data so there is no way to predict simply by looking at the data if the auto-tracking will be successful. Moreover, there is no way to know whether the auto-tracking has failed, led alone where it failed and why. Most applications perform auto-tracking only of boundary representations of the objects of interest, usually by tracking only the top or the bottom. Because all boundary representations have generally the same characteristic, being an edge, it is easy for these auto-trackers to get lost and wander from the top or the bottom of the object of interest to the top or the bottom of a different object. Some voxel applications auto-track solid objects by auto-tracking the interior. Often, to accomplish the desired results, objects need to be auto-tracked based on several types of data and then compared or combined in an external application through Boolean operations in a non-interactive manner. Objects also often need editing which is accomplished through a series of morphological operations (erosion, dilation, translation, etc.) to remove speckling due to noise and to sharpen edges. These are also usually performed in an external application. The above result in a trial and error workflow that usually takes a long time before an acceptable product is created.

What is needed is a way to perform the simultaneous display of multiple data types preserving both the information of each data type but also displaying their interaction. The interpreter needs to be able to use pattern recognition to explore data sets in a visual search, for example, of a play concept in the data to identify objects of interest. The application of mathematics, with one or more data types as input, is also needed to allow data types to be combined or modified to make visual easier.

SUMMARY OF THE INVENTION

The invention overcomes the above-identified problems, as well as other shortcomings and deficiencies of existing technologies, by providing false color imagery as a method of combining multiple data types along with color manipulation. The present invention provides for simultaneous display of multiple data types while preserving both the information of each data type and the ability to display their interaction through false color imagery. When applied to features, patterns, and textures, the present invention enables visual clustering that provides an interactive pattern analysis of seismic data in a more effective visual manner. Visual clustering allows the user to modify the color assignment scheme to change the way each data set maps into the final display. When the color assignment involves either turning the mapping on or off during visual clustering, sharp decision boundaries are applied. When the assignment is ramped from full off to full on, fuzzy decision boundaries are created. The ability to assign allows the interpreter to use pattern recognition through visual clustering to explore data sets in a visual search, for example, of a play concept in the data using first fuzzy decision boundaries to identify objects of interest, and then sharpen the decision boundaries to "tune them in". The application of mathematics with one or more data types as input is used to allow data types to be combined or modified, and to make visualization easier.

In addition to displaying multiple data types, auto-tracking tools are provided by the present invention that auto-track based on the color resulting from the combination of the multiple data types. The colors are defined either as a specific list for detailed color selection or as a color range. When used in either list or range, the auto-tracker perceives the data in exactly the same way the operator sees it. Consequently, the operator can determine if the auto-tracking will be successful and, in addition, the operator has a way to identify and to correct failures. When applied to a false color image representing a visual cluster analysis of feature, pattern, and texture attributes, the result of the auto-tracking is the same as pattern analysis based segmentation. To assist the geoscientists in analyzing the shape of the exterior edge of objects, the present invention provides a method of measuring attributes of the boundary representation (such as local dip, local curvature, etc.). The present invention also provides a method for performing pattern analysis on the attributes of the boundary representation, and for displaying the attributes on the object.

The ability to display objects along with data, display false color images of the data, display sculpted objects, and dissect the sculpted objects, are all provided by the present invention to help the user verify the selection of the object and to analyze its internal characteristics. Allowing the color, and especially the opacity assignment, to be modified for a sculpted image provides enhanced visual dissection of the object.

Objects can be constructed from multiple data types and merged by interactively applying Boolean operations within the visualization application. In addition, objects can be edited interactively using morphological operators plus manual painting for touch up as needed.

When the color assignment technique and associated visualization are used together with a pattern database, a method of drawing, painting or otherwise selecting an example or a target for pattern recognition base pattern matching is provided. In addition, the present invention provides an interactive environment of target example-selection, data mining through hyperdimensional fragment matching, applying a template, and object creation.

Features and advantages of the invention will be apparent from the following description of the embodiments, given for the purpose of disclosure and taken in conjunction with the accompanying drawings.

BRIEF DESCRIPTION OF THE DRAWINGS

A more complete understanding of the present disclosure and advantages thereof may be acquired by referring to the following description taken in conjunction with the accompanying drawings, wherein:

FIG. 26*c* is a mathematical expression for computing the RMS amplitude feature for a fragment, according to the present invention.

FIG. 26*d* is a mathematical expression for computing the shape feature for a fragment, according to the present invention.

FIG. 28*b* is an example of feature and feature function anisotropy, according to the present invention.

FIG. 28*c* is an example of no feature and feature function anisotropy, according to the present invention.

FIG. 28*d* is a mathematical expression for computing M and $\phi$ for feature and feature function anisotropy, according to the present invention.

FIG. 30*c* is a diagram of a three-dimensional pattern space with pattern locations computed as M, $\alpha$, $\beta$, according to the present invention, according to the present invention.

FIG. 30*d* is a mathematical expression for computing M, $\alpha$, $\beta$, according to the present invention.

Figure 1A:
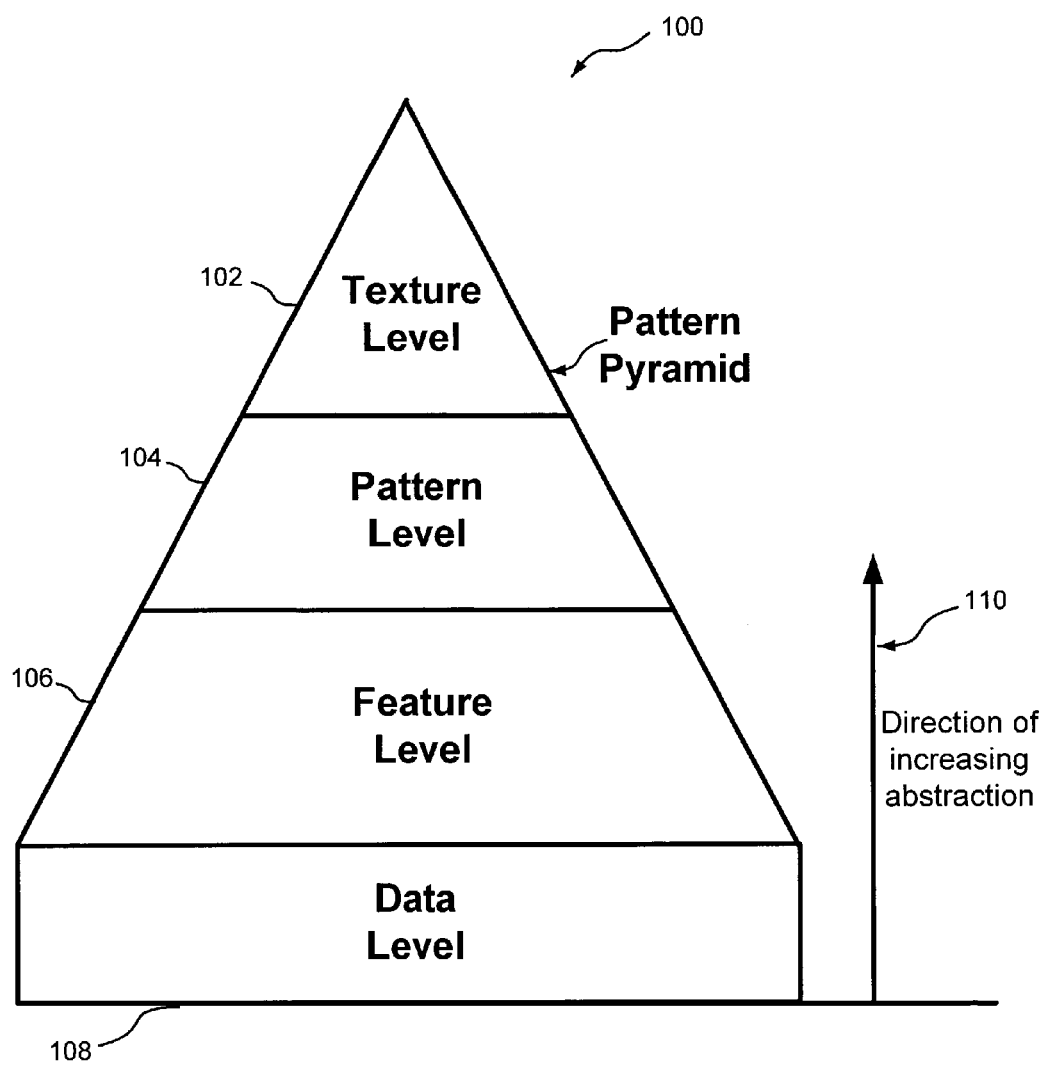
FIG. 1a is a diagram of the pattern pyramid and associated levels of abstraction according to the teachings of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

The goal of pattern recognition is to find targets that reasonably match known examples. When the pattern recognition process is accomplished, the result will be a collection containing true positives (good matches) and false positives (bad matches). The key to efficient processing is to build a method that finds all of the true positives while minimizing false positives.

A part of the present invention is the separation of the extraction and the classification processes into two distinct operations. Some prior art pattern recognition methods combine the extraction and classification processes and inter-mix the results. The prior art pattern recognition methods also mix in segmentation, object creation which, in contrast, is performed separately in the method of the present invention.

In general, the analysis process of the present invention performs a feature/pattern/texture extraction first. However, the classification is accomplished in multiple places within the method of the present invention. Hyperdimensional fragments and/or templates are used as a computational classifier. The hyperdimensional fragments and templates can be tested and modified ("tuned") during the template construction process. The template construction process includes performing highly interactive visual clustering in a visualization program in order to review, and optimize decision surfaces that are discovered from the previous steps in the method of the present invention.

The present invention identifies and verifies the classification and then performs the segmentation step. A check is made of the segmentation results for false positives and those results are used to further refine the classification and the decision surfaces in order to reduce them. Consequently, the present invention is not simply a visualizer of data. Instead, the present invention is utilizes visualization techniques to enable a user, or a software process, to classify and to segment.

The following are definitions of terms that are used in the description of the present invention. Terms not defined herein retain their common usage.

Abstraction Process: An abstraction process is a process of successive identification of features, patterns, and textures within data and storing the results of each step into a layer within a pattern database.

Affinity: See Binding Strength.

Alpha: Alpha is a measure of transparency. Higher alpha results in increased transparency. When alpha is zero the material is opaque.

Auto-track: Auto-track is the process of building objects by identifying spatially connected zones with a common attribute, collection of attributes, a common hyperdimensional fragment, or satisfying a template.

Attribute/Attributing: Intuitively, an attribute it is a characteristic or measurement of data. For the purposes of the present invention, it is defined as the measurements used to characterize the data at a given level of the pattern pyramid. . In addition to characterizing the data, attributes can characterize the cuts or the boundary representation of objects after segmentation. Examples include local curvature measurements on the exterior of a segmented geological reservoir in geoscience, or colon in medical studies. Examples are features, patterns, and textures.

Attribute Location: The attribute location is the physical starting and ending location in the data set defining the location of an attribute.

Azimuth: See Dip/Azimuth.

Binding Strength: Binding strength is a threshold that is supplied by the operator that sets the degree of match required to determine if the known data matches the target data. The binding strength allows the present invention to recognize patterns in data that contains defects or noise or where a perfect match is not required. It is implemented as the threshold of values for each level of a hyperdimensional fragment.

Classifiers: A classifier is a computational method (algorithm) that sorts out data into various sets with common characteristics or classes. See template.

Classification: A classification is the process of applying classifiers or templates. For the purposes of the present invention it is the process of identifying hyperdimensional fragments in the pattern database of the target data set that match, within a given binding strength, the hyperdimensional fragments of a known data set.

CMY: CMY is a color model consisting of Cyan-Magenta-Yellow.

CMYK: CMYK is a color model consisting of Cyan-Magenta-Yellow-Black.

Cut/Cutting: Cutting is the process of subdividing the data into a collection of one dimensional fragments.

Cutting Criteria: Cutting criteria is part of the method and related parameters for creating fragments. The specific method depends on the nature of the data and the objective of the analysis. The simplest example is to choose a fixed length of data samples. A more complex method is to perform cuts based on changes in the data values such as sign changes, identification of edges, and others. Either of the above examples result in cuts with varying spatial lengths. Variable length cuts give rise to a topological surface that has measurable characteristics or attributes. While cuts of variable spatial lengths are possible, cuts of uniform length are also possible.

Data Mining: Data mining is the process of applying templates from a template database to one or many target data sets creating output objects, in scenes, that satisfy the template.

Decision Surface: A decision surface is a surface that separates two or more classes during classification. For the present invention it exists each of the feature level, pattern level, and texture level and is defined by a hyperdimensional fragment plus a non-zero binding strength that performs classification at each of the levels of abstraction. A template is a concatenation of the decision surfaces for each level of abstraction.

Dip/Azimuth: A dip or azimuth is a measurement system used to measure the orientation of geological formations. It refers to the orientation of a plane that is tangent to the surface of a rock layer at a given map location. They are two angles defining the orientation of a vector that points in a direction that maximizes the vectors dip magnitude and lies on the tangent plane. The dip angle is referenced to the horizon, which is a horizontal plane oriented so that its normal points toward the center of the earth at the location of interest. Dip is the angle the vector makes relative to the horizon. When the vector is projected onto the horizon plane, strike is the angle from the projected vector to a unit vector pointing north.

Display Creation: Display creation occurs when the operator selects objects to be displayed from a list of display objects and sets the display properties while instructing the visualization application to create a virtual display. The operator controls the appearance of the display scene and display objects by setting the display properties. Creating the display is usually an interactive process where the operator repeatedly modifies the selection of display objects and display properties followed by a display refresh until the desired display is achieved.

Display Objects: Display objects are objects that are displayed within a display scene. Many display objects are available. The specific display object selections depend on the specific application and the desired result. The operator usually selects from a list of available display objects and either turns the objects on or off. The display objects are read as data objects from disk and then converted, if necessary, to display objects and loaded into RAM The loading of display objects usually occurs when they are turned on, but might have occurred earlier. Display objects include but are not limited to: overlay objects, annotation objects, and additional reference and data objects. An example of overlay data objects is the various levels of the pattern pyramid for a 3D band limited acoustical impedance data set which is read from a pattern database. An example of annotation data objects includes axes, scales, associated labels, north arrow, and others. One example of other reference and data objects is well symbols, labels, subsurface borehole location, and other information. Another example is culture information such as political boundaries, OCS block boundaries, and other geographical information.

Display Properties: Display properties determine the visual appearance if display scenes and display objects. Many display properties are available. The specific selections depend on the specific application and the desired result. They include but are not limited to: display scene properties and display object properties. Display object properties include but are not limited to overlay parameters, annotation parameters, and additional reference and data object parameters. Display scene parameters define the display scene in which the display objects are placed. For example a 3D display scene in perspective usually contains camera settings (dip, azimuth, twist, dolly location, etc.), lighting (locations, intensities, color range, etc), and others. Another example of a display scene display property is the background color or scene color in a display. An example of overlay data objects parameters includes color tables, opacity tables, location in the display scene, and others. An example of annotation data object parameters includes axes, scales, associated labels, north arrow, and others. One example of other reference and data object properties is well parameters that control the display of symbols, labels, subsurface borehole location, and other information. Another example is culture information properties that control the display of political boundaries, OCS block boundaries, and other geographical information.

Display Refresh: A display refresh is preformed after the display scene or the display objects have been modified to make the modifications visible on the display device. The display refresh recreates or updates the scene projection of the virtual display, places it in the screen display buffer and directs the application to update the picture on the screen. The display refresh often occurs automatically but also occurs when the operator instructs the application to perform one.

Display Rerender: See display refresh.

Display Scene: A display scene is a virtual two dimensional space or three dimensional space which is projected onto and displayed on a computer monitor or screen. The display scene has display properties and it contains display objects which have locations in the display scene and their own display properties.

Earth Manifold: Mathematically, a manifold is a topological space on Earth that is only locally Euclidean. The manifold consists of a collection of local coordinate charts and a set of transformations between the charts. The transformations allow motion from one chart to the next. For the present invention, the manifold is also required to be piecewise continuous. Intuitively the manifold is a space that was distorted. One example of a manifold is the globe manifold, which is the 3D space representing the surface of the planet Earth. The globe manifold is been mapped using a set of maps (locally Euclidean coordinate charts) and a convention (overlapping of the maps) for moving from the edge of one map to the corresponding edge of the next (set of transformations). To describe the subsurface of the Earth the 3D Earth manifold follows the undulating geology. Each fragment, or a related coordinate neighborhood, has a coordinate chart defined by the local strike and dip of the rock layers (plus the normal to both) and rules for connecting them together along the rock layers. For problems where the space on which the attributes of interest occur has been distorted, pattern analysis is performed on a manifold.

Edge: An edge occurs where the data or attribute(s) of the data changes significantly at a given spatial location. In other words, an edge occurs at locations where the derivative of the attribute(s) has a peak. In reality, edges are often not sharp and are obscured by various noises in the data. Also, see segmentation and cutting.

False Color Imagery: False color imagery is a technique for the simultaneous display of multiple data sets. The technique associates the data values of four input data channels with the amount of each of four color components in a color model. For example red, green, blue, and transparency (RGBA). Because the human eye and brain is capable of distinguishing the amount of each color plus their relationships, the result is a simultaneous display of all four data sets that preserves each channel and their interactions. This technique works for all forms of color models including RGBA, HSVA, CMYK, YIQ, and others.

Feature: A feature is the smallest interpretable and classifiable measurement that can be made on the data. A features is one member of a feature set. Also, see feature set, visual feature set, and feature space.

Feature Location: The feature location is the physical starting and ending location that defines the spatial position of a feature.

Feature Set: A feature set is a set of feature attributes that represent the state of the data or image at each feature location in the image. Different feature sets are selected to classify data in various ways. Also, see feature, visual feature set, and feature space.

Feature Space: Mathematically, specifically topologically, a feature set is represented by a vector space (state space) called a feature space where each axes of the space is a feature attribute. The smallest feature attribute set, which is also the computationally most efficient set, is described mathematically as a set, or basis of the vector space, where each member of the set is linearly independent. Linearly independent means that one axes, or set member, is not a linear combination of the other set members. Each feature attribute represents a degree of freedom of the image. When all of the degrees of freedom are represented as feature attributes, then the feature set, which is also the basis of the vector space, are described as spanning. Intuitively, spanning means that a feature set can be recombined to exactly recreate the data from which it was measured. In practice, a feature set capable of spanning the feature space is defined, but to reduce computation time only the features required to solve the problem are computed.

Fragment: A fragment is a one-dimensional interval that has a physical size and spatial location. A fragment is the smallest interval at the given spatial location within which attributes can be measured. Fragments may be defined as having a fixed physical length or include a fixed number of attribute values. Fragments may also have a variable physical length where the fragment is cut using cutting criteria that are a function of the data, attributes, or statistics of any lower level in the pattern pyramid. Variable length fragments usually lay between data value, attribute, or statistic edges. Fragments are cut at each of the feature, pattern, or texture levels of the pattern pyramid. Also, see fragment sequence.

Fragment Orientation: When the data being analyzed has more than one dimension a fragment orientation needs to chosen while cutting the data into fragments. For example 3D seismic is often measured in a three dimensional space with three axes, line, xline, and time. Other 3D data is often measured in three-dimensional space in three axes, x, y, and z. Thus, the fragment orientation can be aligned along any of these three axes. Another option is to align the fragment orientation along the earth manifold in the dip, strike, or normal (to the rock layers) direction, or in an alternate coordinate system, such as a geology or tissue aligned manifold.

Fragment Sequence: A fragment sequence is the sequence of data, attribute, or statistic values that occur within a fragment.

Global Statistic: A global statistic is a statistical comparison of the value of the attribute of interest at a particular location in a data set to the value of this attribute at all locations of the data set. Also, see statistic and local statistic.

HLS: A color model comprised of Hue-Lightness-Saturation.

HSV: A color model comprised of Hue-Saturation-Value.

HSVA: A color model comprised of Hue-Saturation-Value-Alpha.

HUE: Hue is a color designation of red, yellow, green, blue or any interpolated mix between any contiguous pair of these colors.

Hyperdimensional Fragment: A hyperdimensional fragment is a fragment that extends vertically through the various levels of a pattern pyramid. A hyperdimensional fragment represents an ordered collection of attributes containing members from each level. At each level, the hyperdimensional fragment contains a single point and the associated attribute value. If required, a binding strength, which is a set of thresholds representing a range of values about the attributes at each level above the data level, can be used. The binding strength is defined for both known data and target data and is used for the simultaneous classification of features, patterns, and textures. See template and classification. Mathematically, topologically, it is a fiber view of the tangent spaces represented by the levels of the pattern pyramid. In terms of pattern recognition, it represents a classifier derived from the known data that is used to perform classification of the target data.

Known Data: Known data are a specified portion of a geophysical data set containing either a geological analog that is a known hydrocarbon deposit or an example composed of a subset of the geophysical data that is identified by a geoscientist as a potential hydrocarbon deposit. It is chosen to include primarily the item of interest and little else.

LAN: Local Area Network.

Local Statistic: Local statistic is a statistical comparison of the value of the attribute of interest at a particular location to the value of this attribute in a local coordinate neighborhood. The size of the path is operator selected. Also, see statistic and global statistic.

Look Up Table (LUT): A look up table is a table where either each row or each column associates on index with multiple properties. For example, a RGB color lookup table associates each index with a red value, a green value and a blue value. An object lookup table, associates each index with an object color, a name and other object properties. This technique is often used for display objects.

Mask: A mask is an item that partially covers another item. For the purposes of this invention the mask is intuitively similar to a mythical cloak, which when worn makes the covered portions of the person wearing it invisible.

Masked Overlay: A masked overlay is an overlay that has been partially covered by a mask. The portion that is covered is not visible and the portion that is not covered is visible.

Object: An object is a spatially connected body within a scene that has a common attribute, hyperdimensional fragment (collection of attributes), or fits a template. Software objects are not to be confused with an object of the present invention. Software objects retain their standard meaning.

Object Attribute: An object attributes are the measurable properties that is associated with an object's boundary representation or outside edge. An example of an object attribute is the local curvature of the exterior surface of an object.

Object Space: An object space is a manifold space that represents either the exterior boundary of an object or the interior of an object. An example of a 3D manifold is the surface on the outside of an object. Another example is the 3D manifold representing rock layers within the earth.

Opacity: Opacity is the property of a material that prevents light from shining through it and allows the material to cover up items behind it so that those items cannot be seen. Opacity is inversely proportional to transparency.

Overlay: An overlay is one of a set of display objects that are stacked one upon another. For the purposes of this invention overlays are intuitively similar to a set of papers or films placed on a light table and viewed with light shining through them so that the images on them can be compared. The invention allows overlays to have two or more physical dimensions, usually three.

Pattern: A pattern is a naturally occurring repeats of feature attributes in a fragment sequence. Also, see Pattern Space.

Pattern Database (PDB): A pattern database is a database that consists of several levels of attributes (usually features, patterns, and textures) within a data set. The pattern database can be a relational database containing the attributes. The PDB can also be an object database containing the attributes as parameters and the reduction process computations as methods plus other parameters and methods if required for data handling and/or display.

Pattern Location: The pattern location is the physical starting and ending location that defines the spatial position of a pattern.

Pattern Pyramid: A pattern pyramid is a diagram that represents the pattern database. The pyramid sits on a broad rectangular base representing the data. A triangle sets on the base which decreases in width upward. The triangle has 3 levels consisting from bottom to top of features, patterns, and textures. The width at each level represents the number of fragments at that level, which decreases as the level of abstraction increases. Mathematically, topologically, the levels of the pattern pyramid represent tangent spaces of the data set.

Pattern Recognition: Pattern recognition is the process of analyzing data for the purpose of making a decision. Pattern recognition involves making measurements on the data (pattern attributes and data statistics), analyzing the measurements (classification) and making a decision (computing a decision surface).

Pattern Space: Pattern space is an abstract vector space (state space) where each axes of the space represents a degree of freedom of the patterns in the image. Each location in the fragment sequence ($N_F$) and each member of the associated feature set represent the degrees of freedom ($N_M$). Thus, the pattern space has a dimension of $D=N_F \times N_M$. For example, a fragment sequence of length 3 with only 1 measured feature is a 3D space. There are several methods of assigning pattern attribute values. One method is to identify clusters in pattern space, assign numbers to the clusters, and use the cluster number as the pattern attribute number. A second method is to simply bin the space and assign the bin numbers to the pattern attributes. A third method is to identify the location where the pattern maps into pattern space and use the coordinates as pattern attribute values. In practice, it is computationally more efficient to estimate the pattern space by transforming only selected portions of the feature space. Also, see pattern.

PC: Personal computer.

Physical Space: The physical space is the space within which the data is measured or sampled. Physical space is usually a Euclidean space. For problems where the space on which the patterns of interest occur has not been distorted, attribute calculations are performed on the physical space. For seismic data, the axes of the physical space are inline, xline, and time. The time axes refers to the two way travel time of sound through the earth. Sometimes time is replaced by subsurface depth.

RAID: Redundant Array of Input/Output Devices

RAM: Random Access Memory

RGB: A color model consisting of Red-Green-Blue.

RGBA: A color model consisting of Red-Green-Blue-Alpha.

SAN: System area network.

Saturation: Saturation is the chromatic purity or amount of variation from pure white caused by the addition or reduction of color.

Scene: Intuitively, a scene is a spatial region that is viewable and contains one or more objects. Scene is analogous to a room that is being viewed by an observer where the room contains furniture objects and people objects, all of which can be viewed. For the purposes of the present invention, a scene is a collection of objects. Scene is implemented as an integer data cube that contains integer numbers that represent object numbers plus a null value. Data points containing the null value represent null zones, which are not assigned to objects. Zones containing object numbers are assigned to the objects associated with the specific numbers.

Statistic/Statisizing: Statistic is a method of analyzing the attributes of each layer in the PDB for the purpose of analyzing the probability of a selected occurrence of the attribute occurring elsewhere in the entire data set or in a selected local coordinate neighborhood. Also, see local statistic, and global statistic. Statisizing is the process of applying the statistic method.

Target Data: Target data is a geophysical data set that is to be analyzed. Examples include seismic, electrical, magnetic, optical, or other form of measurements that measure rock properties. Target data is usually in the form of a 3D voxel cube although higher or lower spatial dimensions or analog data may also be used. The data that is most frequently used is 3D seismic data. To allow analysis of the rock layers rather than their interfaces, band-limited acoustical impedance is usually used. To maximize the quality of the analysis, the broadest bandwidth that can be reliably computed should be used. In terms of pattern recognition this is a data set to be classified into targets and non-targets by the hyperdimensional fragment which functions as a classifier.

Template: Intuitively, a template is sorting device for selecting a subset of a data collection where each member of the subset matches the template. A template is implemented in software as a collection of one or more decision surfaces. For the purposes of the present invention, a template is a hyperdimensional fragment representing the pertinent contents of the pattern database of a known data plus the binding strength. A template is applied to the hyperdimensional fragments of the PDB of a target data set to identify targets. Different templates identify different targets. Multiple templates can be applied to identify more than one type of target. In addition, a template can contain decision surfaces that are related to object attributes that are properties of the objects boundary representation. An example is selecting objects for which the local curvatures lie within a given range of values as defined by decision surfaces in the template.

Template database: A database containing one or more templates. The template database can be stored as data files, in a relational database, in an object database, or in an object-relational database.

Texture: Intuitively, a texture is the visual characteristic of a cloth that is composed of closely interwoven threads where the threads have unique patterns. Texture is a measurement of the order of repeated patterns in a series of spatially adjacent fragment sequences. Also, see Texture Space.

Texture Location: The texture location is the physical starting and ending location that defines the spatial position of a texture.

Texture Space: Texture space is, mathematically (topologically), an abstract vector space (state space) that is computed as a transformation from a pattern space to the texture space. The transformation is computed in the same way as transforming from feature space to pattern space with the exception that the input is a pattern space. In practice, computational efficiency is enhanced by estimating the pattern space by transforming only selected portions of the feature space. Also, see texture.

Transparency: Transparency is a property of a material that allows light to shine through it and also allows items behind it to be viewed through it. Transparency is inversely proportional to opacity.

Value: Value is the amount of light being emitted. The absence of light is black. The presence of equal amounts of all colors is white.

Visual feature set: A visual feature set is a feature set designed to classify data based on its visual appearance. An instance of a visual feature set is the one a shipping company uses to classify packages. The feature set is measurements of boxes including length, width, height, and shape (square, rectangular, etc.). An instance of a visual feature set that is used by seismic stratigraphers and interpreters to analyze band-limited acoustical impedance (inverted seismic) includes distance between zero crossings, maximum amplitude, and shape (skewed upward, skewed downward, single peak, multiple peaks, shoulder). Also, see features.

Visualization: Visualization is the creation and manipulation of virtual display scenes containing display objects plus the act of viewing them after they are displayed on a computer monitor, a display screen, or any display device.

Voxel cube: A voxel cube is a 3D regular, ordered, quadmesh representing discreet measurements in a Euclidean space. A voxel cube is also referred to as 3D pixels.

WAN: Wide Area Network.

YIQ: A color model comprised of Luminosity-In-phase-Quadrature.

The present invention is a method, system, and apparatus for converting digitized information, such as seismic data, and associated measurements, such as a pattern database, into a color-based format for display to a human user. The present invention is also used for visualizing pattern database information for the data being analyzed and performing visual clustering of the associated pattern database information. In addition, the present invention allows identification of a portion of the data set that acts as an example or known data set and then comparing that known data to the entire data set, target data, in order to illuminate desired features within the target data. To make the image more interpretable it slows volume math to be performed, for example for rescaling or displaying in a logarithmic or other scale. This is followed by segmentation of the target data to create objects, object editing, and object visualization including sculpting and dissection.

Specifically, the present invention is a system for and method of constructing a false-color image for three-dimensional ("3-D") images by mapping multiple pieces of pattern database information into different color and opacity channels, and creating a single 3-D image that clearly retains and displays all of the separate pieces of information plus their interactions in one image. In addition, example subsets called known data, can be selected in the total data set for which a pattern database is constructed. The known data is then compared to the rest of the data, called the target data set, from which patterns can be discerned and the locations of desirable features identified, which are then segmented out as objects.

Pattern Recognition of Geoscience and Geological Data

The first step of the pattern recognition method of the present invention is feature extraction. Feature extraction comes in many forms, and tends to be specific to the type of problem encountered. For example, in seismic data analysis, geological features are extracted. Most traditional methods of feature extraction for seismic data involve mathematical algorithms that focus on the measurements of the sound rather than on the visual appearance of the displayed data. Most geophysicists, however, think of geology in a visual way, which makes analysis and interpretation of traditionally extracted seismic signal features difficult. Many other examples and uses for the feature extraction and imaging technique of the present invention will be apparent upon examination of this specification.

In general, a mathematical representation of features describes the local state of a system. The features are then represented as a vector in an abstract vector space or tangent space called the feature state space. The axes of the state space are the degrees of freedom of the system, in this case the features of the image. To minimize the amount of information required to represent the state of the image it is preferred that the features, axes of the state space, be linearly independent. The features have the capacity to "span the signal," or to describe all seismic attributes such that, for example, a geophysicist could accurately re-create the underlying geology.

Using seismic data as an example, geological features are extracted for performing pattern recognition on a seismic data set. Feature descriptors of seismic data tend to be one-dimensional, measuring only one aspect of the image, such as measuring only properties of the signal at specific locations in the signal. These feature descriptors taken singly do not yield enough information to adequately track geology. The relationship these measurements have with their local neighbors contains information about depositional sequences that is also very important geological information. Thus, the relationship features have with their neighbors and the total data set needed to be analyzed.

The present invention utilizes a hierarchical data structure called a pattern pyramid that is stored in a pattern database (PDB). The pattern database employs a process that is based on DNA-like pseudo sequencing to process data and places the information into a pattern database. This database contains the data plus features and their relationship with the data and, in addition, information on how the features relate with their neighbors and the entire data set in the form of pattern, textures, and related statistics.

Intuitively the basic concept of the pattern pyramid is that complex systems can be created from simple small building blocks that are combined with a simple set of rules. The building blocks and rules exhibit polymorphism in that their specific nature varies depending on their location or situation, in this case the data being analyzed and the objective of the analysis. The basic building block used by the present invention is a fragment sequence built from a one-dimensional string of data samples. A pattern pyramid is built using fragment sequences (simple building blocks) and an abstraction process (simple rules). The specific definition of the building blocks, cutting criteria, exhibits polymorphism in that the algorithm varies depending on the data being analyzed and the goal of the analysis. Similarly, the abstraction process exhibits polymorphism in that the algorithm depends on the data being analyzed and the goal of the analysis.

A pattern database is built for known data, which functions as a reference center for estimating the locations in the target data that are potential hydrocarbon deposits. The estimation is accomplished by building a pattern database for the target data using the same computations as for the known data and comparing the pattern databases. The pattern pyramids have several levels of abstraction that may include features, patterns, and textures. The pattern pyramids are built using an abstraction process. Comparing the pattern databases is performed by defining a hyperdimensional fragment which associates the appropriate pattern information in the pattern database to the specific data samples from which they were computed. Classification of the target data into portions which match the known data and portions which do not match is accomplished by searching through the hyperdimensional fragments of the target data and comparing them to the hyperdimensional fragments for the known data (the classifier) to identify matches. Intuitively this means that for the target data to match the known data at any location not only do the data values need to agree but the data values must also be a part of local features, patterns and textures that also agree adequately. Thus, the present invention not only performs pattern recognition, but is also capable of performing feature recognition, texture recognition, and data comparison all at the same time as required for solving the problem.

To allow for natural variation or noise in the data, exact matches do not have to be required. This is accomplished by defining a binding strength or affinity which allows hyperdimensional fragments that are reasonably similar but not exactly the same to be classified as matched. The hyperdimensional fragment selected by the geoscientist operating the present invention captures the operators' knowledge of what is a desirable outcome, or in other words what a hydrocarbon filled reservoir looks like.

The hyperdimensional fragments and associate abstraction process parameters can be saved as a template into a template database. One or more templates can be checked out from the library and applied to large volumes of target data to identify targets. Targets which have been segmented out of the data set are stored as objects in a collection of objects called a scene. The objects, along with additional data the geoscientist adds to them, become a list of drilling opportunities.

Oil Exploration & Production Uses

This invention is capable of being used for geological, geophysical and engineering data processing, analysis and interpretation for hydrocarbon exploration, development, or reservoir management. It supports application for a variety of types of geophysical data. The present invention is flexible and extensible allowing adaptation to provide solutions to many geoscience problems.

For example, the present invention is capable of being used to analyze 3D seismic target data set with the goal of identifying the drilling target locations that represent potential hydrocarbon bearing reservoir rock. An ideal path to reaching this goal is to directly locate and analyze the hydrocarbons in reservoirs. Experience has shown that geology is diverse and complex and geophysical tools (other than drilling) do not directly measure the existence of hydrocarbons. Thus, oil finders build a set of corroborating evidence to decrease risk and increase the probability of drilling success, where success is defined as locating profitable hydrocarbon accumulations. Accomplishing this involves using several forms of geological and geophysical analysis, the goal of which is to identify sufficient evidence of the three basic components of an oil field, which are a reservoir, a charge, and a trap. Identifying a reservoir involves collecting evidence of the existence of a rock having the property that it is capable of holding sufficient hydrocarbons (adequate porosity) and the property that allows the hydrocarbons to be removed from the earth (adequate permeability). Identifying a charge involves collecting evidence that a hydrocarbon is present in the reservoir rock (bright spots, fluid contacts, and others). Another way is to identify a source rock that is or was expelling hydrocarbons and a hydrocarbon migration path to the trap. Identifying a trap involves collecting evidence that the earth structure and/or stratigraphy forms a container in which hydrocarbons collect forming structural traps, stratigraphic traps, or a combination of the two. When the identification of a reservoir, charge, and trap are complete the result is called a lead. After a full analysis of the reservoir, charge, and trap plus risk analysis, economic analysis, and drilling location selection the lead becomes a prospect that is ready to be drilled. The probability of success is highest when there is strong evidence that a reservoir, charge, and trap all exist, that they exist in the same drillable location, and that they can be profitable exploited. Our objective is to construct a pattern recognition process and associated tools that identify a location with all of the constituent parts of a lead and to quantify them to covert a lead into a prospect.

When it is applied to 3D seismic, the present invention identifies a potential reservoir through feature analysis, identifies hydrocarbon indications through pattern and texture analysis, and identifies the presence of a depositional process that deposits reservoir rock though texture analysis. It is also capable of identifying the presence of a trap by determining the presence of stratigraphic sequences that create stratigraphic traps through texture analysis and the determining the presence of structural trapping components through fault identification by edge identification. In addition it is capable of identifying the presence of a charge by locating stratigraphic sequences capable of expelling hydrocarbons through feature, pattern, and texture analysis plus determining the presence of faults in the neighborhood through fault identification. The final step of associating and validating the three components of an oil field is usually accomplished by a geoscientist.

After a lead has been identified, the pattern database, along with appropriate visualization, could be used to perform reservoir dissection. This is a study of the internal characteristics of the reservoir to estimate the economics and convert the lead into a prospect.

After an oil field has been discovered the present invention is capable of being used to improve reservoir characterization, which is the estimation of rock properties (rock type, porosity, permeability, etc.), and fluid properties (fluid type, fluid saturations, etc.). Rock types and properties are a function of the geologic process that deposited them. In addition to information about the rock's acoustical impedance, the local features, patterns and textures contain information about depositional processes. Thus, the rock type and property estimations can be improved by including the feature, pattern, and texture information while estimating them.

In addition to the above seismic analysis methods, the present invention could be used for portions of data processing. Examples include but are not limited to, automatic stacking velocity picking, automatic migration velocity picking, noise identification, and noise muting.

The present invention is also capable of performing data set registration and comparison by successively aligning textures, patterns, and features. When applied to seismic it includes registering shear data to compressional data, registering 4D seismic data, registering angle stacks for AVA analysis, and others.

3D Seismic First Pass Lead Identification

This example performs first pass lead identification through simultaneous identification of a potential reservoir through feature analysis, identification of hydrocarbon indications through pattern and texture analysis, and identification of the presence of a depositional process, that deposits reservoir rock, though texture analysis. One way to do this is to use a known data set, which represents a successful lead or example lead, and compare the target data to known data. For this example, the goal is to identify reservoirs that occur in all forms of traps. Thus, it is preferable to disassociate the structural aspects of the earth from the stratigraphic, rock property, and hydrocarbon indication aspects. During this analysis, the structural aspects are not used. After the potential lead is identified using this example, the existence of a trap and charge will be determined.

For 3D seismic lead identification, the overall process starts by building a pattern database with successive levels of abstraction (features, patterns, and textures) for the known data. After the pattern database building process has been applied to a set of known data, and the minimum set of attributes that characterize the known data has been identified, the pattern database is applied to a set of data to be analyzed (the "target data"). The data of each set are subjected to the same series of steps within the abstraction process.

Before or during the comparison an affinity or binding strength is selected by the operator which determines how closely the known data has to match the target data to result in a target being identified. The binding strength helps to identify features, patterns, and textures in the target data that adequately match, but do not exactly match, the desired features, patterns, and textures in the known data.

Next, the pattern database for the known data is compared to that of the target data. This is performed by identifying a hyperdimensional fragment from the known data pattern database that adequately and reasonably uniquely characterizes the known data. This hyperdimensional fragment relates the data at the location where the hydrocarbons were found or are expected to be found to the set of features, patterns, and textures which were derived from it. The hyperdimensional fragment and associated abstraction process parameters can be combined into a template. Templates can be used immediately or stored in a template database on one or more mass storage devices, and then retrieved when needed.

When templates are applied to target data sets the resulting targets are identified. These targets are stored as objects that represent leads. The leads objects are the locations in the target data sets which have a potential reservoir identified through feature analysis, potential hydrocarbon indications identified through pattern and texture analysis, and the potential presence of a depositional process that deposits reservoir rock identified though texture analysis. A collection of objects are stored in a scene. The scene represents the physical locations of the leads identified by the present invention in this example. Geological and other required properties of the leads can be stored with them.

Because the nature of the reservoirs, and possibly the hydrocarbons trapped in them, varies across each data set due to natural geological variations, it is often necessary to create more than one template to identify all of the leads any given area offers. A collection of templates can be created and stored in a template database. These may be sequentially applied to one or many target data sets in a process called data mining. When multiple templates are applied to the same target data set, the results are several scenes each containing lead objects. The scenes and their associated objects, one scene from each template, can be combined by performing Boolean operations on the scenes containing the objects creating one composite scene.

3D Seismic Pattern Pyramid

A 3D seismic data set exemplary embodiment of the layers of abstraction associated with the method of the present invention is illustrated in FIGS. 1a-e. Each level of the pattern pyramid represents a level of abstraction. The input data lie in the data layer 108 at the bottom of the pyramid 100. The width at the base of each layer is generally indicative of the number of data samples or fragments involved within that stage of the method of the present invention. For each level of abstraction the smallest spatial unit that needs to be analyzed is a fragment. A fragment sequence is a one dimensional, ordered, spatially sequential, set of data values that cover multiple data samples and becomes larger with each higher level of abstraction. The total number of fragments for each level decreases as the level of abstraction increases leading to the pyramid-shaped illustration of FIG. 1a.

In the exemplary embodiment, the pattern pyramid 100 contains three layers of abstraction above the data level 108 (see FIG. 1a). The abstraction process is first applied to the data level to generate the feature level 106. Thereafter, the abstraction process is applied (at least once) to the feature layer data to generate the pattern level 104. Next, the abstraction process is applied (at least once) to the pattern layer data to generate the texture level 102. While the exemplary embodiment of the pattern pyramid 100 illustrated in FIG. 1a has three layers of abstraction above the data level 108, only one layer is required to practice the invention. Additional layers are generally used to solve specific problems. Should the analysis call for it, any number of layers may be generated above the data level 108. How many layers are generated, or how they are generated, is problem-specific.

Figure 1B:
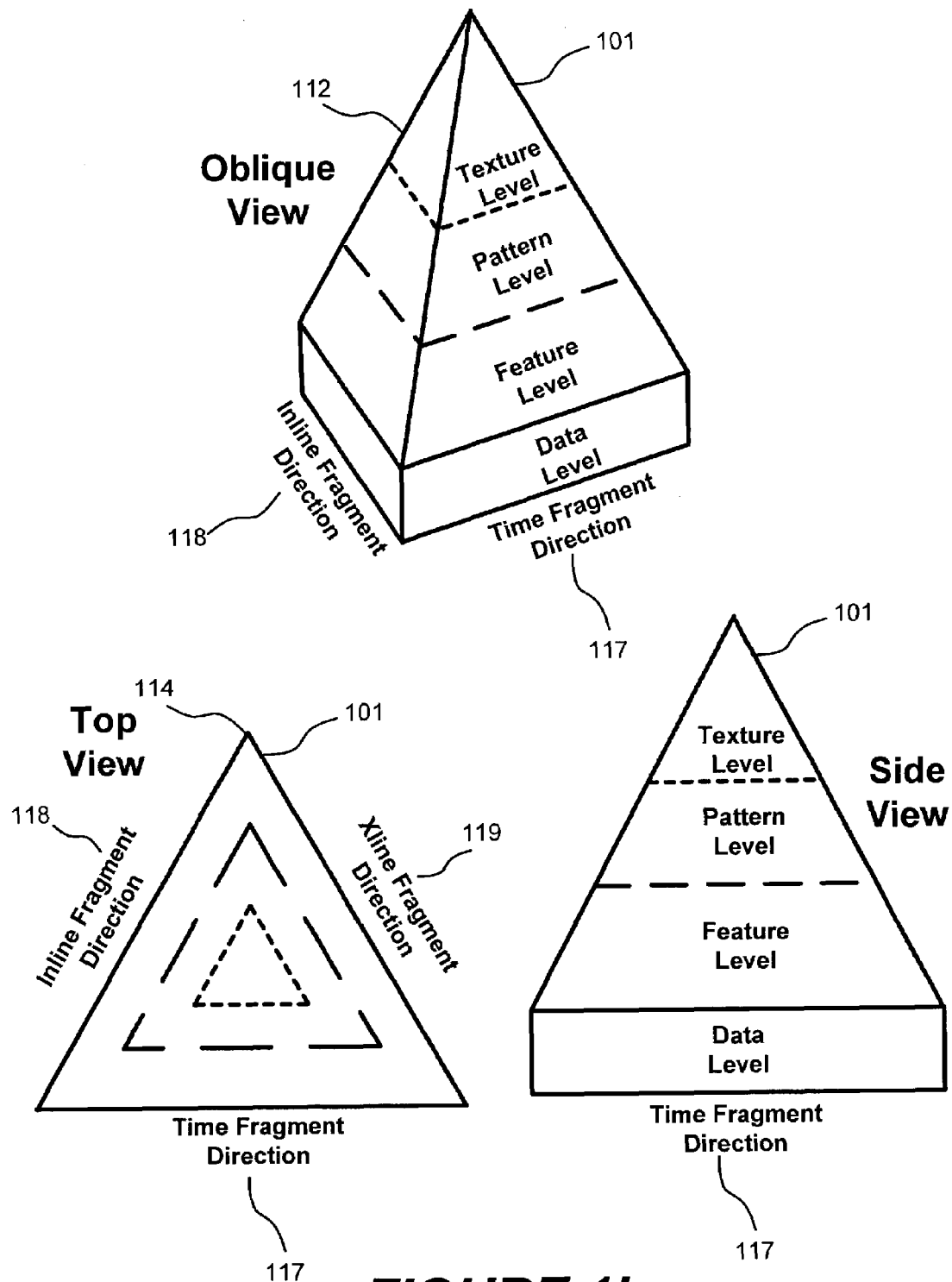
FIG. 1b is a diagram of an example of a pattern pyramid for data with three spatial dimensions according to the teachings of the present invention.

The pattern pyramid 100 shown in FIG. 1a corresponds to a single fragment orientation during analysis. Some data sets with more than one spatial dimension may require analysis in more than one fragment orientation to achieve the desired results. Seismic data has a strong preferred direction caused by the geology of the subsurface of the earth. Another example of data with a preferred direction is wood grain. For these types of data, the analysis can give very different results depending on the fragment orientation relative to the preferred direction of the data. Successful analysis of this data might require using fragments with more than one alignment (such as an earth manifold alignment). To accomplish the analysis, sides can be added to the pattern pyramid 101 as shown in FIG. 1b. Each side of the pattern pyramid 101 is associated with a fragment alignment direction. The example, FIG. 1b shows three views (oblique 112, top 114, and side 116) of a 3D pattern pyramid 101. The example of FIG. 1b shows a pattern pyramid 101 for 3D seismic data that has 3 spatial dimensions consisting of the inline axes, xline axes, and time axes. Each direction has an associated side on the pattern pyramid, an inline side 118, an xline side 119, and a time side 117. Because geology does not always align itself with the coordinate system on which the data is collected, this orientation will result in a pattern recognition analysis where the largest effect is the structure of the earth. When analyzing the trap component of an oil field, this orientation is very useful. However, if the goal is to avoid analyzing geological structure and instead analyze the earth's stratigraphy, a different coordinate system is needed. To accomplish that goal, the fragments need to be aligned with the earth manifold, along dip, strike, and normal to the layers.

Figure 1C:
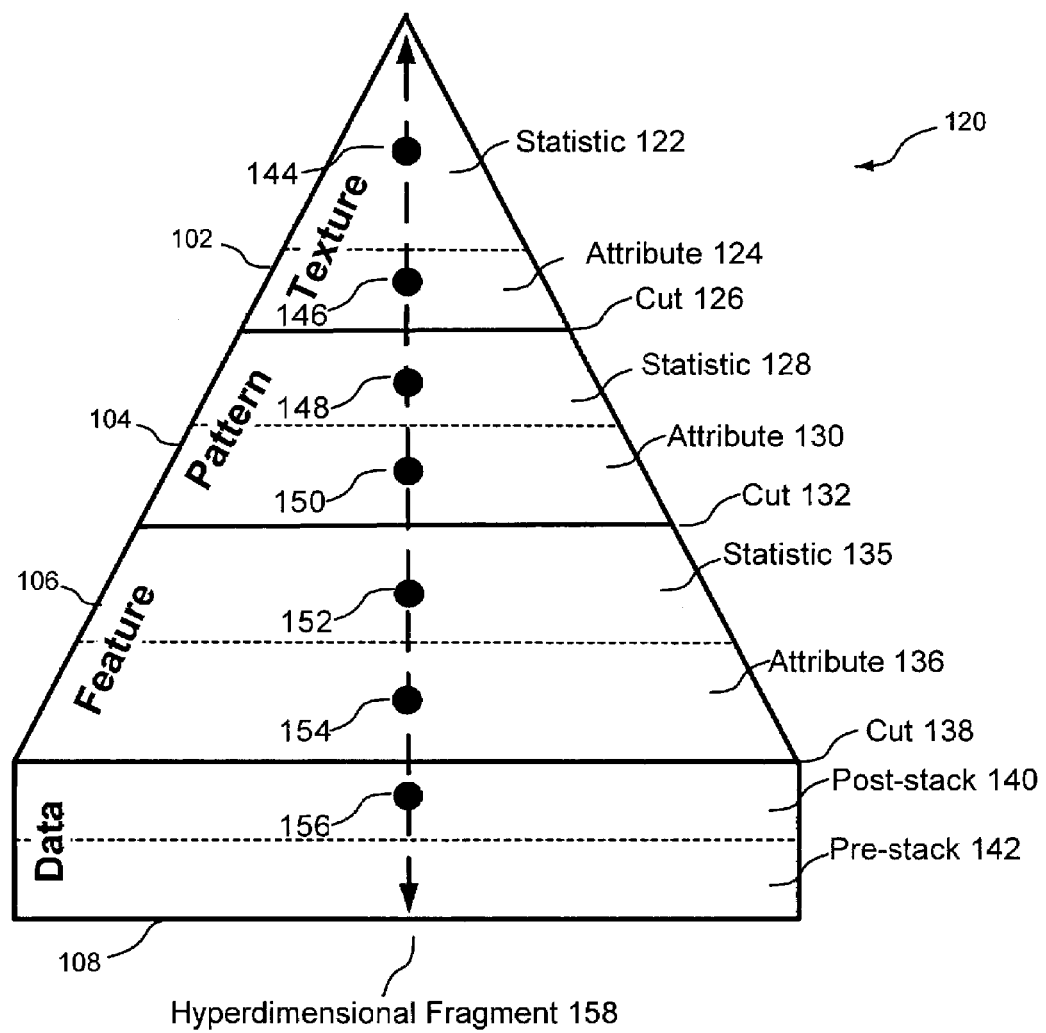
FIG. 1c is a diagram of the pattern pyramid, an example of the components within each level, plus an example of a hyperdimensional fragment according to the teachings of the present invention.

The pattern database building process identifies the minimum set of attributes (features, patterns, and textures) of one or several examples of known data so that, when the known data is compared to the target data, only the desired characteristics need to be considered. The results of each step are represented in the pattern pyramid 120 as shown in FIG. 1c and are stored in the pattern database (illustrated and discussed below). The process starts at the data layer 108 which for seismic data can contain a lower layer of pre-stack seismic data 142 setting under a layer of post-stack seismic data 140. Above the data layer 108, at the base, the pattern database 120 contains several layers of abstraction that are built sequentially starting at features 106, proceeding through patterns 104, and finally ending with textures 102, the latter being the highest level of abstraction for this application. There may be one or several layers of each type. Moreover, not all of the layers are required. The pattern database can be built only up to the pattern pyramid level required to solve the problem. The creation of each layer includes one or more steps of cutting, computing attributes, and computing statistics. For example, each layer 106, 104, and 102 has a cut 138, 132, and 126, computed attributes 136, 130, and 124, plus computed statistics 135, 128, and 122, respectively. The precise methods of cutting, computing attributes, and computing statistics can change from layer to layer, and can change within the individual layers. The specific computations in the preferred embodiment of the present invention, the abstraction process is designed to capture the minimum set of feature level attributes 136, feature level statistics 135, pattern level attributes 130, pattern level statistics 128, texture level attributes 124, and texture level statistics 122 required to solve the problem.

Geophysical & Geological Data

The data in the foundation of the pattern database can by any type of a variety of geophysical and geological data types. The data types include many forms of indirect and direct measurements. Direct measurements involve obtaining physical samples of the earth by mining or drilling. Indirect measurements include active and passive data gathering techniques. Passive techniques involve studying naturally occurring signals or phenomena in the earth such as magnetic field variations, gravitational field variations, electrical field variations, sound (such as naturally occurring micro-seismicity or earthquakes), and others. Active measurements involve introducing signals or fields into the earth and measuring the returns including magneto-telluric, seismic, and others. Active and passive measurements are acquired on the surface of the earth and in wells. These include but are not limited to seismic, electrical, magnetic, and optical data. It is capable of being applied to data sets with any number of spatial dimensions, usually one, two, or three dimensions. It also works on higher dimension data. Examples include, but not limited to, 4D pre-stack seismic cubes containing offset data, 3D pre-stack cubes containing all of the offsets for a 3D seismic line, 4D seismic cubes containing multiple angle stacks, 4D seismic taken at different calendar dates, combinations of these, or others.

When applied to seismic data, the wave propagation types include but are not limited to compressional, shear, combinations and other types. The seismic can be in the form of pre-stack and post-stack data or both. It can be as acquired (raw) or processed. It can also include modified seismic data including but not limited to acoustical impedance computed by a seismic inversion. If the goal is to study AVO or AVA effects reflection coefficient data of elastic impedance data may be used.

Each data sample has at least, but is not limited to, one data value. An example of a single data value at a sample includes, but is not limited to, the band-limited acoustic impedance information obtained from seismic data. An example of a sample with multiple data values includes, but is not limited to, multi-component seismic.

When the goal of the analysis is seismic interpretation of 3D seismic data, the properties of the geological layers need to be studied instead of the properties of their boundaries where reflections occur. The preferred, but not only, way to accomplish this is by analyzing an acoustical impedance cube with the broadest possible bandwidth that can be reliably created by seismic inversion. The analysis can be band-limited acoustical impedance computed from reflection data. The analysis can also be broad-band acoustical impedance computed from seismic data plus well log data, and/or seismic stacking velocities, and/or seismic migration velocities, and/or operator constructed models. For the lead identification example, the technique is applied to 3D seismic data that has been inverted creating a band-limited acoustical impedance 3D voxel cube.

PDB Abstraction—Cutting

The first step of the abstraction process, for each pattern pyramid level, is to cut fragments. Each fragment is a one dimensional interval that has a physical length and physical location. It corresponds to an associated fragment sequence that is a sequence of data, attribute, or statistics values from a lower layer in the pattern pyramid.

In the most computationally efficient embodiment of the present invention, pre-defined or operator-supplied cutting criteria are applied to the data to generate the fragments. The specific cutting criteria that are applied for cutting can be a function of the problem, of the data being analyzed, or both. These include fixed spatial length cuts, cuts derived from lower level pattern pyramid information, or cuts determined from a user-supplied example.

Some forms of geophysical and geological data are amenable to using fixed-length fragments, and the present invention can easily accommodate fixed-length fragments. Fixed length fragments associate a fragment with a fixed number of data samples.

For band-limited acoustical impedance the most common cutting criteria are to use cuts derived from the information in any lower level of the pattern pyramid. For example, feature cutting criteria is a function of the data values. Pattern cutting criteria can be a function of the feature level cuts, feature level attributes, feature level statistics, or data values. In this case the cutting criteria remains constant for the level while the underlying data typically varies, with the results that fragment sequences are often variable in spatial length. Variable length fragments, that track geology, are preferred.

For some problems, cutting criteria need be selected interactively. Here the operator paints an example of data on one side of the cut and paints a second example of data on the other side of the cut. The application then performs a statistical analysis of all or some of the information in lower levels of the pattern pyramid to identify the information that classifies the two examples provided by the operator as different then uses that classification to determine the cut. This is the computationally most inefficient method.

While the cutting criteria for a step of cutting typically remain constant, the specific criteria can vary from layer to layer in the pattern database. As higher levels of the pattern database are computed the associated fragments created during the cutting process become larger.

Because geological unconformities occur in band-limited acoustical impedance zero crossings, it is necessary, when the present invention is used for seismic interpretation, to constrain the fragment cuts for all of the levels of the pattern database above the feature level to occur at the same spatial location as the fragment cuts for the feature level. The imposition of the constraint is accomplished by restricting the cutting criteria to be a function of the information one level below it. Other problems may not have need of the constraint.

It should be noted that the choice of the grid coordinate system, on which the data is sampled, typically has no relationship to the spatial distribution of the geology being studied and the associated data measurements. When the spatial dimensions of the data are higher than one, a fragment orientation needs to be selected. For geophysical data, the natural fragment orientation is to align it with geology. This is accomplished by computing a geology aligned coordinate system, which is an earth manifold, and using it to align the fragments and fragment sequences with geology. To simplify the implementation the fragments can be aligned with the seismic traces recognizing that, as geological dip becomes large, the approximation quality decreases.

When the coordinate system on which the underlying data is sampled is not aligned with the geology, edge noise can occur during cutting, attribute calculations, and statistic calculations. For optimum performance, the edge noise should be eliminated or attenuated by using a continuous representation (local or global spline fit) of the data when performing computations. The best, but computationally most inefficient, solution is a manifold with continuous local coordinate charts.

PDB Abstraction—Attributes

In the second step of the abstraction process, the attributes at each fragment are computed and are stored at the attribute location for the appropriate level in the pattern database. The specific attribute computations can be the same or can vary from level to level. The attributes may be stored in a pattern database, as software objects (parameters or methods) stored in RAM, as objects stored in an object database, as objects or data stored in an appropriately mapped relational or object-relational database, or stored via some other storage technique or mechanism.

PDB Abstraction—Statistics

The third step of the process is the statistical analysis of the previously calculated attributes. The statistical analysis gives the probability of the attribute occurring in its local neighborhood (local statistic) and in the total data set (global statistic). Some statistics may represent estimates or properties (sometimes called features) of the attributes for the next level up in the pattern pyramid. An example is attribute complexity or local attribute anisotropy.

In practice, other types of information may be stored along with statistics in the present invention including correction parameters. An example of a correction value occurs when the data is provided in a Euclidean format. However, geological measurements are best expressed in a geology aligned fashion. To align the analysis with geology it needs to be aligned with the earth manifold. The corresponding earth manifold definition and/or local coordinate chart dip and azimuth values can be computed and saved within the database in the statistics level.

Additional properties, which are needed but are not captured by the attributes, may also be stored as statistics. These include properties of the earth manifold, measured on the local topology of the earth, such as local curvature.

Hyperdimensional Fragment and Binding Strength

FIG. 1c illustrates how a particular point of space in the input data 140 and 143, represented by the point 156, has corresponding points 154 and 153 in the feature layer, 150 and 148 in the pattern layer, plus 146 and 144 in the texture layer. The ordered set of points 156, 154, 153, 150, 148, 146, and 144 forms a trajectory called a hyperdimensional fragment of the data point 156 in question. The pattern pyramid has a set of hyperdimensional fragments that associate each data sample to the features, patterns, and textures to which it contributed. Because the type of abstraction analysis is problem specific, so too is the resultant hyperdimensional fragment.

When comparing the known data hyperdimensional fragment to the collection of target data hyperdimensional fragments the amount of similarity required to consider them matched is determined by the binding strength or affinity. This invention implements the concept of a binding strength by setting a range of acceptable feature, pattern, and texture values at each pattern pyramid level that the hyperdimensional fragment passes through. The result is that exact matches are no longer required but similar matches are allowed.

When the above-described process is completed, the hyperdimensional fragment and associated threshold becomes a template that is used for object identification. Making a comparison between the known data and the target data is accomplished by applying the template to the target data. The comparison is accomplished by searching through all of the hyperdimensional fragments in the target data set and determining if the feature, pattern, and texture values though which they pass are the same within the binding strength as the values in the known data hyperdimensional fragment. Templates can be stored in a template database and retrieved for later use on any target data set.

Scenes and Objects

The result of applying a template to a target data set pattern database is a scene that contains null values where matches did not occur and a value representing matched where matches did occur. The next step is to identify all data connected points where matches occurred and assign them to an object. This is accomplished by stepping through all of the points that are marked as matched and performing an auto-track that assigns all connected points that are marked as matched to an object. This is repeated until all points that are marked as matched have been assigned to connected objects. The result is a scene containing connected objects that represent potential hydrocarbon deposits. These objects represent a simultaneous analysis of how well they represent a potential reservoir through feature analysis, represent hydrocarbon indications through pattern and texture analysis, and include the presence of a depositional process that deposits reservoir rock though texture analysis.

Objects can have associated properties. For example, a 3D manifold (also referred to as a shrink-wrap) can be placed on the boundary (outside edge) of an object forming an object space. Topological properties of the object surface, such as local curvature, can be measured and stored as an object property.

Next, the scene, the collection of objects, is then analyzed in a quality control step to determine if the system is correctly creating the desired objects. If the system creates the expected objects, but the objects are incomplete or obscured due to seismic noise, the binding strength is modified and the data mining is repeated. If the expected objects are not created or too many objects which are false positives are created the amount of information in the PDB or associated parameters are modified, a new template is created and the data mining is repeated.

Finally, the collection of objects, in the scene(s), is viewed to manually identify and remove any remaining false positives. The goal is to minimize the work in this step by a good choice of PDB construction.

Data Mining

Templates can be precomputed from known data sets, stored in a template database, and used the pattern databases for one or many target data sets creating resultant scenes containing objects which satisfy the templates. This process is often referred to as data mining. The collection of objects becomes a lead inventory.

Feature Level Cutting Criteria, Attributes, and Statistics

Figure 1D:
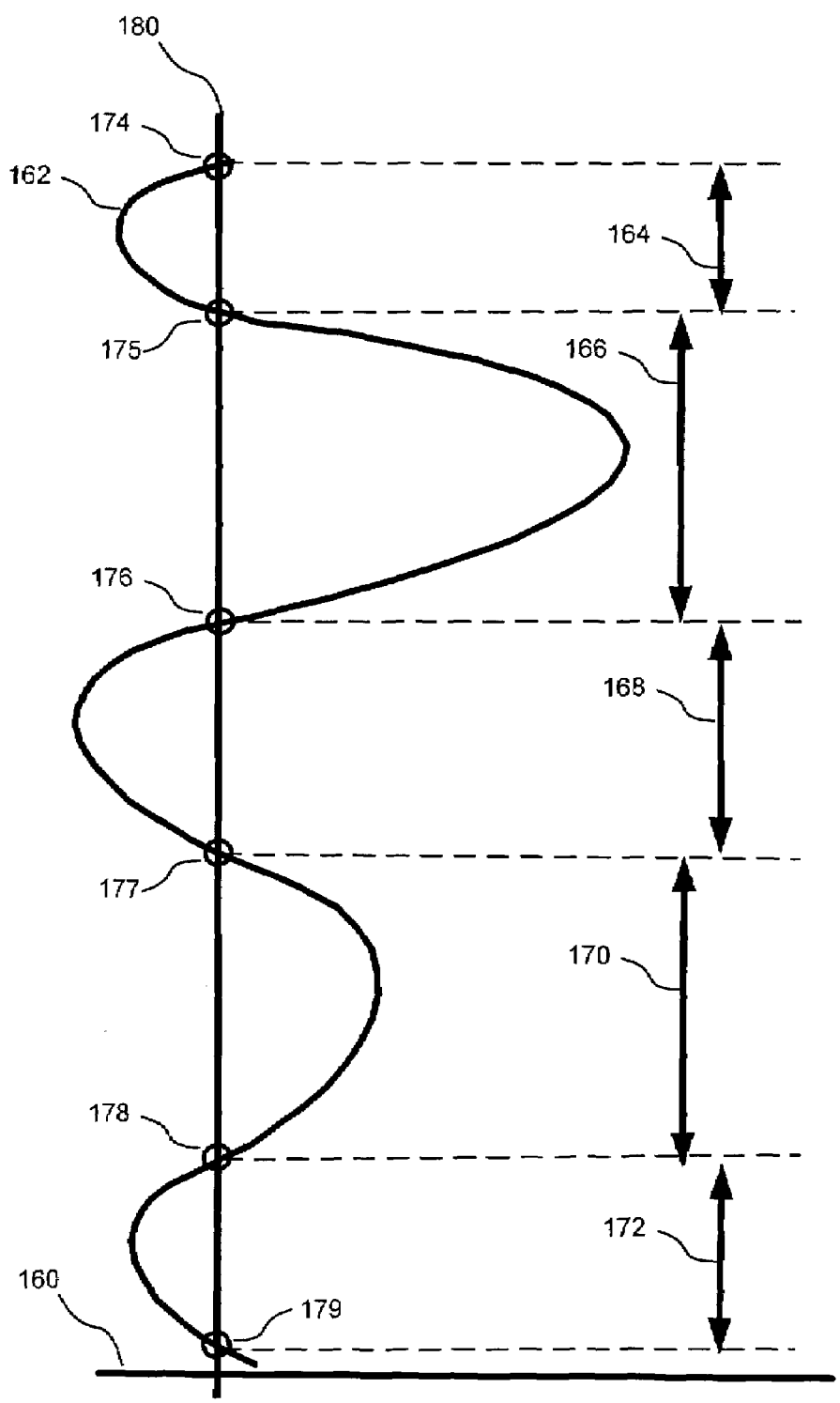
FIG. 1d is a diagram of an example of feature level fragment cuts for a band-limited acoustical impedance trace according to the teachings of the present invention.

For the 3D seismic first pass lead identification example, the data being analyzed is band-limited acoustical impedance. The objective is to identify hydrocarbon filled reservoir rocks. In order to identify the hydrocarbons, it is preferable to gather information about the band-limited acoustical impedance values, depositional process, and the presence of hydrocarbon indicators (bright spots, dim spots, flat spots, etc.) but exclude the geological structure so that we can find opportunities for all possible trap structures. For this example the cutting criteria for features is cutting at each zero crossing of band-limited acoustical impedance as shown in FIG. 1d. The figure includes a portion of band limited acoustical impedance data that can be represented as a curve 163 on a coordinate system having an X-axis 160 representing the band limited acoustical impedance value (also called amplitude) and a Z-axis 180 representing the 3 way travel time of sound or subsurface depth. In this example the cutting criteria creates a fragment cut wherever the band limited acoustical impedance has a zero crossing. In the example of FIG. 1d, the data 163 crosses the Y-axis 180 at six locations 174 to 179. The zero crossings 174 and 175 can be used to demarcate the interval 164 of a fragment of data, namely curve 163. Similarly, the zero crossings 175 to 179 demarcate fragments 166 to 173. When broadband acoustical impedance data is used, one method of cutting criteria is to find edges in the data that are places where the change in the broadband acoustical impedance values between two consecutive data samples exceeds a threshold.

The feature attributes for this example are chosen to form a visual feature set. This set describes the band-limited acoustical impedance using the same descriptions as used by seismic stratigraphers when communicating their work. This choice ensures that the features are interpretable, or understood by geoscientists. Because the features are based on naturally occurring, geological visual properties, and because seismic stratigraphers have had considerable success using them, they are known classifiable. These interpretable features include the length of the fragment (also called thickness), the absolute value of the maximum acoustical impedance of the data within the fragment (also called max amp), the shape of the data values in the fragment, and the sign of the data values (+ or −). There are many ways to measure shape. One way to measure shape is to measure all of the statistical moments of the data in the fragment. This set of measurements represents all of the degrees of freedom of the problem. In practice, not all of the statistical moments are required to solve the problem. Often, only the first moment is used.

The statistics, for this example, consist of a global statistic. It is the probability of the given feature occurring in the entire data cube. Two local statistics is also computed. One is the data complexity in a local coordinate patch. Data complexity is the normalized sum of the data value variances. The second is local feature anisotropy. It computes the direction and magnitude of the feature variances in the local coordinate neighborhood. Both can be considered local texture estimates (also called texture features or texture statistics).

For seismic data the computationally most efficient method is to measure fragments for features aligned with seismic traces and is the way that seismic stratigraphers typically perform the task. Variations in structural dip may cause variations in the feature values that are not associated with rock or fluid variations. If the effects of these variations become too large, the fragments on which the features are measured must be aligned with the earth manifold. Since inline and xline fragments will carry primarily information about the earth's structure they are not used for this example. However, when the goal of the analysis is to identify structure similarity, inline and xline fragments should be used.

Pattern Level Cutting Criteria, Attributes, and Statistics

Figure 1E:
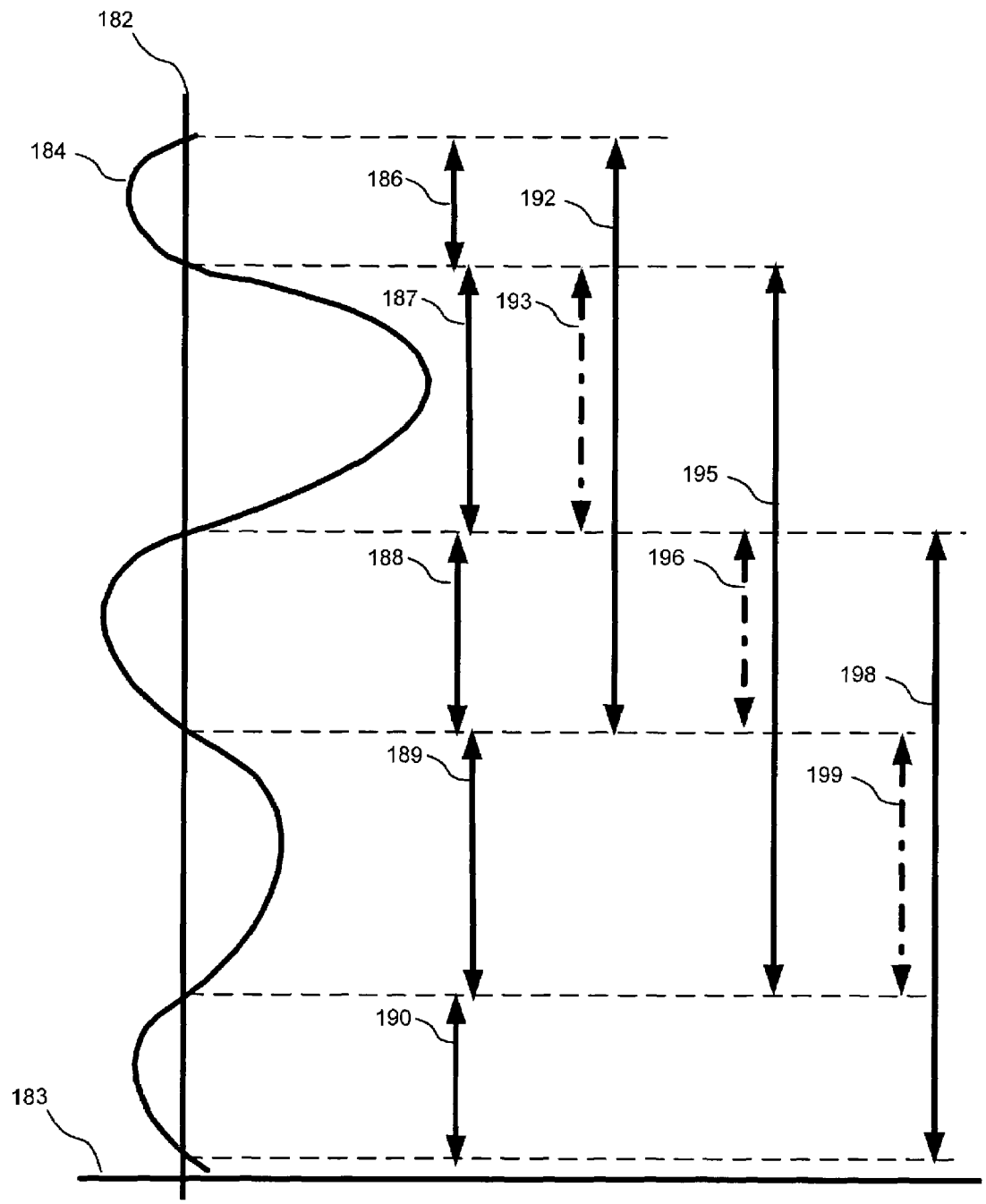
FIG. 1e is a diagram of an example of pattern level fragment cuts for a band-limited acoustical impedance trace according to the teachings of the present invention.

For the 3D seismic first pass lead identification example the pattern level cutting criteria is to cut the patterns so that the top and the bottom of the pattern fragments occurs at band-limited acoustical impedance zero crossings. The easiest way to accomplish this is by cutting the pattern level fragments from a combination of feature level fragments, FIG. 1e illustrates an example of pattern cutting for pattern location 193. The fragment 193 is defined as a combination of three feature level fragments 186, 187, and 188. This is often referred to as a pattern fragment length of 3 features and is an example of what is referred to as an odd feature length pattern fragment. By repeating the cutting process, the cutting criteria create the pattern fragment 195 for pattern location 196 using the feature level fragments 187, 188, and 189. Similarly, pattern fragment 198 for pattern location 199 comes from the feature level fragments 188, 189, and 190. Notice that the pattern fragments are larger than the feature fragments and overlap.

A shorter pattern fragment length can be computed by dropping one feature length off the top or one feature length off the bottom when performing the calculation. This is often referred to as a pattern fragment length of 3 feature lengths and is an example of what is referred to as an even feature length pattern fragment.

Longer pattern fragments can be constructed by extending either the odd or the even feature length pattern fragment described above. This is accomplished by adding one feature length to each end. Extending on both ends can be repeated as many times as required.

The pattern level attributes can be computed by performing a transformation of the feature attribute values associated with the pattern fragments into pattern space. After the transformation each location in pattern space contains the population density of pattern fragments that transform into it. Peaks in the population density can be identified and the space can be broken into clusters by placing decision surfaces between the clusters or peaks. The regions between decision surfaces for each cluster are assigned pattern attribute values. The pattern attribute values can then be transformed back to physical space and assigned to the pattern intervals as pattern attributes. This is the most computationally intensive technique and is too costly to be used for production processing and data mining.

A second method of computing pattern attributes is performed by breaking the pattern space up into user defined bins. To do this the binding strength needs to be selected at this point of the analysis. The bin size is determined from the binding strength. For each pattern location the bin into which the feature attributes associated with the given pattern fragment transforms is easily computed and stored as the pattern attribute value at the pattern location. This association is, computationally, the most efficient method. However, the association method has the drawback that the binding strength must to be set at this point of the analysis rather than be selected dynamically or interactively later, when the known data and target data pattern databases are compared. If the binding strength is not known it will be difficult to use this method. Sometimes it is determined by trial end error where the user repeats the analysis with different binding strengths and chooses the one that gives the best results. This method is often refereed to as fixed bin clustering or quick clustering.

A third method is to compute the coordinates of the pattern space location into which the feature attributes associated with the pattern fragment transforms and storing the coordinates as the pattern attribute values at the pattern location. The coordinates can be expressed in spherical coordinates, Cartesian coordinates, or any useful projection. In this method the pattern attributes have several values. The maximum number of values is equal to the number of feature fragments that are combined to create the pattern fragment. This is the computationally less efficient than the second method but much faster than the first method and can be used for data mining. It has the drawback that each pattern attribute has multiple associated values thus uses a lot of space on disk and in RAM. It is possible to decrease the storage requirements by discarding of combining values. It has the benefit that the binding strength selection can be accomplished during pattern database comparison, which makes it the most flexible method.

Any or all of the above methods of computing pattern attributes can be included as one or several levels in the pattern level of the pattern pyramid. Other methods of unsupervised classification, usually clustering methods, can also be used. The specific choices depend on how well and how uniquely the algorithm isolates out (classifies) the targets of interest from the rest of the target data.

Statistics can include the same algorithms used at the feature level of the pattern pyramid but applied to the pattern attribute values.

For seismic data the computationally most efficient method is to measure pattern fragments that are aligned with seismic traces. This is the way seismic stratigraphers typically perform the task. Variations in structural dip may cause variations in the feature attribute values that are not associated with rock or fluid variations. If the effects of these variations become too large, the fragments on which the feature attributes are measured must be aligned with the earth manifold. Since inline and xline fragments will carry primarily information about the earth's structure, they are not used for this example. When the goal of the analysis is to identify similar structures, the inline and xline fragments should be used. Fragment orientations that are aligned with the earth manifold or along local dip and strike will capture information about stratigraphic variations in the rocks and fluid variations related to the transition from hydrocarbon filled reservoir rock to brine filled reservoir rock. For the 3D seismic first pass lead identification example it might be useful to use a 3D pattern pyramid and populate the strike and dip sides of the pattern pyramid with strike and dip oriented pattern attributes and statistics computed from feature attributes from the vertical level of the pattern pyramid. This is computationally intensive, thus it might be faster to estimate them by computing them in the inline and xline directions but limiting the calculation to local coordinate patches with a common feature sign.

Texture Level Cutting Criteria, Attributes, and Statistics

For the 3D seismic first pass lead identification example the cutting criteria, attribute calculations, and statistics calculations are the same as for the pattern level with the following exceptions. First, the cutting criteria are computed as multiples of the pattern fragments rather than feature fragments. Second, the texture level attributes are stored at texture locations and are calculated from the pattern level attributes rather than the feature level attributes. The input to the transformation is texture fragments and the transformation is to texture space rather than pattern space. Third, the statistics only include the global statistics.

PDB Comparison, Objects, and Scenes

For the 3D seismic first pass lead identification example, the PDB comparison is performed by comparing hyperdimensional fragments. The binding strength is specified for each level of the pattern pyramid where it was not already specified during pattern database construction usually by using the quick clustering technique above. When this step is performed for the first time it is often performed interactively during visualization of a target data set and the related pattern database. When the optimal binding strength has been chosen, the template is applied to the target data set. This step is often referred to as applying a scene construction tool. After this is accomplished the spatially connected objects are computed using another tool which is also referred to as a scene tool.

Data Mining and Lead Inventory

For the 3D seismic first pass lead identification example the template computed above is saved in the template database. The appropriate templates are checked out and applied to all of the data in the geographical region being analyzed. The resulting scenes and associated templates are combined using Boolean operations which are usually referred to as Boolean scene tools. The final product is a lead inventory which is associated with a scene containing a list of multiple leads (objects) and lead parameters. The lead parameters include lead names, locations, spatial sizes, global statistics, local statistics, and other useful information as required by the operator.

The Implementation of the Present Invention

The present invention is preferably implemented as a set of one or more software processes on a digital computer system. However, the present invention may also be implemented purely in hardware, or may be virtually any combination of hardware and software.

The present invention may be modeled on a digital computer with the aid of various software objects that encapsulate data in the form of properties, and computations as methods. Moreover, these various object may have one or more methods through which selected functionality is performed. Each of these objects has a class definition and is interconnected according to the following descriptions and referenced drawings.

Class Definitions

The QDialog Class 302

Figure 3A:
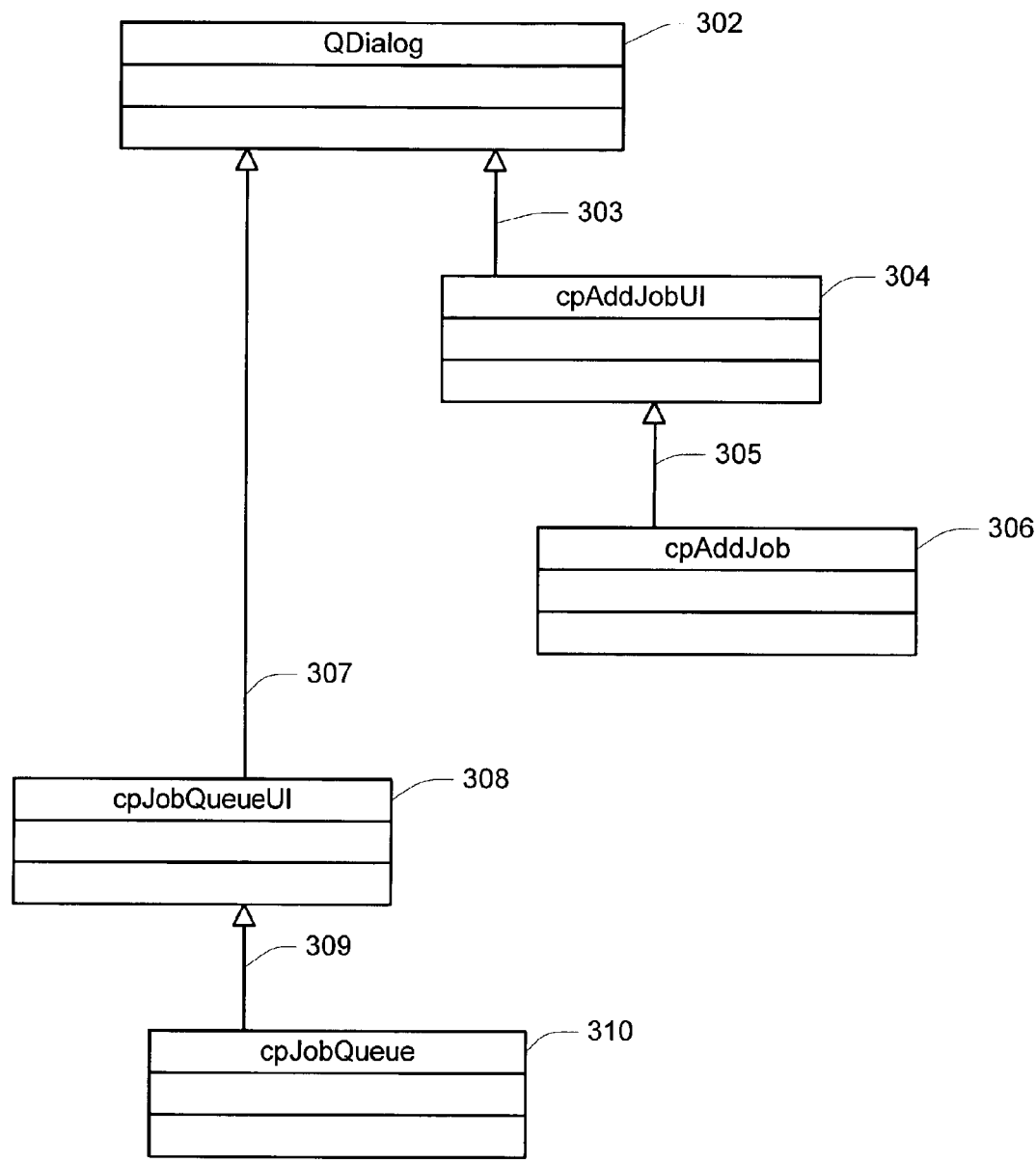
FIG. 3a is a block diagram illustrating a portion of the class hierarchy of the present invention.

The QDialog object 302 is illustrated in FIG. 3a and is a base class. The QDialog object 302 is the base level dialog of all windows.

The QDialog object 302 has a set of associations, for instance, the cpAddJobUI class 304 is derived from the QDialog class 302 (see association 303 of FIG. 3a); and the cpJobQueueUI class 308 is derived from the QDialog class 302 (see association 307 of FIG. 3a).

The cpAddJobUI Class 304

The cpAddJobUI object 304 is illustrated in FIG. 3a and is itself derived from the QDialog class 302. The cpAddJobUI object 304 is a part of the user interface. It is the base level window layout for the add job widget. The add job widget adds a job to the job queue. A job is a list of output volumes to be created and related parameters that result in the computation of a user selected set of feature attributes, feature statistics, pattern attributes, pattern statistics, texture attributes, and texture statistics. An add job widget displays user interface that allows the users to select the specific outputs to be computed and the parameters used during the computation.

The cpAddJobUI object 304 has a set of associations, for instance, the cpAddJobUI class 304 is derived from the QDialog class 302 (see association 303 of FIG. 3a).

The cpAddJob Class 306

The cpAddJob object 306 is illustrated in FIG. 3a and is itself derived from the cpAddJobUI class 304. The cpAddJob object 306 defines interactions for the add job widget.

The cpAddJob object 306 has a set of associations, for instance, the cpAddJob class 306 is derived from the cpAddJobUI class 304 (see association 305 of FIG. 3a).

The cpJobQueueUI Class 308

The cpJobQueueUI object 308 is illustrated in FIG. 3a and is itself derived from the QDialog class 302. The cpJobQueueUI object 308 is the user interface widget layout for the job queue.

The cpJobQueueUI object 308 has a set of associations, for instance, the cpJobQueueUI class 308 is derived from the QDialog class 302 (see association 307 of FIG. 3a).

The cpJobQueue Class 310

The cpJobQueue object 310 is illustrated in FIG. 3a and is itself derived from the cpJobQueueUI class 308. The cpJobQueue object 310 defines interactions for the job queue.

The cpJobQueue object 310 has a set of associations, for instance, the cpJobQueue class 310 is derived from the cpJobQueueUI class 308 (see association 309 of FIG. 3a).

The QThread Class 352

Figure 3B:
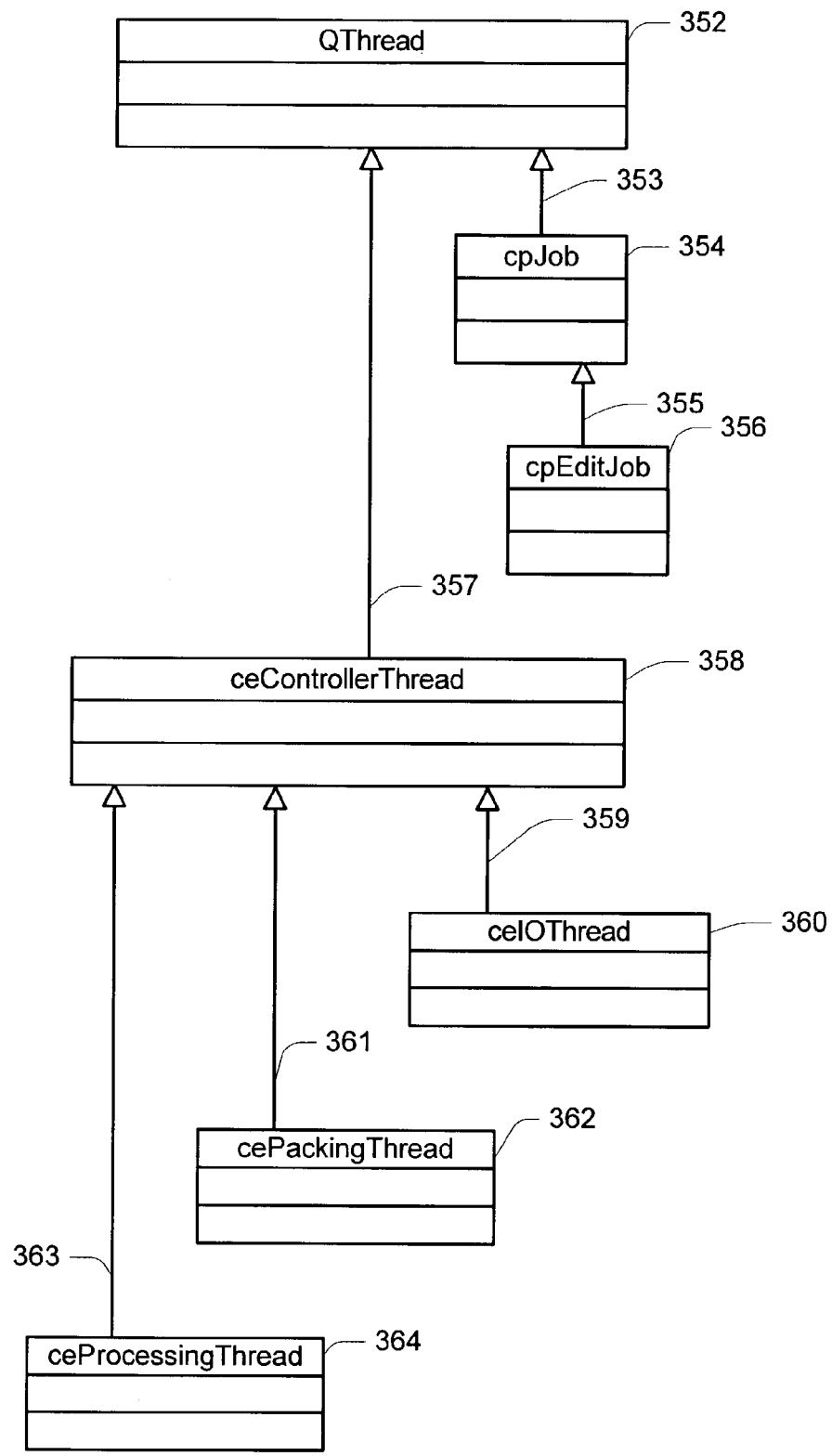
FIG. 3b is a block diagram illustrating a portion of the class hierarchy of the present invention.

The QThread object 352 is illustrated in FIG. 3b and is a base class. The QThread object 352 is the base level threading class supporting threaded functions. A thread is a function that runs on a processor. Using multiple threads allows multiple processors to be used, each performing a function.

The QThread object 352 has a set of associations, for instance, the cpJob class 354 is derived from the QThread class 352 (see association 353 of FIG. 3b); and the ceControllerThread class 358 is derived from the QThread class 352 (see association 357 of FIG. 3b).

The cpJob Class 354

The cpjob object 354 is illustrated in FIG. 3b and is itself derived from the QThread class 352. The cpjob object 354 is a collection of feature, pattern, and related volumes to be built by the job.

The cpJob object 354 has a set of associations, for instance, the cpjob class 354 is derived from the QThread class 352 (see association 353 of FIG. 3b); and the cpEditJob class 356 is derived from the cpjob class 354 (see association 355 of FIG. 3b).

The cpEditJob Class 356

The cpEditJob object 356 is illustrated in FIG. 3b and is itself derived from the cpjob class 354. The cpEditJob object 356 allows for editing of the jobs that are already in the queue.

The cpEditJob object 356 has a set of associations, for instance, the cpEditJob class 356 is derived from the cpjob class 354 (see association 355 of FIG. 3b).

The ceControllerThread Class 358

The ceControllerThread object 358 is illustrated in FIG. 3b and is itself derived from the QThread class 352. The ceControllerThread object 358 is common functionality for ceIOThread class 360, cePackingThread class 362, and ceProcessingThread class 364.

The ceControllerThread object 358 has a set of associations, for instance, the ceControllerThread class 358 is derived from the QThread class 352 (see association 357 of FIG. 3b); the ceIOThread class 360 is derived from the ceControllerThread class 358 (see association 309 of FIG. 3b); the cePackingThread class 362 is derived from the ceControllerThread class 358 (see association 361 of FIG. 3b); and the ceProcessingThread class 364 is derived from the ceControllerThread class 358 (see association 313 of FIG. 3b).

The ceIOThread Class 360

The ceIOThread object 360 is illustrated in FIG. 3b and is itself derived from the ceControllerThread class 358. The ceIOThread object 360 is threads used for reading data from mass data storage and writing data to mass data storage. The mass data storage may be tape, hard disk, CD, DVD, or other device capable of storing digital information.

The ceIOThread object 360 has a set of associations, for instance, the ceIOThread class 360 is derived from the ceControllerThread class 358 (see association 359 of FIG. 3b).

The cePackingThread Class 362

The cePackingThread object 362 is illustrated in FIG. 3b and is itself derived from the ceControllerThread class 358. The cePackingThread object 362 is a thread that is used to resort data to the proper orientation, which is either slices or traces.

The cePackingThread object 362 has a set of associations, for instance, the cePackingThread class 362 is derived from the ceControllerThread class 358 (see association 361 of FIG. 3b).

The ceProcessingThread Class 364

The ceProcessingThread object 364 is illustrated in FIG. 3b and is itself derived from the ceControllerThread class 358. The ceProcessingThread object 364 sends the various slices or traces to the computational plug-ins.

The ceProcessingThread object 364 has a set of associations, for instance, the ceProcessingThread class 364 is derived from the ceControllerThread class 358 (see association 313 of FIG. 3b).

The ceController Class 402

Figure 4:
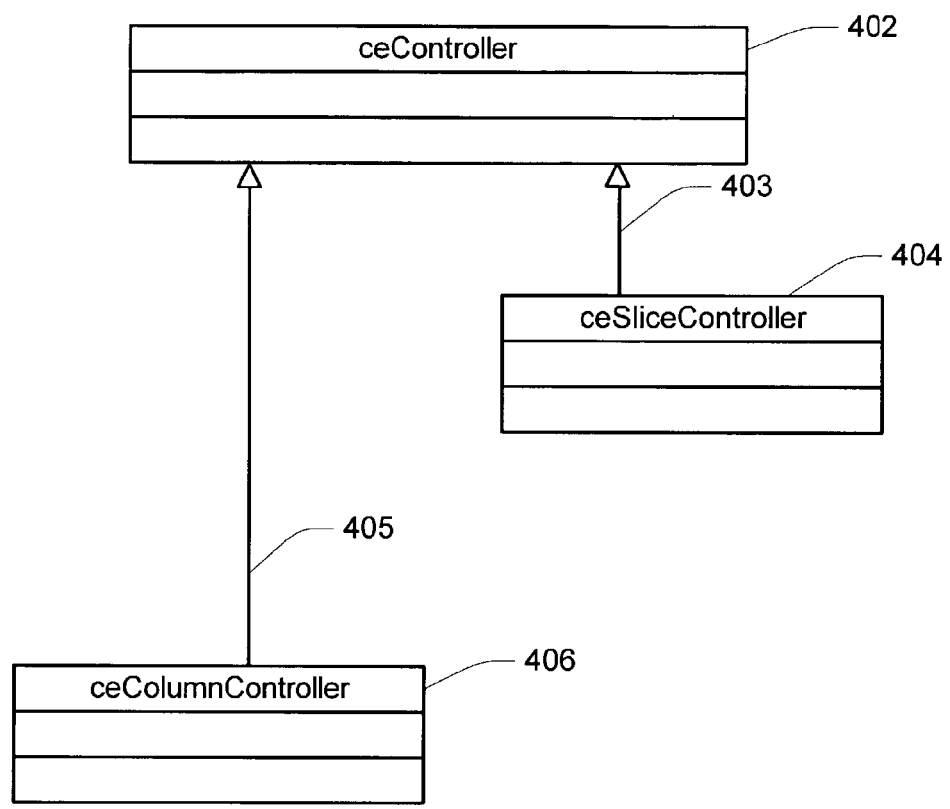
FIG. 4 is a block diagram illustrating a portion of the class hierarchy of the present invention.

The ceController object 402 is illustrated in FIG. 4 and is a base class. The ceController object 402 is common functionality for ceSliceController class 404 and ceColumnController class 406.

The ceController object 402 has a set of associations, for instance, the ceSliceController class 404 is derived from the ceController class 402 (see association 403 of FIG. 4); and the ceColumnController class 406 is derived from the ceController class 402 (see association 405 of FIG. 4).

The ceSliceController Class 404

The ceSliceController object 404 is illustrated in FIG. 4 and is itself derived from the ceController class 402. The ceSliceController object 404 controls data flow for plug-ins that requires horizontal slices.

The ceSliceController object 404 has a set of associations, for instance, the ceSliceController class 404 is derived from the ceController class 402 (see association 403 of FIG. 4).

The ceColumnController Class 406

The ceColumnController object 406 is illustrated in FIG. 4 and is itself derived from the ceController class 402. The ceColunmController object 406 controls data flow for plug-ins that requires traces.

The ceColumnController object 406 has a set of associations, for instance, the ceColumnController class 406 is derived from the ceController class 402 (see association 405 of FIG. 4).

The ceProcessTrace Class 502

Figure 5:
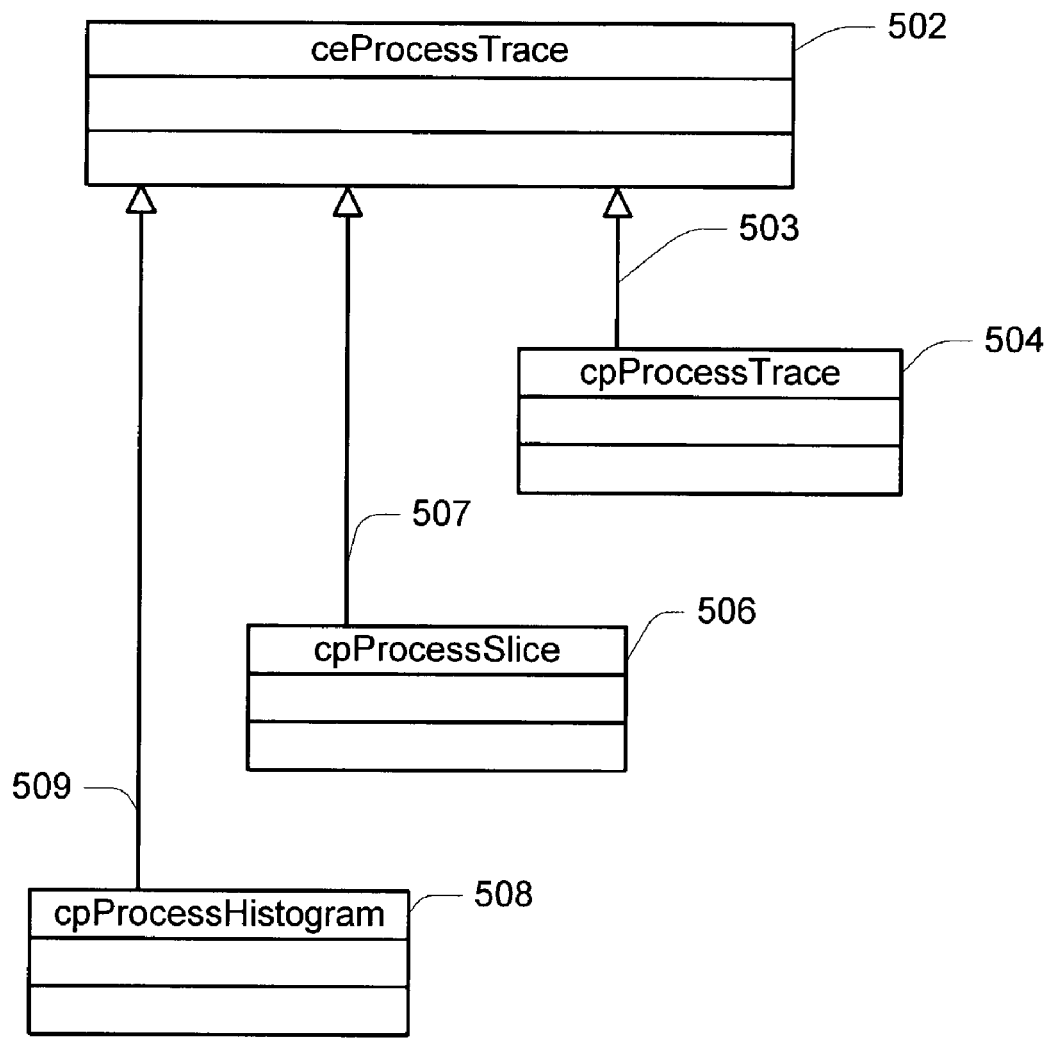
FIG. 5 is a block diagram illustrating a portion of the class hierarchy of the present invention.

The ceProcessTrace object 502 is illustrated in FIG. 5 and is a base class. The ceProcessTrace object 502 is a collection of data on which computations will be performed.

The ceProcessTrace object 502 has a set of associations, for instance, the cpProcessTrace class 504 is derived from the ceProcessTrace class 502 (see association 503 of FIG. 5); the cpProcessSlice class 506 is derived from the ceProcessTrace class 502 (see association 507 of FIG. 5); and the cpProcessHistogram class 508 is derived from the ceProcessTrace class 502 (see association 509 of FIG. 5).

The cpProcessTrace Class 504

The cpProcessTrace object 504 is illustrated in FIG. 5 and is itself derived from the ceProcessTrace class 502. The cpProcessTrace object 504 is Collection of trace plug-ins that computes individual feature attributes, feature statistics, pattern attributes, pattern statistics, texture attributes, and texture statistics for a given trace.

The cpProcessTrace object 504 has a set of associations, for instance, the cpProcessTrace class 504 is derived from the ceProcessTrace class 502 (see association 503 of FIG. 5).

The cpProcessSlice Class 506

The cpProcessSlice object 506 is illustrated in FIG. 5 and is itself derived from the ceProcessTrace class 502. The cpProcessSlice object 506 holds a slice plug-in that computes individual features, patterns, and related data for a given slice.

The cpProcessSlice object 506 has a set of associations, for instance, the cpProcessSlice class 506 is derived from the ceProcessTrace class 502 (see association 507 of FIG. 5).

The cpProcessHistogram Class 508

The cpProcessHistogram object 508 is illustrated in FIG. 5 and is itself derived from the ceProcessTrace class 502. The cpProcessHistogram object 508 is a collection of volumes that has out of date histograms. It recomputes the individual histograms for each of the volumes.

The cpProcessHistogram object 508 has a set of associations, for instance, the cpProcessHistogram class 508 is derived from the ceProcessTrace class 502 (see association 509 of FIG. 5).

The OFeatureListInterface Class 602

Figure 6:
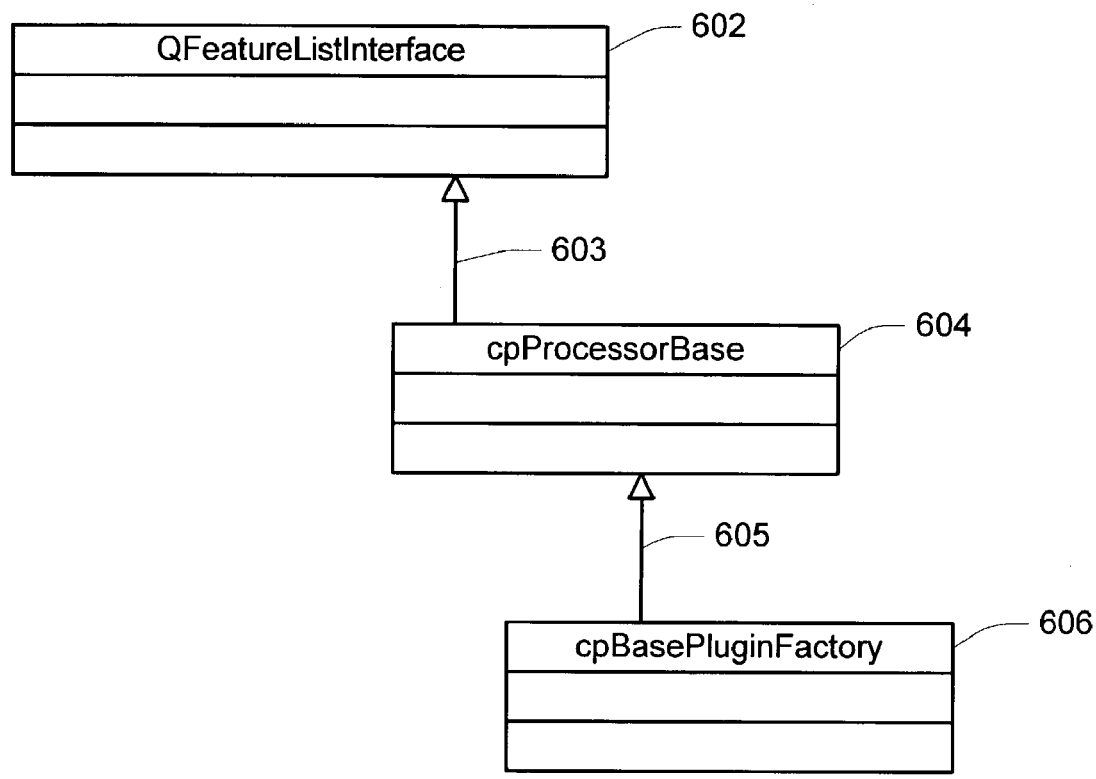
FIG. 6 is a block diagram illustrating a portion of the class hierarchy of the present invention.

The QFeatureListInterface object 602 is illustrated in FIG. 6 and is a base class. The QFeatureListInterface object 602 is the low level interface for the plugins.

The QFeatureListInterface object 602 has a set of associations, for instance, the cpProcessorBase class 604 is derived from the QFeatureListInterface class 602 (see association 603 of FIG. 6).

The cpProcessorBase Class 604

The cpProcessorBase object 604 is illustrated in FIG. 6 and is itself derived from the QFeatureListInterface class 602. The cpProcessorBase object 604 is the application specific plug-in interface.

The cpProcessorBase object 604 has a set of associations, for instance, the cpProcessorBase class 604 is derived from the QFeatureListInterface class 602 (see association 603 of FIG. 6); and the cpBasePluginFactory class 606 is derived from the cpProcessorBase class 604 (see association 605 of FIG. 6).

The cpBasePluginFactory Class 606

The cpBasePluginFactory object 606 is illustrated in FIG. 6 and is itself derived from the cpProcessorBase class 604. The cpBasePluginFactory object 606 is a factory class that instantiates plug-ins.

The cpBasePluginFactory object 606 has a set of associations, for instance, the cpBasePluginFactory class 606 is derived from the cpProcessorBase class 604 (see association 605 of FIG. 6).

The QObject Class 702

Figure 7:
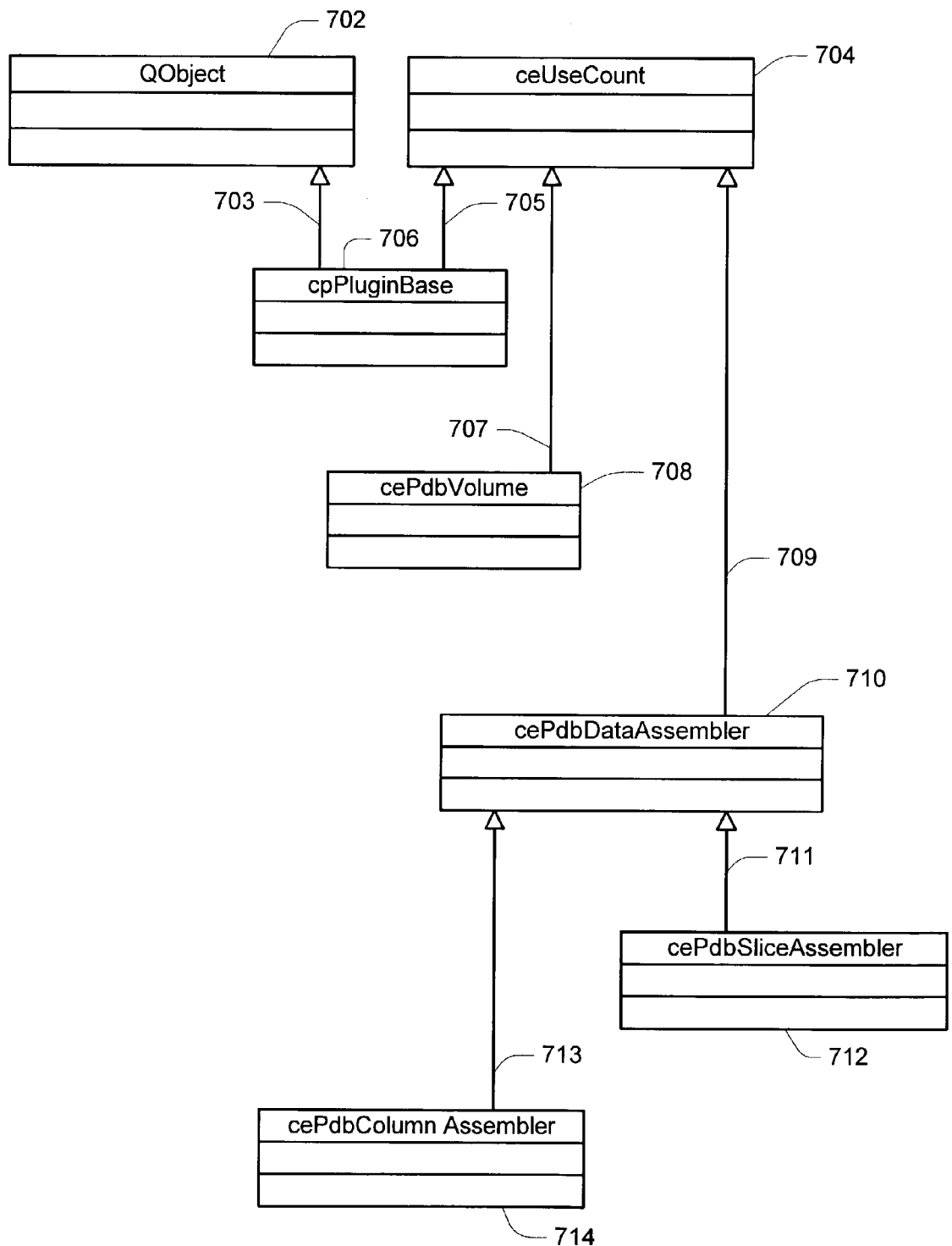
FIG. 7 is a block diagram illustrating a portion of the class hierarchy of the present invention.

The QObject object 702 is illustrated in FIG. 7 and is a base class. The QObject object 702 provides notification between plug-ins and the application.

The QObject object 702 has a set of associations, for instance, the cpPluginBase class 706 is derived from the QObject class 702 (see association 703 of FIG. 7).

The ceUseCount Class 704

The ceUseCount object 704 is illustrated in FIG. 7 and is a base class. The ceUseCount object 704 is maintains a reference count, e.g., it keeps track of how many other objects are using the object that is derived from the ceUseCount class 704.

The ceUseCount object 704 has a set of associations, for instance, the cpPluginBase class 706 is derived from the ceUseCount class 704 (see association 705 of FIG. 7); the cePdbVolume class 708 is derived from the ceUseCount class 704 (see association 707 of FIG. 7); and the cePdb-DataAssembler class 710 is derived from the ceUseCount class 704 (see association 709 of FIG. 7).

The cpPluginBase Class 706

The cpPluginBase object 706 is illustrated in FIG. 7 and is derived from the QObject class 702, derived from the ceUseCount class 704. The cpPluginBase object 706 is an interface that abstracts common functionality of all plug-ins.

Figure 14:
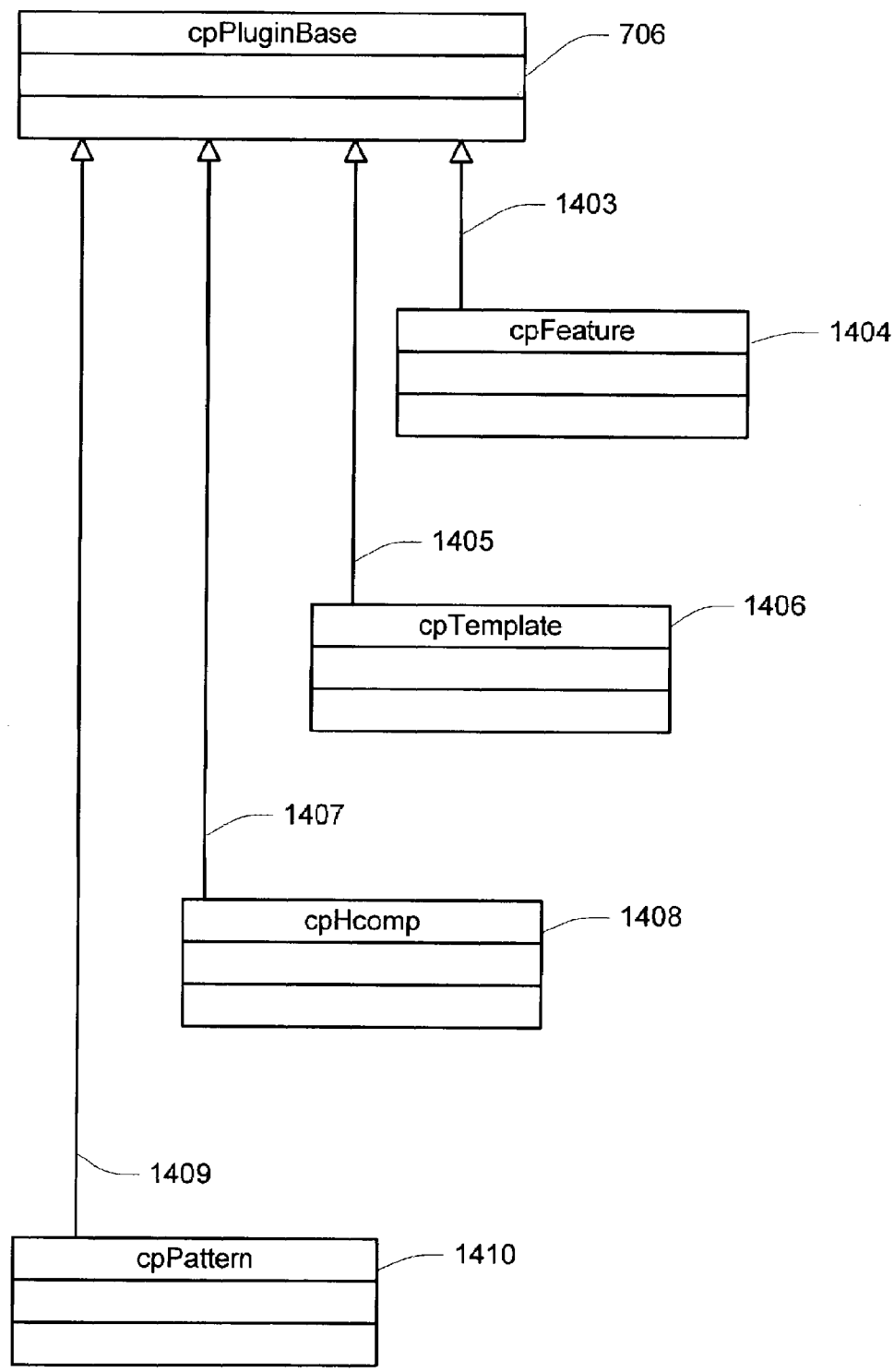
FIG. 14 is a block diagram illustrating a portion of the class hierarchy of the present invention

The cpPluginBase object 706 has a set of associations, for instance, the cpPluginBase class 706 is derived from the QObject class 702 (see association 703 of FIG. 7); the cpPluginBase class 706 is derived from the ceUseCount class 704 (see association 705 of FIG. 7); the cpFeature class 1404 is derived from the cpPluginBase class 706 (see association 1403 of FIG. 14); the cpTemplate class 1406 is derived from the cpPluginBase class 706 (see association 1405 of FIG. 14); the cpHcomp class 1408 is derived from the cpPluginBase class 706 (see association 1407 of FIG. 14); and the cpPattern class 1410 is derived from the cpPluginBase class 706 (see association 1409 of FIG. 14).

The cpPluginBase class optionally has a method called preprocess( ) for computations that are performed before data is processed. The preprocess( ) method does not need any input parameters. The preprocess( ) method need not return a result to the calling function.

The cpPluginBase class optionally has a method called process( ) that processes the individual data slices or traces. The process( ) method does not need any input parameters. The process( ) method need not return a result to the calling function.

The cpPluginBase class optionally has a method called postprocess( ) that allows for the additional computations and cleanup to be performed after the data is processed, such as maintaining a history, etc. The postprocess( ) method does not need any input parameters. The postprocess( ) method need not return a result to the calling function.

The cpPluginBase class optionally has a method called init( ) which initializes the plug-in for processing the data. The init( ) method does not need any input parameters. The init( ) method need not return a result to the calling function.

The cePdbVolume Class 708

The cePdbVolume object 708 is illustrated in FIG. 7 and is itself derived from the ceUseCount class 704. The cePdbVolume object 708 is the class that defines the PDB metadata for an individual volume. PDB metadata includes all associated data including, for example, the map location of the data volume and associated information.

The cePdbVolume object 708 has a set of associations, for instance, the cpPluginBase class 706 is derived from the ceUseCount class 704 (see association 705 of FIG. 7).

The cePdbDataAssembler Class 710

The cePdbDataAssembler object 710 is illustrated in FIG. 7 and is itself derived from the ceUseCount class 704. The cePdbDataAssembler object 710 is the low-level data access layer class that is utilized to access volume data.

The cePdbDataAssembler object 710 has a set of associations, for instance, the cePdbDataAssembler class 710 is derived from the ceUseCount class 704 (see association 709 of FIG. 7).

The cePdbSliceAssembler Class 712

The cePdbSliceAssembler object 712 is illustrated in FIG. 7 and is itself derived from the cePdbDataAssembler class 710. The cePdbSliceAssembler object 712 extracts the volume data from the mass storage device ("disk") in the form of slices.

The cePdbSliceAssembler object 712 has a set of associations, for instance, the cePdbSliceAssembler class 712 is derived from the cePdbDataAssembler class 710 (see association 711 of FIG. 7).

The cePdbColumnAssembler Class 714

The cePdbColumnAssembler object 714 is illustrated in FIG. 7 and is itself derived from the cePdbDataAssembler class 710. The cePdbColumnAssembler object 714 accesses the volume data from disk preferably as columns.

The cePdbColumnAssembler object 714 has a set of associations, for instance, the cePdbColumnAssembler class 714 is derived from the cePdbDataAssembler class 710 (see association 713 of FIG. 7).

The cpFeature Class 1404

The cpFeature object 1404 is illustrated in FIG. 14 and is itself derived from the cpPluginBase class 706. The cpFeature object 1404 computes the features.

The cpFeature object 1404 has a set of associations, for instance, the cpFeature class 1404 is derived from the cpPluginBase class 706 (see association 1403 of FIG. 14).

The cpTemplate Class 1406

The cpTemplate object 1406 is illustrated in FIG. 14 and is itself derived from the cpPluginBase class 706. The cpTemplate object 1406 computes a scene from a template.

The cpTemplate object 1406 has a set of associations, for instance, the cpTemplate class 1406 is derived from the cpPluginBase class 706 (see association 1405 of FIG. 14).

The cpHcomp Class 1408

The cpHcomp object 1408 is illustrated in FIG. 14 and is itself derived from the cpPluginBase class 706. The cpHcomp object 1408 computes horizontal complexity.

The cpHcomp object 1408 has a set of associations, for instance, the cpHcomp class 1408 is derived from the cpPluginBase class 706 (see association 1407 of FIG. 14).

The cpPattern Class 1410

The cpPattern object 1410 is illustrated in FIG. 14 and is itself derived from the cpPluginBase class 706. The cpPattern object 1410 computes patterns.

The cpPattern object 1410 has a set of associations, for instance, the cpPattern class 1410 is derived from the cpPluginBase class 706 (see association 1409 of FIG. 14).

Object Descriptions

Figure 2:
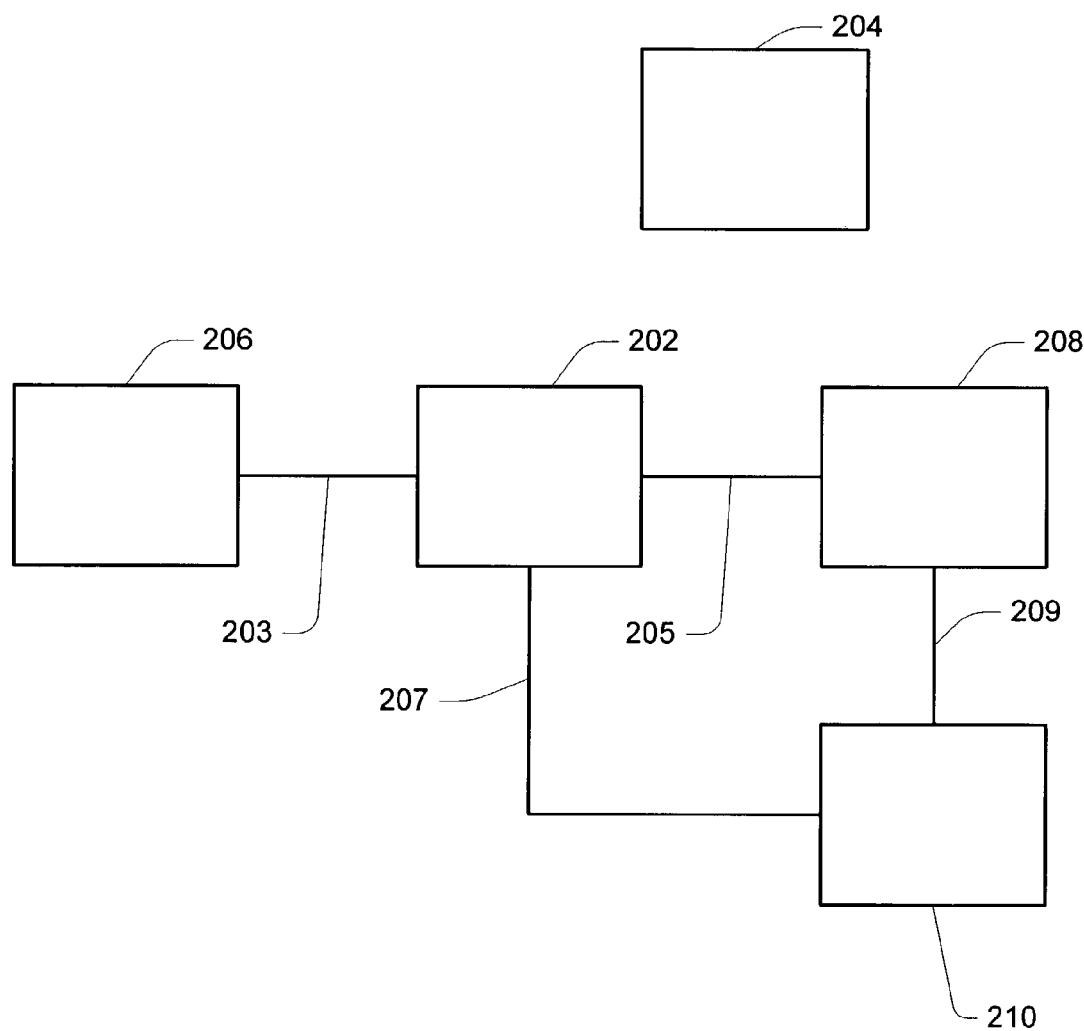
FIG. 2 is a block diagram illustrating the main modules of the present invention that are further illustrated in FIGS. 8-12.

FIG. 2 is a block diagram illustrating the interconnectivity of certain modules of the present invention. Each of the modules contains certain objects and associations with other objects. The associations between objects of other modules are established via links between the various modules, as described below. The first module 202 is illustrated in more detail in FIG. 8 and accompanying description. The second module 204 is illustrated in more detail in FIG. 9 and accompanying description. The third module 206 is illustrated in more detail in FIG. 10 and accompanying description. The forth module 208 is illustrated in more detail in FIG. 11 and accompanying description. The sixth module 210 is illustrated in more detail in FIG. 12 and accompanying description. As illustrated, the objects within module 206 can communicate with the objects of module 202 via link 203. Similarly, the objects of module 202 can communicate with the objects of modules 208 and 210 via links 205 and 207, respectively. Finally, the objects of module 208 can communicate with the objects of module 210 via link 209. The arrangement of the modules of FIG. 2 is not meant to imply a necessary architecture. On the contrary, the present invention may be implemented on a variety of object architectures. Moreover, the method and properties of the various objects are subject to reassignment to other objects, or new objects, without departing from the scope and spirit of the present invention.

Figure 8:
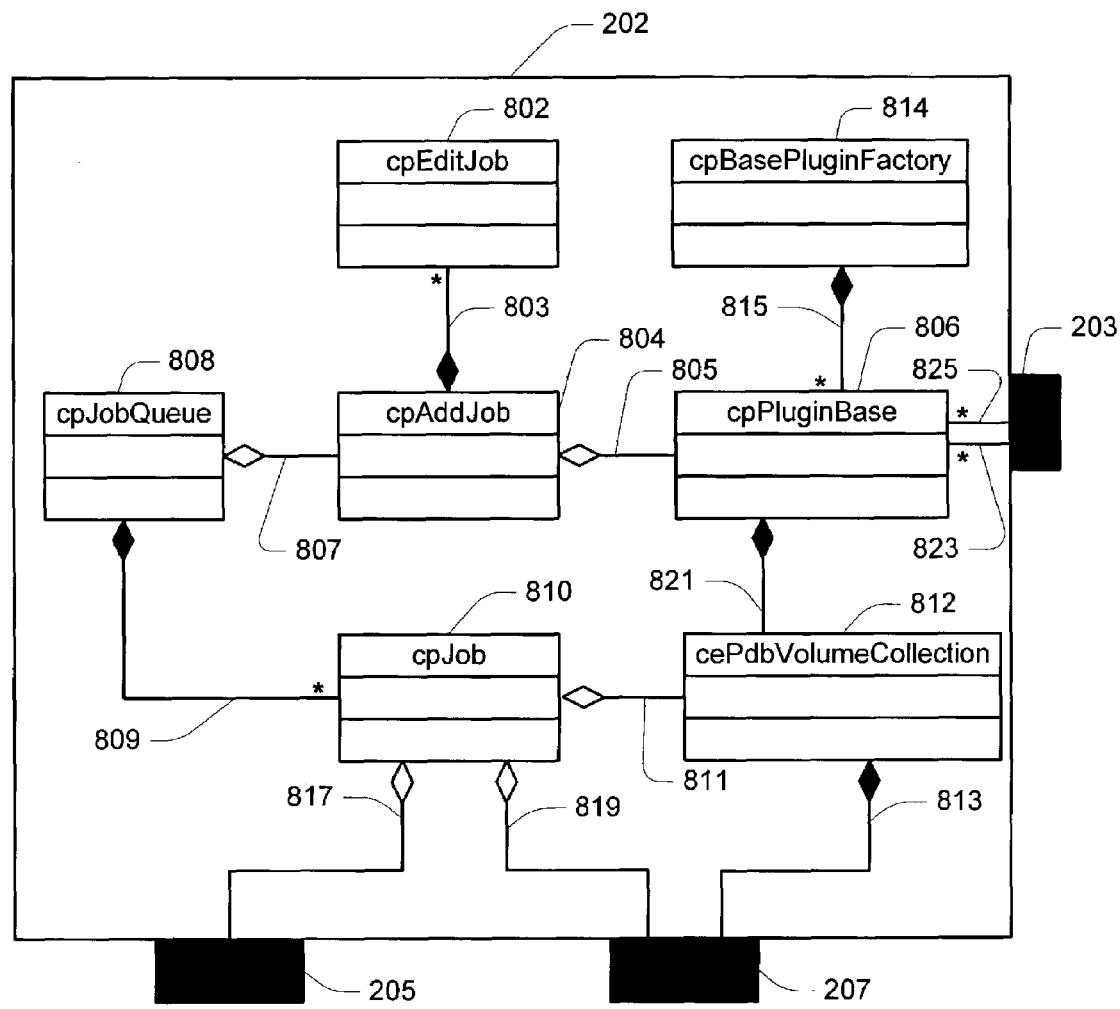
FIG. 8 is a block diagram illustrating a set of objects within one of the modules of the present invention.

The following description makes reference to the objects of FIG. 8, which are contained within the module 202 of FIG. 2.

The cpEditJob Object 802

The cpEditjob object 802 is illustrated in FIG. 8. The cpEditJob object 802 is an instance of the cpEditJob class 356. The application creates one instance of the cpEditJob class 356 that provides editing of an instance of a cpjob 810.

The cpEditJob object 802 has a set of associations, for instance, there is a composition association 803 between exactly one cpAddJob object 306 and many cpEditJob object 356.

The cpAddJob Object 804

The cpAddJob object 804 is illustrated in FIG. 8. The cpAddJob object 804 is an instance of the cpAddJob class 306. The application creates one instance of the cpAddJob class 306 that provides the interface for modifying an instance of a cpEditJob 802.

The cpAddJob object 804 has a set of associations, for instance, there is a composition association 803 between exactly one cpAddJob object 306 and many cpEditJob object 356; there is an aggregation association 805 between exactly one cpAddJob object 306 and exactly one cpPluginBase object 706; and there is an aggregation association 807 between exactly one cpJobQueue object 310 and exactly one cpAddJob object 306.

The cpPluginBase Object 806

The cpPluginBase object 806 is illustrated in FIG. 8. The cpPluginBase is the low level base class for each instance of a plug-in.

The cpPluginBase object 806 has a set of associations, for instance, there is an aggregation association 805 between exactly one cpAddJob object 306 and exactly one cpPluginBase object 706; there is a composition association 821 between exactly one cpPluginBase object 706 and cePdbVolumeCollection 812; there is an aggregation association 823 between cpProcessBase 103 and many cpPluginBase objects 706; and there is an aggregation association 825 between exactly one cpProcessSlice object 506 and many cpPluginBase object 706.

The cpJobQueue Object 808

The cpJobQueue object 808 is illustrated in FIG. 8. The cpjobQueue object 808 is an instance of the cpJobQueue class 310. The application creates one instance of the cpJobQueue class that provides an interface and a collection of cpjob 810 objects to schedule how jobs are ordered for execution.

The cpJobQueue object 808 has a set of associations, for instance, there is an aggregation association 807 between exactly one cpJobQueue object 310 and exactly one cpAddJob object 306; and there is a composition association 809 between exactly one cpJobQueue object 310 and many cpJob object 354.

The cpjob Object 810

The cpjob object 810 is illustrated in FIG. 8. The cpjob object 810 is an instance of the cpjob class 354. The application creates one instance for each PDB for which a new feature, pattern, etc. or output volumes are created.

The cpjob object 810 has a set of associations, for instance, there is a composition association 809 between exactly one cpJobQueue object 310 and many cpjob object 354; there is an aggregation association 811 between exactly one cpjob object 354 and cePdbVolumeCollection object 812; there is an aggregation association 817 between exactly one cpJob object 354 and exactly one ceController object 402; and there is an aggregation association 819 between exactly one cpjob object 354 and many cePdbVolume object 708.

The cePdbVolumeCollection Object 812

The cePdbVolumeCollection object 812 is illustrated in FIG. 8. The cePdbVolumeCollection object 812 is an instance of the cePdbVolumeCollection class. The cePdbVolumeCollection class 812 is a collection of PDB volumes for a specific instance of cpjob 810.

The cePdbVolumeCollection object 812 has a set of associations, for instance, there is an aggregation association 811 between exactly one cpjob object 354 and cePdbVolumeCollection object 812; there is a composition association 813 between cePdbVolumeCollection object 812 and many cePdbVolume objects 708; and there is a composition association 821 between exactly one cpPluginBase object 706 and cePdbVolumeCollection object 812.

The cpBasePluginFactory Object 814

The cpBasePluginFactory object 814 is illustrated in FIG. 8. The cpBasePluginFactory object 814 is an instance of the cpBasePluginFactory class 606. The present invention creates one instance of the cpBasePluginFactgory object 814 for each plug-in dynamically linked library that provides an interface for creating an instance of a plug-in.

The cpBasePluginFactory object 814 has a set of associations, for instance, there is a composition association 815 between exactly one cpBasePluginFactory object 606 and many cpPluginBase object 706.

Figure 9:
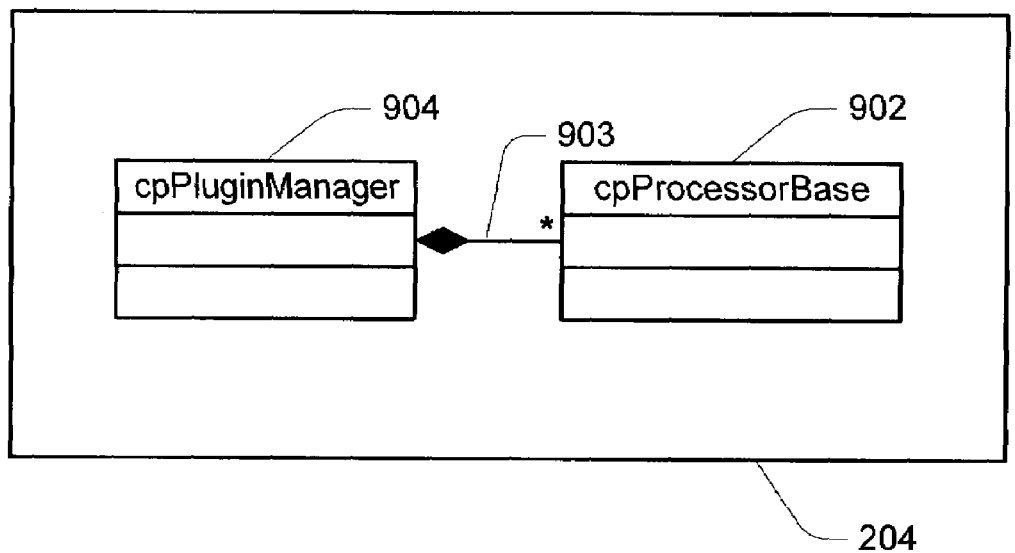
FIG. 9 is a block diagram illustrating a set of objects within one of the modules of the present invention.

The following description refers to the objects of FIG. 9, which are contained within the module 204 of FIG. 2.

The cpProcessorBase Object 902

The cpProcessorBase object 902 is illustrated in FIG. 9. The cpProcessorBase object 902 is an instance of the cpProcessorBase class 604. The cpProcessorBase object 902 is the low-level base class for each instance of a plug-in dynamically linked library.

The cpProcessorBase object 902 has a set of associations, for instance, there is a composition association 903 between cpPluginManager object 904 and many cpProcessorBase objects 604.

The cpPluginManager Object 904

The cpPluginManager object 904 is illustrated in FIG. 9. The cpPluginManager object 904 is an instance of the cpPluginManager class. The present invention creates a single instance of cpPluginManager object 904 that manages (creates, deletes, loads, etc.) instances of the cpProcessBase object 604.

The cpPluginManager object 904 has a set of associations, for instance, there is a composition association 903 between cpPluginManager object 904 and many cpProcessorBase objects 604.

Figure 10:
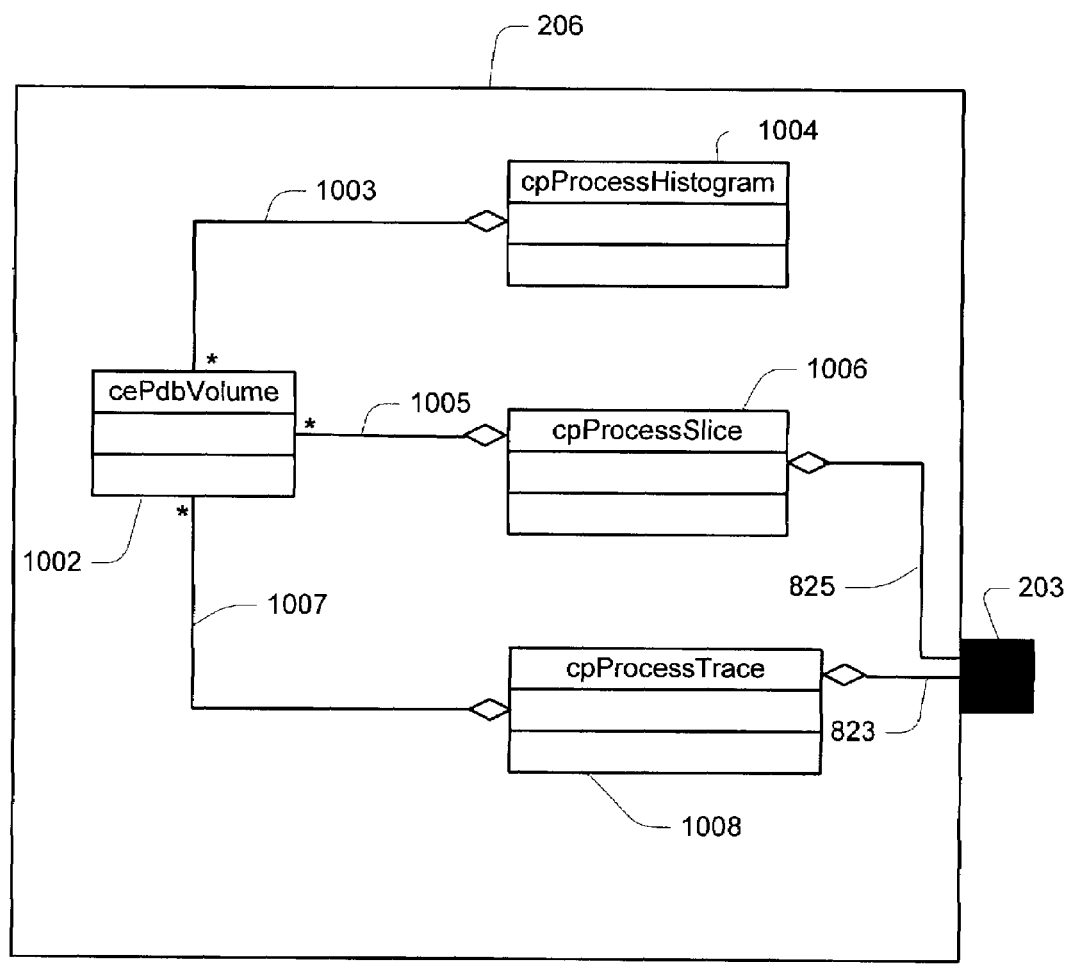
FIG. 10 is a block diagram illustrating a set of objects within one of the modules of the present invention.

The following description refers to the objects of FIG. 10, which are contained within the module 206 of FIG. 2.

The cePdbVolume Object 1002

The cePdbVolume object 1002 is illustrated in FIG. 10. The cePdbVolume object 1002 is an instance of the cePdbVolume class 708. The present invention creates multiple instances of cePdbVolume 708 for each volume upon which it operates.

The cePdbVolume object 1002 has a set of associations, for instance, there is a composition association 813 between cePdbVolumeCollection object 812 and many cePdbVolume object 708; there is an aggregation association 819 between exactly one cpJob object 354 and many cePdbVolume object 708; there is an aggregation association 1003 between exactly one cpProcessHistogram object 508 and many cePdbVolume object 708; there is an aggregation association 1005 between exactly one cpProcessSlice object 506 and many cePdbVolume object 708; there is an aggregation association 1007 between exactly one cpProcessTrace object 504 and many cePdbVolume object 708; there is an aggregation association 1213 between exactly one ceIOThread object 360 and exactly one cePdbVolume object 708; there is an aggregation association 1215 between exactly one cePdbDataAssembler object 710 and exactly one cePdbVolume object 708; there is an aggregation association 1217 between exactly one cePdbVolume object 708 and exactly one cePdbDataAssembler object 710; there is an aggregation association 1513 between exactly one cpFeature object 1404 and many cePdbVolume object 708; there is an aggregation association 1515 between exactly one cpTemplate object 1406 and many cePdbVolume object 708; there is an aggregation association 1517 between exactly one cpHcomp object 1408 and many cePdbVolume object 708; and there is an aggregation association 1521 between exactly one cpPattern object 1410 and many cePdbVolume object 708.

The cpProcessHistogram Object 1004

The cpProcessHistogram object 1004 is illustrated in FIG. 10. The cpProcessHistogram object 1004 is an instance of the cpProcessHistogram class 508. The present invention creates a single instance of the cpProcessHistogram object 1004 that recomputes the data histogram for all volumes in cpjob 810 that have out-of-date histograms. A histogram is a distribution (usually displayed as a plot) of the number of data samples for each data value.

The cpProcessHistogram object 1004 has a set of associations, for instance, there is an aggregation association 1003 between exactly one cpProcessHistogram object 508 and many cePdbVolume object 708.

The cpProcessSlice Object 1006

The cpProcessSlice object 1006 is illustrated in FIG. 10. The cpProcessSlice object 1006 is an instance of the cpProcessSlice class 506. The application creates an instance of this class for each volume that is processed one slice at a time.

The cpProcessSlice object 1006 has a set of associations, for instance, there is an aggregation association 825 between exactly one cpProcessSlice object 506 and many cpPluginBase object 706; and there is an aggregation association 1005 between exactly one cpProcessSlice object 506 and many cePdbVolume object 708.

The cpProcessTrace Object 1008

The cpProcessTrace object 1008 is illustrated in FIG. 10. The cpProcessTrace object 1008 is an instance of the cpProcessTrace class 504. The application creates an instance of the cpProcessTrace object 1008 for all volumes that are processed one trace at a time.

The cpProcessTrace object 1008 has a set of associations, for instance, there is an aggregation association 823 between cpProcessTrace 504 and many cpPluginBase object 706; and there is an aggregation association 1007 between exactly one cpProcessTrace object 504 and many cePdbVolume object 708.

Figure 11:
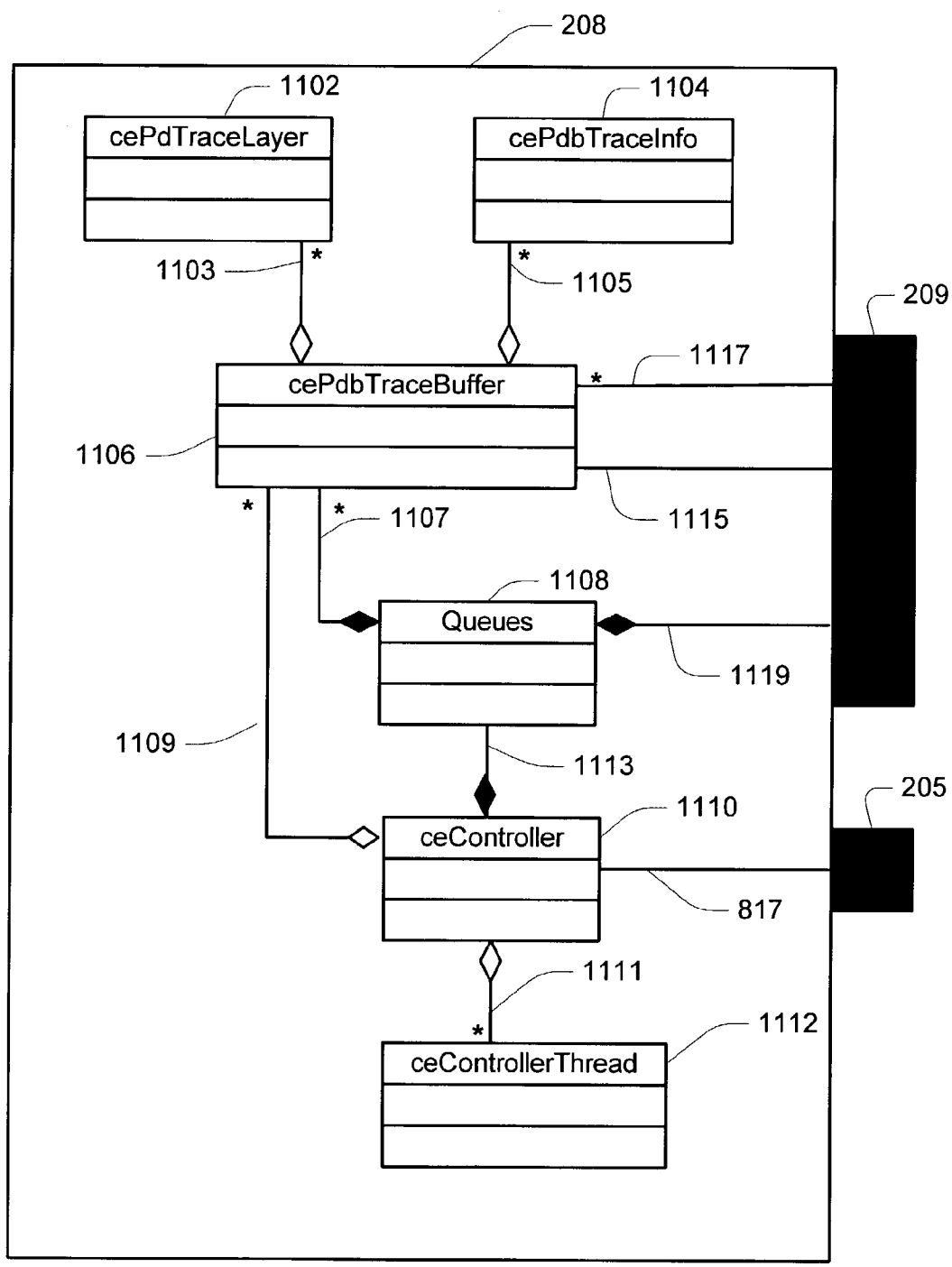
FIG. 11 is a block diagram illustrating a set of objects within one of the modules of the present invention.

The following description refers to the objects of FIG. 11, which are contained within the module 208 of FIG. 2.

The cePdbTraceLayer Object 1102

The cePdbTraceLayer object 1102 is illustrated in FIG. 11. The cePdbTraceLayer object 1102 is an instance of the cePdbTraceLayer class. The cePdbTraceLayer class 1102 is a temporary buffer that holds the data that belongs to one data volume that is about to be processed or have just been processed.

The cePdbTraceLayer object 1102 has a set of associations, for instance, there is an aggregation association 1103 between cePdbTraceBuffer 1106 and cePdbTraceLayer 1102.

The cePdbTraceInfo Object 1104

The cePdbTraceInfo object 1104 is illustrated in FIG. 11. The cePdbTraceInfo object 1104 is an instance of the cePdbTraceInfo class. The cePdbTraceInfo class 1104 holds the information about the location of a trace of data or a slice of data within the data buffer.

The cePdbTraceInfo object 1104 has a set of associations, for instance, there is an aggregation association 1105 between cePdbTraceBuffer 1106 and cePdbTraceInfo 1104.

The cePdbTraceBuffer Object 1106

The cePdbTraceBuffer object 1106 is illustrated in FIG. 11. The cePdbTraceBuffer object 1106 is an instance of the cePdbTraceBuffer class. The cePdbTraceBuffer class 1106 owns a collection of cePdbTraceLayer objects 1102, one for each volume in the total set of volumes that are being processed. The cePdbTraceBuffer serves as a buffer to hold a set of traces to be processed.

The cePdbTraceBuffer object 1106 has a set of associations. For instance, there is a composition association 1107 between Queues 1108 and cePdbTraceBuffer 1106.; there is an aggregation association 1109 between exactly one ceController object 402 and cePdbTraceBuffer 1106; there is a one-to-many aggregation association 1115 between ceProcessingThread object 364 and cePdbTraceBuffer 1106; and there is an aggregation association 1117 between exactly one cePackingThread object 362 and cePdbTraceBuffer 1106.

The Queues Object 1108

The Queues object 1108 is illustrated in FIG. 11. The Queues object 1108 is an instance of the Queues class. The Queues class 1108 encapsulates the functionality of a queue data structure and ensures the synchronized access to the contents of the data structure from different threads of execution. The Queues object 1108 is utilized to synchronize the access to the cePdbTreadBuffer objects 1106 by different threads of execution.

The Queues object 1108 has a set of associations, for instance, there is a composition association 1107 between Queues object 1108 and cePdbTraceBuffer object 1106.; there is a composition association 1113 between exactly one ceController object 402 and Queues object 1108; and there is a composition association 1119 between Queues object 1108 and many cePdbDataAssembler objects 710.

The ceController Object 1110

The ceController object 1110 is illustrated in FIG. 11. The ceController object 1110 is an instance of the ceController class 402. The ceController class 1110 is responsible for controlling the data processing. It creates and manages the cePdbTraceBuffer objects 1106, the Queues objects 1108 and the worker threads that are involved in the processing of data.

The ceController object 1110 has a set of associations, for instance, there is an aggregation association 817 between exactly one cpjob object 354 and exactly one ceController object 402; there is an aggregation association 1109 between exactly one ceController object 402 and many cePdbTraceBuffer objects; there is an aggregation association 1111 between exactly one ceController object 402 and many ceControllerThread objects 358; and there is a composition association 1113 between exactly one ceController object 402 and Queues objects 1108.

The ceControllerThread Object 1112

The ceControllerThread object 1112 is illustrated in FIG. 11. The ceControllerThread object 1112 is an instance of the ceControllerThread class 358. The ceControllerThread class 1112 encapsulates the functionality that is common to all data processing threads.

The ceControllerThread object 1112 has a set of associations, for instance, there is an aggregation association 1111 between exactly one ceController object 402 and many ceControllerThread object 358.

Figure 12:
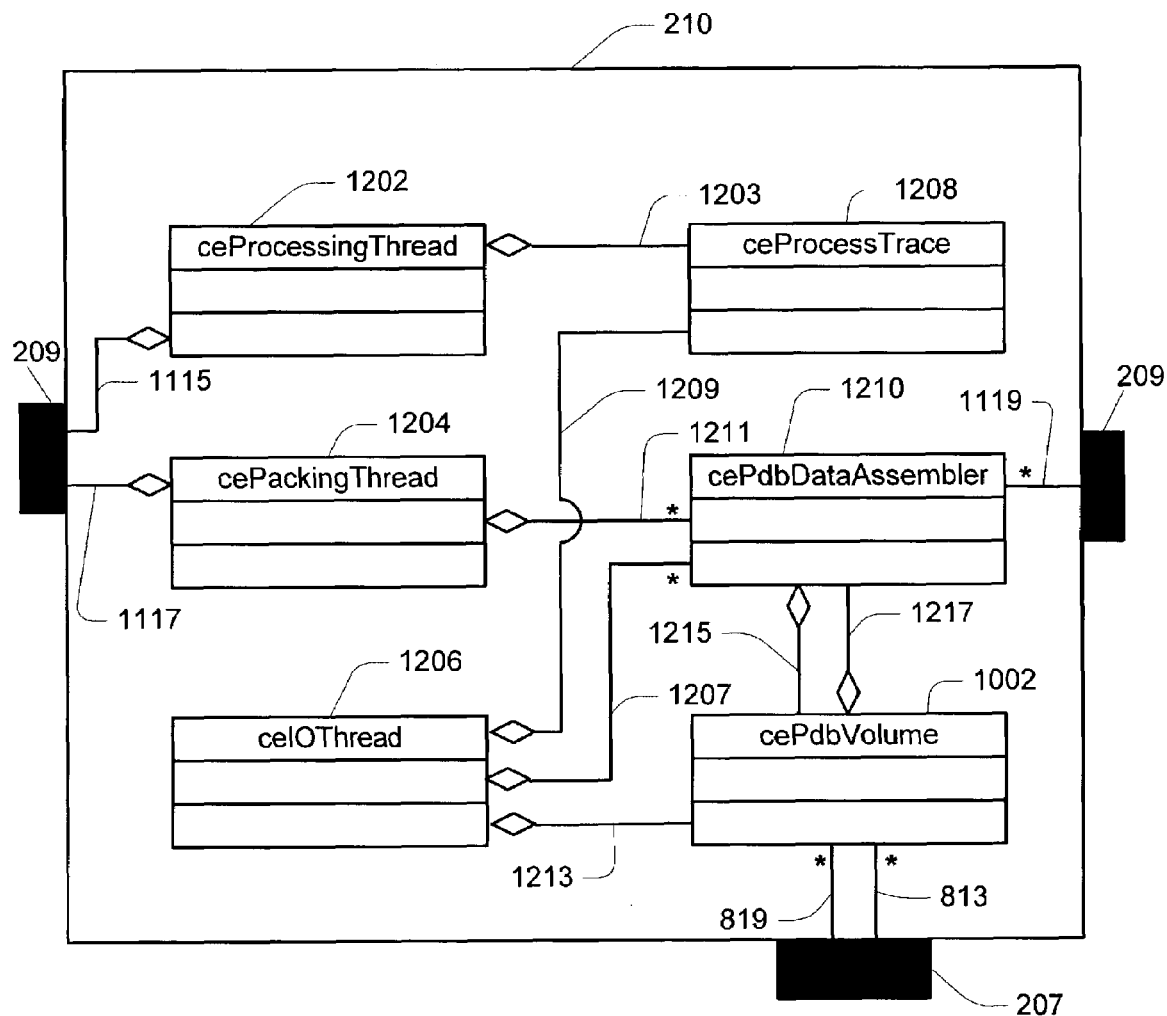
FIG. 12 is a block diagram illustrating a set of objects within one of the modules of the present invention.

The following description refers to the objects of FIG. 12, which are contained within the module 210 of FIG. 2.

The ceProcessingThread Object 1202

The ceProcessingThread object 1202 is illustrated in FIG. 12. The ceProcessingThread object 1202 is an instance of the ceProcessingThread class 364. The ceProcessingThread class 1202 is responsible for fetching the buffers filled with data out of the queue, for submitting the data for processing and, finally, for placing the buffers with processed data into an appropriate queue.

The ceProcessingThread object 1202 has a set of associations, for instance, there is an aggregation association 1115 between many ceProcessingThread object 364 and cePdbTraceBuffer object 1106; and there is an aggregation association 1203 between exactly one ceProcessingThread object 364 and exactly one ceProcessTrace object 502.

The cePackingThread Object 1204

The cePackingThread object 1204 is illustrated in FIG. 12. The cePackingThread object 1204 is an instance of the cePackingThread class 362. The cePackingThread class 1204 controls conversion of data from the "packed" format, that is used to store it on disk, to the "unpacked" format, that is required for processing.

The cePackingThread object 1204 has a set of associations, for instance, there is an aggregation association 1117 between exactly one cePackingThread object 362 and cePdbTraceBuffer 1106; and there is an aggregation association 1211 between exactly one cePackingThread object 362 and many cePdbDataAssembler object 710.

The ceIOThread Object 1206

The ceIOThread object 1206 is illustrated in FIG. 12. The ceIOThread object 1206 is an instance of the ceIOThread class 360. The ceIOThread class 1206 controls all input/output operations, including the retrieval of data from the hard drive and the storage of the processed data.

The ceIOThread object 1206 has a set of associations, for instance, there is an aggregation association 1207 between exactly one ceIOThread object 360 and many cePdbDataAssembler object 710; there is an aggregation association 1209 between exactly one ceIOThread object 360 and exactly one ceProcessTrace object 502; and there is an aggregation association 1213 between exactly one ceIOThread object 360 and exactly one cePdbVolume object 708.

The ceProcessTrace Object 1208

The ceProcessTrace object 1208 is illustrated in FIG. 12. The ceProcessTrace object 1208 is an instance of the ceProcessTrace class 502. The ceProcessTrace class 1208 serves as the base class for all data processing classes. The Strategy, also called policy, design pattern is a technique of defining a group of algorithms and encapsulating them individually so that they can be used interchangeably. It is employed here to ensure that different pattern analysis processing algorithms are easily pluggable into the processing framework. Strategy is also called policy. An example is described in the reference Design Patterns by Gamma, Helm, Johnson, and Vlissides, ISBN 0-201-63361-2 1995 Addison-Wesley, pp. 315-330.

The ceProcessTrace object 1208 has a set of associations, for instance, there is an aggregation association 1203 between exactly one ceProcessingThread object 364 and exactly one ceProcessTrace object 502; and there is an aggregation association 1209 between exactly one ceIOThread object 360 and exactly one ceProcessTrace object 502.

The cePdbDataAssembler Object 1210

The cePdbDataAssembler object 1210 is illustrated in FIG. 12. The cePdbDataAssembler object 1210 is an instance of the cePdbDataAssembler class 710. The cePdbDataAssembler class 1210 is a low level data access/data buffer class that is utilized together with cePdbVolume 1102 to retrieve data from disk.

The cePdbDataAssembler object 1210 has a set of associations, for instance, there is a composition association 1119 between the Queues object 1108 and many cePdbDataAssembler objects 710; there is an aggregation association 1207 between exactly one ceIOThread object 360 and many cePdbDataAssembler object 710; there is an aggregation association 1211 between exactly one cePackingThread object 362 and many cePdbDataAssembler object 710; there is an aggregation association 1215 between exactly one cePdbDataAssembler object 710 and exactly one cePdbVolume object 708; and there is an aggregation association 1217 between exactly one cePdbVolume object 708 and exactly one cePdbDataAssembler object 710.

The cpBasePluginFactory Object 1302

Figure 13:
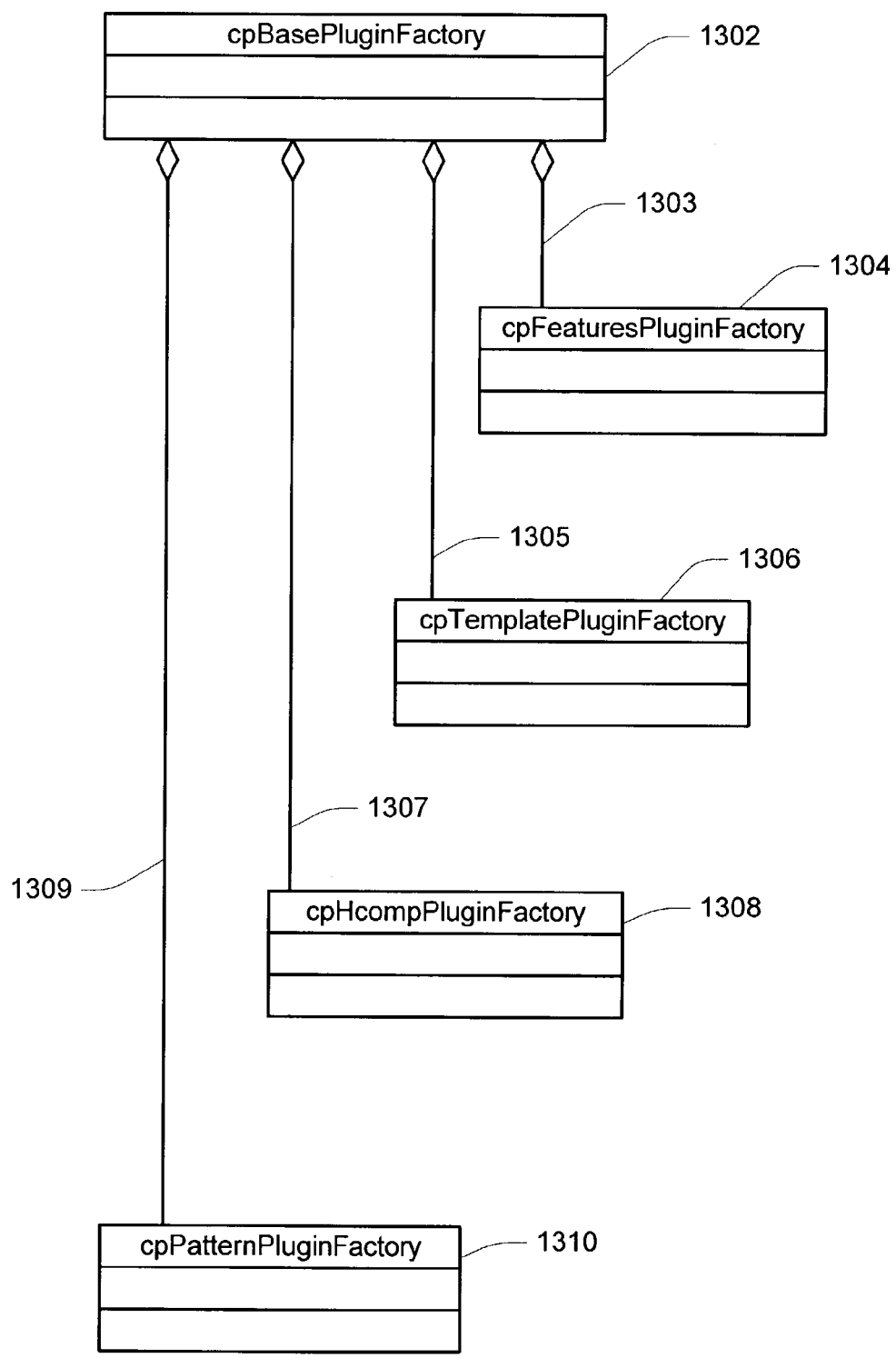
FIG. 13 is a block diagram illustrating a set of objects within one of the modules of the present invention.

The cpBasePluginFactory object 1302 is illustrated in FIG. 13. The cpBasePluginFactory object 1302 is an instance of the cpBasePluginFactory class 606. The cpBasePluginFactory class 1302 serves as a factory for the plug-ins and is responsible for creating the plug-in objects 706.

The cpBasePluginFactory object 1302 has a set of associations, for instance, there is an aggregation association 1303 between exactly one cpBasePluginFactory object 606 and cpFeaturePluginFactory object 1304.; there is an aggregation association 1305 between exactly one cpBasePluginFactory object 606 and cpTemplatePluginFactory 1306; there is an aggregation association 1307 between exactly one cpBasePluginFactory object 606 and cpHcompPluginFactory 1308; and there is an aggregation association 1309 between exactly one cpBasePluginFactory object 606 and cpPatternPluginFactory object 1310.

The cpFeaturesPluginFactory Object 1304

The cpFeaturesPluginFactory object 1304 is illustrated in FIG. 13. The cpFeaturesPluginFactory object 1304 is an instance of the cpFeaturesPluginFactory class. The cpFeaturesPluginFactory class 1304 is responsible for creating feature plug-ins.

The cpFeaturesPluginFactory object 1304 has a set of associations, for instance, there is an aggregation association 1303 between exactly one cpBasePluginFactory object 606 and cpFeaturesPluginFactory object 1304.

The cpTemplatePluginFactory Object 1306

The cpTemplatePluginFactory object 1306 is illustrated in FIG. 13. The cpTemplatePluginFactory object 1306 is an instance of the cpTemplatePluginFactory class. The cpTemplatePluginFactory class 1306 is responsible for creating template plugins.

The cpTemplatePluginFactory object 1306 has a set of associations, for instance, there is an aggregation association 1305 between exactly one cpBasePluginFactory object 606 and cpTemplatePluginFactory 1306.

The cpHcompPluginFactory Object 1308

The cpHcompPluginFactory object 1308 is illustrated in FIG. 13. The cpHcompPluginFactory object 1308 is an instance of the cpHcompPluginFactory class. The cpHcompPluginFactory class 1308 is responsible for creating h-complexity (horizontal complexity) plug-ins.

The cpHcompPluginFactory object 1308 has a set of associations, for instance, there is an aggregation association 1307 between exactly one cpBasePluginFactory object 606 and cpHcompPluginFactory object 1308.

The cpPatternPluginFactory Object 1310

The cpPatternPluginFactory object 1310 is illustrated in FIG. 13. The cpPatternPluginFactory object 1310 is an instance of the cpPatternPluginFactory class. The cpPatternPluginFactory class 1310 is responsible for creating pattern plugins.

The cpPatternPluginFactory object 1310 has a set of associations, for instance, there is an aggregation association 1309 between exactly one cpBasePluginFactory object 606 and cpPatternPluginFactory object 1310.

The cpFeature Object 1502

Figure 15:
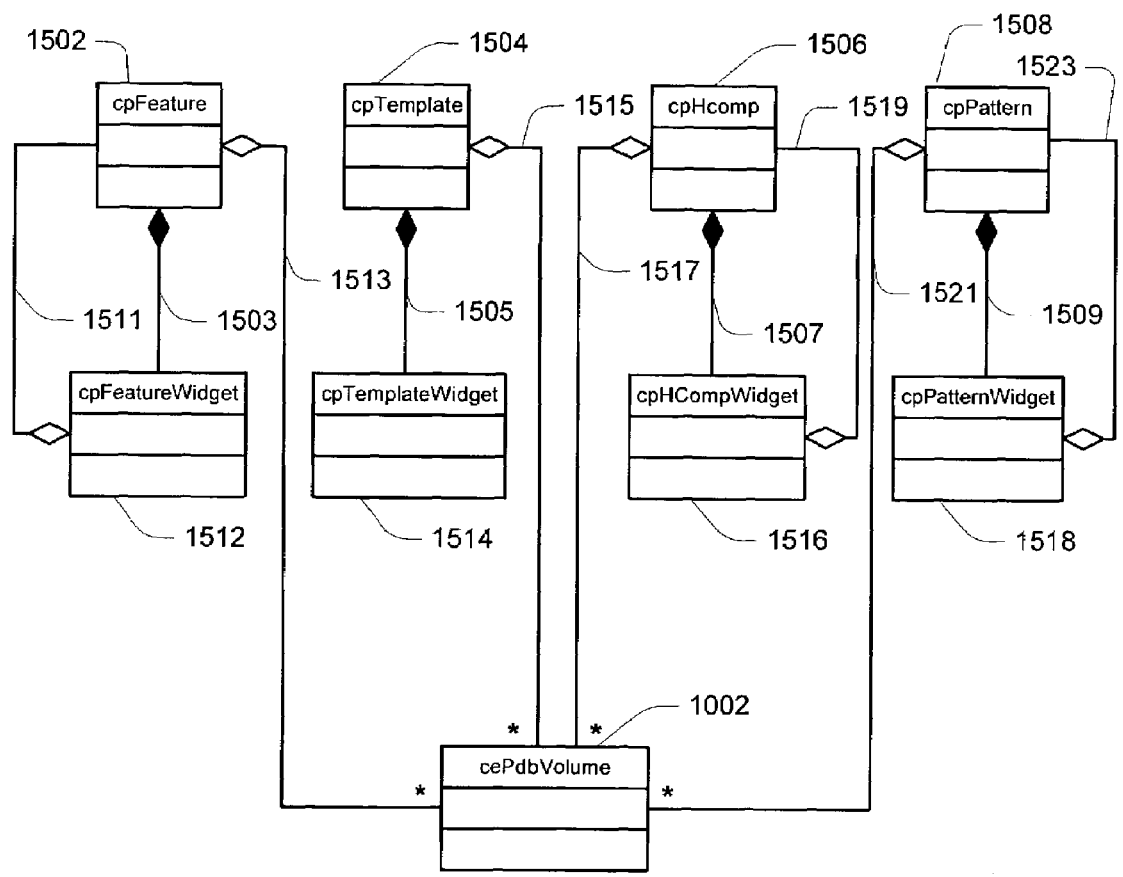
FIG. 15 is a block diagram illustrating a set of objects within one of the modules of the present invention.

The cpFeature object 1502 is illustrated in FIG. 15. The cpFeature object 1502 is an instance of the cpFeature class 1404. The cpFeature class 1502 encapsulates the feature algorithm.

The cpFeature object 1502 has a set of associations, for instance, there is a composition association 1503 between exactly one cpFeature object 1404 and cpFeatureWidget object 1512; there is an aggregation association 1511 between cpFeatureWidget object 1512 and exactly one cpFeature object 1404; and there is an aggregation association 1513 between exactly one cpFeature object 1404 and many cePdbVolume object 708.

The cpTemplate Object 1504

The cpTemplate object 1504 is illustrated in FIG. 15. The cpTemplate object 1504 is an instance of the cpTemplate class 1406. The cpTemplate class 1504 is responsible for generating template data volumes.

The cpTemplate object 1504 has a set of associations, for instance, there is a composition association 1505 between exactly one cpTemplate object 1406 and cpTemplateWidget object 1514; and there is an aggregation association 1515 between exactly one cpTemplate object 1406 and many cePdbVolume object 708.

The cpHcomp Object 1506

The cpHcomp object 1506 is illustrated in FIG. 15. The cpHcomp object 1506 is an instance of the cpHcomp class 1408. The cpHcomp class 1506 implements the horizontal complexity data processing algorithm.

The cpHcomp object 1506 has a set of associations, for instance, there is a composition association 1507 between exactly one cpHcomp object 1408 and cpHCompWidget object 1516; there is an aggregation association 1517 between exactly one cpHcomp object 1408 and many cePdbVolume object 708; and there is an aggregation association 1519 between exactly one cpHcomp object 1408 and many cePdbVolume objects 708.

The cpPattern Object 1508

The cpPattern object 1508 is illustrated in FIG. 15. The cpPattern object 1508 is an instance of the cpPattern class 1410. The cpPattern class 1508 is responsible for the implementation of the pattern extraction data processing algorithm.

The cpPattern object 1508 has a set of associations, for instance, there is a composition association 1509 between exactly one cpPattern object 1410 and cpPatternWidget object 1518; there is an aggregation association 1521 between exactly one cpPattern object 1410 and many cePdbVolume object 708; and there is an aggregation association 1523 between cpPatternWidget object 1518 and exactly one cpPattern object 1410.

The cpFeatureWidget Object 1512

The cpFeatureWidget object 1512 is illustrated in FIG. 15. The cpFeatureWidget object 1512 is an instance of the cpFeatureWidget class. The cpFeatureWidget class 1512 is the graphical user interface class that manages the widgets that are responsible for collecting the data from the user.

The cpFeatureWidget object 1512 has a set of associations, for instance, there is a composition association 1503 between exactly one cpFeature object 1404 and cpFeatureWidget 1512; and there is an aggregation association 1511 between cpFeatureWidget object 1512 and exactly one cpFeature object 1404.

The cpTemplateWidget Object 1514

The cpTemplateWidget object 1514 is illustrated in FIG. 15. The cpTemplateWidget object 1514 is an instance of the cpTemplateWidget class. The cpTemplateWidget class is the graphical user interface class that manages the widgets that are required to collect the information from the user.

The cpTemplateWidget object 1514 has a set of associations, for instance, there is a composition association 1505 between exactly one cpTemplate object 1406 and cpTemplateWidget object 1514.

The cpHCompWidget Object 1516

The cpHCompWidget object 1516 is illustrated in FIG. 15. The cpHCompWidget object 1516 is an instance of the cpHCompWidget class 1516. The cpHCompWidget class is the graphical user interface class that manages the widgets that are required to collect the parameters from the user that are used in the horizontal complexity calculations.

The cpHCompWidget object 1516 has a set of associations, for instance, there is a composition association 1507 between exactly one cpHcomp object 1408 and cpHCompWidget object 1516; and there is an aggregation association 1519 between exactly one cpHcomp object 1408 and many cePdbVolume object 708.

The cpPatternWidget Object 1518

The cpPatternWidget object 1518 is illustrated in FIG. 15. A cpPatternWidget object 1518 is an instance of the cpPatternWidget class. The cpPatternWidget class 1518 is the graphical user interface class that manages the widgets that are required to collect the information from the user.

The cpPatternWidget object 1518 has a set of associations, for instance, there is a composition association 1509 between exactly one cpPattern object 1410 and cpPatternWidget object 1518; and there is an aggregation association 1523 between cpPatternWidget object 1518 and exactly one cpPattern object 1410.

The Apparatus of the Present Invention

Figure 16:
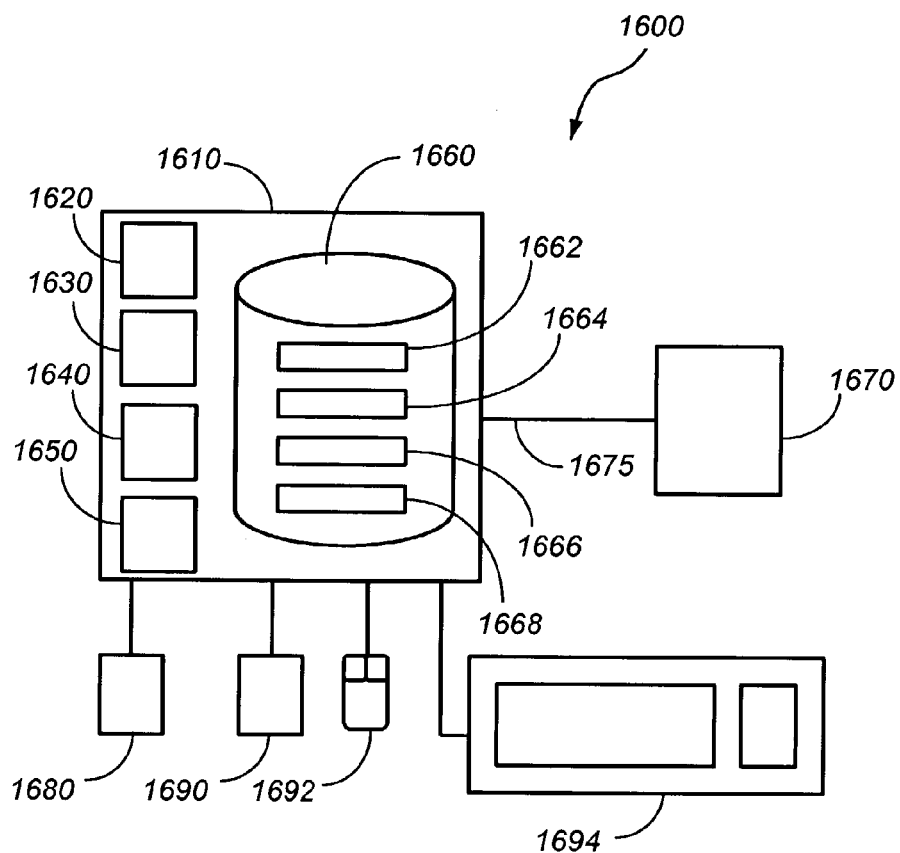
FIG. 16 is a block diagram of the apparatus of the present invention.

FIG. 16 illustrates an enhanced personal computer ("PC") 1600 used for extracting features from a signal. Enhanced PC 1600 includes a main unit 1610, a high-resolution display 1670, a VGA cable 1675, an optional CD-ROM drive 1680, an optional 8 mm (or other type) tape drive 1690, a mouse 1692, and a keyboard 1694. Main unit 1610 further includes one or more CPUs 1620, a high-speed memory 1630, a network card 1640, a high-speed graphics card 1650, and an internal and/or external hard drive 1660. The hard drive 1660 can be replaced with any suitable mass storage device, such as a storage area network ("SAN"), RAM, tape, drum, bubble or any other mass storage media. Hard drive 1660 stores, for example, a seismic and SEG-Y format database 1662, a pattern database ("PDB") 1664 (also called a knowledge hierarchy), well data, culture data, other supporting adapt and documents, one or more applications 1666, and a template library 1668.

High-speed memory 1630 is used to accelerate processing. High-speed graphics card 1650 is preferably an ultra-high-speed graphics card like the Intense 3D Wildcat (manufactured by 3DLabs of Huntsville, Ala.). High-resolution display 1670 is the highest resolution display currently available in order to support the applications, which are intensely graphic in nature, and is electrically connected to main unit 1610 by VGA cable 1675. Also electrically connected to main unit 1610 are CD-ROM drive 1680, 8 mm tape drive 1690, mouse 1692, and keyboard 1694.

In operation, seismic data enters the enhanced PC 1600 via, for example, the 8 mm tape drive 1690, the CD-ROM drive 1680 and/or the network card 1640. This seismic data is stored in, for example, SEG-Y format in database 1662 and is processed by CPU 1620 using applications 1666, with mouse 1692, and keyboard 1694 as input devices and high-speed memory 1630 to facilitate processing. The processed seismic data is then stored in a PDB 1664 format.

After pattern analysis, a PDB contains a collection of data volumes. The collection includes a 3D seismic data volume, multiple associated pattern, feature, texture volumes, and multiple scene volumes. The data values are stored so that they can be addressed as spatially vertical columns or horizontal slabs with the columns and slabs made up of subsets called bricks. A stack of bricks that extend from the top of the cube to the bottom is a column. A mosaic of bricks that extends horizontally across the volume is a slab. The brick size is chosen to optimize data access, for example, 64 by 64 samples in size. The samples are 8-bit integer, 32-bit floating point, or any other desired format. Each volume contains metadata including:

the volumes name;
physical dimensions in slice coordinates (index numbers), seismic survey coordinates, and world (map) coordinates;
labels for each spatial axes;
physical units for the world coordinates of each axes;
registration points associating the slice coordinates to the seismic survey coordinates;
registration points associating the seismic survey coordinates to the world coordinates;
default display properties appropriate to the type of data:
default color table; and
default opacity table;
sample value label;
sample value scaling properties (additive minimum and maximum values of scaled sample values);
history including date and text entry including:
source from which the adapt was obtained;
operations which were performed on the data by the present invention;
description of the data; and
user provided notes;
minimum and maximum sample values, plus histogram of data values;
locking keys and other data management keys and pointers; and
other associated information.

The PDB collection, and associated metadata, can be stored as files on a file system, as information in a database, or as a combination of the two.

After modification, a seismic template is created for each geoscientist, and this template is stored in template library 1668. During processing, the seismic data is viewed on the high-resolution display 1670. After further processing, the seismic data is stored in template library 1668, and output to 8 mm tape drive 1690 or CD-ROM 1680, or transmitted via the network card 1640.

The methods illustrated in FIGS. 17 and 19 are executed using object-oriented programming, which allows reflection coefficient ("RFC") data, acoustic impedance ("AI"), and other calculated feature extraction information to be stored either as parameters and methods or as results, according to the available memory and processing capability of the host system. If the full results of the seismic data analysis are stored in the PDB 1664, the memory requirement is measured in terabytes, which is more memory capacity than many systems have. If the parameters and methods for generating the seismic analysis are stored instead, the system must have enormous processing capability and high-speed memory 1630 in order to rapidly calculate the analyzed seismic data when the seismic object is executed.

Method of 3D Seismic First Pass Lead Identification

Figure 17A:
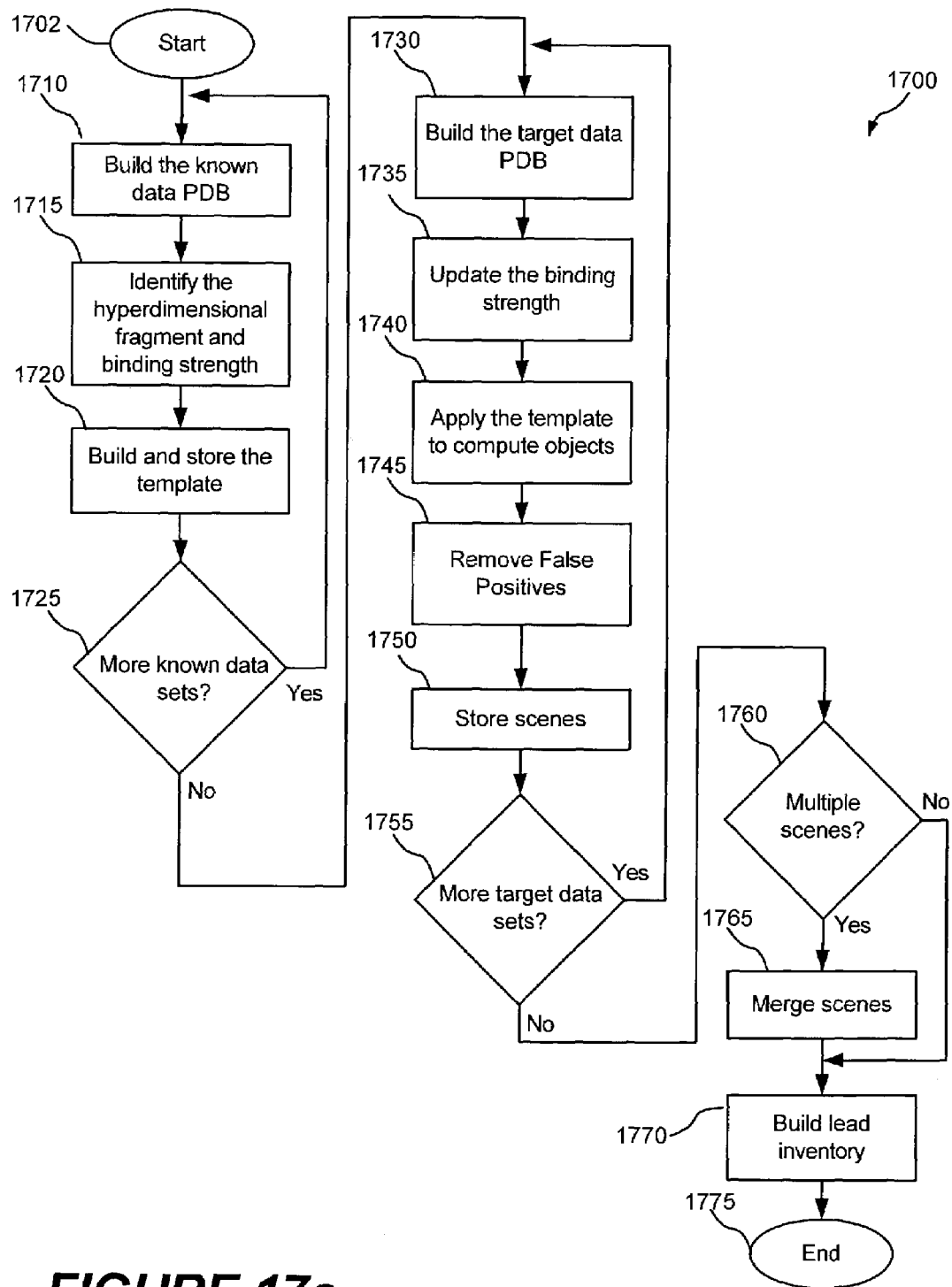
FIG. 17*a* is a flowchart illustrating an embodiment of a method of 3D seismic first pass lead identification.
Figure 17B:
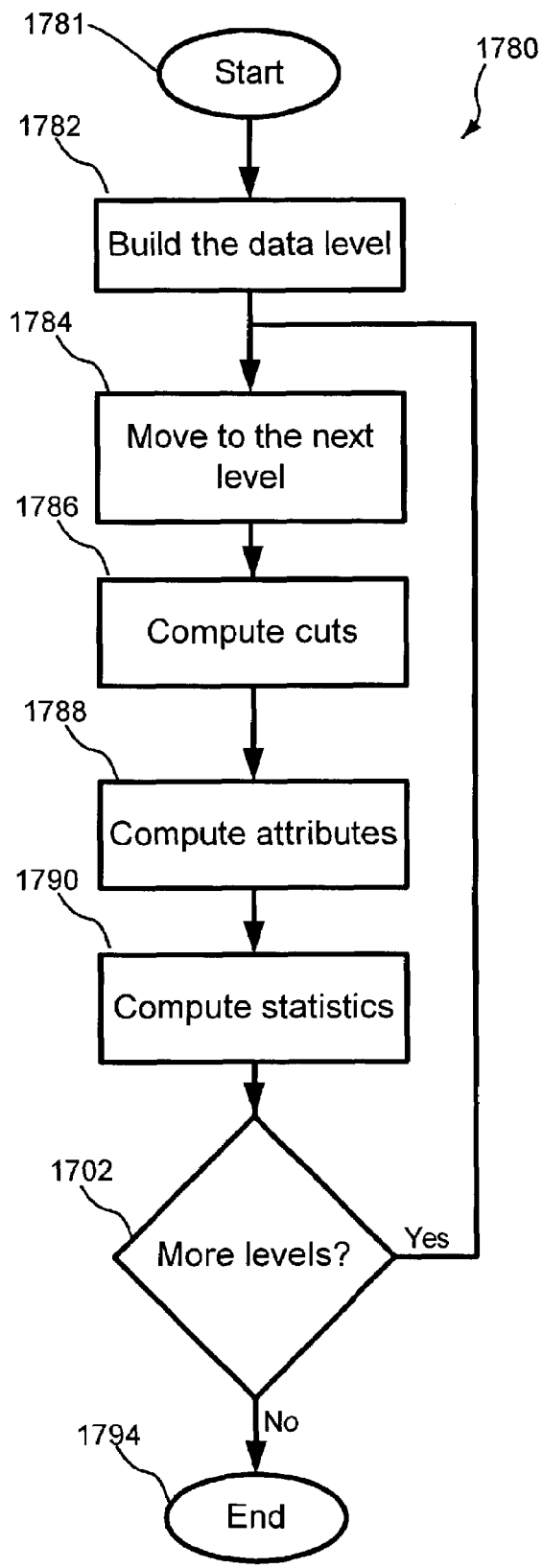
FIG. 17*b* is a flowchart illustrating an embodiment of a method of building a pattern database for geophysical and geological data.

The present invention employs the above-identified apparatus for various purposes. The method of the present invention will now be illustrated via the 3D seismic first pass lead identification example method of the present invention is illustrated in FIG. 17a by method 1700.

Step 1700: Method 1700 starts. The method starts generally at step 1702.

Step 1710: Build the known data PDB. In this step, the operator executes a batch program called Chroma Patterns to build a pattern database for the known data set. This step performs the method 1780 shown in FIG. 7b.

Step 1715: Identify the hyperdimensional fragment and binding strength. In this step, the user visualizes the PDB built in step 1710 in a suitable visualization application, usually Chroma Vision, although others such as VoxelGeo, GeoViz, EarthCube, etc. could be used. The known data set usually contains a target which is a zone of a drilled hydrocarbon filled reservoir or a zone of the geology of interest to the geoscientist. It also contains non-targets that are zones that are not of interest. The geoscientist studies the data, feature, pattern, and texture attribute and statistic values associated with the targets and non-targets to identify the values for attributes and statistics at each level of the pattern pyramid that classify the two as different. This can sometimes be accomplished quickly be probing the zones with the cursor and monitoring the readout of the values. A better method is to paint examples of the targets and nontargets and export a spreadsheet of value population histograms for them that are then read into a spreadsheet analysis and graphing program such as Microsoft Excel, which is manufactured by the Microsoft Corporation of Redmond, Wash. They can than be analyzed statistically by curve fitting and cross plotting to identify the attribute and statistic values for each pattern pyramid layer that has the highest probability of classifying the targets as different than the non-targets which become the hyperdimensional fragment. An analysis of the distribution or residuals can be used to determine the required binding strength. If the known data set is small enough, the hypothetical templates could be created and interactively applied and modified in a trial and error process to determine the best hyperdimensional fragment and binding strength. The end product is a hyperdimensional fragment containing the associated values for each level of the pattern pyramid and an associated binding strength which properly classifies the known data set.

Step 1720: Build and store the template. In this step, the template is built using the hyperdimensional fragment identified in step 1715 and the parameters used to build the PDB in step 1710. The template is stored in a template database.

Step 1725: More known data sets? In this step, the operator determines if there are more known data sets. If the answer is yes method 1700 proceeds to step 1710. If it is no the method 1700 proceeds to step 1730. Because geology is complex any given area might contain more than one play concept. A play concept is a geological situation (reservoir, trap, and charge) that causes a hydrocarbon accumulation to occur. Thus, an analysis will require more than one known data example. To accommodate this more than one template needs to be made, one for each play concept.

Step 1730: Build the target PDB. In this step, the operator executes a batch program called Chroma Patterns to build a pattern database for the target data set. This step performs the sub-method 1780 shown in FIG. 17b.

Step 1735: Update the binding strength. In this step, the binding strength is selected using the same technique described in step 1715 with the exception that the visualization is performed on the target data set and only the binding strength is determined (the hyperdimensional fragment remains unchanged). The goal is to eliminate false positives, if any, that appear when the template is applied to the target data.

Step 1740: Apply the template to compute objects. In this step, the operator executes an application called Chroma Patterns (CPat) to apply the template to the target data set PDB. The result usually identifies voxels with properties like the target but the voxels have not been collected into connected bodies. This step is often performed in a different application such as Chroma Vision. The result is a scene containing spatially connected objects that satisfy the template.

Step 1745: Remove false positives. In this step, the operator visualizes the scene and the objects contained in them in a visualization application, as described in step 1715, to determine if the collection of targets identified by step 1740 contain false targets. False targets may include geology which has the same visual characteristics as hydrocarbon accumulations but are known to not contain hydrocarbons (coals, very clean brine filled sands and others). They may also contain targets that are too small to be commercially viable which are removed by setting a threshold based on size.

Step 1750: store scenes. In this step, the scenes are stored, usually along with the pattern database.

Step 1755: More target data sets? In this step the operator determines if there are more target data sets to be analyzed. If yes, this method returns to step 1730. If no this method proceeds to step 1760.

Step 1760: Multiple scenes? In this step the operator determines if only one of more than one scene was created during the operation of this method. If only one scene was created the method skips step 1765 to step 1770. If multiple scenes were created the method proceeds to step 1765.

Step 1765: Merge scenes. In this step the present invention operator executes a computer application, usually scene tools in Chroma Vision, to merge the scenes together into a single scene. This combination is performed using repeated Boolean operations applied to the objects in the scenes to create a union of the objects creating a single merged scene.

Step 1770: Build lead inventory. In this step the operator uses a computer application such as Chroma Vision to export a the spreadsheet list of objects and associated information such as their names, locations, sizes, and other information as required by the operator. Additional information is appended as required to make a lead inventory spreadsheet.

Step 1775: Method 1700 ends. The method 1700 ends generally at step 1775.

Method of Building a Pattern Data Base for Geophysical and Geological Data

An additional embodiment of the present invention is a system for and method of building a pattern database. This method will now be illustrated via a building a pattern database for geophysical and geological data example method which is illustrated in FIG. 7b by method 1780.

Step 1780: Method 1780 starts.

Step 1782: Build the data level. In this step, the present invention operator uses a computer application to read the data and write it to the appropriate location in a pattern database.

Step 1784: Move to the next level. The present invention operator performs uses a computer application, to perform steps 1784 through 1702. The operator usually selects all of the required parameters the build a set of batch jobs which are then queued and run in batch mode without user intervention. For the first time this step is executed the Chroma Patterns application initializes the process to start at the first level of abstraction in the pattern pyramid. After the first time, the application increments to the next higher level of abstraction.

Step 1786: Compute cuts. In this step, the Chroma Patterns application applies the operator selected cutting criteria for the current level of abstraction of the pattern pyramid. The specific algorithms and parameters are selected buy the operator from a list of options and depend on the nature of the data and the goal of the analysis. A list of specific list of choices and the associated algorithms described later.

Step 1788: Compute attributes. In this step, the Chroma Patterns application applies the operator selected attribute computations for the current level of abstraction of the pattern pyramid. The specific algorithms and parameters are selected buy the operator from a list of options and depend on the nature of the data and the goal of the analysis. A list of specific list of choices and the associated algorithms described later.

Step 1790: Compute statistics. In this step, the Chroma Patterns application applies the operator selected statistics computations for the current level of abstraction of the pattern pyramid. The specific algorithms and parameters are selected buy the operator from a list of options and depend on the nature of the data and the goal of the analysis. A list of specific list of choices and the associated algorithms described later.

Step 1702: More Levels? In this step the Chroma Patterns application checks the user supplied parameters to determine if there are more levels of abstraction to be computed. If yes, the method returns to step 1784. If no the method proceeds to step 1794 and ends.

Step 1794: Method 1780 ends. The method 1780 ends generally at step 1794.

Method of Building a Pattern Data Base for 3D Band-limited Acoustical Impedance

Figure 18A:
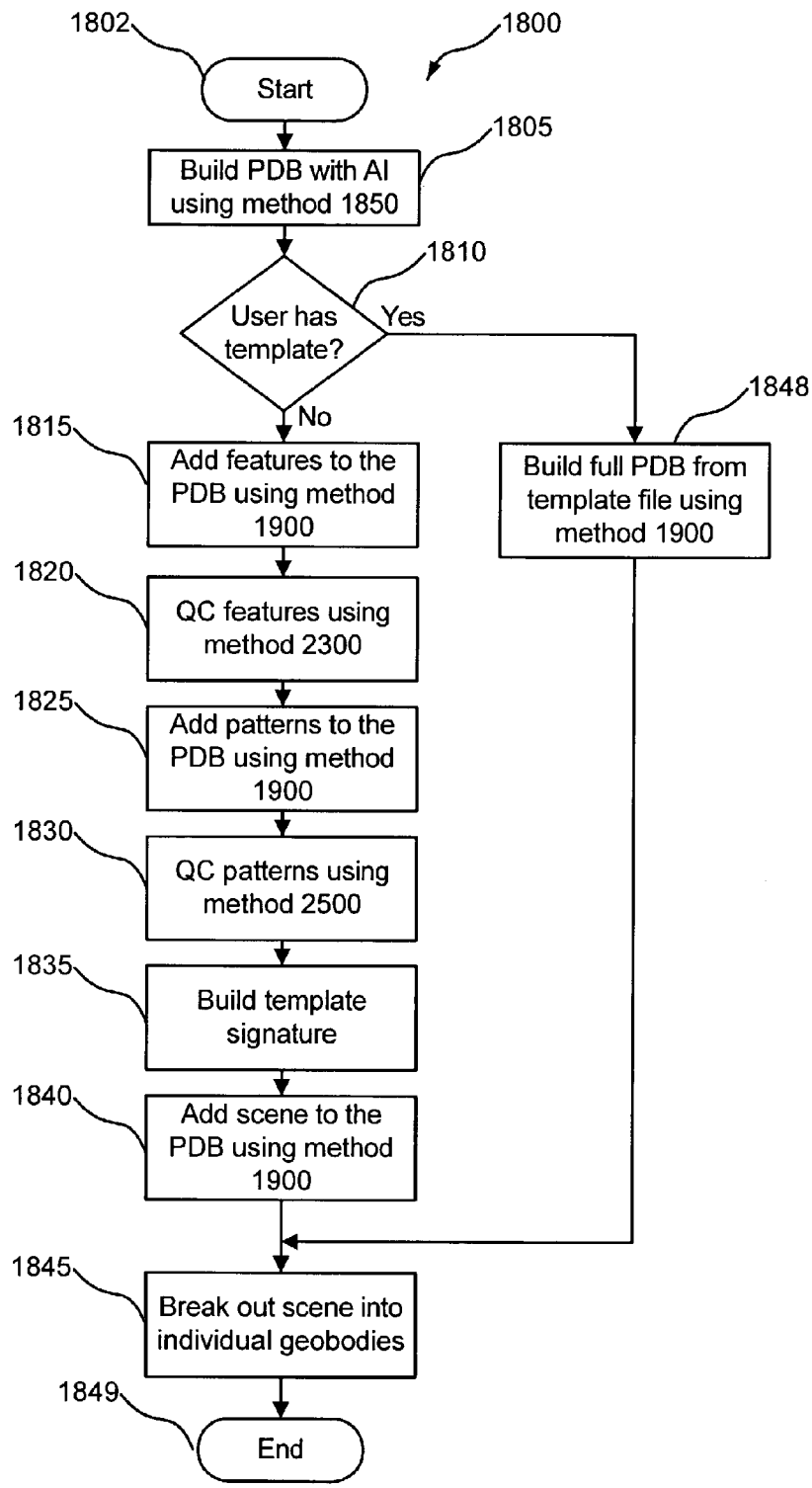
FIG. 18*a* is a flowchart illustrating an embodiment of a method of building a pattern database for 3D band-limited acoustical impedance.

An additional embodiment of the present invention is a system for and method of building a pattern database. This method will now be illustrated via a building a pattern database for 3D band-limited acoustical impedance example which is illustrated in FIG. 18*a* by method 1800. FIG. 18*a* illustrates an example of an embodiment of the method of the present invention for performing a pattern analysis of seismic data, including:

Step 1802: Start. The method starts generally at step 1802.

Step 1805: Build the PDB with acoustic impedance using method 1850. In this step, the system operator performs method 1850 in order to prepare the seismic data for pattern analysis.

Step 1810: User has a template? In this step, the operator checks to determine if this method was already performed at least once in the past and a template has been created. If yes, the method 1800 proceeds to step 1848; otherwise, the method 1800 proceeds to step 1815.

Step 1815: Add features to the PDB using method 1900. In this step, the system operator uses a pattern analysis application that is described in method 1900, as illustrated in FIG. 19, in order to add features to the PDB.

Step 1820: QC features using method 2300. In this step, the system operator performs a quality control analysis of the features that were created in step 1815 by performing method 2300 shown in FIG. 23.

Step 1825: Add patterns to the PDB using method 1900. In this step, the system operator uses a pattern analysis application that is described in method 1900, shown in FIG. 19, to add patterns to the PDB.

Figure 25:
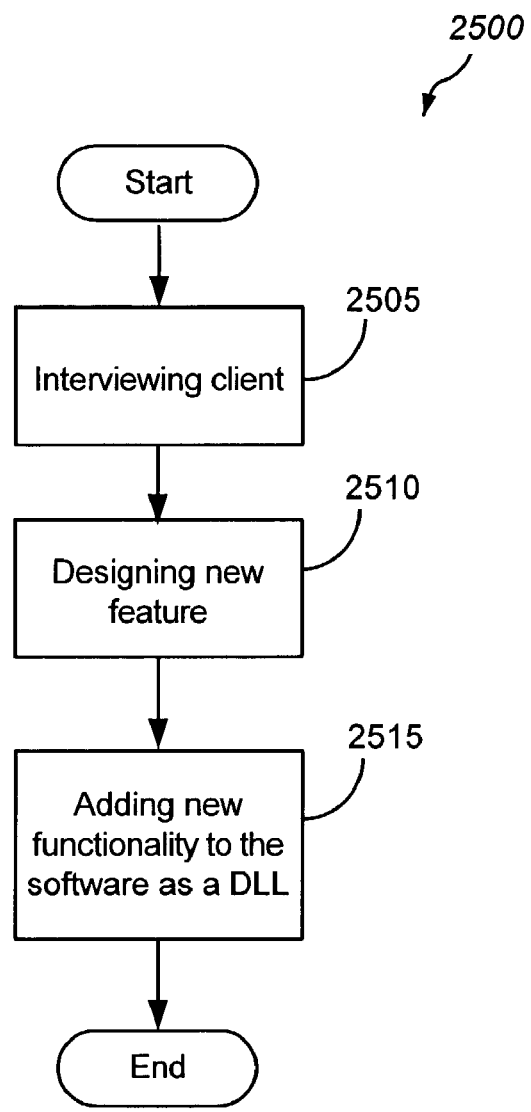
FIG. 25 is a flowchart illustrating an embodiment of a method of adding cutting, attribute, or statistic algorithms to the pattern database building application.

Step 1830: QC patterns using method 2500. In this step, the system operator performs a quality control analysis of the patterns that were created in step 1825, by performing method 2500 that is shown in FIG. 25.

Step 1835: Build template signature. In this step, the system operator uses a visualization application to select a set of voxels by painting or any other selection method. The painted portion of the data identifies an example of the geological feature the geoscientists is searching for. The application displays the ranges of data values in the selected area. These data ranges are stored in a template signature file. The template signature contains the PDB signature that locates geological geobodies and other objects of interest.

Step 1840: Add scene to the PDB using method 1900. In this step, the system operator uses a pattern analysis application with method 1900 that is described in FIG. 19, to add a scene to the PDB using the template signature that was built in step 1835.

Step 1845: Break out scene into individual geobodies. In this step, the system operator uses a connected body autotracker, usually in a visualization application, to separate out all of the connected geobodies in the data set. This is accomplished either manually or automatically in that the autotrack process is repeated iteratively using as a seed point all voxels that have not been included in a previously autotracked body until all of the voxels have been processed. This step is better facilitated when all of the data is in RAM to perform the search and thus, it is preferable not to perform this step in a batch mode that streams the data to and from disk. When this step is completed, method 1800 proceeds to step 1849 and ends..

Step 1848: Build a full PDB from a template using method 1900. In this step, the system operator uses a pattern analysis application of method 1900, as described in FIG. 19, in order to build a complete PDB and scene. When step 1848 is completed, method 1800 proceeds to step 1845.

Step 1849: Method 1800 ends. The method 1800 ends generally at step 1849.

Method of Preparing Seismic Data for Pattern Analysis

An additional embodiment of the present invention is a system for and method of preparing seismic data for pattern analysis.

Figure 18B:
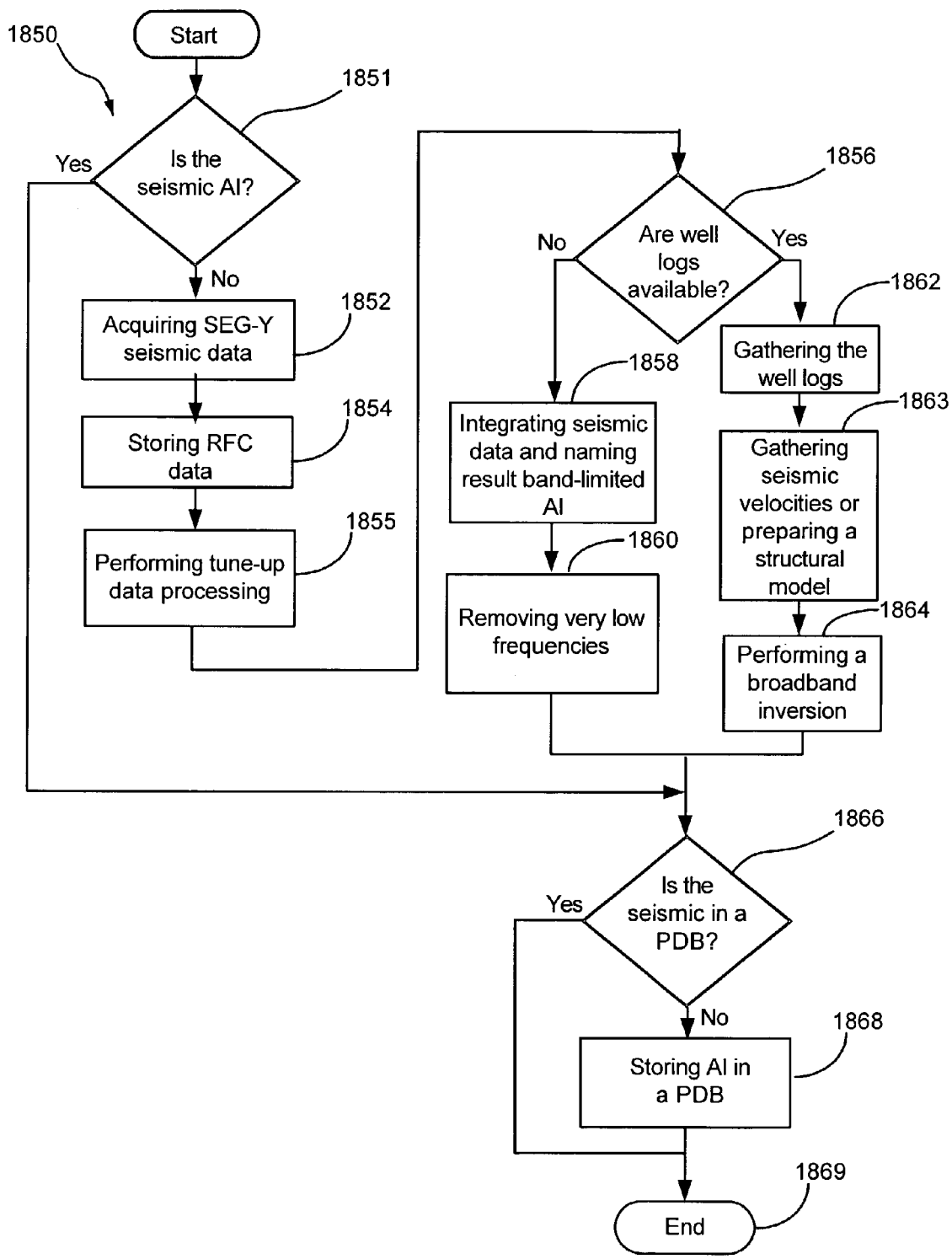
FIG. 18*b* is a flowchart illustrating an embodiment of a method of preparing seismic for pattern analysis.

FIG. 18*b* illustrates an exemplary embodiment of the method for preparing seismic data for pattern analysis, including:

Step 1851: Is the seismic AI? In this step, the operator checks to determine if the seismic has already been acquired and is already in the form of band-limited limited acoustical impedance or of broadband acoustical impedance. If yes, the method 1850 proceeds to step 1866; otherwise, the method 1850 proceeds to step 1852.

Step 1852: Acquiring SEG-Y seismic data. In this step, seismic data is collected by, retrieving it from a data library, purchasing it from a data acquisition company, or acquiring it for example, rolling vehicles using a geophone if the sound source is land-based, or by ships using a hydrophone if the sound source is marine-based. After collection, the seismic data is stored locally on magnetic tape or other mass storage media. The seismic data is then processed using standard techniques.

Step 1854: Storing RFC data. In this step, the RFC data is preferably stored in SEG-Y format in the database 1662. An alternate source for seismic data is data that has been previously acquired and stored. The data is read, for example, from a magnetic tape by inserting the tape into the 8 mm tape drive 1690 (see FIG. 16), or by transmitting the data over a network, e.g., the Internet, to network card 1640. The seismic data is stored on disk as RFC data in the SEG-Y industry standard format.

Step 1855: Performing tune-up data processing. In this step, the system operator uses an industry standard data processing application such as ProMax from Landmark Graphics of Houston, Tex., to perform some types of standard seismic data processing, if required, to reduce noise and improve the data quality. The amount of tune-up processing varies depending on the quality of the data that was received.

Step 1856: Are well logs available? In this step, the operator checks to determine if wells have been drilled and if the merged, edited, and processed well log data is available in LAS format. If yes, then method 1850 proceeds to step 1862; otherwise, the method 1850 proceeds to step 1858.

Step 1858: Integrating seismic data and naming result band-limited AI. In this step, the system operator uses an industry standard data processing application, such as Pro-Max from Landmark Graphics to integrate the seismic data, thereby turning the output value of a sample into a running sum of the previous sample plus the input value of the current sample. The resulting data is called band-limited acoustic impedance or RAI that has the same bandwidth as the seismic data, as well as some very low frequency artifacts. Since many applications do not have this function, an application plug-in is usually written to provide this capability.

Step 1860: Removing very low frequencies. In this step, the system operator uses an industry standard data processing application, such as ProMax from Landmark Graphics, to remove the lowest frequencies from the seismic data. Low-frequency data artifacts are caused by the fact that a digital signal of finite length and having discrete samples cannot be free of direct current ("DC"). Several standard methods can be used to subtract the low-frequency seismic data, including a polynomial fit that is then subtracted, bandpass filters, or recursive bandpass filters. The result of this step is AI with the same bandwidth as the seismic data and is called band-limited AI.

Step 1862: Gathering well logs. In this step, the operator gathers the well logs in LAS format and stores them in the database 1662.

Step 1863: Gathering seismic velocities or preparing a structural model. In this step, the operator seismic velocities or prepares a structural model and stores them in the database 1662.

Step 1864: Performing a broadband seismic inversion. In this step, the operator uses a commercially available seismic processing application, such as the Hampson Russell Strata application, to perform a seismic inversion using industry standard techniques. The result is called acoustical impedance.

Step 1866: Is the seismic in a PDB? In this step, the operator checks to determine if the seismic was previously placed directly into a PDB. If yes, then method 1850 proceeds to step 1869 and ends; otherwise, the method 1850 proceeds to step 1868.

Step 1868: Storing AI. In this step, the system operator uses an industry standard data processing application, such as ProMax from Landmark Graphics, to reformat the AI result of step 1725 or step 1735 and store it on the hard drive 1660 in the PDB format. Since the PDB format is not an industry standard format an application plug-in is written to provide this capability. The PDB 1764 now contains RFC data and either band-limited AI or broadband AI.

Step 1869: Method 1850 ends. The method 1850 ends generally at step 1869.

Figure 19A:
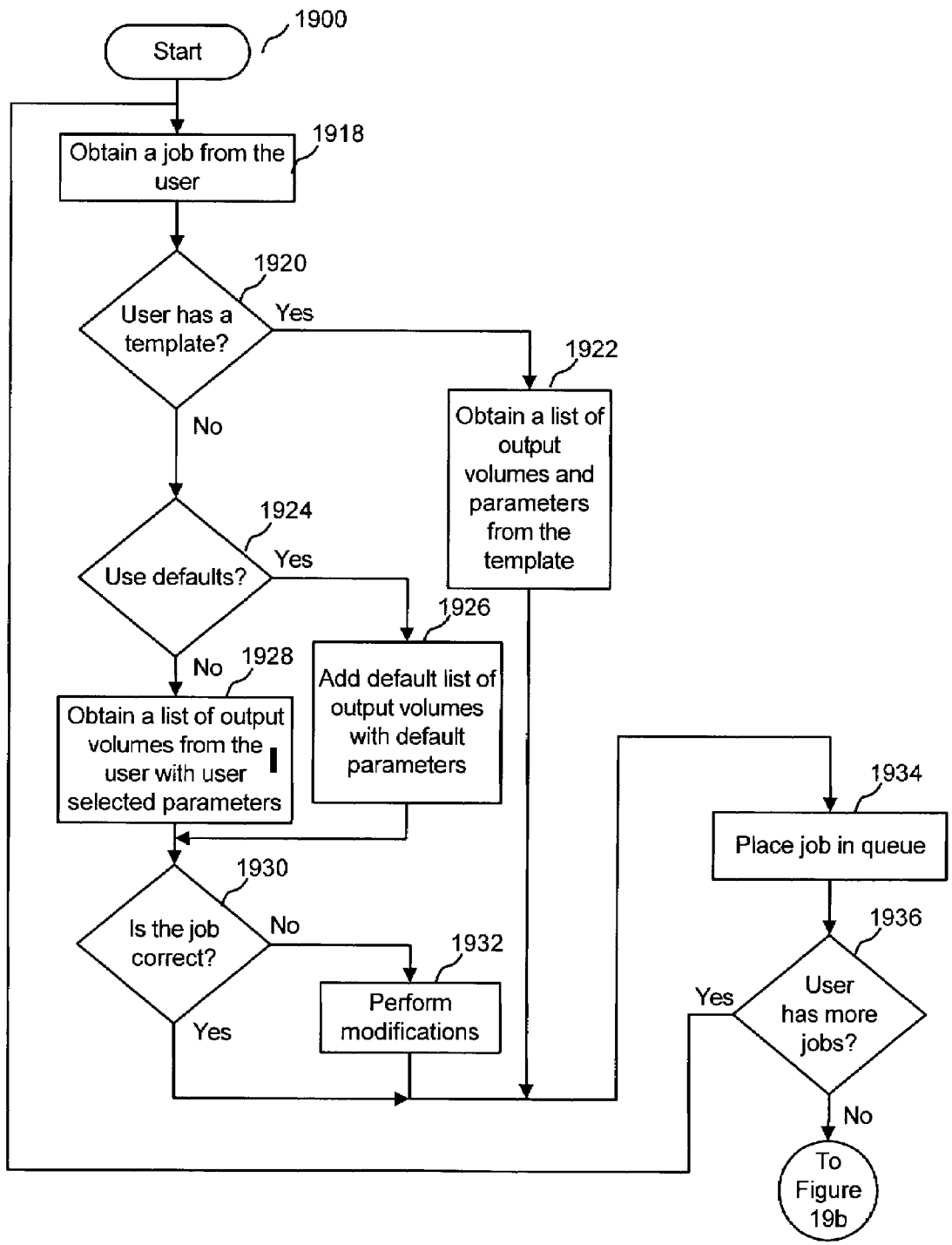
FIGS. 19*a* and 19*b* are flowcharts illustrating an embodiment of a method of constructing a pattern database for 3D band-limited acoustical impedance.
Figure 19B:
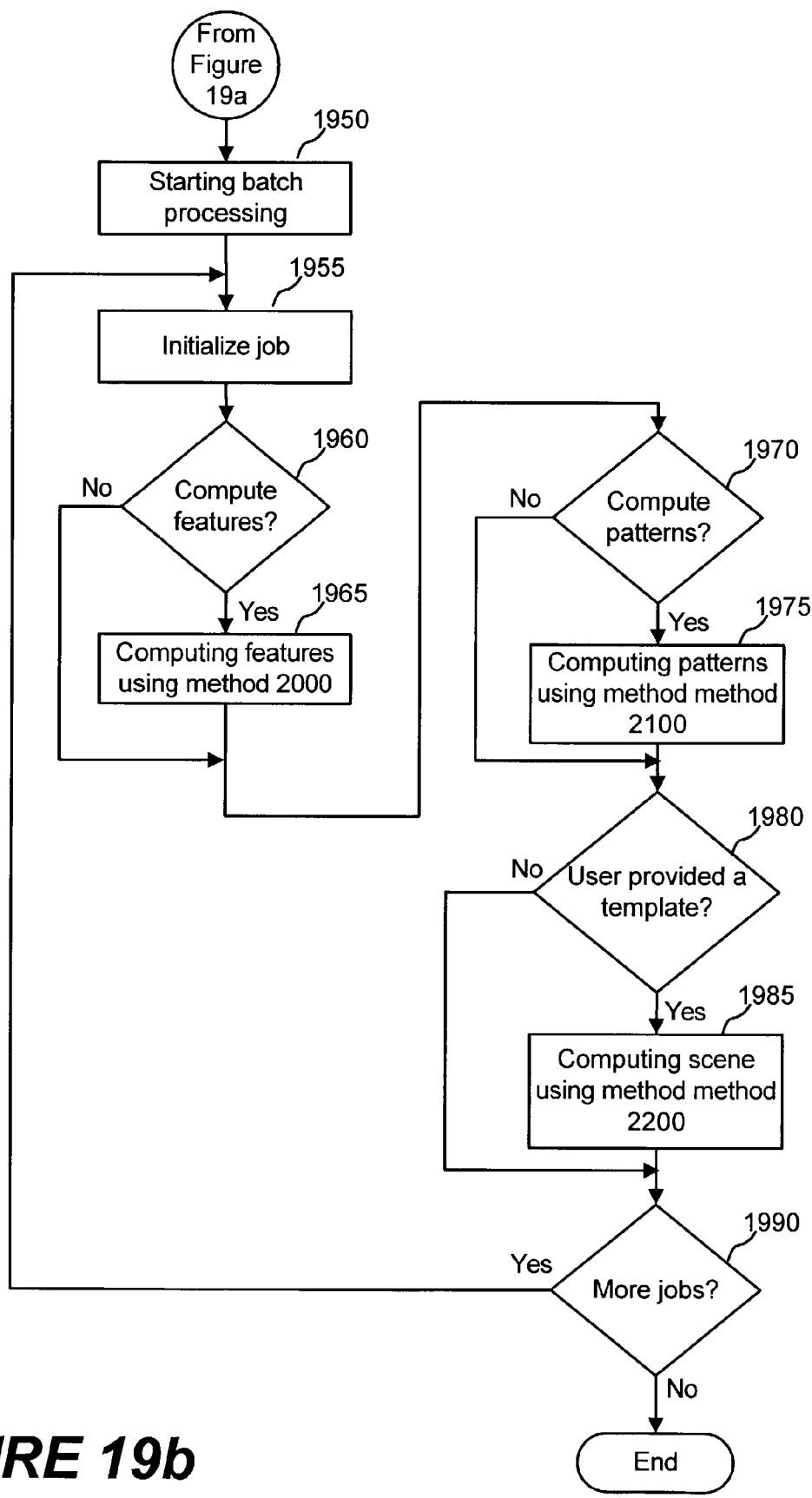
Figure 20A:
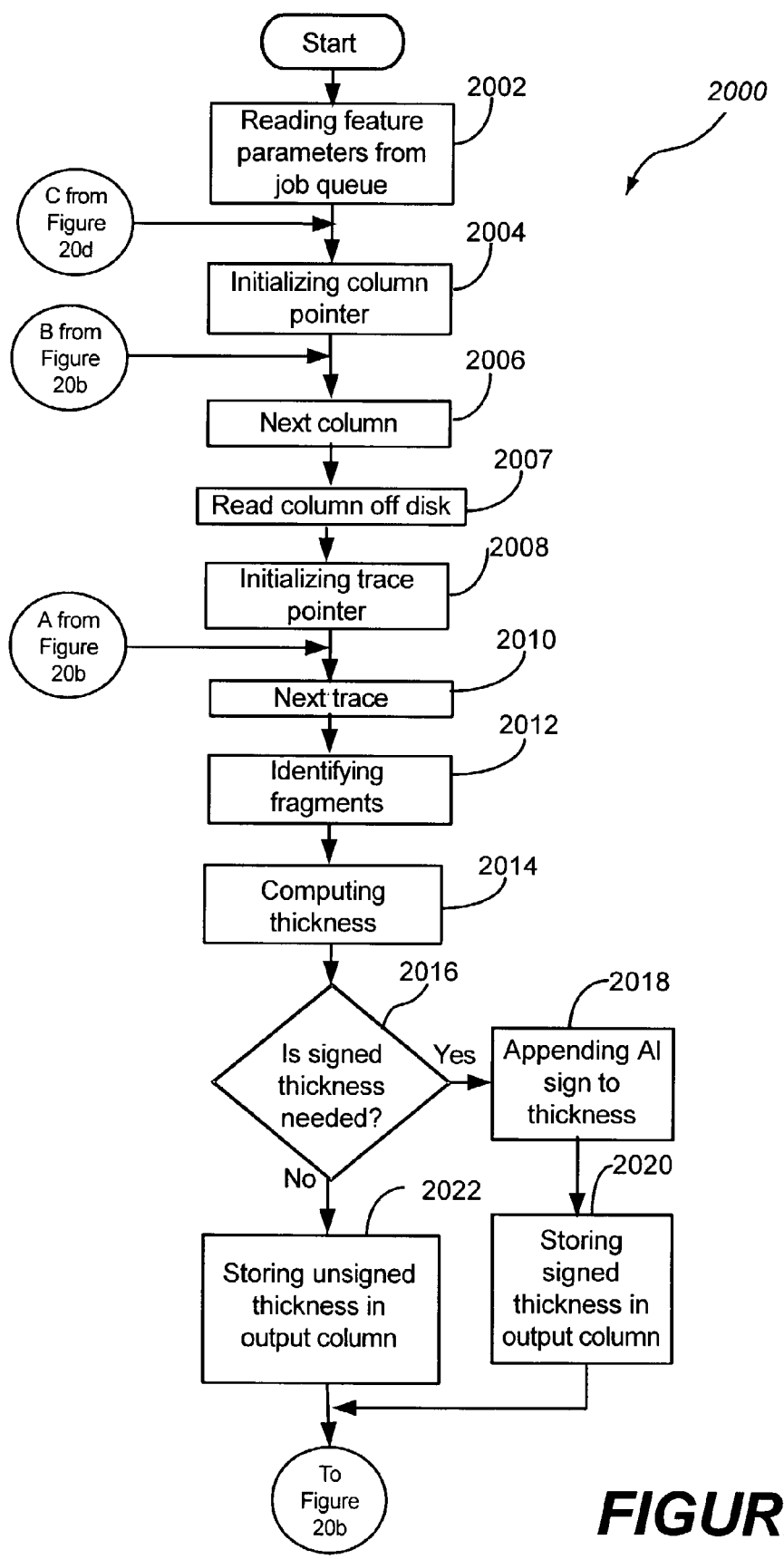
FIGS. 20*a*, 20*b*, 20*c*, and 20*d* are flowcharts illustrating an embodiment of a method of fragment cutting and feature attribute and statistic computation.
Figure 20B:
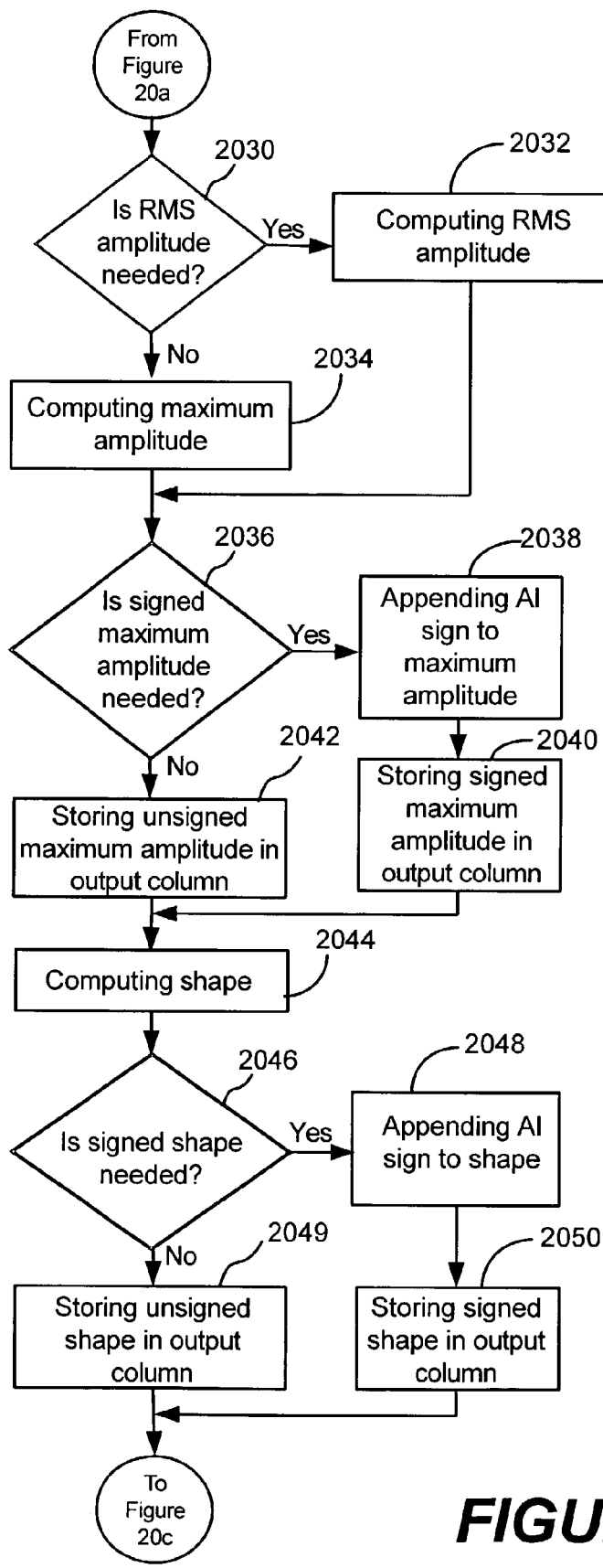
Figure 20C:
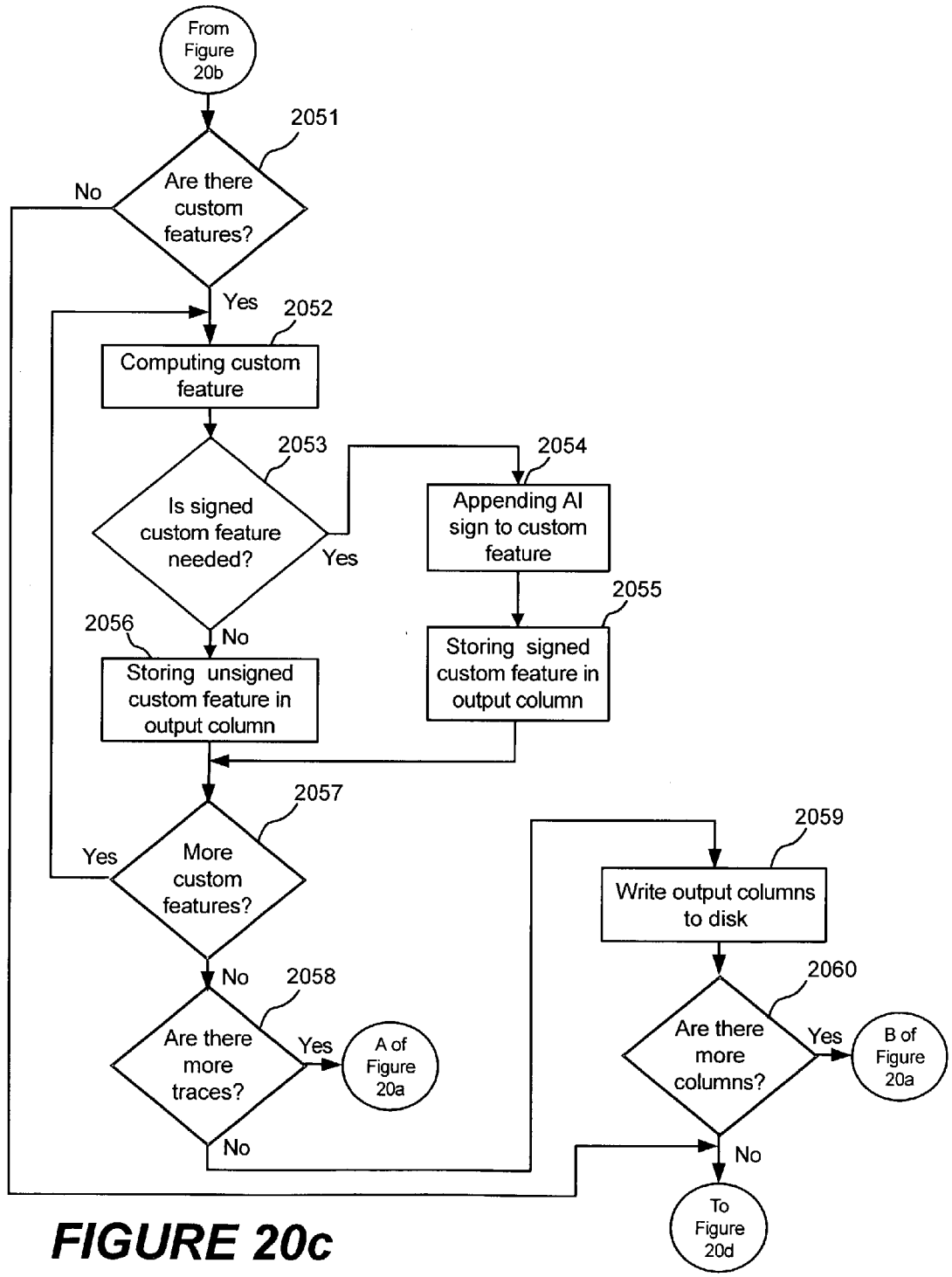
Figure 20D:
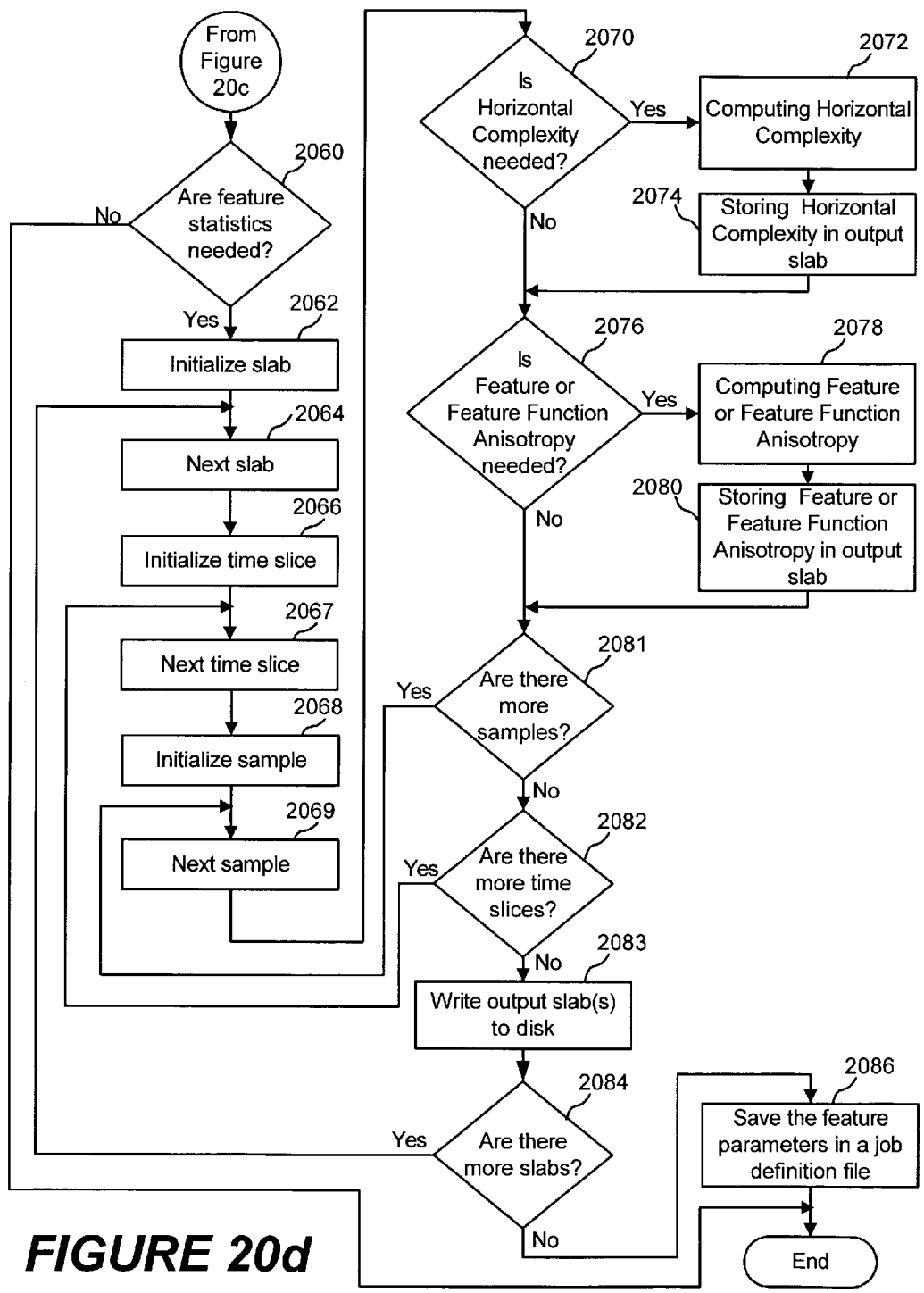

Method of Constructing a Pattern Data Base for 3D Band-limited Acoustical Impedance An additional embodiment of the present invention is a system for and method of constructing a pattern database. This method will now be illustrated via a preparing 3D seismic for pattern analysis example method that is illustrated in FIGS. 19a and 19b by method 1900.

Figure 21A:
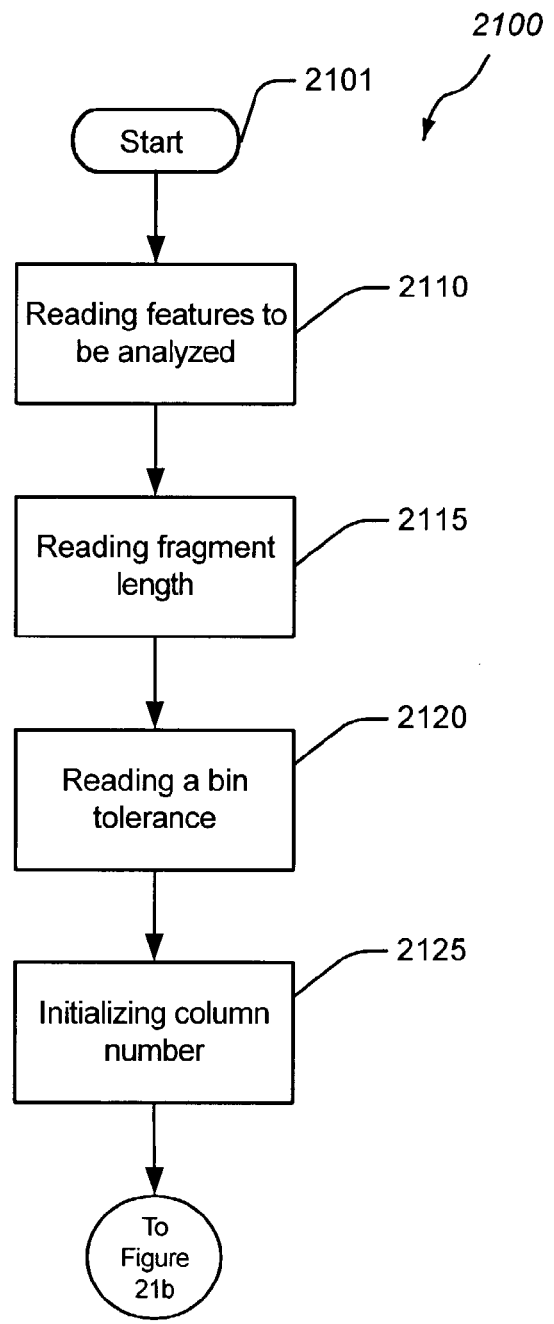
FIGS. 21*a*, 21*b*, and 21*c* are flowcharts illustrating an embodiment of a method of pattern attribute and statistic calculation.
Figure 21B:
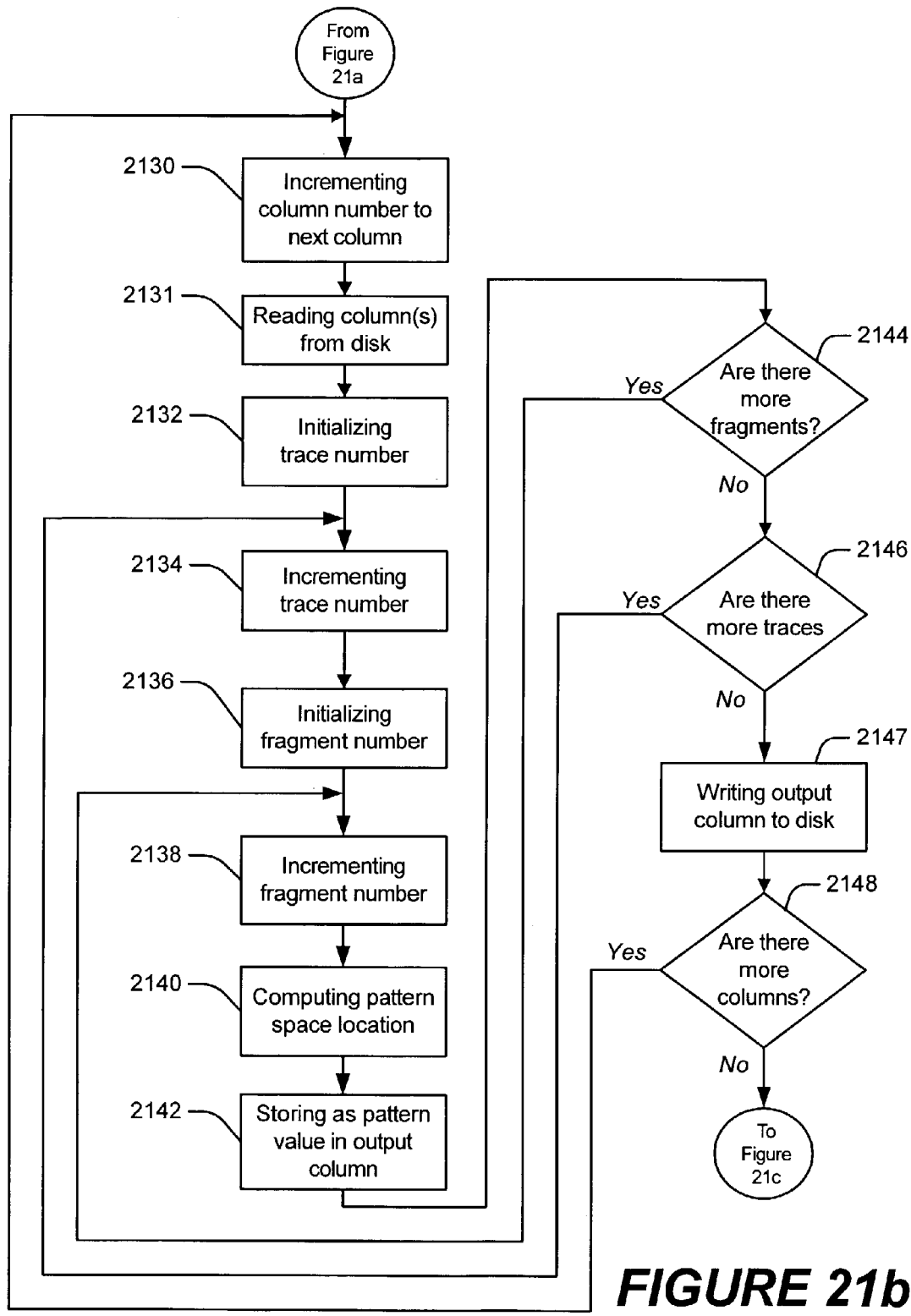
Figure 21C:
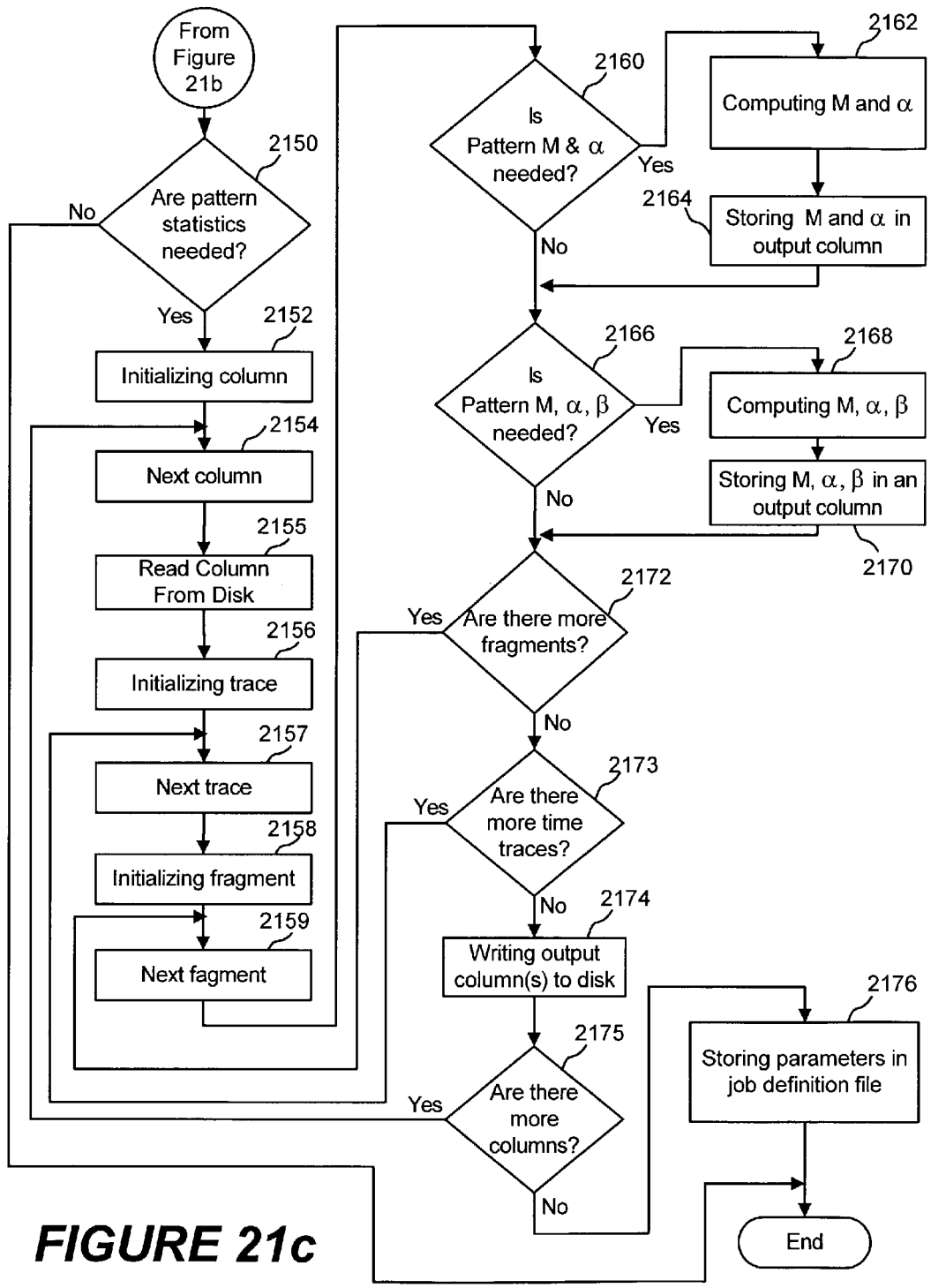
Figure 22:
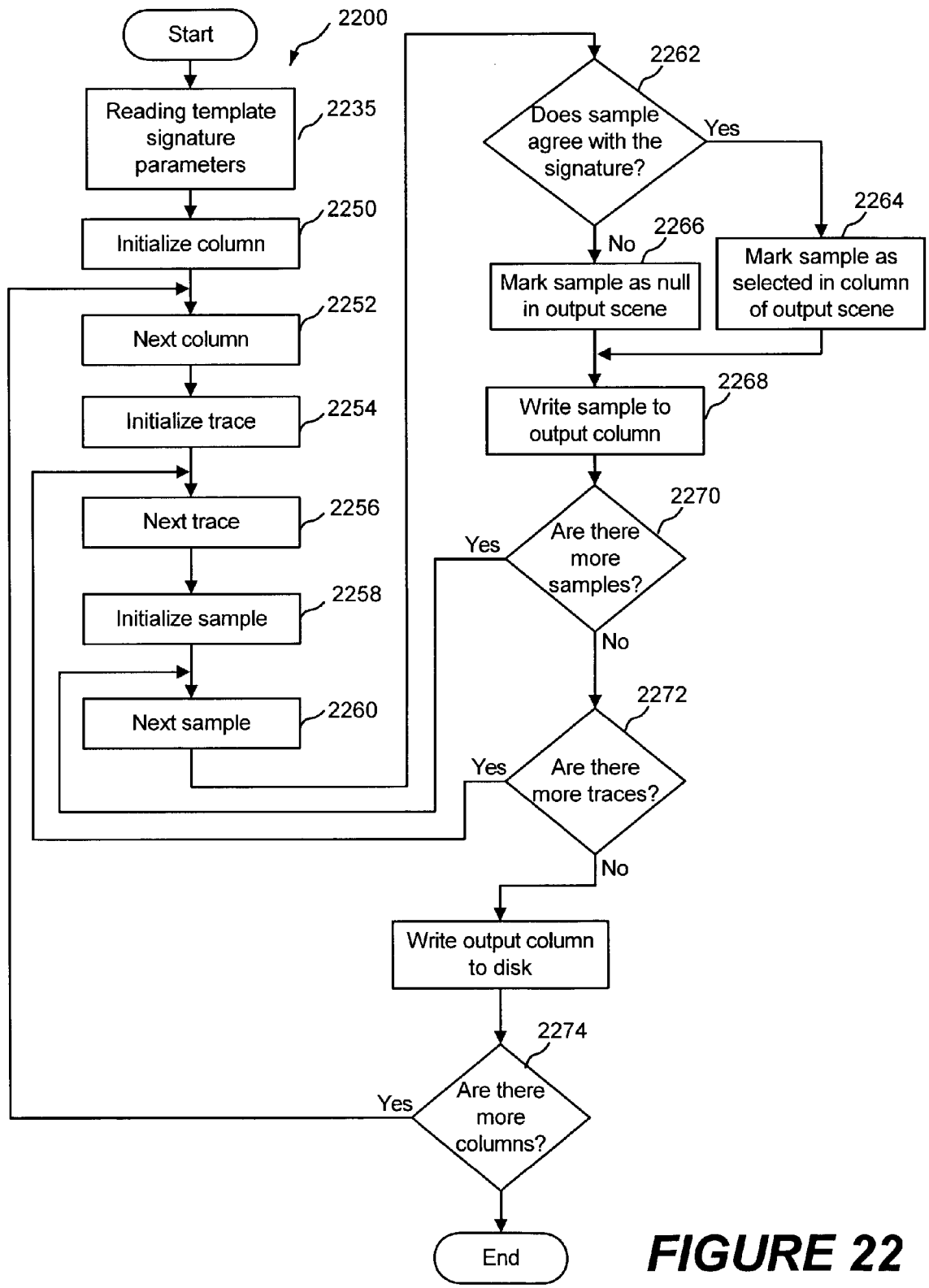
FIG. 22 is a flowchart illustrating an embodiment of a method of data mining using a template.

Note that this alternate embodiment of the present invention is practiced after completing the method described in FIG. 18. Further, this additional embodiment of the present invention assumes the prior creation of a PDB 1664 that contains either band-limited or broadband acoustical impedance. Note also that this method uses sub-method 2000 (illustrated in FIGS. 20a, 20b, 20c, and 20d) plus sub-method 2100 (illustrated in FIGS. 21a, 21b, and 21c) plus sub-method 2200, as illustrated in FIG. 22. This method is preferably implemented as a single computer application. The application has two modes of operation. The first part of the method is described in steps 1918 through 1936, where an interactive session allows the operator to build a list of work to be accomplished in a job. In addition, multiple jobs are placed in a job queue. The second part of the method is described in steps 1950 to 1990, where the application runs in a batch mode, without user intervention. While running in batch mode, the application displays a progress indicator with elapsed time and remaining time. In addition, pause, resume, and stop buttons are displayed which perform the indicated functions if invoked by the system operator. The additional embodiment of the method of the present invention includes:

Step 1918: Obtain a job from the user. In this step, the application displays a user interface that the system operator uses to define a job. A job is a list of output volumes and associated parameters that are created from a single input AI volume.

Step 1920: User has a template? In this step, the application checks to determine if there is an operator-provided template that was created during a previous execution of this method. If yes, the method 1900 proceeds to step 1922; otherwise, the method 1900 proceeds to step 1924.

Step 1924: User defaults? In this step, the application is instructed by the operator to use the default parameters. If yes, the method 1900 proceeds to step 1926; otherwise, the method 1900 proceeds to step 1928.

Step 1926: Add default list of output volumes with default parameters. In this step, the application creates a list of default output volumes and associated parameters to define a job. After step 1926, the method 1900 proceeds to step 1930.

Step 1928: Obtain a list of output volumes from the user with user-selected parameters. In this step, the application displays a user interface that allows the user to add output volumes to the list until the list is complete. Each added volume is added to the list with default parameters that the user is allowed to change.

Step 1930: Is the job correct? In this step, the application displays the list of output volumes and associated parameters for the system operator to review and determine if the list is correct. If yes, the method 1900 proceeds to step 1934; otherwise, the method 1900 proceeds to step 1932.

Step 1932: Perform modifications. In this step, the application displays a user interface that allows the user to add output volumes to the list, remove output volumes from the list, and modify the associated parameters until the list and the parameters are correct.

Step 1934: Place job in queue. In this step, the application appends the operator-defined jobs to the bottom of a processing queue. It displays a user interface that allows the operator to alter the order of the jobs that are in the queue.

Step 1936: User has more jobs? In this step, the application allows the user to add more jobs to the processing queue. If more jobs are to be added, then the method 1900 proceeds to step 1918; otherwise, the method 1900 proceeds to step 1950.

Step 1950: Start batch processing. In this step, the application displays a run button. When the operator is ready, the batch-processing mode is launched by invoking the run button. This usually occurs at the end of the workday when the operator is ready to leave the office. This allows the computer to run at night, thereby performing productive work while unattended.

Step 1955: Initialize job. In this step, the batch application initializes the first unprocessed job in the queue. This step includes the reading of the output volume list and parameters and the preparation for processing.

Step 1960: Compute features? In this step, the batch application determines if the output volume list includes features. If yes, the method 1900 proceeds to step 1965; otherwise, the method 1900 proceeds to step 1970.

Step 1965: Computing features using method 2000. In this step, the batch application performs method 2000 that is illustrated in FIGS. 20*a*, 20*b*, 20*c*, and 20*d*.

Step 1970: Compute patterns? In this step, the batch application determines if the output volume list includes patterns. If yes, the method 1900 proceeds to step 1975; otherwise, the method 1900 proceeds to step 1980.

Step 1975: Computing patterns using method 2100. In this step, the batch application performs method 2100 that is illustrated in FIGS. 21*a*, 21*b*, and 21*c*.

Step 1980: User provided a template? In this step, the batch application determines if the user provided a template to define the current job. If yes, the method 1900 proceeds to step 1985; otherwise, the method 1900 proceeds to step 1990.

Step 1985: Computing scene using method 2200. In this step, the batch application performs method 2200, illustrated in FIG. 22.

Step 1990: More jobs? In this step, the batch application determines if the queue contains more jobs. If yes, the method 1900 proceeds to step 1955; otherwise, the method 1900 ends.

Fragment Cutting and Feature Attribute and Statistic Computation

An additional embodiment of the present invention is a system for, and method of, selecting fragments and extracting features from the prepared data.

FIG. 20 illustrates an example method of identifying selected features and extracting features from the prepared data. Note that this alternate embodiment of the present invention is practiced as step 1960 of method 1900. Further, the present invention assumes that a PDB 1664 that contains either band-limited or broadband acoustical impedance has been created at some prior point. The alternate method of the present invention includes the following methods.

Figure 26A:
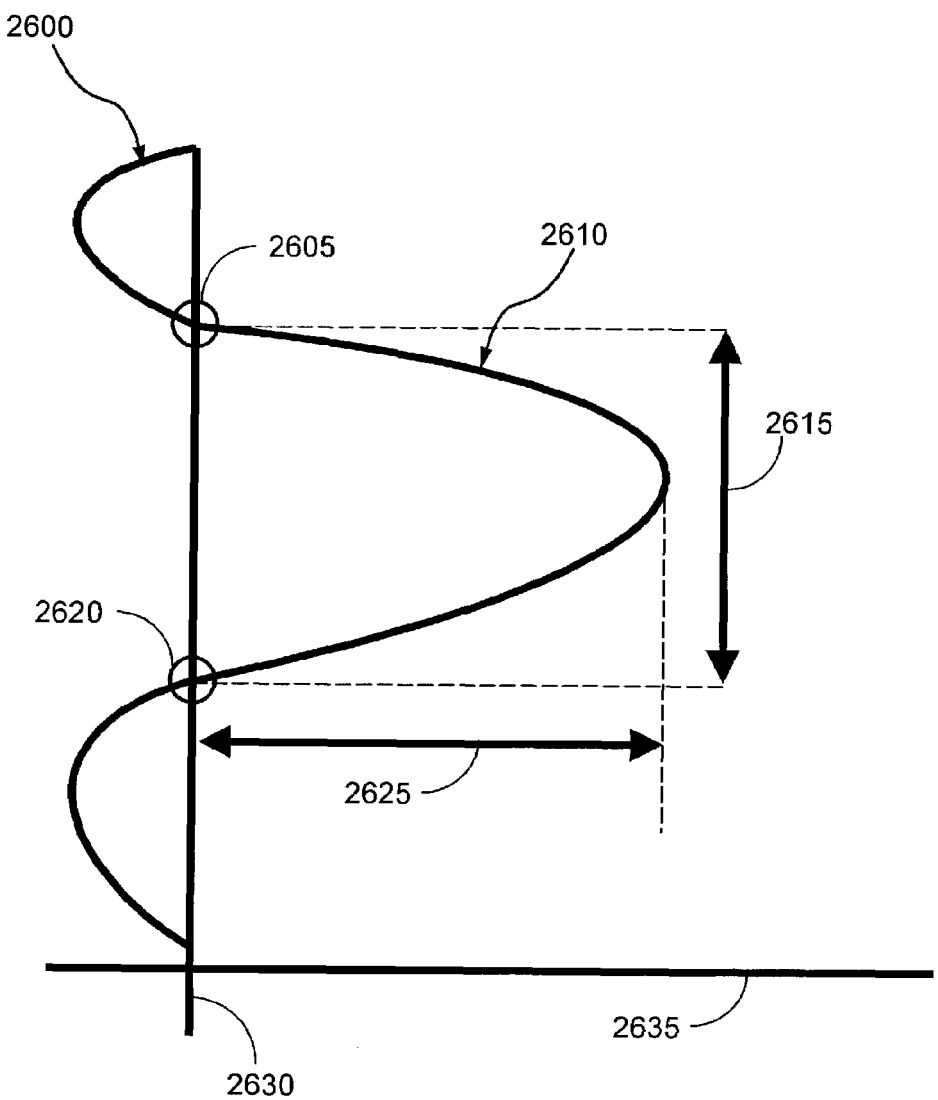
FIG. 26*a* is a plot of band-limited acoustical impedance as a function of time or distance.
Figure 26B:
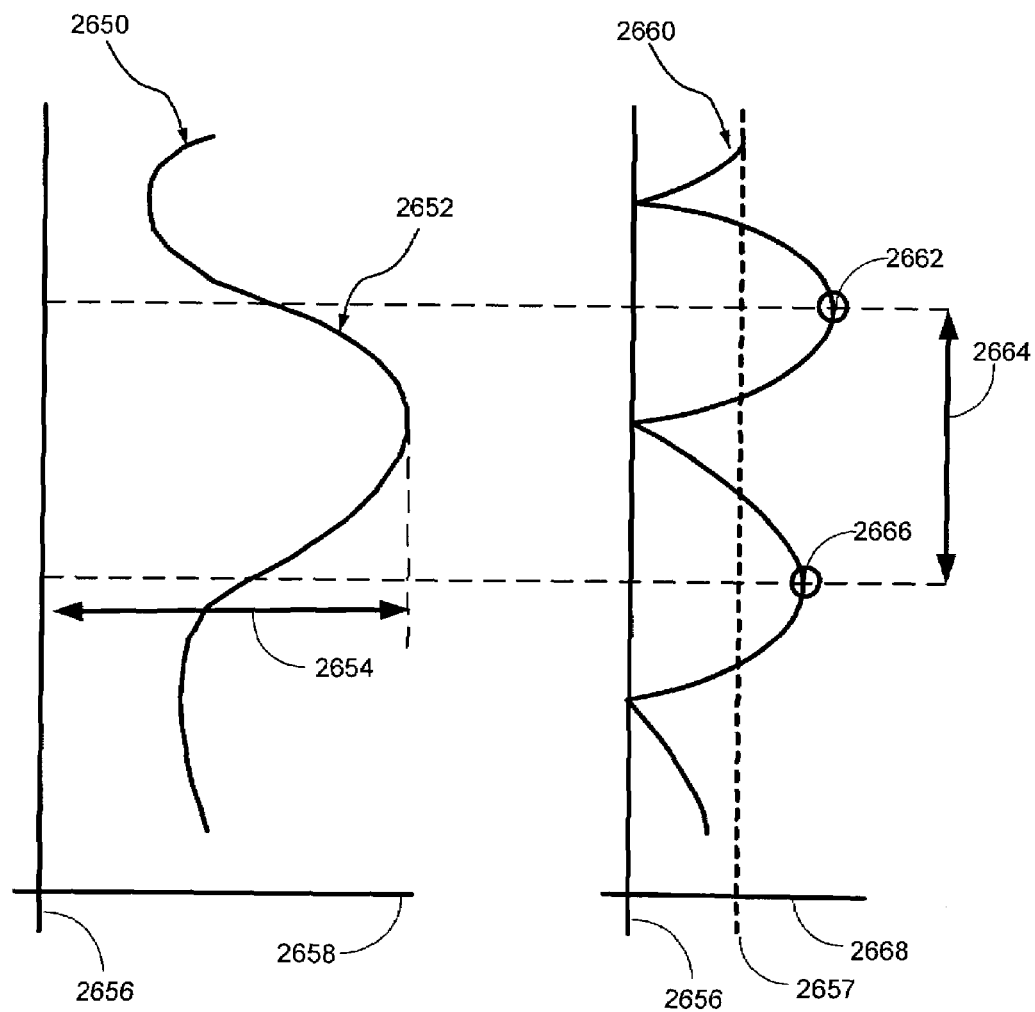
FIG. 26*b* is a representative plot of broadband acoustical impedance as a function of time or distance, according to the present invention.

The input data is broken up into pieces called fragments. The pieces have varying lengths in that they do not all contain the same number of samples. The rules for breaking up the data into fragments are called the cutting criteria. The cutting criteria depend upon the specific nature of the data being analyzed. FIG. 26*a* illustrates the cutting criteria for band limited acoustical impedance where a fragment is the portion between zero crossings 2605 and 2620. FIG. 26*b* corresponds to broadband acoustical impedance that does not have zero crossings. Here the fragment occurs between peaks of the first derivative 2660 that are at 2662 and 2666.

Features are measurements on the input data. As a collection, features describe the data as fully as necessary to perform the desired data classification. Mathematically, features are represented as a vector state space where each vector represents a state of the image. The axes of the state space represent the degrees of freedom of the problem; in this case the image features. To represent the data as fully as possible and as efficiently as possible, the state space axes, and thus the features, should span the space and be linearly independent.

For this application, the features have an added requirement. Because features will be visualized along with the data and interpreted as a visual image, they need to represent simple visual properties of the seismic data that are familiar to geoscientists.

Step 2002: Reading feature parameters from job queue. In this step, the batch application reads the feature parameters from the job queue.

Step 2004: Initializing column pointer. In this step, the batch application initializes the column pointer so that, when incremented, the column pointer points to the location of the first column on the hard drive 1660.

Step 2006: Next column. In this step, the batch application increments the column pointer to the location of the next column on the hard drive 1660, reads the input column from disk, and places the input column in RAM.

Step 2007: Read column off disk. In this step, the batch application identifies the location of the PDB on the hard drive 1620 and reads the PDB in one of two ways:

In the first method, the application performs batch processing of a series of pattern recognition operations that are stored in a job queue. The application processes chunks of the data in streams. During streaming, the data is read, transferred to RAM, and processed in individual portions called columns, which are columnar subsets of the data cube, or in individual portions called slabs, which are horizontal slab subsets of the data cube. The data set is divided into subsets called bricks. A stack of bricks that extend from the top of the data set to the bottom is a column. A horizontal swath of bricks that extends across the data set is a slab. The choice of column addressing or slab addressing depends on the type of pattern analysis operation being performed.

In the second method, all of the data in the data cube is processed at once in high-speed memory 1630 with the system operator viewing the data interactively on, for example, a high-resolution display 1670, with the data being then stored directly to the PDB 1664.

Processing the entire data cube in memory all at once allows the system operator to visualize the data cube and modify parameters during processing. Modification of parameters is accomplished to select and tune the parameters on a relatively small subset of the entire data set. Streaming enables brick-by-brick processing of large sets of data that exceed the size of memory. The available high-speed memory 1630, and the size of the data cube, dictate which storage method is used.

The following description describes the batch operation with data streaming. However, the same pattern computations can be used for the case where the data is all in memory. All of the steps in method 1800 (illustrated in FIGS. 18*a* to 18*c*) are represented as if performed by the batch application.

Step 2008: Initializing trace pointer. In this step, the batch application initializes the trace pointer so that, when incremented, the trace pointer points to the location of the first trace in the current column on the hard drive 1660.

Step 2010: Next trace. In this step, the batch application increments the trace pointer to the location of the next trace in the current column on the hard drive 1660.

Step 2012: Identifying fragments. In this step, the batch application breaks up the seismic trace into fragments. The specific breaking technique depends on whether the AI was created by steps 1808 and 1810 or by step 1814. For seismic traces created by steps 1808 and 1810, the application runs through the bandlimited AI trace and identifies zero crossings in order to identify each fragment. FIG. 26*a* illustrates a plot of band limited acoustical impedance 2600 as a function of time or depth, axes 2630 that more clearly defines a fragment 2615, shown as starting at zero crossing 2605 and ending at zero crossing 2620, in this context. For broadband AI created by step 1814, the application computes the first derivative of the broadband AI trace and identifies the peaks of the first derivative to identify each fragment as shown in FIG. 26*b*. To be used as a fragment boundary the peaks must be higher than a threshold 2657, which was specified by the user and stored as a parameter in the queued job. FIG. 26b illustrates a plot of broadband acoustical impedance 2660 as a function of time or depth, axes 2656, and more clearly defines a fragment 2664. The fragment starts at the first derivative peak 2662 and ends at peak 2666 of the first derivative of the broadband AI 2650 in this context.

Step 2014: Computing thickness. In this step, the thickness 1810 of the bandlimited AI 1800 is measured by the batch application, relative to the X-axis 1825 between the top of fragment 1805 and the bottom of fragment 1815. For broadband AI, the thickness 1880 is measured relative to the X-axes 1860 between the top of the fragment 1875 and bottom 1885.

Step 2016: Is signed thickness needed? In this decision step, the application checks a parameter previously selected by the system operator that is stored in the job queue to decide whether or not to append a positive or a negative sign to the thickness measurement. There are several reasons that signed thicknesses are needed, e.g., if the complexity of the data is to be measured in horizontal gates. Complexity is a texture measure that can be used to refine the visual depiction of the seismic data. Restricting the complexity measurements to include only values with the same sign prevents data from geology that is from different rock layers (younger or older) from being included in the calculation when the rock layers dip. Another reason to use signed thickness is for those situations where the seismic data is to be visualized in a way that distinguishes between regions of the seismic data that are acoustically hard relative to its neighbors vertically and regions that are acoustically soft relative to its neighbors vertically. Acoustically soft regions have lower AI values, and acoustically hard regions have higher AI values. Since in some depositional settings and geographical locations hydrocarbon deposits tend to correspond to acoustically soft regions, some geoscientists choose to identify regions that are acoustically soft and mask areas that are acoustically hard. Given an example thickness measurement of 36 milliseconds, the thickness of acoustically hard seismic data is labeled +36, while the thickness of acoustically soft seismic data is labeled −36. If the result of this step 2016 is yes, the method 2000 proceeds to step 2018; otherwise, the method 2000 proceeds to step 2022.

Step 2018: Appending AI sign to thickness. In this step, the batch application appends the sign to thickness. The AI sign, either positive or negative, is appended to the thickness measurement to indicate if it has relatively hard or soft acoustical impedance when compared to its neighbors vertically. In some geographical areas acoustically softer seismic data corresponds to more porous rock, which is necessary for the accumulation of hydrocarbons.

Step 2020: Storing signed thickness in output column. In this step, the signed thickness is stored in the output column by the batch application.

Step 2022: Storing unsigned thickness in output column. In this step, the unsigned thickness is stored in the output column by the batch application.

Step 2030: Is RMS amplitude needed? In this step, the batch application checks parameters that were selected previously by the system operator and stored in the job queue to determine whether RMS amplitude or maximum amplitude should be computed. When seismic data contains high amplitude noise spikes, the noise contaminates some of the maximum amplitude measurements so RMS amplitude is used. If the noise spikes were successfully removed during previous data processing steps, the operator can optionally use maximum amplitude. During analysis, the operator might want to compare amplitude measurements to measurements that were made on other data such as well data. To make comparison easier, the operator might wish to use the same measurement, RMS amplitude, or maximum amplitude, as the standard to which the comparison is being made. If the result of this step 2030 is yes, the method 2000 proceeds to step 2032; otherwise, the method 2000 proceeds to step 2034.

Step 2032: Computing RMS amplitude. In this step, the square root of the average of the sum of the squares of the amplitudes of all of the amplitude values within the fragment is computed using the equation in FIG. 26c. The equation in FIG. 26c is a standard measurement that is commonly used in the industry.

Step 2034: Computing maximum amplitude. In this step, the batch application computes the maximum amplitude feature. The maximum amplitude measurement (see FIGS. 26a and 26b) for AI is the same for band limited AI, and broadband AI. For band limited AI, the maximum amplitude 2625 of AI fragment 2610 is measured relative to the zero line of X-axis 630 by determining the peak of the curve, as illustrated in FIG. 26a. For broadband AI, the maximum amplitude 2654 of the AI fragment 2652 is measured relative to the zero line of the X-axes 2658 by determining the peak of the curve, as illustrated in FIG. 26b.

Step 2036: Is signed maximum amplitude needed? In this step, the batch application checks parameters that were previously selected by the system operator and stored in the job queue to determine whether to use the signed maximum amplitude or the unsigned maximum amplitude. The operators' selection was based on the same criteria as used in step 2016. If yes, the method 2000 proceeds to step 2038; otherwise, the method 2000 proceeds to step 2042.

Step 2038: Appending AI sign to maximum amplitude. In this step, the AI sign, either positive or negative, is appended to the maximum amplitude measurement by the batch application to indicate hard or soft acoustical texture, respectively. In some depositional settings, acoustically softer seismic data corresponds to more porous rock, which is necessary for the accumulation of hydrocarbons.

Step 2040: Storing signed maximum amplitude in output column. In this step, the signed maximum amplitude is stored in the output column by the batch application. The PDB 1664 now contains RFC data, band-limited AI, the signed or the unsigned thickness and the signed maximum amplitude.

Step 2042: Storing unsigned maximum amplitude in output column. In this step, the unsigned maximum amplitude is stored in the output column by the batch application.

Step 2044: Computing shape. In this step, the curve of AI fragment 1900 is determined by the batch application. Although the curve depicted in FIG. 19 is symmetrical, actual seismic data is not always symmetrical but can be top-loaded, bottom-loaded, have multiple curves, or include many other variations in the appearance of the function. The shape of the function is determined using one of several statistical tools, according to the specific parameters of the seismic data. One example of an algorithm used to determine shape is a normalized first statistical moment of the function of the seismic data as shown in FIG. 26d.

Step 2046: Is signed shape needed? In this step, the batch application checks parameters previously selected by the system operator and stored in the job queue to determine if signed shape will be used. If signed shape is to be used, it is (i.e., answers "yes" to this question), then the method 2000 proceeds to step 2068; otherwise, the method 2000 proceeds to step 2072.

Step 2048: Appending AI sign to shape. In this step, the AI sign, either positive or negative, is appended to the shape description by the batch application to indicate hard or soft acoustical texture, respectively. Acoustically softer seismic data corresponds to more porous rock, which is necessary for the accumulation of hydrocarbons.

Step 2049: Storing unsigned shape. In this step, the unsigned shape is stored in the output column by the batch application.

Step 2050: Storing signed shape in output column. In this step, the signed shape is stored in the output column by the batch application.

Step 2051: Are there custom features? In this step, the batch application checks the parameters that were selected previously by the system operator and stored in the job queue to determine whether to compute custom features. If custom features are to be computed (i.e., the answer to the question is 'yes'), then the method 2000 proceeds to step 2052; otherwise, the method 2000 proceeds to step 2061 (see FIG. 20d).

Step 2052: Computing custom feature. In this step, the batch application executes the proper functions in a library, such as a dynamically linked library ("DLL"), to compute the custom feature.

Step 2053: Is signed custom feature needed? In this step, the batch application checks parameters that were selected previously by the system operator and stored in the job queue to decide whether to use a signed custom feature. Generally, the operator's selection would have been based on the same criteria as used in step 1722. If the operator decides to use a signed custom feature (i.e., the answer to the question is 'yes'), then the method 2000 proceeds to step 2054; otherwise, the method 2000 proceeds to step 2056 (see FIG. 20c).

Step 2054: Appending AI sign to custom feature. In this step, the AI sign, either positive or negative, is appended to the shape description by the batch application to indicate specific custom feature attributes in a similar way that AI sign differences are used to indicate hard or soft rock properties.

Step 2055: Storing signed custom feature in output column. In this step, the signed custom feature is stored in the output column by the batch application.

Step 2056: Storing unsigned custom feature in the output column. In this step, the unsigned custom feature is stored in the output column by the batch application.

Step 2057: More custom features? In this step, the batch application determines if there are more custom features to be computed. If there are more custom features to be computed, then method 2000 proceeds to step 2052; otherwise, the method 2000 proceeds to step 2058.

Step 2058: Are there more traces? In this step, the batch application determines if there are more traces to be processed. If there are more traces to be processed, then method 2000 proceeds to step 2010; otherwise, the method 1800 proceeds to step 2059.

Step 2059: Write output columns to disk. In this step, the output columns that were created in steps 2020, 2022, 2042, 2040, 2052, 2050, 2056 and 2055 are written to disk by the batch application. Writing to disk in a column by column fashion improves application performance by reducing disk write times.

Step 2060: Are there more columns? In this step, the application determines if there are more columns to be processed. If there are more columns to be processed, then the method 2000 proceeds to step 2006; otherwise, the method 2000 proceeds to step 2061.

Step 2061: Are feature statistics needed? In this step, the batch application checks parameters that were selected previously by the system operator and stored in the job queue to determine if feature statistics are needed to solve the problem. Generally, the operator's decision would have been based on the types of patterns and textures in the data, the quality of solution that is required, and the amount of time available. Some problems do not require a rigorous pattern analysis but can be solved by estimating some pattern and texture properties using feature statistics. The benefit is that the amount of time and amount of computer power required computing the feature statistics is less than to that required to do a full pattern analysis. If the operator instructed the batch application to use feature statistics (i.e., answers "yes" to step 2060), then method 2000 proceeds to step 2062; otherwise, the method 2000 ends.

Step 2062: Initializing slab. In this step, the batch application initializes the slab pointer so that, when incremented, the slab pointer identifies the location of the first slab on the hard drive 1660.

Step 2064: Next slab. In this step, the batch application increments the slab pointer to the location of the next slab on the hard drive 1660 and copies the input data slab into RAM.

Step 2066: Initializing time slice. In this step, the batch application initializes the time slice pointer so that, when incremented, the time slice pointer points to the location of the first time slice in the current slab on the hard drive 1660.

Step 2067: Next time slice. In this step, the batch application increments the time slice pointer to the location of the next time slice in the current slab on the hard drive 1660.

Step 2068: Initializing sample. In this step, the batch application initializes the sample pointer so that, when incremented, the sample pointer points to the location of the first sample in the current time slice on the hard drive 1660.

Step 2069: Next sample. In this step, the batch application increments the sample pointer to the location of the next sample in the current time slices on the hard drive 1660.

Step 2070: Is horizontal complexity needed? In this step, the batch application checks parameters that were selected previously by the system operator and stored in the job queue to determine if horizontal complexity is needed to solve the problem. If the operator instructed the batch application to compute horizontal complexity functions (i.e., the answer to this step is yes), then the method 2000 proceeds to step 2072; otherwise, the method 2000 proceeds to step 2076.

Step 2072: Computing horizontal complexity. In this step, the batch application computes the horizontal complexity value at the current sample. Horizontal complexity is computed by evaluating the equation shown in FIG. 27a.

Step 2074: Storing horizontal complexity in the output slab. In this step, the horizontal complexity is stored in the output slab by the batch application. The PDB 1664 now contains RFC data, band-limited AI, the signed or the unsigned thickness, the signed or the unsigned maximum amplitude, signed or unsigned shape, and horizontal complexity.

Step 2076: Is feature or feature function anisotropy needed? In this step, the batch application checks parameters that were selected previously by the system operator and stored in the job queue to determine if feature or feature function anisotropy is needed to solve the problem. If the operator instructed the batch application to compute feature or feature function anisotropy (i.e., the answer to this step is yes), then the method 2000 proceeds to step 2078; otherwise, the method 2000 proceeds to step 2081.

Step 2078: Computing feature or feature function anisotropy. In this step, the batch application computes the feature or feature function anisotropy value at the current sample. Feature or feature function anisotropy ("FFA") is computed using the expression given in FIG. 27f.

Step 2080: Storing feature or feature function anisotropy. In this step, the feature or the feature function anisotropy is stored in the output slab by the batch application.

Step 2081: Are there more samples? In this step, the batch application determines if there are more samples to be processed. If there are more samples to be processed, then the method 2000 proceeds to step 2069; otherwise, the method 2000 proceeds to step 2082.

Step 2082: Are there more time slices? In this step, the batch application determines if there are more time slices to be processed. If there are more time slices to be processed, then the method 2000 proceeds to step 2067; otherwise, the method 2000 proceeds to step 2083.

Step 2083: Write output slab(s) to disk. In this step, the output slab(s) created in steps 2074, and 2080 are written to disk by the batch application. Writing to disk in a slab by slab fashion improves application performance by reducing disk write times.

Step 2084: Are there more slabs? In this step, the batch application determines if there are more slabs to be processed. If there are more slabs to be processed, then the method 2000 proceeds to step 2064; otherwise the method 2000 proceeds to step 2086.

Step 2086: Storing parameters in a job definition file. In this step, the parameters that could be used to recreate the features and feature statistics, which have been identified in the above steps, are stored in a job definition file in the PDB folder on hard drive 1660 by the batch application.

Pattern Attribute and Statistic Calculation

An additional embodiment of the present invention is a system for and method of generating pattern attributes from feature attributes in a pattern abstraction database. An example of a method for accomplishing this is to do it by computing for each voxel in physical space the pattern space location into which the data associated with the voxel would transform if it were transformed into pattern space. This is equivalent to a fiber view. The pattern space is assigned pattern attribute, usually cluster or bin numbers, which are assigned to the appropriate voxel in physical space.

Pattern space is represented mathematically as a vector state space representing the patterns formed by the features associated with neighboring fragments measured from the data set. The vector space has one axes for each feature being analyzed. The features may be multiple features at the same spatial location, the same feature from neighboring locations, or a combination of both. The pattern is labeled by its location in the pattern space that is given by the values of the associated features that make up the pattern.

The entire pattern space is then visualized in order to facilitate the analysis of the underlying geology from which the geological features were extracted, and thereby determine the location of, for example, hydrocarbon deposits.

FIGS. 21a, 21b, and 21c illustrate a method of generating patterns from features in a pattern abstraction database as described herein. Note that this alternate embodiment of the present invention is practiced after completing the method described in FIGS. 20a, 20b, 20c, and 20d. Further, the present invention assumes that a PDB 1664 that contains the extracted features for the geology of interest has been created at some prior point. The alternate method of the present invention includes:

Step 2110: Reading features to be analyzed. In this step, the batch application reads the list of features to be analyzed from the job in the processing queue. The list of features to be analyzed was generated by the geoscientist. These geological features were chosen to measure geological aspects that are pertinent to analyzing the geoscientist's play concept.

Step 2115: Reading fragment length. In this step, the batch application reads the fragment length to be analyzed from the job in the processing queue. The fragment length to be analyzed was selected by the geoscientist. The fragment length is chosen to measure a geological pattern that is pertinent to analyzing the geoscientist's play concept.

Step 2120: Selecting a bin tolerance. In this step, the batch application reads the bin tolerance from the job in the processing queue. The bin tolerance was selected by the geoscientist. The bin tolerance is selected by changing the ratio of the length of the central bins (see FIG. 27), as represented by central bin length 2715, to the length of pattern space 2700, as represented by pattern space length 2710, until the different cases of information for pattern space analysis are sufficiently segregated into the appropriate bins. More common combinations fall into the central bin and anomalous, less common, combinations fall into the outer bins. The different combinations are separated out depending on which bins they fall into and can be assigned different display and geological properties.

There is a concept called a "fiber view" that is created to go with pattern space 2700. The entire data set is transformed into the pattern space and put into bins, as represented by bin 2710. The bins are numbered and then the bin numbers are transformed back to physical space and placed in a data cube in their physical space locations. The numbers that have been transformed back to physical space is what topologists call a fiber view of transform space.

Step 2125: Initializing column number. In this step, the batch application initializes the pointer for a column, which is a vertical column of voxels, so that when incremented it points to the location of the first column on the hard drive 1660. Step 2125 is the beginning of the process that will assign pattern values (also referred to as bin values) to every fragment within the data cube.

Step 2130: Incrementing column number to next column. In this step, the batch application increments the column pointer to the location of the next column on the hard drive 1660 and reads the input column from disk, placing it in RAM.

Step 2131: Reading column(s) from disk. In this step, the batch application reads the input feature column(s) from the hard drive 1660, placing it in RAM.

Step 2132: Initializing trace number. In this step, the batch application initializes the pointer for a trace so that, when incremented, it points to the location of the first trace in the current column on the hard drive 1660.

Step 2134: Next trace. In this step, the batch application increments the trace pointer to the location of the next trace in the current column on the hard drive 1660.

Step 2136: Initializing fragment number. In this step, the batch application initializes the pointer for a fragment so that, when incremented, it points to the location of the first fragment in the current trace on the hard drive 1660.

Step 2138: Incrementing fragment number. In this step, the next fragment in the first column is identified by the batch application Step 2140: Computing pattern space location. In this step, the pattern space location, i.e., the bin, is computed for every fragment in every column by the batch application.

Step 2142: Storing as pattern value. In this step, the pattern space location from step 2140 is stored as a pattern value by the batch application. The pattern value corresponds to the bin number, wherein bins 2722 to 2726 have pattern values of 0 to 8 (see FIG. 27). This process is accomplished for every fragment in each column in the data cube.

Step 2144: Are there more fragments? In this decision step, the batch application determines if there are more fragments to be assigned a pattern value. If yes, the method 2100 returns to step 2138; otherwise, the method 2100 proceeds to step 2146.

Step 2146: Are there more traces? In this decision step, the batch application determines if there are more traces to be processed. If yes, the method 2100 returns to step 2134; otherwise, the method 2100 proceeds to step 2148.

Step 2047: Write output column to disk. In this step, the batch application writes the output column created in steps 2142 to disk. Writing to disk in a column by column fashion improves application performance by reducing disk write times.

Step 2148: Are there more columns? In this decision step, the batch application determines if there are more columns to be processed. If yes, the method 2100 returns to step 2130; otherwise, the method 2100 proceeds to step 2150

Step 2150: Are pattern statistics needed? In this decision step, the system operator and geoscientist determine if pattern statistics are needed. If the pattern statistics are needed, the method 2100 continues to step 2151; otherwise, the method 2100 ends.

Step 2152: Initializing column number. In this step, the batch application initializes the pointer for a column, which is a vertical column of voxels, so that, when incremented, the pointer points to the location of the first column on the hard drive 1660.

Step 2152 is the beginning of the process that will assign pattern values (also referred to as bin values) to every fragment within the data cube.

Step 2154: Next column. In this step, the batch application increments the column pointer to the location of the next column on the hard drive 1660.

Step 2155: Reading column form disk. In this step, the batch application and reads the input column from disk places it in RAM.

Step 2156: Initializing trace. In this step, the batch application initializes the pointer for a trace so that, when incremented, the pointer points to the location of the first trace in the current column on the hard drive 1660.

Step 2157: Next trace. In this step, the batch application increments the trace pointer to the location of the next trace in the current column on the hard drive 1660.

Step 2158: Initializing fragment. In this step, the batch application initializes the pointer for a fragment so that, when incremented, the pointer points to the location of the first fragment in the current trace on the hard drive 1660.

Step 2159: Next fragment. In this step, the next fragment in the current trace is identified.

Step 2160: Is pattern magnitude and alpha needed? In this decision step, the system operator and/or geoscientist determine if pattern magnitude and alpha is needed. The pattern magnitude and alpha give the location of the specific pattern in pattern space using cylindrical coordinates. If the pattern magnitude and alpha is needed, the method magnitude and alpha 2100 continues to step 2162; otherwise, the method 2100 continues to step 2166. This method assigns unique locations to each pattern rather than classifying them. When the results are visualized the data is classified by assigning the same color to patterns which are assigned to the same class.

Step 2162: Computing magnitude and alpha. In this step, the batch application computes magnitude and alpha by performing the mathematical computation shown in FIGS. 30a and 30b.

Step 2164: Storing magnitude and alpha output column. In this step, magnitude and alpha from step 2162 are placed in output columns.

Step 2166: Is pattern magnitude, alpha beta needed? In this decision step, the system operator and geoscientist determine if pattern magnitude, alpha and beta is needed. If magnitude, alpha and beta pattern is needed, then the method 2100 continues to step 2168; otherwise, the method 2100 continues to step 2172.

Step 2168: Computing magnitude, alpha, and beta. In this step, the batch application computes magnitude, alpha, and beta by performing the mathematical computation shown in FIGS. 30c and 30d.

Step 2170: Storing magnitude, alpha and beta. In this step, magnitude, alpha and beta from step 2162 are placed in output columns.

Step 2172: Are there more fragments? In this decision step, the batch application determines if there are more fragments to be assigned a pattern value. If there are more fragments to be assigned a pattern value, then the method 2100 returns to step 2159; otherwise, the method 2100 proceeds to step 2173.

Step 2173: Are there more traces? In this decision step, the system determines if there are more traces to be processed. If more traces are to be processed, then the method 2100 returns to step 2157; otherwise, the method 2100 proceeds to step 2174.

Step 2174: Are there more columns? In this decision step, the system determines if there are more columns to be processed. If more columns are to be processed, then the method 2100 returns to step 2154; otherwise, the method 2100 proceeds to step 2176.

Step 2176: Storing parameters in the job definition file. In this step, the parameters of the pattern statistics, which have been identified in the above steps, are stored in a job definition file in the PDB on hard drive 1660.

Data Mining Using a Template

An additional embodiment of the present invention is a system for and method of performing data mining using a previously created template.

FIG. 22 illustrates an example method of performing data mining using a previously created template. Note that this alternate embodiment of the present invention is practiced after completing the methods described in FIGS. 17 to 23, plus determination of the pattern signature of the target geology that is performed in another application. Further, this additional embodiment of the present invention assumes that a PDB 1664 that contains either band limited or broadband acoustical impedance has been created at some prior point. The additional embodiment of the method of the present invention includes:

Step 2205: Reading template. In this step, the application reads the PDB construction commands from the template.

Step 2210: Placing PDB construction commands in the processing queue. In this step, the application places the PDB construction commands in the batchprocessing queue and initiates execution.

Step 2215: Obtaining PDB with AI. In this step, the system operator obtains a PDB created by the methods illustrated in either FIGS. 17 or 18, and this step is handled in the same way as described in step 1802.

Step 2220: Compute fragments, features, and feature statistics? In this step, the batch application performs a portion of the method illustrated in FIG. 18, specifically, steps 1804 to 1884.

Step 2225: Compute custom features. In this step, the batch application performs a portion of the method illustrated in FIG. 20a, specifically, steps 2025 to 2075.

Step 2230: Compute patterns and pattern statistics. In this step, the batch application performs a portion of the method illustrated in FIG. 20a, specifically, steps 2005 to 2074.

Step 2235: Reading template signature parameters. In this step, the batch application reads the pattern signature information from the template.

Step 2250: Initializing column pointer. In this step, the batch application initializes the column pointer so that, when incremented, the column pointer points to the location of the first column in the input volume on the hard drive 1660.

Step 2252: Next column. In this step, the batch application increments the column pointer to the location of the next column on the hard drive 1660 and places the input data in RAM.

Step 2254: Initializing trace pointer. In this step, the batch application initializes the trace pointer so that, when incremented, the trace pointer points to the location of the first trace in the current column on the hard drive 1660.

Step 2256: Next trace. In this step, the batch application increments the trace pointer to the location of the next trace in the current column on the hard drive 1660.

Step 2258: Initializing sample. In this step, the batch application initializes the sample pointer so that when incremented it points to the location of the first sample in the current trace on the hard drive 1660.

Step 2260: Next sample. In this step, the batch application increments the sample pointer to the location of the next sample in the current trace on the hard drive 1660.

Step 2262: Does the sample agree with the signature? In this step, the application compares the signature feature, feature function, and pattern function value ranges to the sample values. The ranges represent a tolerance within which the features, feature statistics, and pattern statistics need to match. It also compares the signature pattern to the sample pattern to determine if they match. If sample matches the template signature, then process 2200 proceeds to step 2264; otherwise, the process 2200 proceeds to step 2266.

Step 2264: Mark the sample as selected in output scene. A scene is an index volume each sample is capable of having a value of 0 to 255. The values 0 to 254 represent objects to which the sample can be assigned. The number 255 indicates that the sample is not assigned to an object or is null. This step assigns the number 0, or the meaning of being included in the object with index number 0, to the sample in the output scene.

Step 2266: Mark the sample as selected in output scene. This step assigns the number 255, or the meaning of null, to the sample in the output scene.

Step 2268: Storing scene. In this step, the scene created in step 2264 or 2266 is stored in the same way as described in step 1820. The PDB 1664 now contains the input acoustical impedance, the feature attributes, feature statistics, pattern attributes, pattern statistics, texture attributes, and texture statistics computed in steps 2220 to 2230 and the scene computed in step 2264 or 2266.

Step 2270: Are there more samples? In this step, the application determines if there are more samples in the current trace to be processed. If there are more samples, then process 2200 proceeds to step 2260; otherwise, the method 2200 proceeds to step 2272.

Step 2272: Are there more traces? In this step, the application determines if there are more traces in the current column to be processed. If there are more traces, then the method 2200 proceeds to step 2256; otherwise, the method 2200 proceeds to step 2274.

Step 2274: Are there more columns? In this step, the application determines if there are more columns in the input data volume to be processed. If there are more columns, then the method 2200 proceeds to step 2252; otherwise, the batch application cleans up and terminates and the method 2200 ends.

Quality Control Analysis of Feature Attributes

An additional embodiment of the present invention is a system for and method of performing quality control of features computed by method 1900.

Figure 23:
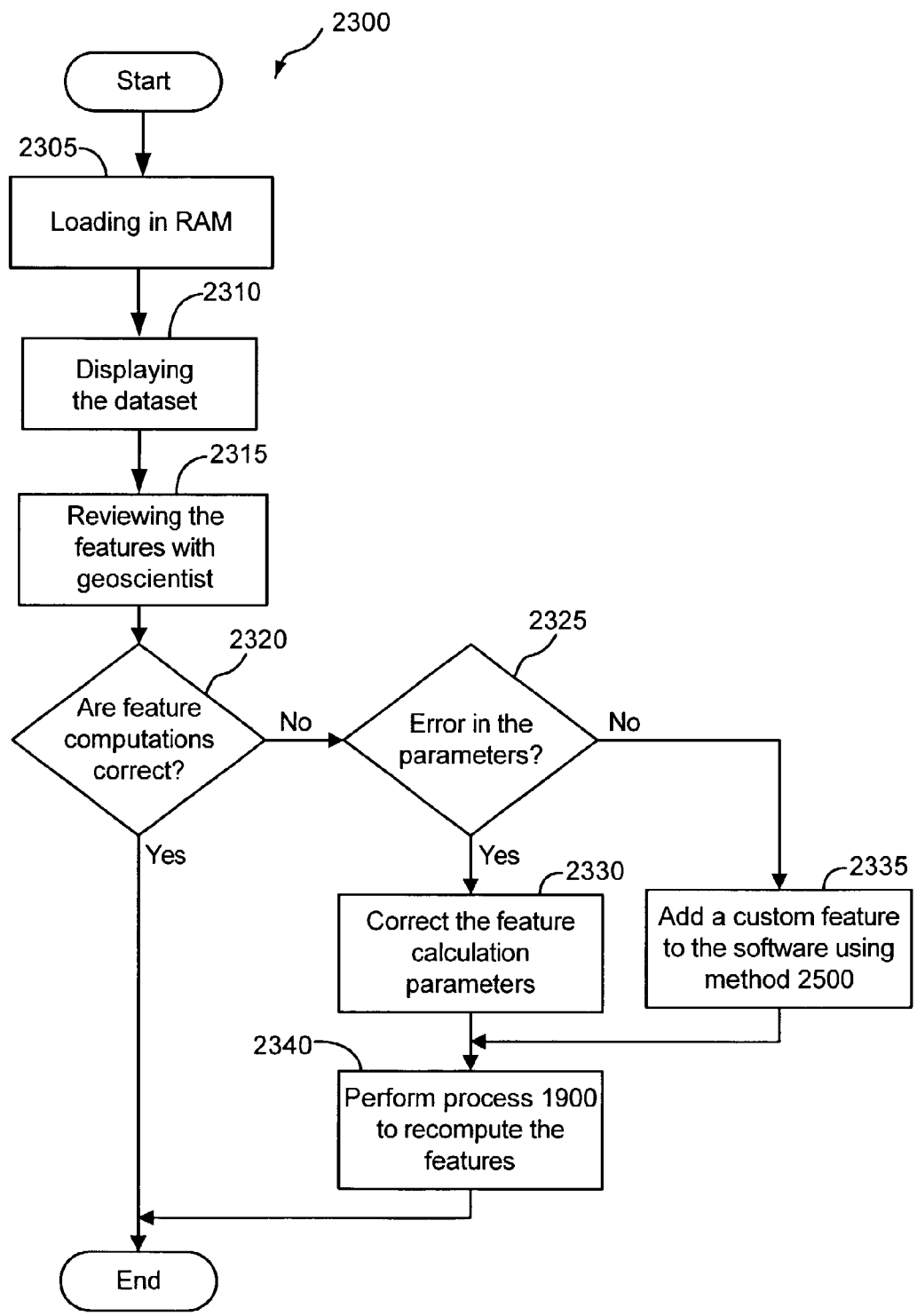
FIG. 23 is a flowchart illustrating an embodiment of a method of quality control analysis of feature attributes.

FIG. 23 illustrates an example method of performing quality control of features. Note that this alternate embodiment of the present invention is practiced after completing the method 1900 described in FIG. 19.

Step 2305: Loading in RAM. When method 1900 is performed using a batch application as shown in FIGS. 19, then all of the data is on disk but not in RAM when the batch job is completed. In this case when the geoscientist and/or system operator starts an interactive visualization application it moves the data or a selected subset of the data to RAM in this step 2305. If the steps were performed in an interactive visualization application that contains the pattern analysis tools application, then all of the data is already in RAM and this step is skipped. If the data were not put into high-speed memory 1630 before this point, the data are now in order to fully visualize the data set.

Step 2310: Displaying the data set. In this step, the geoscientist displays the data set. The visualization is accomplished with suitable software on the apparatus of the present invention.

Step 2315: Reviewing the features with the geo-scientist. In this step, the visualized seismic data set from step 2310 is reviewed by the geo-scientist in order to determine if the specifications for the project have been met.

Step 2320: Are feature computations correct? In this decision step, the geoscientist determines whether the feature definition has been adequately determined according to the geo-scientific specifications. If the geology of interest is clearly identified at the feature level to the geo-scientist's satisfaction, the method ends. If the geology of interest has not been adequately identified according to the geo-scientific specifications, the method proceeds to step 2325.

Step 2325: Error in the parameters? In this decision step, the geoscientist and/or system operator review the feature computation parameters and determine if they were correct. If the parameters were correct, then the method 2300 proceeds to step 2330; otherwise, the parameters were not correct, and the method 2300 proceeds to step 2335.

Step 2330: Correcting the feature calculation parameters. In this step, the feature calculation parameters are corrected by the system operator and the execution of the method continues to step 2340.

Step 2335: Adding a custom feature to the software using method 2500. In this step, the system operator-requests a custom feature from the programmer and sub-method 2500 is executed.

Step 2340: Performing method 1900 to recompute the features. In this step, the system operator executes the pattern analysis computer application which performs sub-method 1900 to compute the custom features.

Quality Control Analysis of Pattern Attributes

An additional embodiment of the present invention is a system for and method of performing quality control of patterns computed by method 2100.

Figure 24:
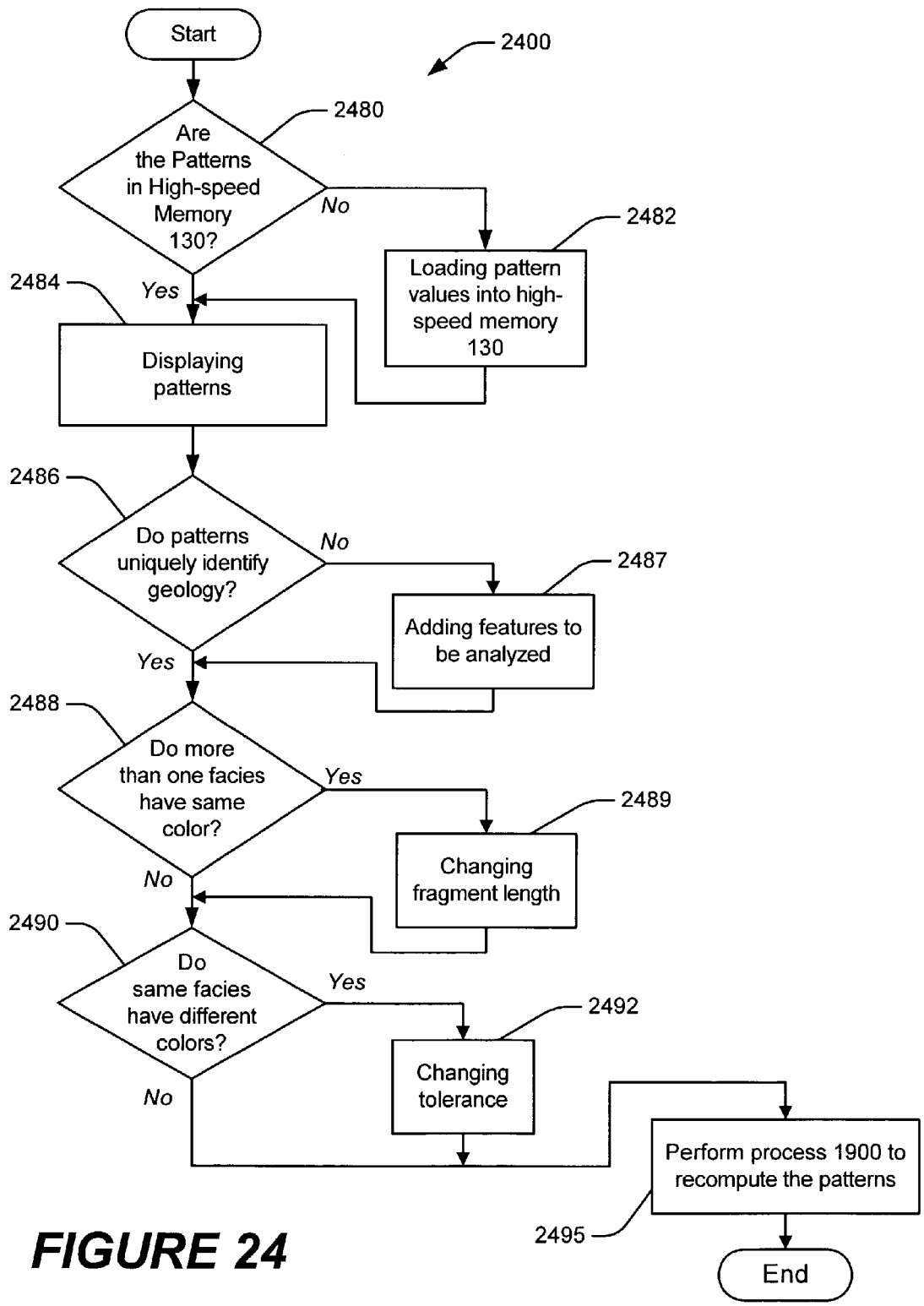
FIG. 24 is a flowchart illustrating an embodiment of a method of quality control analysis of pattern attributes.

FIG. 24 illustrates an example method of performing quality control of patterns. Note that this alternate embodiment of the present invention is practiced after completing the method 1900 described in FIG. 19.

Step 2480: Are the patterns in high-speed memory 1630? In this decision step, the system determines if the pattern values were stored in high-speed memory 1630 during the execution of sub-method 1900. When sub-method 1900 is performed using a batch application, then all of the data is on disk but not in RAM when the job is completed. If the steps were performed in an interactive visualization application that contains the pattern analysis tools application, then all of the data is already in RAM and this step 2480 is skipped. If the pattern values are in high-speed memory, the method 2400 proceeds to step 2484; otherwise, the pattern values were stored in the PDB 1664 on hard drive 1660, and the method 2400 proceeds to step 2482.

Step 2482: Loading pattern values into high-speed memory 130. In this step, pattern values are loaded into high-speed memory 1630 using suitable visualization software.

Step 2484: Displaying patterns. In this step, the pattern space is displayed on high-resolution display 3170 using suitable visualization software.

Step 2486: Do the patterns uniquely identify the geology of interest? In this decision step, the system operator and/or the geoscientist who are preferably looking at the patterns displayed on high-resolution 1670, determine if the patterns uniquely identify the geology of interest established in step 2210. If the result of step 2486 is yes (positive), then the method 2400 proceeds to step 2488; otherwise, the method 2400 proceeds to step 2492.

Step 2488: Do more than one facies have the same color? In this decision step, the system operator and the geoscientist determine if more than one facies, which is an observable attribute of rocks, has been identified with the same color. If two or more facies have the same color, then the method 2400 proceeds to step 2494; otherwise, the method 2400 proceeds to step 2490.

Step 2490: Do the same facies have different colors? In this decision step, the system operator and the geoscientist determine if different instances of the same facies have been identified with different colors. If the same facies have different colors, then the method 2400 proceeds to step 2496; otherwise, the method 2400 proceeds to step 2491.

Step 2491: Storing parameters in the template. In this step, the parameters of the pattern space, which have been identified in the above steps, are stored as a template in a template library 1668 on hard drive 1660.

Step 2492: Adding features to be analyzed. In this step, the system operator adds new features to the pattern space to identify geologic areas of interest more distinctly from each other.

Step 2494: Changing fragment length. In this step, the system operator changes the fragment length to better isolate the facies of interest.

Step 2496: Changing tolerance. In this step, the system operator changes the tolerance in order to widen the bin and allow different instances of a single facies to be identified with one color.

Method of Adding Cutting, Attribute, or Statistic Algorithms to the Pattern Data Base Building Application An additional embodiment of the present invention is a system for and method of adding additional functionality such as additional cutting algorithms, feature attributes, feature statistics, pattern attributes, pattern statistics, texture attributes, and texture statistics to the pattern database building software. An example method is shown in FIG. 25.

Note that this alternate embodiment of the present invention is practiced as a part of method 2500 described in FIG. 25 but can also be practiced independently during the routine maintenance and addition of functionality of the software of the present invention.

Step 2505: Interviewing the geo-scientist. In this step, the system operator interviews the geo-scientist to determine the parameters of the custom feature or new functionality that is required to adequately define the geology of interest.

Step 2510: Designing a new feature. Although, at the feature scale, most geology of interest is often adequately defined by the standard set of features embodied by thickness, amplitude and shape, for complex problems a custom feature can be defined. The feature is determined by asking the geo-scientists to describe what visual aspect of the data he is interested in and how does the aspect change as the rock composition of the rock layer in the subsurface changes when moving along the layer. As an example, the geophysicist might say the acoustical impedance in the fragment has two peaks in one location that change to one peak in another location along the layer as the types of rocks change. In this case a feature of peak count might be added.

Similarly, new cutting algorithms, feature attributes, feature statistics, pattern attributes, pattern statistics, texture attributes, and texture statistics might be needed to solve the geological problem. The present invention facilitates satisfaction of the need to add features and functions.

Step 2515: Adding new functionality to the software as a Library. In this step, definitions are developed for the custom features or other functionality needed according to geo-scientist specifications from step 2505. These definitions are used to modify the source code in the pattern abstraction software program that embodies and implements the methods of the present invention. These modifications are implemented using standard practices and commercially available object-oriented analysis and design language, such as that from the Object Management Group ("OMG"), which uses the Unified Modeling Language ("UML") diagramming methodology used in the illustrations of FIGS. 2 through 15. The modification is constructed as source code for an application plug-in. The plug-in is compiled to create a static or dynamically linked library ("DLL") which is placed in the software directory containing the application. When executed, the application recognizes and executes the plug-in according to standard software techniques. It should be noted that while it is preferred to utilize object-oriented programming techniques, non-object oriented implementations may also be used to generate the software and/or hardware needed to implement the methods of the present invention. Moreover, virtually any programming language may be used to implement the methods the present invention.

Although the method described in FIGS. 17*a*, 17*b*, 18*a*, 18*b*, 19*a*, 19*b*, 20*a*, 20*b*, 20*c*, 20*d*, 21*a*, 21*b*, 21*c*, 22, 23, 24, and 25 were discussed with respect to seismic data, it is also applicable to other types of geophysical and geological data. Moreover, the method illustrated in FIGS. 17*a*, 17*b*, 18*a*, 18*b*, 19*a*, 19*b*, 20*a*, 20*b*, 20*c*, 20*d*, 21*a*, 21*b*, 21*c*, 22, 23, 24, and 25 may be applied to other problems, such as well log analysis or rock electrical, magnetic, and gravitational property analysis.

FIG. 26a illustrates a plot of band limited acoustical impedance 2600 as a function of time or depth that is typical of seismic data. FIG. 26a includes a band limited AI fragment 2610 having a top of fragment 2605, a thickness 2615, a bottom of fragment 2620, a Y-axis 2635, an X-axis 2630, and maximum amplitude 2625.

FIG. 26b illustrates a plot of broadband acoustical impedance 2650 as a function of time or depth that is typical of seismic data on the left and its first derivative 2660 on the right. FIG. 26b includes a broadband AI fragment 2652 having a top of fragment 2662, a thickness 2664, a bottom of fragment 2666, an X-axis 2656, a acoustical impedance function Y-axis 2658, a first derivative Y-axis 2668, and max amplitude 2654. The top of fragment 2662 and bottom of fragment 2666 are also peaks of the first derivative 1960.

Fragments are a function of acoustical impedance related to time or depth. The seismic data is frequently measured as a function of the two way travel time of the sound (down to the reflector and back up), although the data can be converted to a measurement of depth, which is the preferred measurement for seismic data analysis. Either time or depth measurement can be used in all of the seismic data processing, but because it is costly to convert the seismic data to depth, data is frequently acquired and processed in terms of time.

The length of each fragment is measured in a different manner for band limited AI and broadband AI. For band limited AI it is the distance between zero crossings, as shown by top of fragment 2605 and bottom of fragment 2620 in AI fragment 2610 that is a portion of the band limited AI function 2600. Thickness 2615 is measured along X-axis 2630, and is the distance between top of fragment 2605 and bottom of fragment 2620, in time or depth. Top of fragment 2605 is the zero crossing at the minimum depth or initial time. Bottom of fragment 2620 is the zero crossing at the maximum depth or maximum time. Max amplitude 2625 is the top point of the function of band limited AI 2600 within fragment 2610 as measured on Y-axis 2635. The band limited AI fragment 2610 represents a portion of one trace in one column of information in a data cube.

For broadband AI 2650 in FIG. 26b, the length of a fragment is determined from the first derivative of the broadband AI function 2660. It is the distance between peaks of the first derivative, as shown by top of fragment 2662 and bottom of fragment 2666 in first derivative 2660 of the broadband AI fragment 2652 that is a portion of the broadband AI function 2650. Thickness 2664 is measured along X-axis 2656, and is the distance between top of fragment 2662 and bottom of fragment 2666, in time or depth. Top of fragment 2662 is the first derivative peak at the minimum depth or initial time. The bottom of fragment 2666 is the first derivative peak at the maximum depth or maximum time. The Maximum ("Max") amplitude 2654 is the top point of the function of broadband AI 2650 within fragment 2652 as measured on Y-axis 2658. The broadband AI fragment 2652 represents a portion of one trace in one column of information in a data cube.

FIG. 26c provides the mathematical expression for calculating RMA amplitude and definitions of the terms in the expression. This equation is implemented as a method of one or more than one software objects in the computer software portion of the implementation of the present invention.

FIG. 26d provides the mathematical expression for calculating one example of a shape feature that is the first statistical moment. FIG. 26d includes definitions of the terms in the expression. This equation is implemented as a method of one or more than one software objects in the computer software portion of the implementation of the present invention.

Figures 27A, 27B:
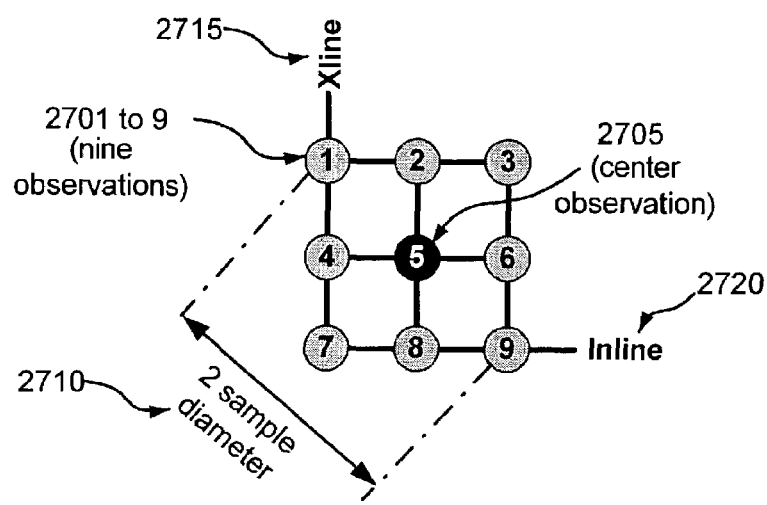
FIG. 27*a* is a mathematical expression for computing the Horizontal Complexity feature statistic, according to the present invention.
FIG. 27*b* is the definition of a coordinate neighborhood for horizontal complexity and feature and feature function anisotropy feature statistics, according to the present invention.

FIG. 27a provides the mathematical expression for calculating horizontal complexity. FIG. 27a includes definitions of the terms in the expression. The complexity value is computed for the central observation in a coordinate neighborhood as shown in FIG. 27b. The number of observations in the coordinate neighborhood is determined by the diameter of the coordinate neighborhood. In the example illustrated in FIG. 27b, the diameter is 2 and the number of samples is 9. This equation is implemented as a method of one or more than one software objects in the computer software portion of the implementation of the present invention.

FIG. 27b shows the coordinate neighborhood for observation #5 2705. The coordinate neighborhood has a Xline axes 2715 and an Inline axes 2720. The neighborhood has a diameter of 2 samples 2710. It contains 9 observations #1 to #9 shown as dots 2701 to 2709. Larger diameters may be used thereby increasing the number of samples in the coordinate neighborhood.

Figure 28A:
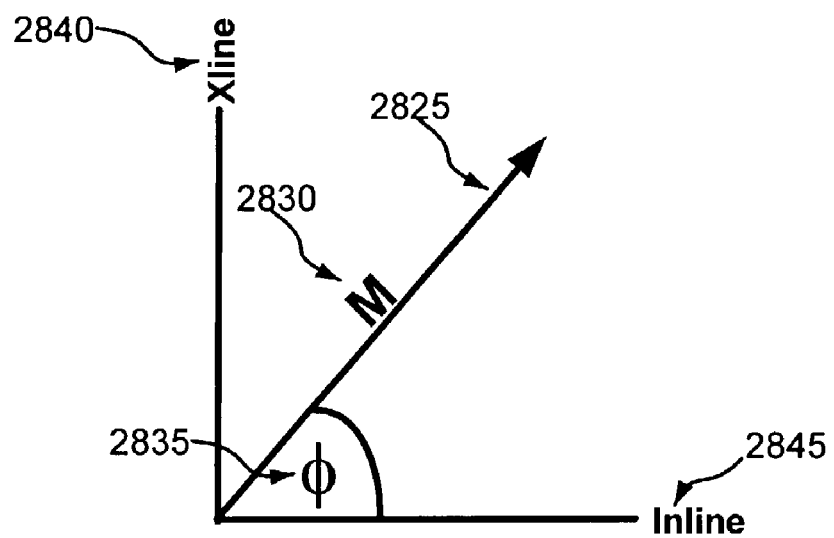
FIG. 28*a* defines the values, M and $\phi$, of feature and feature function anisotropy, according to the present invention.

FIGS. 28a, 28b, 28c, and 28d define feature and feature function anisotropy. FIG. 28a shows the magnitude "M" and angle φ for feature and feature function anisotropy. FIG. 28a consists of a coordinate patch that contains observations as defined in FIG. 27b and has an Xline axes 2840 and a Inline axes 2845. A vector 2845 that is defined by its magnitude M and angle φ gives the direction of maximum complexity. FIG. 28b gives an example of feature and feature function anisotropy where a local variation occurs. It includes a coordinate patch 2850 as seen by observer A 2852 looking along the vector 2856 and observer B 2854 looking along vector 2858. The observations vary from white to black as shown. Observer A sees a significant variation from one corner of the coordinate patch to the other. Observer B sees no variation. Because the variation seen by the two observers are different, the coordinate patch is anisotropic. The vector of maximum anisotropy is 2856 in this example. FIG. 28c shows another coordinate patch 2850. In this example, the observers see the same amount of variation, thus the coordinate patch is isotropic. FIG. 28d gives the mathematical expression for the magnitude "M" and angle φ of anisotropy as shown in FIG. 28b. These equations are implemented as a method of one software object, or multiple software objects in the computer software portion of the implementation of the present invention.

Figures 30A, 30B:
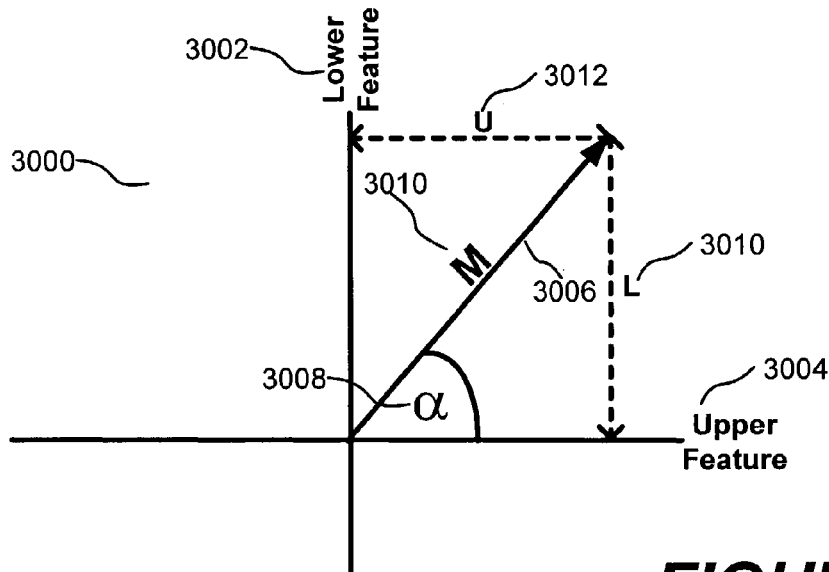
FIG. 30*a* is a diagram of a two dimensional pattern space with pattern locations computed as M and $\alpha$, according to the present invention.
FIG. 30*b* is mathematical expression for computing M and $\alpha$, according to the present invention.

FIGS. 30a and 30b define the M and α pattern space measures. FIG. 30a shows a two-dimensional pattern space 3000 created by a 2-feature analysis with an upper feature and a lower feature. The space has two axes, one for the lower feature 3002 and one for the upper feature 3004. The pattern created by the two features are plotted pattern space at the location designated by the upper feature value U 3012 and lower feature value L 3010. A vector 3006 extends from the origin to the plotted pattern location. The vector is defined by its magnitude M 3010 and direction given by the angle α 3008. FIG. 30b gives geometric expression for computing M and α as functions of L 3010 and U 3012. These equations are implemented as a method of one or more than one software objects in the computer software portion of the implementation of the present invention.

FIGS. 30c and 30d extend the concept to three dimensions giving M, α, and β pattern space measures. FIG. 30c shows a three-dimensional pattern space 3050 created by a 3-feature analysis with an upper feature, a middle feature, and a lower feature. The space has three axes, one for the lower feature 3054, one for the middle feature 3056, and one for the upper feature 3052. The pattern created by the two features are plotted in pattern space at the location designated by the upper feature value U 3066, the middle feature value C 3070, and the lower feature value L 3068. A vector 3058 extends from the origin to the plotted pattern location. The vector 3058 is defined by its magnitude M 3064 and direction given by the two angles α 3060 and β 3062. FIG. 30*d* gives geometric expressions for computing M, α, and β as functions of L 3068, C 3070, and U 3066. These equations are implemented as a method of one or more than one software objects in the computer software portion of the implementation of the present invention.

Figure 29A:
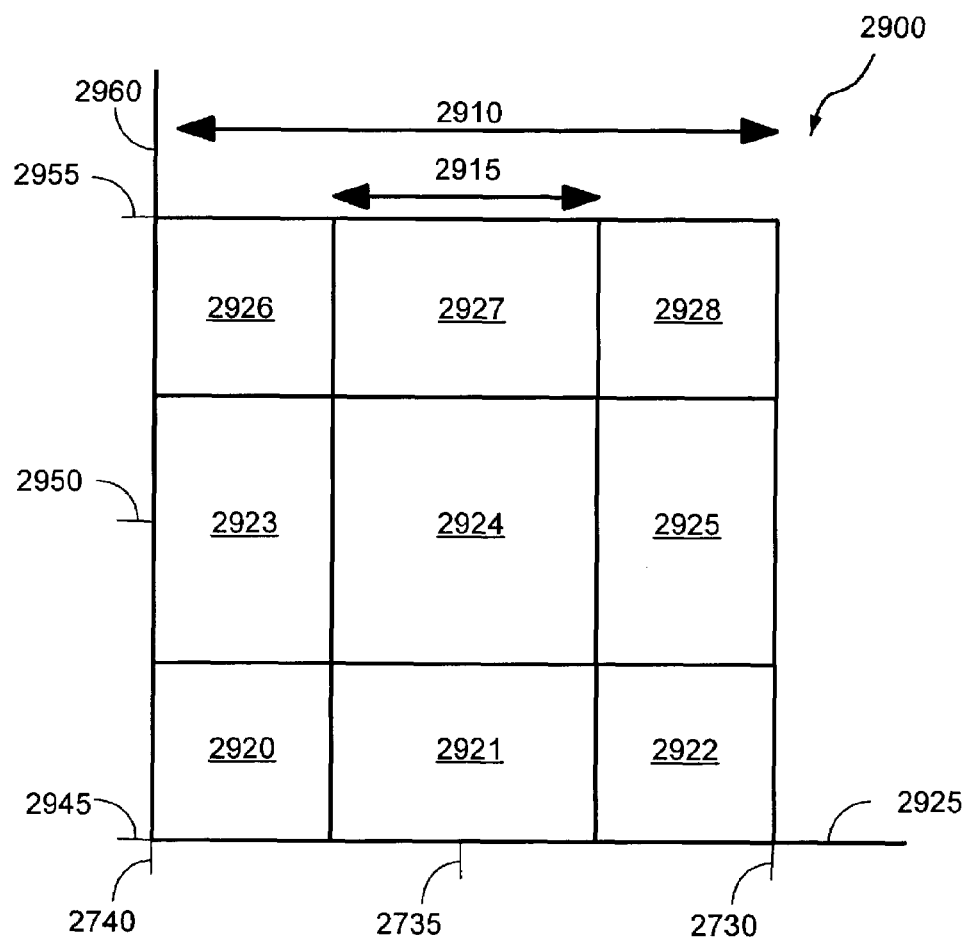
FIG. 29*a* is a diagram of pattern space, according to the present invention.

FIG. 29*a* illustrates a diagram of pattern space 2900 for the shape feature for a fragment length of two, including pattern space length 2910, central bin length 2915, bins 2920 to 2928, fragment #2 axis 2925. The fragment #2 axis 2925 extends from a top loaded shape 2930 through a symmetric shape 2935 to a bottom loaded shape 2940. The fragment #1 axis 2960 extends from top loaded shape 2955 through symmetric shape 2950 to bottom loaded shape 2945.

Figure 29B:
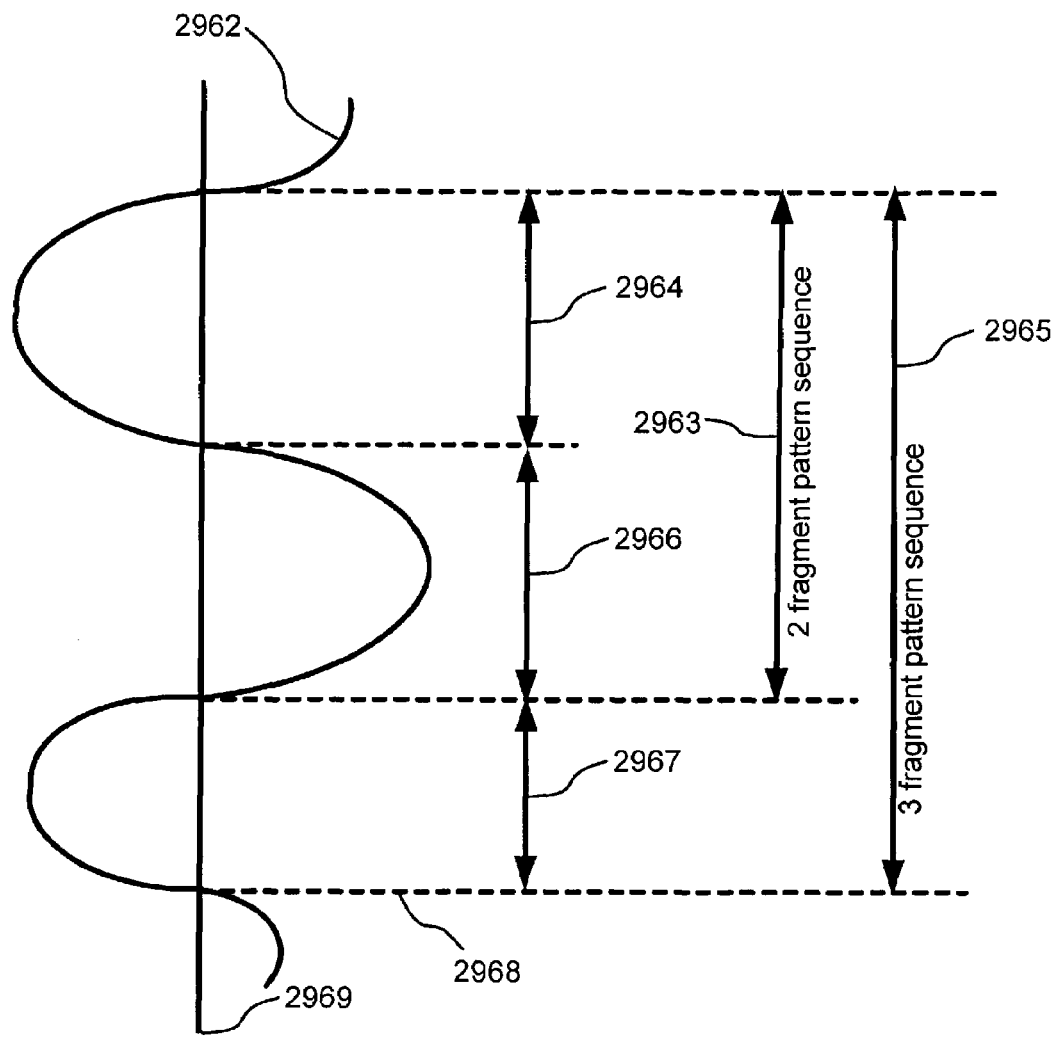
FIG. 29*b* is a diagram showing example fragment lengths of 3 and 3, according to the present invention.

Pattern space 2900 shows eight separate bins, represented by bins 2920 to 2928, that are used to organize feature fragment sequences (for example, shape) as shown in FIG. 26*a*. Each bin corresponds to the relationship between two fragments 2964 and 2966, of a two-fragment pattern sequence 2963 as defined in FIG. 29*b*. Each fragment has an associated feature value as described above. Fragments vary in length, and the range of feature values measures the total length of pattern space 2900. This pattern space diagram is for categorizing the shape feature, although all other types of features may be used. FIG. 29*b* shows symmetric fragments, but the seismic data can also be distributed in a top-loaded or bottom-loaded manner. These three different distributions are indicated as bottom 2730, symmetric 2735, and top 2740 along horizontal axis 2725, and as top 2745, symmetric 2750, and bottom 2755 along vertical axis 2760.

Fragment sequences are considered as they are analyzed, in this example, with respect to their shape. Since the fragment length is two, two fragment sequences must be categorized. If both the first and second fragments are bottom-loaded, the fragment sequence falls into bin 2928. Similarly, each of the other bins is filled with a particular fragment sequence. The bin tolerance is defined as the ratio of the central bin length 2915 to the pattern space length 2910. The tolerance determines how the bin sizes vary. The less common values are on the outside of FIG. 29*a*. These outer, less common, bins represent anomalies that have a high correlation to the successful location and exploitation of hydrocarbon deposits. The length of the two fragment sequences illustrated in FIG. 29*a* is two, making the figure two-dimensional. When there are lengths of three fragment patter sequences 2965 in FIG. 29*b*, the illustration is three-dimensional, as shown in FIG. 29*b*, with a lower feature axes 2974, middle feature axes 2976, and upper feature axes 2972. Lengths greater than three are used, but they make illustration impossible.

Figure 29C:
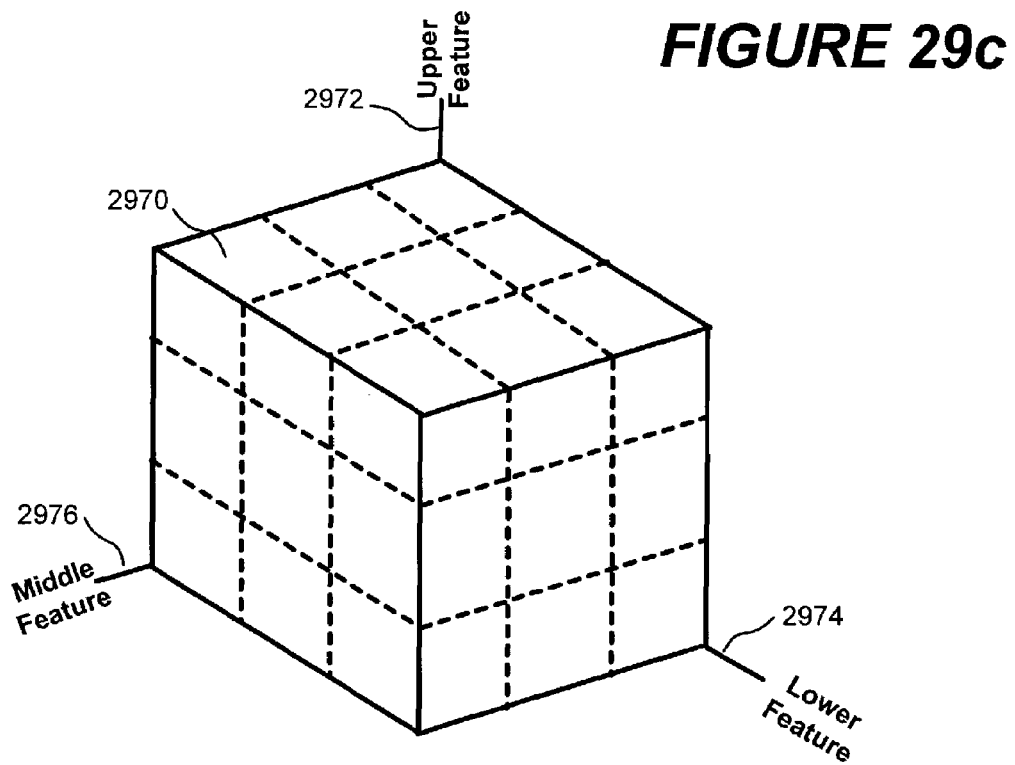
FIG. 29*c* is a diagram showing pattern space for a pattern computed using a fragment length of 3, according to the present invention.
Figure 29D:
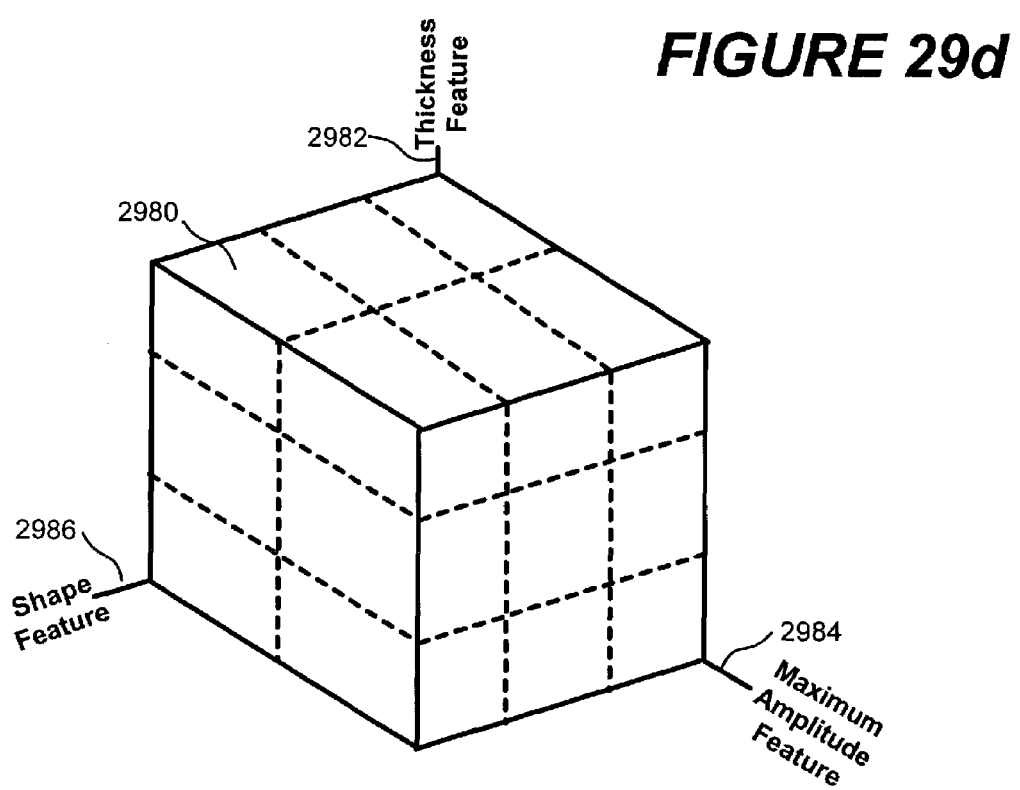
FIG. 29*d* is a diagram showing a multi-feature pattern space, according to the present invention.

In a similar fashion, FIG. 29*a* only considers the feature of shape. Every additional feature adds a dimension to the pattern space as shown in FIG. 29*c*. The maximum amplitude 2984 and thickness features 2982 have a single threshold line, rather than two for shape 2986. Any combination of the features described herein False Color Imaging As the results of the method of the present invention are displayed on a computer screen, raster graphics tools and images are used. In raster graphics, each pixel is given a specific color. The specific color is generated through the use of a color model. Color models describe the composition of colors in a 3-D coordinate system. One color model is Red-Green-Blue ("RGB"). For RGB images, the coordinate system is a unit cube subset of the 3-D Cartesian coordinate system. For the Red-Green-Blue-Alpha ("RGBA") color model, the same 3-D RGB is used, but a fourth dimension, transparency (Alpha), is also employed. Most computer graphics cards that are currently in use accept data as a pixel image composed of four RGBA data channels.

When seismic data is prepared for display a virtual display is created. This virtual display consists of a display scene containing display objects. The display scene is usually a 2D display scene or a 3D scene. A common method of creating 2D seismic display objects creates a virtual pixel display of the seismic data also called variable density (VD). In this case the amount of black in each pixel is determined by the data value or amplitude and the size of a pixel corresponds to one data sample, or some multiple thereof if the amount of data is being reduced to increase display speed. Colors are usually assigned to the pixels by assigning an index to the pixel which corresponds to one or a set of look up tables (LUTs, also called color tables) containing associated RGB or RGBA values for each index. By scaling the amplitude values so that the largest amplitude is equal to the largest lookup table index, and doing the same for the minimum, then converting the rescaled values to integers the amplitude values are associated to the color set in the LUT. Color table editors are provided to callow users to modify the color assignments. After the display object is created it is projected onto the display screen space then displayed. Intuitively, the screen space is a 2D picture which is equivalent to what is seen by a single camera (or eye) looking through a window at the display scene where the window and 2D picture occupy the same location in space. For 3D display scenes the seismic display objects consists of a 3D set of voxels which are assigned colors and opacities and displayed in the same way. This technique usually creates a display of only one input data set. The only way to get multiple data sets into the display scene is to overlay them so that multiple pixels or voxels occupy the same spatial location and are viewed by reducing their opacity so that they can be viewed as if on a virtual light table.

Another technique for the simultaneous display of multiple data sets is to associate the data values of four input data channels with the amount of each of four color components, for example red, green, blue, and transparency (RGBA). Because the human eye and brain is capable of distinguishing the amount of each color plus their relationships the result is a simultaneous display of all four data sets that preserves each channel and their interactions. This technique works for all forms of color models. This technique is called false color imagery.

There are other color models, such as Luminosity-In-phase-Quadrature ("YIQ"), which is a recoding of the RGB color model that is often used for television transmissions. In the YIQ color model, the In-phase color value contains Orange-Cyan color information, and the Quadrature color value contains Green-Magenta color information. Yet another color model is Hue-Lightness-Saturation ("HLS"). Two other color models are Cyan-Magenta-Yellow ("CMY") and Cyan-Magenta-Yellow-Black ("CMYK"). CMY and CMYK color models are used most often with printing. CMY images can be mapped directly to RGB images, with the use of black ink (with CMYK) being used to reduce the amount of color inks needed to make the color black. Yet another color model is Hue-Saturation-Value ("HSV"). According to Foley, et al., "Computer Graphics: Principles and Practice,"

"Hue distinguishes among colors such as red, green, purple, and yellow. Saturation refers to how far a color is from a gray of equal intensity. Red is highly saturated, pink is relatively unsaturated; royal blue is saturated; sky blue is relatively unsaturated. Unsaturated colors contain more white light than saturated colors. Lightness embodies the colorless notion of perceived intensity of a reflecting object."

Adjusting the hue in an image actually rotates colors around a color wheel. Saturation works by adjusting the amount of gray mixed with the base color. Generally, higher settings of saturation reduce the amount of gray in a color, making the color appear more pure. Lower settings of saturation cause the colors to fade toward gray. For any color model transparency, designated by alpha, can be added for example, Hue-Saturation-Value-Alpha ("HSVA") is similar to the HSV color model, except that transparency (Alpha) is also present. When the display scene is being projected onto the screen, alpha determines how much of the objects behind each given object can be seen through it. Because the screen image is usually in the form of RGB when displayed by a graphics card, objects that are defined using other schemes must be converted before or during the projection to screen space.

False color imagery ("FCI") is the use of a color model, for example any of those described above, to display the information in multiple types of data. Each of up to four types of data can piped into each of the four color channels in an object composed of pixels or voxels. In false-color imaging, the choice of color can represent specific types of information, such as four features from a pattern database. The present invention makes use of false-color imaging. The present invention also has the unique ability to allow the operator to interactively select at run-time which color model is used and which color channel (or other color model parameter) will be used with which specific data type (e.g., information from a pattern database.) to create a false color image. In addition the mapping of specific data value ranges into the color ranges for each channel can be interactively set at run time. The result is an extremely versatile environment for simultaneously exploring the characteristics of up to 4 different data channels and their interactions.

Visual Clustering

A common mathematical representation of information during pattern recognition is to create a tangent space, usually vector space, representing state of the data for each location in the physical space. For example, a data set is represented by three linearly independent features, the associated feature space is a three dimensional vector space. Each vector in the space represents a potential state of the data set, a unique combination of the three features. If all of the data in the data set is transformed into the feature space in such a way that the value at each feature space location represents the number of data values that map into that point, a probability distribution of the features is created. Local maxima in this distribution are referred to as means. An area around each mean can be defined that is called a cluster. The cluster is named and within its area lays the values which are associated with and can be assigned to the cluster. The same analysis applies to pattern space and texture space.

When false color imagery is applied to a pattern database, for example at the feature level, the visualization results in visual clustering. During visual clustering different areas of feature space can be assigned colors with the result that all of the locations in the data cube that map into a location in feature space with an assigned color are displayed with the same color when the data cube is displayed. If a cluster is defined by a region in feature space, then that region can have the same color assigned to it with the result that all data that maps into that location are displayed with the same cluster color.

The present invention supports similar mappings and color selections for up to four types of attributes or statistics that are contained in each of the various levels of abstraction in a pattern database. In addition, the present invention can be used to visually cluster the information for up to four levels of abstraction that are contained in a hyperdimensional fragment or template. This enables the operator of the present invention to select up to four attributes and/or statistics from the pattern database, to assign those properties to a particular channel of a selected color model, and to display the colored results in a physical space data slice or voxel cube. Thus, the operator of the present invention can, based upon his/her own experience and objectives, select a set of inputs, and a color model, in order to interactively visually cluster the data to perform interactive pattern analysis on and visually explore the data. When the desired results are identified in the data the correct classification has been achieved. The most commonly used color scheme is HSVA followed by RGBA.

Figure 31:
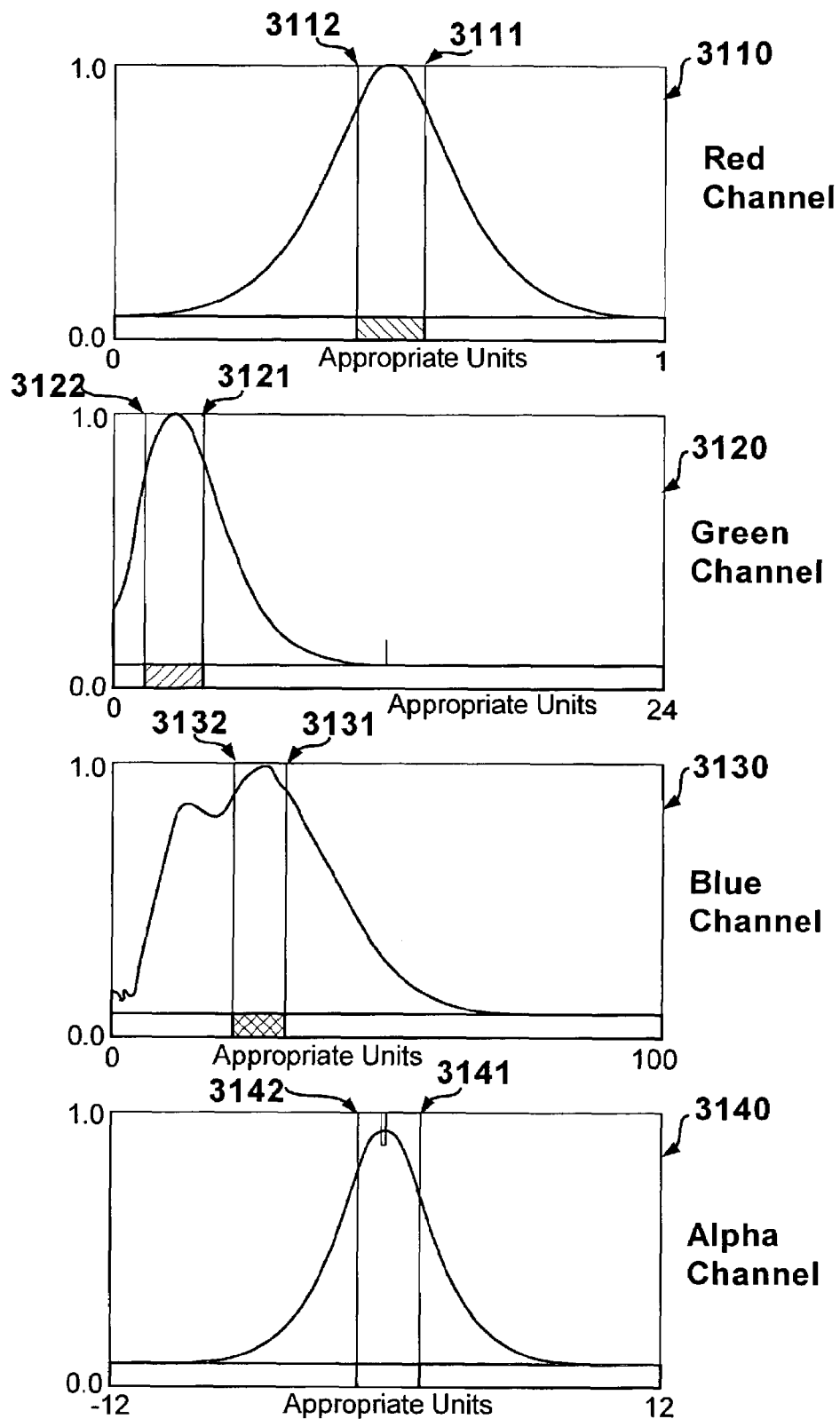
FIG. 31*a* is diagrammatic example of decision surfaces defined in a False Color RGBA image according to the teachings of the present invention.
Figure 32:
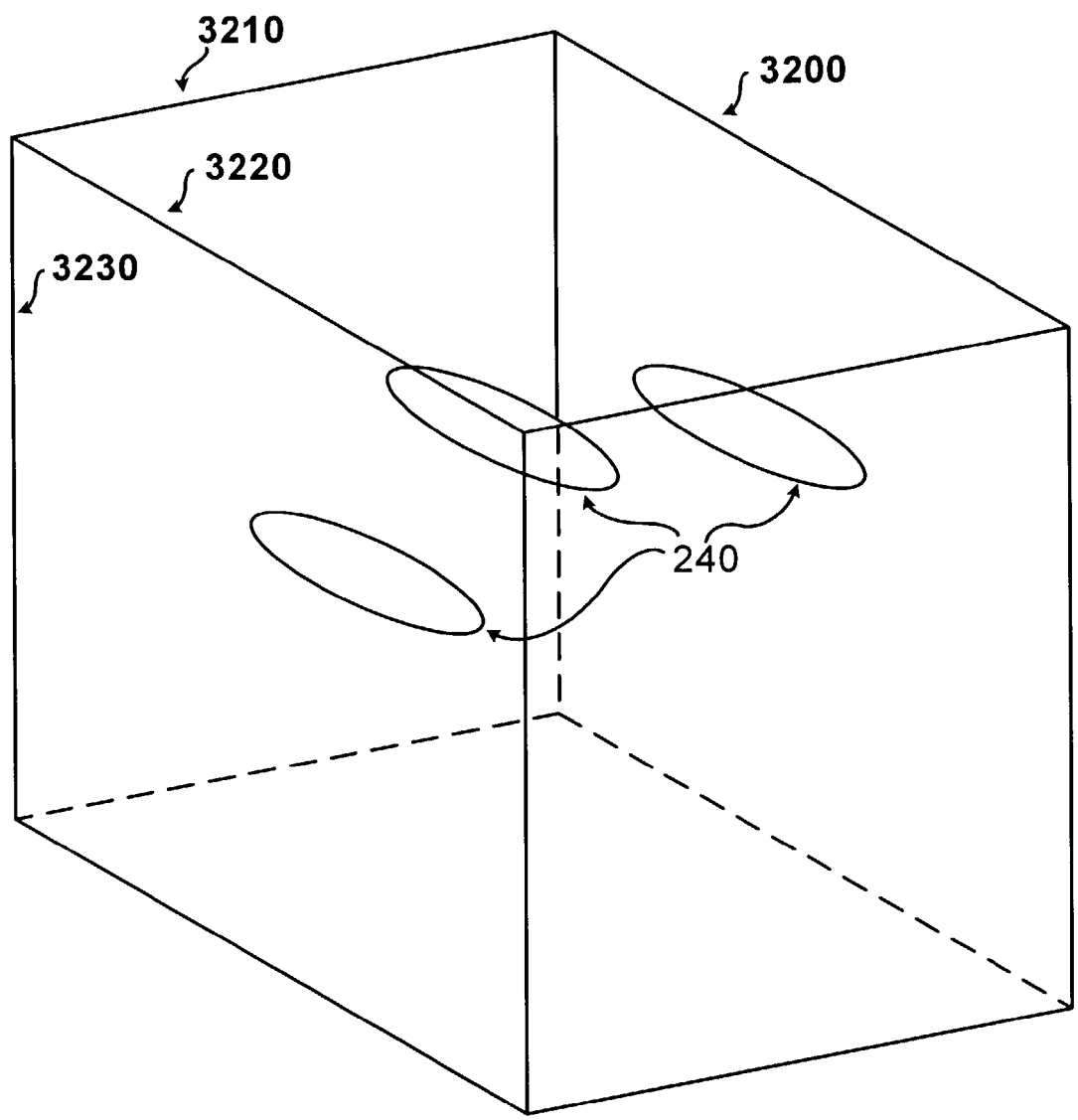
FIG. 32 is a diagrammatic example of the result of applying the decision surface shown in FIG. 31 according to the teachings of the present invention.

The invention includes a user-defined relationship between the input data values and the output color values. For example, when using RGBA a user specified data set is piped into the red color channel. By default, the minimum data values are associated with an amount of red of zero. The maximum data values are associated with the maximum amount of red. These are user modifiable and can be changed to map red to a region about the mean for the channel as shown in the FCI definitions shown in FIG. 31. The red channel color assignment 3110 assigns no red to all of the data values except those between the decision points 3111 and 3112 where the maximum amount of red is assigned. In the same way the green channel 3120 color assignment has green assigned between decision points 3121 and 3122; the blue channel 3130 color assignment has green assigned between decision points 3131 and 3132; and the alpha (transparency) channel 3140 color assignment has green assigned between decision points 3141 and 3142. The resulting display is shown in FIG. 32. The physical space 33200 with x axes 3210, y axes 3220 and z axes 3230, which increases downward as does subsurface depth, contains three bodies 3240 which when transformed to feature space lie within the selected cluster that lies between the decision points shown in FIG. 31.

Figure 33:
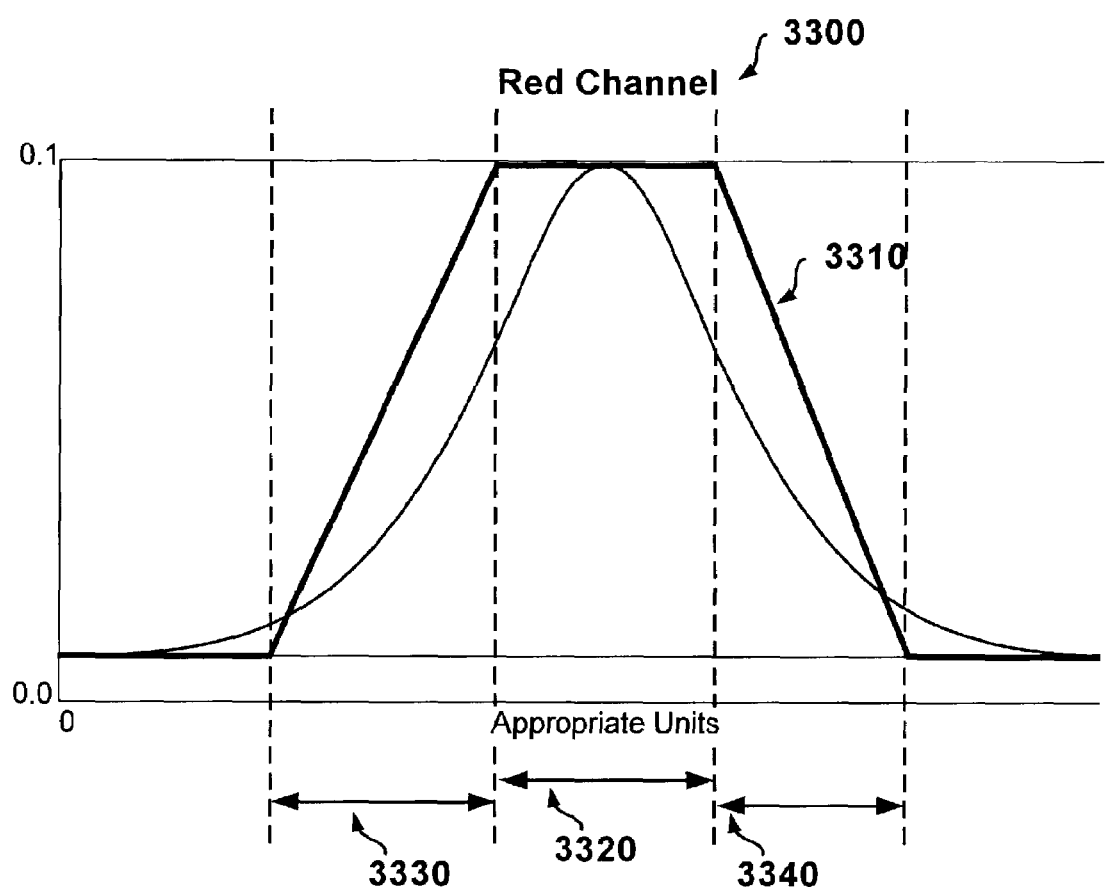
FIG. 33 is a diagrammatic example of the red channel from FIG. 31 modified to show fuzzy decision surfaces according to the teachings of the present invention.
Figure 34:
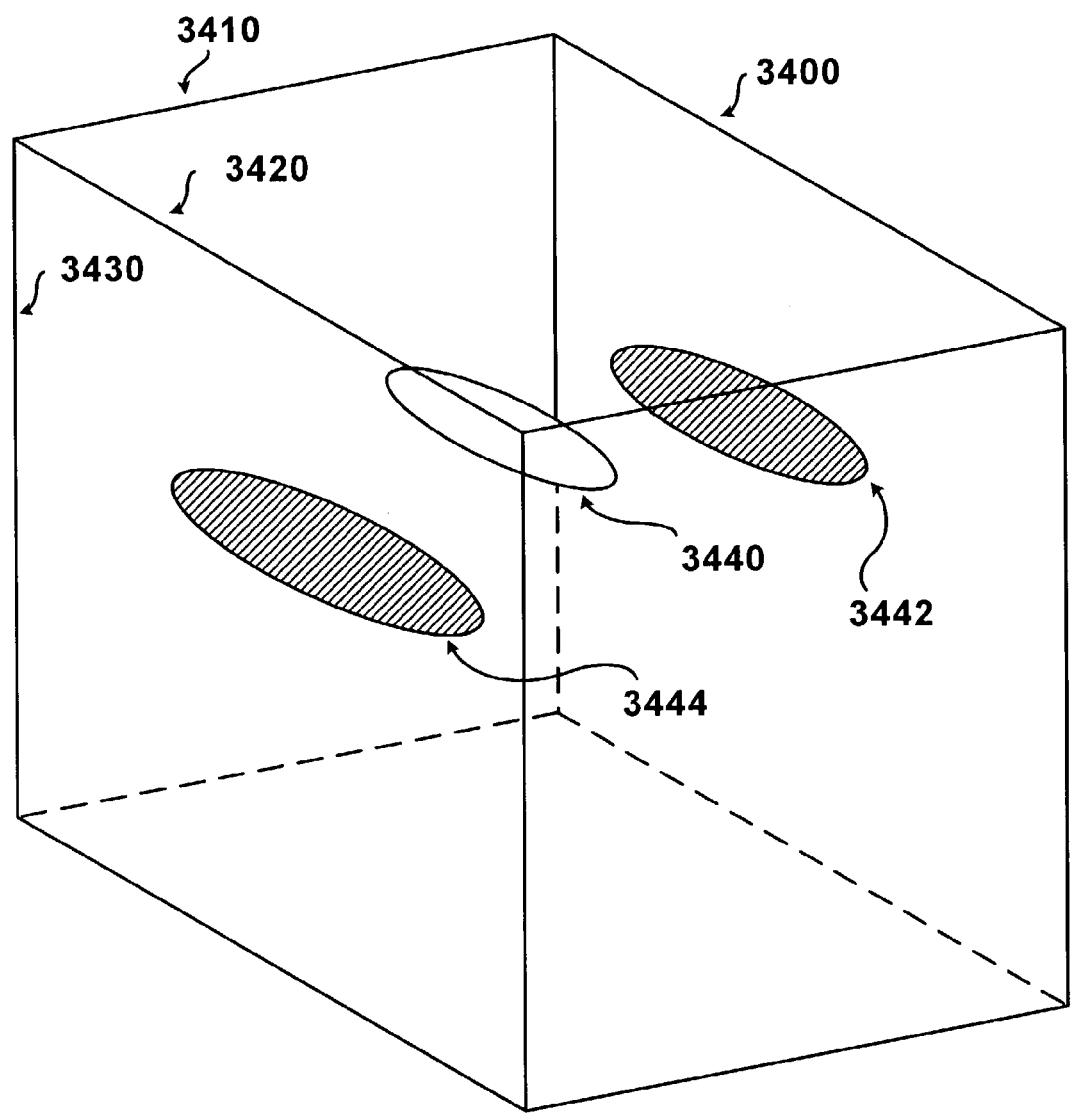
FIG. 34 is a diagrammatic example of the result of applying the decision surfaces shown in FIG. 31 but with the decision surfaces in FIG. 32 substituted for the red channel according to the teachings of the present invention.

When the function 3310 has a ramp as shown for the red channel 3300 in FIG. 33 the decisions are fuzzy. The decisions are composed of ramps 3330 and 3340 on each side of a zone 3320 that is included in the cluster. The result is that the amount of red in the image determines how close the data in the object is to the mean. As the amount of red decreases the object changes from white to blue-green. FIG. 34 shows the result for a fuzzy analysis. The objects 3442 and 3444 do not map into the main portion, 3320 in FIG. 33. They map into ramp portions 3330 and 3340 in FIG. 33 so they only partially satisfy the decision criteria falling into the fuzzy zone. The result is blue-green objects whereas if they had as much red as the have green and blue in them they would be white. The object 3440 fully satisfies the red criteria, resulting in white. A common practice is to use fuzzy decision points to identify locations that may be of interest. Interactively sharpening the edges of the decision points, "tunes in" the objects until they are white.

Pattern Database Visualization

On example of usage of this invention, but not the only use, is visualization of a pattern database that was built for the analysis of geophysical data. An example of geophysical data is 3D seismic converted to band-limited acoustical impedance. Many other types of data may be visualized using this invention. An example use of the visualization is to identify potential subsurface hydrocarbon accumulations. During this effort related activities such as analyzing subsurface stratigraphy are also performed. The invention is capable of being applied to a variety of other geoscience problems.

Apparatus of the Invention

The apparatus and system for performing these steps, as well as an explanation of the steps themselves, are illustrated in the drawings and accompanying text below. Referring now to the drawings, the details of an exemplary embodiment of the present invention are schematically illustrated. Like elements in the drawings will be represented by like numbers, and similar elements will be represented by similar numbers with a different lower case letter suffix.

Figure 35:
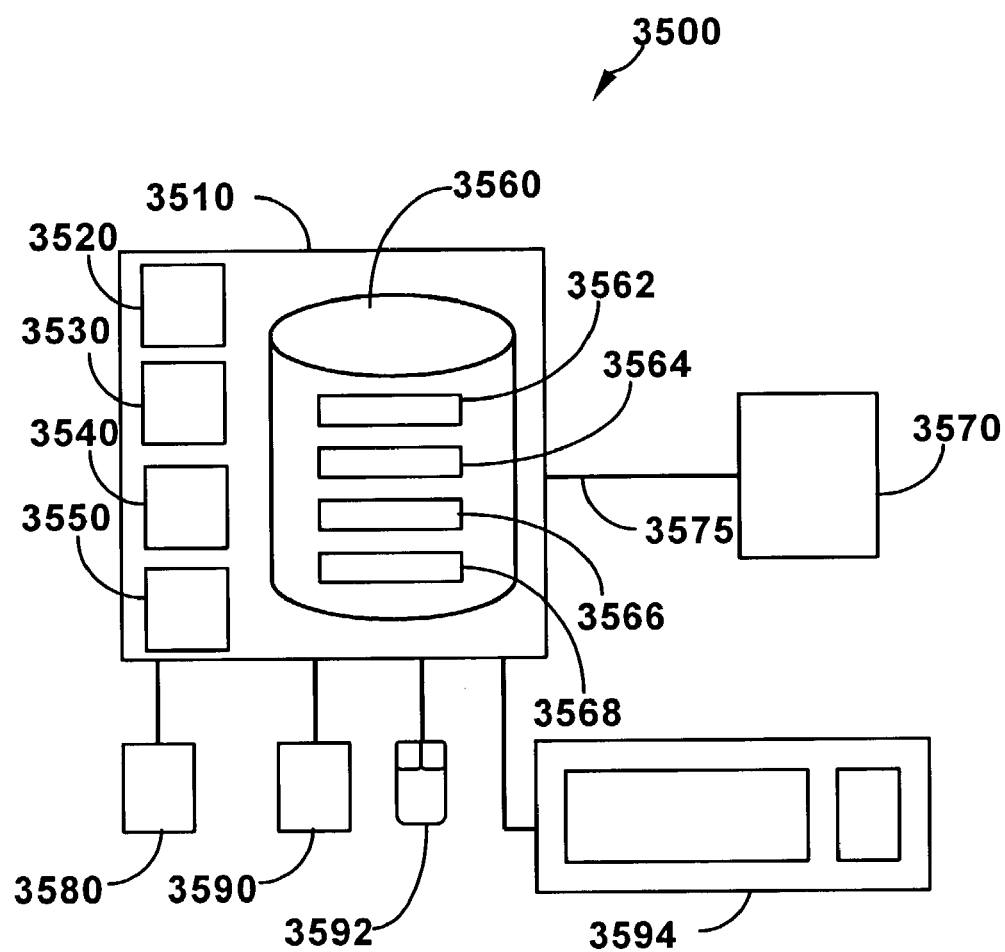
FIG. 35 is block diagram of the pattern pyramid according to the teachings of the present invention.

The present invention can be implemented with the aid of a digital computer, such as a personal computer that was discussed earlier and is illustrated in FIG. 16. FIG. 35 illustrates how a particular point of space in the input data 3502, represented by the point 3522, has corresponding points 3424, 3526, 3528, and 3530 in the feature layer 3504, pattern layer 3506, texture layer 3508, and object 3510, respectively in what is called the pattern pyramid 3500. These points 3522, 3524, 3526, 3528, and 3530 form a trajectory called a template of the point in question. The template trajectory forms a hyperdimensional fragment. Each hyperdimensional fragment (of both the known data and the target data) can be stored in a database (called the pattern database PDB 1664) for later retrieval. Because the type of reduction analysis is problem specific, so too is the resultant template trajectory and hyperdimensional fragment.

A PDB 1664 contains a collection of data volumes. The collection includes a 3D seismic data volume, multiple associated pattern, feature, texture volumes, and multiple scene volumes. The data values are stored so that they can be addressed as spatially vertical columns or horizontal slabs with the columns and slabs made up of subsets called bricks. A stack of bricks that extend from the top of the cube to the bottom is a column. A mosaic of bricks that extends horizontally across the volume is a slab. The brick size is chosen to optimize data access, for example, 64 by 64 samples in size. The samples are 8-bit integer, 32-bit floating point, or any other desired format. Each volume contains metadata including:

the volumes name;
physical dimensions in slice coordinates (index numbers), seismic survey coordinates, and world (map) coordinates;
labels for each spatial axes;
physical units for the world coordinates of each axes;
registration points associating the slice coordinates to the seismic survey coordinates;
registration points associating the seismic survey coordinates to the world coordinates;
default display properties appropriate to the type of data:
default color table; and
default opacity table;
sample value label;
sample value scaling properties (additive minimum and maximum values of scaled sample values);
history including date and text entry including:
source from which the adapt was obtained;
operations which were performed on the data by the present invention;
description of the data; and
user provided notes;
minimum and maximum sample values, plus histogram of data values;
locking keys and other data management keys and pointers; and
other associated information.

The PDB collection, and associated metadata, can be stored as files on a file system, as information in a database, or as a combination of the two.

After modification, a seismic template is created for each geoscientist, and this template is stored in template library 1668. During processing, the seismic data are viewed on the display 1670. After further processing, the seismic data are stored in template library 1668, and output to 8 mm tape drive 1690 or CD-ROM 1680, or transmitted via the network card 3540 to a local area network ("LAN"), a wide area network ("WAN"), or other network.

Method of False Color Imagery for Visual Clustering

Figure 36A:
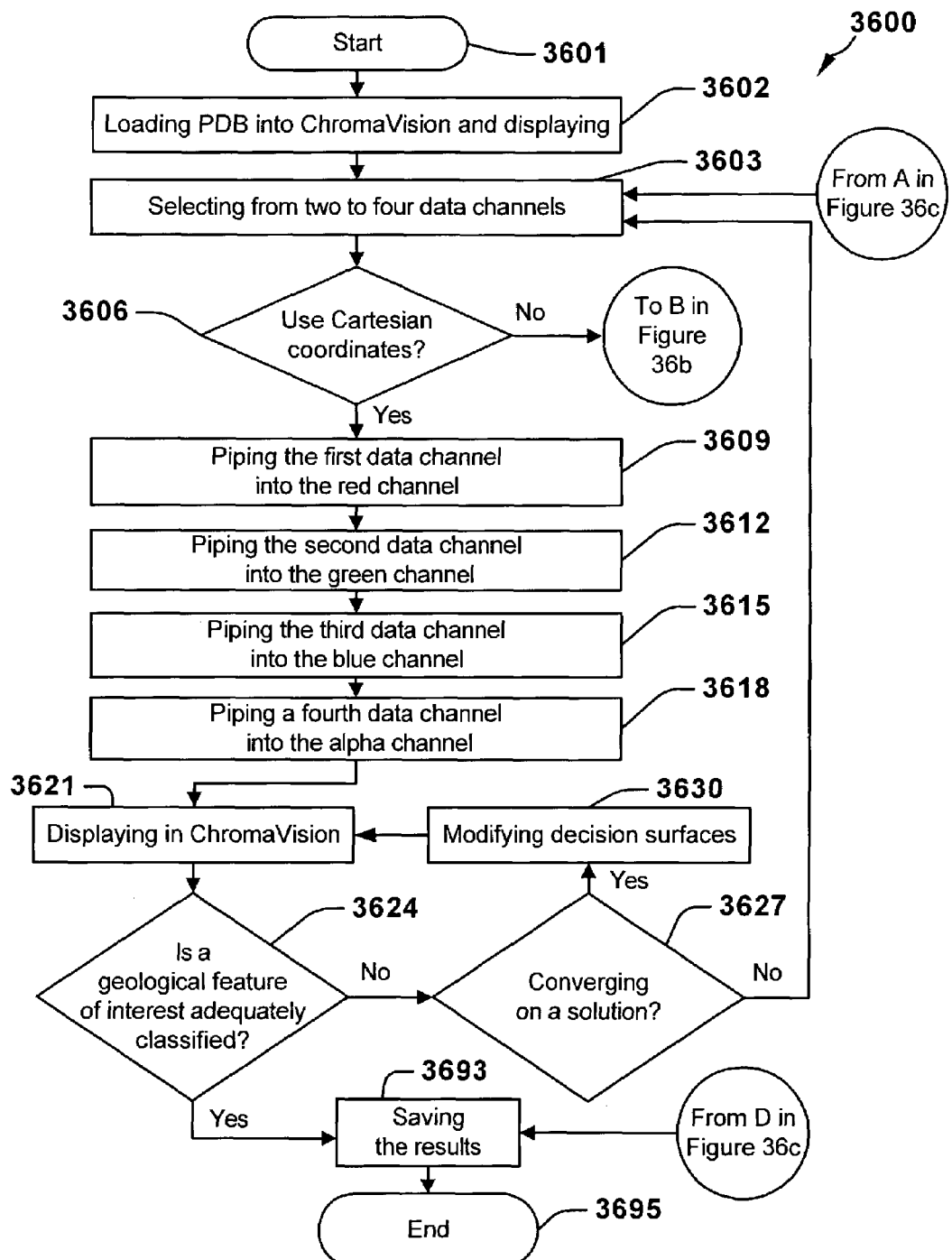
FIG. 36 is a flowchart of an example method of applying false color imagery according to the teachings of the present invention.
Figure 36B:
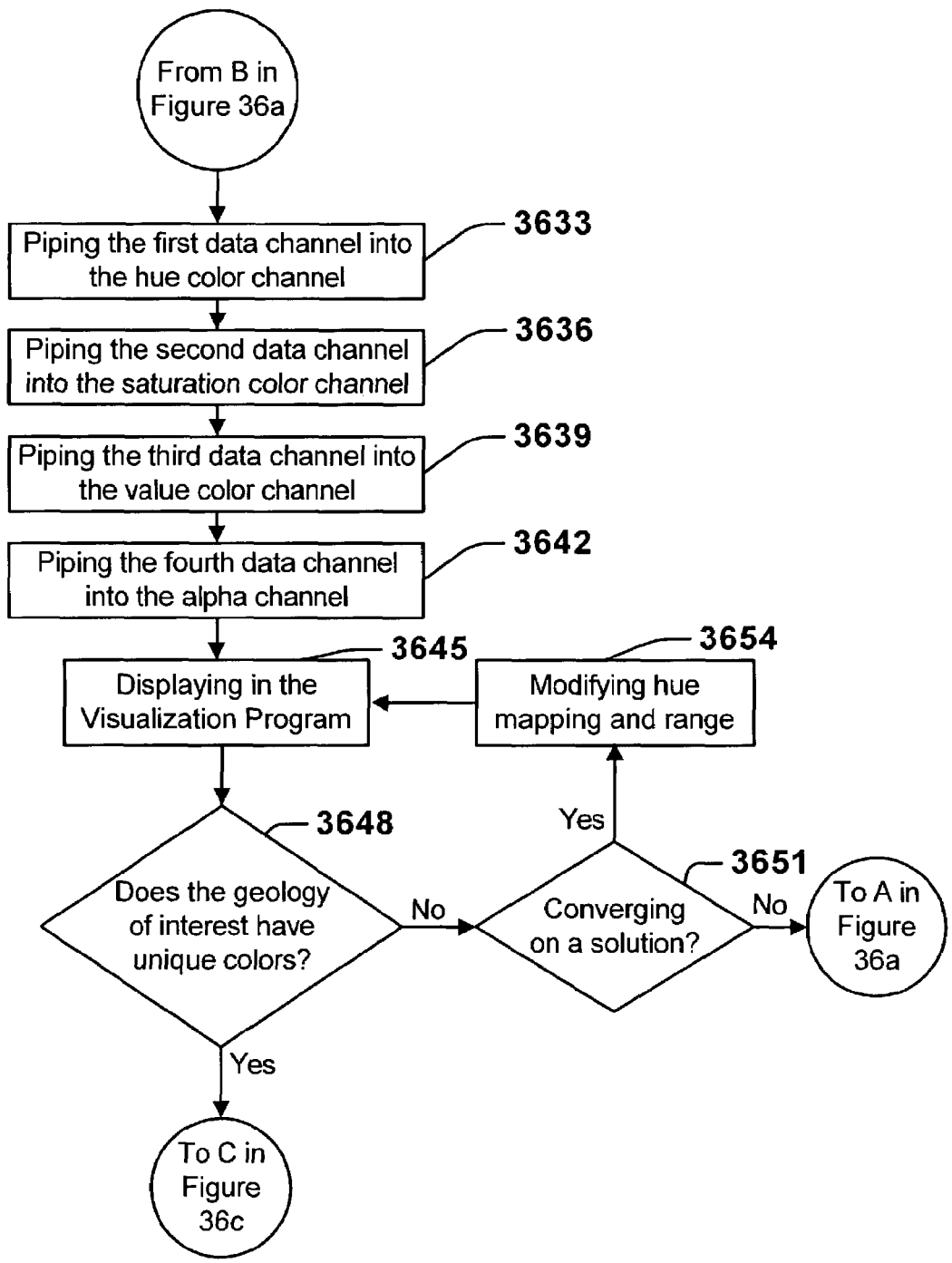
Figure 36C:
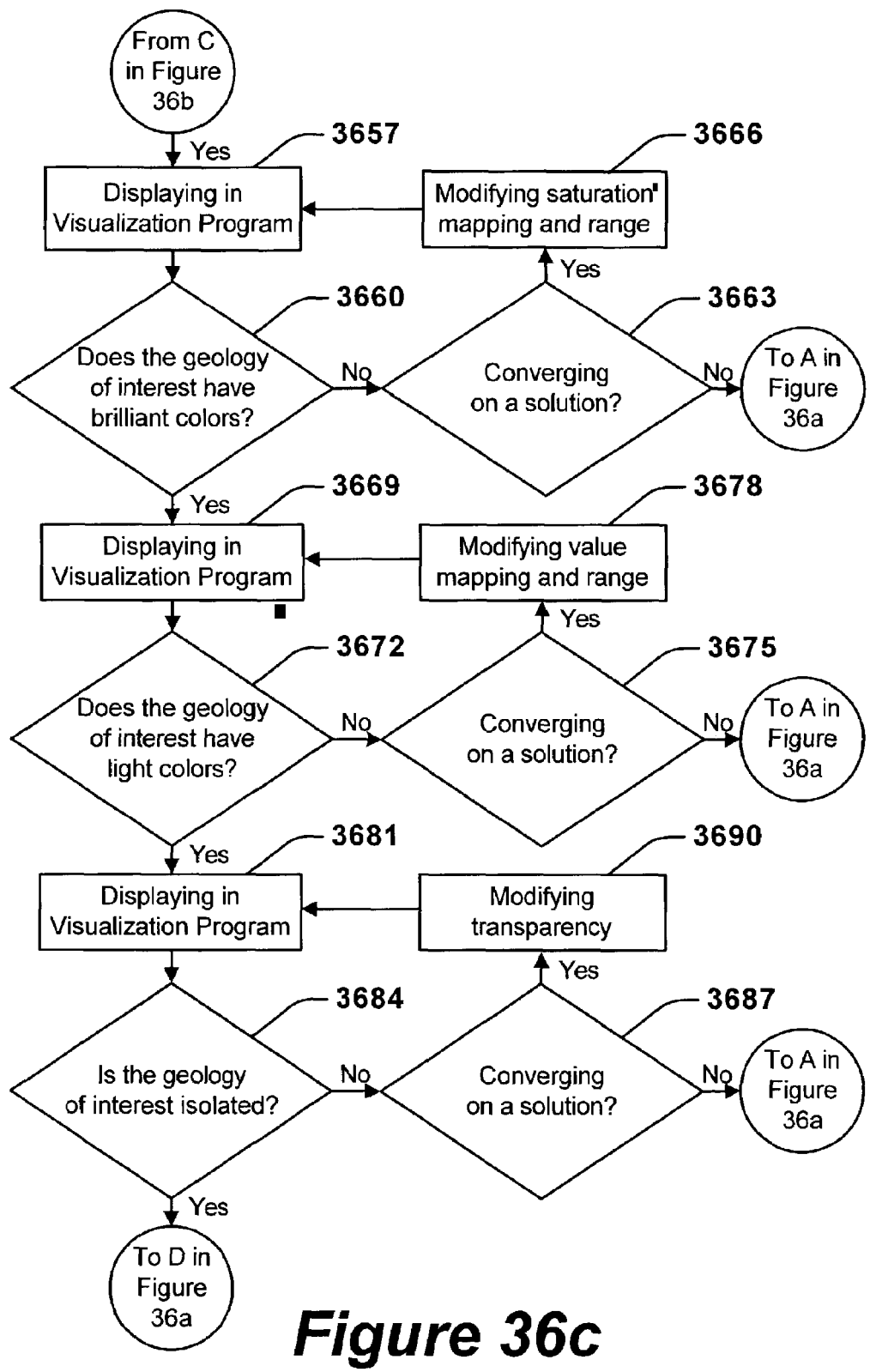

The present invention employs the above-identified apparatus for various purposes. FIG. 36 illustrates an example of a method of the present invention for constructing a false-color image for 3-D images, in this case either using RGBA or HSVA color models.

This method contains interactive modifications and visualization of data. Display refreshes can occur automatically or can be caused by the operator at anytime during the method. The following example shows display modifications and display refreshes at necessary points, however in practice more automatic and operator-selected display modifications and refreshes occur than those shown.

Step 3601: Method 3600 starts.

Step 3602: Loading PDB into the visualization program and displaying. In this step, the table of contents for a previously computed PDB 1664 is loaded from disk or across the local network into memory 3130, and displayed on display 3170. In addition, the operator creates a display and instructs the application to refresh the display.

Step 3603: Selecting from two to four data channels. In this step, the operator, operating PC 1600, selects two to four data channels corresponding to information in one or more levels of abstraction in the PDB 1664 (used in step 3601), that are available in the pattern database, have already been computed, and which are capable of classifying the geology of interest. The goal of pattern recognition is classification that means that, in this example, the features are sufficient to distinguish between the items of interest and everything else based on the specific feature values. If fewer than four unique pieces of information available, the operator either uses the same piece of information for more than one color channel or sets the unused color channels to a constant value. The information can consist of pattern abstraction data chosen from any level in the pattern database. One of the examples discussed below uses information from the feature level of abstraction for visually identifying depositional geometries of interest. For example, while performing this visual exploration, the geoscientist might identify ancient river channels or other recognizable depositional geometries. There is no limitation on which levels or combinations of levels can be chosen.

Step 3606: Use Cartesian coordinates? In this step, the operator determines which coordinate system he wants to use when setting decision surfaces in the vector space formed by the chosen data channels. The choice of coordinate system depends upon the operator's knowledge of the probability distribution of the features in feature space and the nature of the classification to be performed. The decision surfaces which best classify the data may be easier to define in one coordinate system than they are in another. Round regions are easier to define in cylindrical coordinates and rectangular regions are easier to define in Cartesian coordinates.

For example, the operator might be performing an AVA, amplitude versus angle, analysis. To accomplish the AVA analysis, the operator might choose three data channels that include maximum amplitude, a feature measurement, for the near offset angle stack pattern pyramid, mid offset angle stack pattern pyramid, and far offset angle stack pattern pyramid. By placing these in a Cartesian coordinate system, the operation can associate red with the near offset angle stack, green with mid offset angle stack, and blue with far offset angle stack. At this point, each axes represents a component of the vector representing the full stack. The result is the color of the resulting display indicates which component, angle stack feature, has the largest value. In this case, the operator would choose Cartesian coordinates corresponding to a choice of yes and the method proceeds to step 3609.

A different example is feature analysis for identifying depositional geometries, where the features have no sign (the absolute value is taken of the computed number), the probability distribution is generally centered about the origin. Here, a good choice of coordinates that simplify the analysis are cylindrical coordinates used in the HSVA color model. Cylindrical coordinates are the most commonly used, but are not a required choice for visual clustering of the various levels of abstraction in a pattern database due to the nature of the probability distributions. In this case, the operator chooses no and the method proceeds to FIG. 36b.

The next steps deal with piping data into channels. Essentially, one or more data channels are chosen, and those one or more data channels are piped into one or more color channels for further processing (such as visualization).

Step 3609: Piping the first data channel into the red channel. In this step, the first component of the vector is piped or mapped into the red channel of the RGBA false-color imaging scheme. For the AVA analysis example, the first data channel is the maximum amplitude for the near offset angle stack.

Step 3612: Piping the second data channel into the green channel. In this step, the second component of the vector is piped or mapped into the green channel of the RGBA false-color imaging scheme. For the AVA analysis example, the second data channel is the maximum amplitude for the mid offset angle stack.

Step 3615: Piping the third data channel into the blue channel. In this step, the third component of the vector is piped or mapped into the blue channel of the RGBA false-color imaging scheme. For the AVA analysis example the third data channel is the maximum amplitude for the far offset angle stack.

Step 3618: Piping the fourth data channel into the alpha channel. In this step either a fourth data channel is piped or mapped into the alpha channel of the RGBA false-color imaging scheme. For the AVA analysis example the Cartesian space is a 3D space and a fourth channel is not needed so alpha is set to a constant value of 0 or fully opaque.

Step 3621: Displaying in the visualization program. In this step, the operator instructs the visualization program to update the false color image display object and to refresh the display. The false color image appears with a default color table that includes fuzzy decision surfaces.

Step 3624: Is the geological feature of interest adequately classified? In this step, the operator looks at the image that was displayed in step 3621 to determine if the display contains a feature of interest (e.g., geology) that would be of interest to hydrocarbon exploration and if the geology is adequately classified, or given a sufficiently unique color in the display. Because the operator often does not know what geological features are present in the data, this is usually an interactive data exploration process. During the process, the operator is attempting to identify depositional geometries or other geological features based on past experience or training. When the geology is adequately resolved the decision surfaces are not fuzzy, the geology is visible, and it is as clear as the data resolution and quality allows. If the answer to step 3624 is yes, then method 3600 proceeds to step 3693; if the answer is no, then the method 3600 proceeds to step 3627.

Step 3627: Converging on a solution? In this step, the operator decides if there is a potential modification, hypothesis, of the color assignment, which might improve the quality of the classification thereby improving the uniqueness of the color, of the geology of interest. The color assignment corresponds to the decision surface choice. If the answer to the decision step is yes, then the method 3600 proceeds to step 3630; if the answer is no, then the operator is unable to find a color assignment, set of decision surfaces, that works and method 3600 returns to step 3603.

Step 3630: Modify decision surfaces. In this step, the operator modifies the color assignment for one or more than one of the color channels. For the example in FIG. 38, the location of the zone 3820 might be moved from the left or to the right changing the decision surfaces. The color assignment might also involve modifying zones 3830 and 3840 to make them more vertical, less fuzzy, or broader, fuzzier. The specific change depends on the hypothesis the operator formed in step 3627. As the operator iterates on the loop formed by steps 3621, 3624, 3627, and 3630, the decision surfaces should become less fuzzy, more vertical, for each step until a set of decision surfaces like 3111, 3112, 3121, 3122, 3131, 3132, 3141, and 3142 in FIG. 31 are achieved. After this step is performed method 3600 continues to step 3621.

Step 3633: Piping the first data channel into the hue color channel. Before reaching this step, the operator has determined that the most effective way to chose decision surfaces is to do it in cylindrical coordinates. This is most commonly used for unsigned features; which are the absolute value of the measured features, in a pattern database. In this step, the operator pipes a selected data channel into the hue color channel. In the resulting display, this feature will be displayed as having different colors depending on the mapping between the data channel data values and the associated color. For a PDB built on band-limited acoustical impedance, the feature that is often used, but not always used, is shape. Thus, when geology and fluid effects very laterally causing shape to vary, the color of the display also varies but when they do not vary the color stays the same. This data channel has a large visual impact so the data channel that is mapped into it is usually the feature which provides a large amount of discrimination of for which understanding variations is most important..

Step 3636: Piping the second data channel into the saturation color channel. In this step, the operator pipes a selected data channel into the saturation color channel. In the resulting display this feature will be displayed as causing the displayed colors associated with the first data channel to have varying saturations depending on the mapping between the data channel data values and the associated color saturation. For a PDB built on band-limited acoustical impedance and being used to investigate low (large negative) amplitudes associated with class III anomalies, the feature that is often, but not always, used here is maximum amplitude. Thus, when tracking a reservoir laterally across a fluid variation from brine to gas the color of the reservoir will change from being a washed out pastel to in the brine filled zone to bright brilliant colors in the gas filled zone. In a sense, this channel mutes the appearance of the first channel in that for low saturations color variations are more difficult to visually discern.

Step 3639: Piping the third data channel into the value color channel. In this step, the operator pipes a selected data channel into the value color channel. In the resulting display, variations in this feature will cause the displayed colors associated with the first data channel to have varying levels of grayscale depending on the mapping between the data channel data values and the associated color value. For a PDB built on band-limited acoustical impedance, the feature that is often, but not always, used here is fragment thickness. Thus when tracking a rock layer laterally, zones with thin fragments will be blacker and zones with thick fragments will be whiter. In a sense this channel mutes the appearance of the first channel in that for low values color variations are more difficult to visually discern.

Step 3642: Piping the fourth data channel into the alpha color channel. In this step, the operator pipes a specific data channel into the alpha, transparency, color channel. Sometimes opacity rather than transparency is used. In the resulting display this feature will be displayed as causing data to disappear or appear depending on the mapping between the data channel data values and the associated alpha. For a PDB built on band-limited acoustical impedance, and being used to investigate low (large negative) amplitudes associated with class III anomalies, the feature that is often, but not always, used here is either the sign feature, a feature carrying the sign of the acoustical impedance, or the acoustical impedance itself. This allows the operator to turn the data transparent when the acoustical impedance is positive leaving the areas that are relatively soft opaque.

Step 3645: Displaying in the Visualization Program. In this step, the operator instructs the visualization program to update the false color image display object and to refresh the display. The false color image appears with a default color table which includes fuzzy decision surfaces.

Step 3648: Does the geology of interest have unique colors. In this step, the operator looks at the image that was displayed in step 3645 to determine if the geology of interest has unique colors. For example if the operator has identified a reservoir formed by channel fill, then the operator determines if the channel fill has colors that are predominately different than the rocks into which the channel cut. If unique colors are found (i.e., the answer is yes), then the method 3600 proceeds to step 3657; if the unique colors are not found (i.e., the answer is no), method 3600 proceeds to step 3651.

Step 3651: Converging on a solution? In this step, the operator decides if there is a potential modification, hypothesis, of the color hue assignment, which might improve the quality of the classification thereby improving the uniqueness of the color, of the geology of interest. The color assignment corresponds to the decision surface choice. If the answer to the decision step is yes, then the method 3600 proceeds to step 3654; if the answer is no, then the operator is unable to find a color assignment, set of decision surfaces, that works and method 3600 returns to step 3603.

Step 3654: Modify hue mapping and range. In this step, the operator modifies the hue color assignment for the first data channel. This modifies the decision surfaces changing the visual classification or clustering. The specific change depends on the hypothesis the operator formed in step 3651. As the operator iterates on the loop formed by steps 3645, 3648, 3651, and 3654 the decision surfaces should become less fuzzy, more vertical, for each iteration. After this step is performed method 3600 continues to step 3645.

Step 3657: Displaying in the Visualization Program. In this step, the operator instructs the visualization program to update the false color image display object and to refresh the display.

Step 3660: Does the geology of interest have brilliant colors. In this step, the operator looks at the image that was displayed in step 3657 to determine if the geology of interest has brilliant colors. For example if the operator has identified a class III gas filled reservoir, then the operator determines if the gas filled portion of the reservoir has brilliant colors in comparison to the brine filled reservoir which have muted or less saturated colors or pastels. If brilliant colors are found (i.e., the answer is yes), then the method 3600 proceeds to step 3669; if the brilliant colors are not found (i.e., the answer is no), method 3600 proceeds to step 3663.

Step 3663: Converging on a solution? In this step, the operator decides if there is a potential modification, hypothesis, of the color saturation assignment, which might improve the quality of the classification thereby improving the brightness of the color of the geology of interest. The color assignment corresponds to the decision surface choice. If the answer to the decision step is yes, then the method 3600 proceeds to step 3654; if the answer is no, then the operator is unable to find a color assignment, set of decision surfaces, that works and method 3600 returns to step 3603.

Step 3666: Modify saturation mapping and range. In this step, the operator modifies the saturation color assignment for the second data channel. This modifies the decision surfaces changing the visual classification or clustering. The specific change depends on the hypothesis the operator formed in step 3663. As the operator iterates on the loop formed by steps 3657, 3660, 3663, and 3666 the decision surfaces should become less fuzzy, more vertical, for each iteration. After this step is performed method 3600 continues to step 3657.

Step 3669: Displaying in the Visualization Program. In this step, the operator instructs the visualization program to update the false color image display object and to refresh the display.

Step 3672: Does the geology of interest have light colors. In this step, the operator looks at the image that was displayed in step 3669 to determine if the geology of interest has light colors or dark or muddy colors. For example, if the operator has identified a fully resolved fairly thick sand reservoir with a relatively thick fragment that is bounded by shale zones with relatively thin fragments, then the operator determines if the sand reservoir has light colors in comparison to the encasing shale which will be muddy or darker. If light colors are found (i.e., the answer is yes), then the method 3600 proceeds to step 3681; if muddy or dark colors are not found (i.e., the answer is no), method 3600 proceeds to step 3675.

Step 3675: Converging on a solution? In this step, the operator decides if there is a potential modification, hypothesis, of the color value assignment, which might improve the quality of the classification thereby improving the lightness of the color of the sand body of interest. The color assignment corresponds to the decision surface choice. If the answer to the decision step is yes, then the method 3600 proceeds to step 3678; if the answer is no, then the operator is unable to find a color assignment, set of decision surfaces, that works and method 3600 returns to step 3603.

Step 3678: Modify value mapping and range. In this step, the operator modifies the value color assignment for the third data channel. This modifies the decision surfaces changing the visual classification or clustering. The specific change depends on the hypothesis the operator formed in step 3675. As the operator iterates on the loop formed by steps 3669, 3672, 3675, and 3678 the decision surfaces should become less fuzzy, more vertical, for each iteration. After this step is performed method 3600 continues to step 3669.

Step 3681: Displaying in the Visualization Program. This step occurs if the result of step 3672 is positive (yes). In this step, the operator instructs the visualization program to update the false color image display object and to refresh the display. Execution thereafter moves to step 3684.

Step 3684: Is the geology of interest isolated. In this step the operator looks at the image that was displayed in step 3681 to determine if the geology of interest is isolated as a hovering body that does not connect to other unrelated of different bodies. For example, if the operator has identified a sand reservoir that is acoustically relatively softer than the bounding shale, then the operator determines if the sand reservoir is opaque and the bounding shale are transparent. If sand bodies are isolated (i.e., the answer is yes), then the method 3600 proceeds to step 3693; if they connect to opaque bounding shale bodies (i.e., the answer is no), method 3600 proceeds to step 3687.

Step 3687: Converging on a solution? In this step, the operator decides if there is a potential modification, hypothesis, of the color alpha or transparency assignment, which might improve the quality of the classification thereby further isolating the sand body of interest. The transparency, alpha, assignment corresponds to the decision surface choice. If the answer to the decision step is yes, then the method 3600 proceeds to step 3690; if the answer is no, then the operator is unable to find a color assignment, set of decision surfaces, that works and method 3600 returns to step 3603.

Step 3690: Modifying transparency. In this step, the operator modifies the alpha or transparency assignment for the fourth data channel. This modifies the decision surfaces changing the visual classification or clustering. The specific change depends on the hypothesis the operator formed in step 3687. As the operator iterates on the loop formed by steps 3681, 3684, 3687, and 3690, the decision surfaces should become less fuzzy, more vertical, for each iteration. After this step is performed method 3600 continues to step 3681.

Step 3693: Saving the results. The mapping of the data channels to color channels plus the color mapping and ranges of colors represent decision surfaces. The name of the pattern pyramid levels that form the data channels, the associated decision surfaces, and the color assignments are saved into a template that is stored in a template library. After the information is saved the method ends at step 3695.

Step 3695: Method 3600 ends.

Method of Pattern Database Visualization and Analysis

Figure 37A:
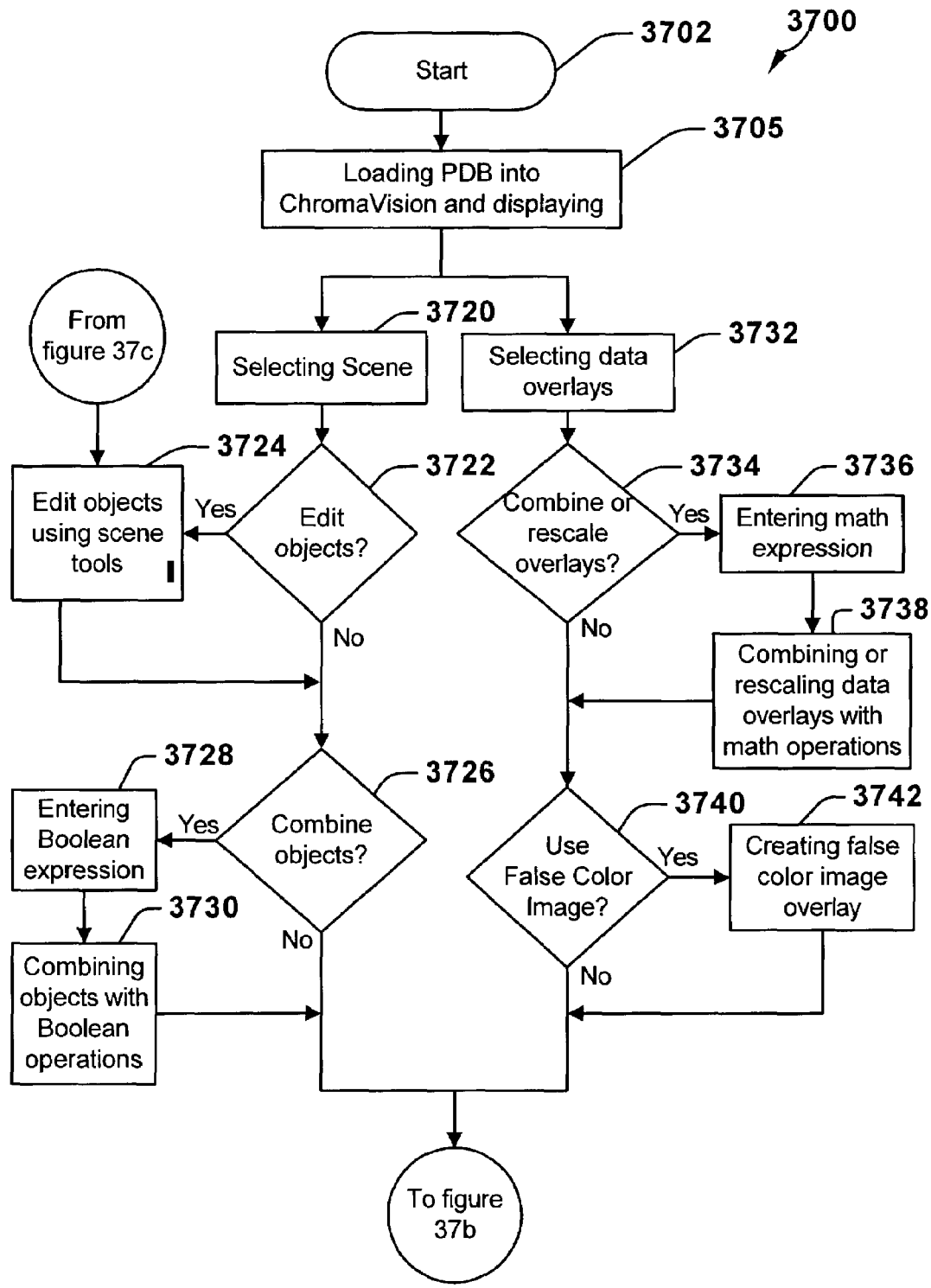
FIG. 37 is a flowchart of an example method of performing visualization of a pattern database according to the teachings of the present invention.
Figure 37B:
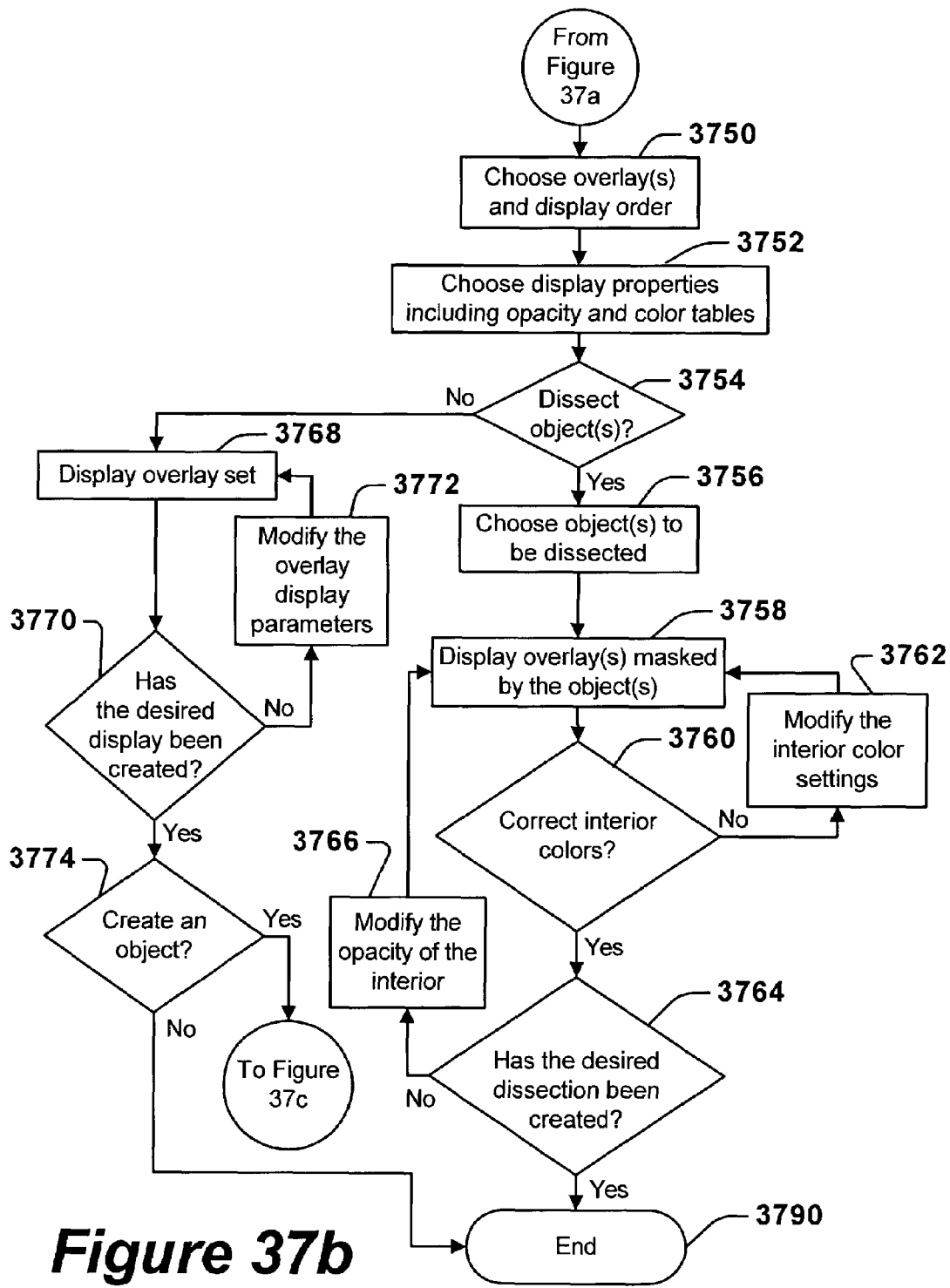
Figure 37C:
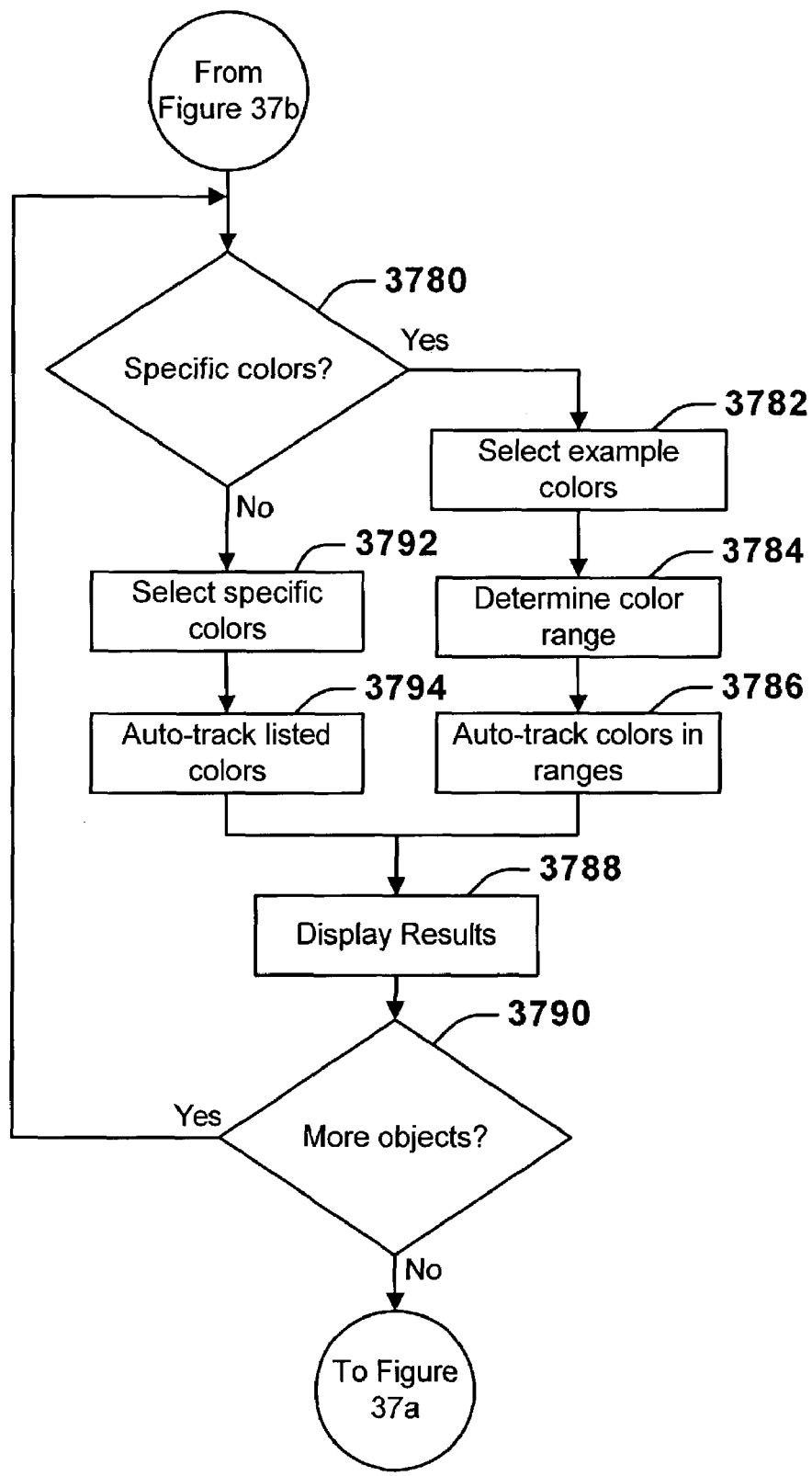

FIG. 37 illustrates a method 3700 of visualizing the contents of a pattern database. This method illustrates one but not all methods of usage. Operators may use only portions of or many variations of this process.

The method of FIG. 37 contains interactive modifications and visualization of data. Display refreshes can occur automatically or can be caused by the operator at anytime during the method. The following example shows display modifications and display refreshes at necessary points, however in practice more automatic and operator selected display modifications and refreshes occur than those shown.

Step 3702: Method starts.

Step 3705: Loading pattern databases In this step, the table of contents for a previously computed PDB 164 is loaded from disk or across the local network into memory 3130, and displayed on display 3170. In addition the operator creates a display and instructs the application to refresh the display.

Step 3720: Selecting scene. The operator selects a scene from a list of sense stored with the PDB.

Step 3722: Edit objects? In this step, the operator decides if there is a need to edit or clean up the objects. An example of an object needing editing is one with holes or speckling in the interior and/or rough edges due to noise or digitization artifacts. If the answer to the decision step is yes, then the method 3700 proceeds to step 3724; if the answer is no, method 3700 switches to step 3726.

Step 3724: Edit objects using scene tools. In this step, the operator selects from a list of editing tools that can be applied to any or all of the objects in a selected scene. The tools include morphological operators (including erosion, dilation, translation, and others), other hole filling algorithms, other smoothing algorithms, or other tools as required to achieve the desired results. This can also include hand editing by painting or drawing. Another technique is to fit a boundary representation to the exterior then reducing the number of points or nodes in it until the desired smoothness is achieved followed by filling the interior if a voxel representation of the object is required. Modifying the objects associated metadata such as its name, other identifiers, and associated properties, such as display color, can also be done here. The display is refreshed as necessary.

Step 3726: Combine objects? In this step, the operator decides if there is a need to combine objects. An example is a single logical object which was in fact identified from the data as two parts, two objects that should be one, using two different techniques or because the logical object was separated into two by noise in the data. If the answer to the decision step is yes, then the method 3700 proceeds to step 3728; if the answer is no, method 3700 switches to step 3750.

Step 3728: Entering a Boolean expression. In this step, the operator enters a Boolean expression applied to selected objects. The operators include AND, OR, NOT. Additional operations including NOR, NAND, AND NOT, XOR, XNOR, OR NOT, TRUE and FALSE, may be implemented with the system and methods of the present invention. The application parses the expression for operations and operands, notifies the user if any errors occurred and prepares to perform the designated operations. This operation can be performed by a variety of implementations.

Figure 38A:
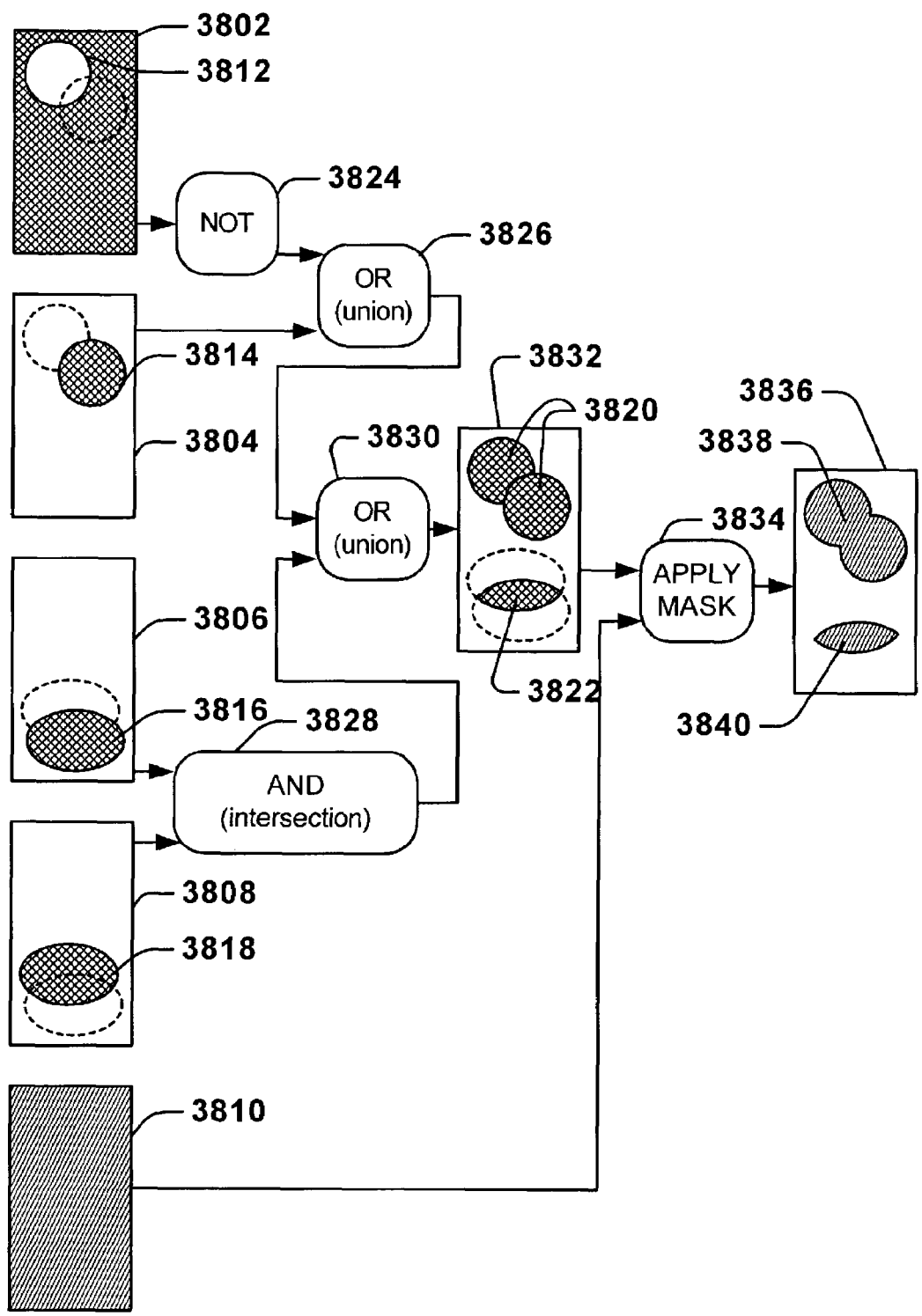
FIG. 38*a* is a diagrammatic example of Boolean math applied to objects according to the teachings of the present invention.

Step 3730: Combining objects with Boolean Operations. In this step, the application performs the Boolean operation and displays the result. An example operation is shown in FIG. 38a. The figure contains four scenes 3802, 3804, 3806, 3808. Each scene 3802, 3804, 3806, 3808 contains an object 3812, 3814, 3816, and 3818, respectively. FIG. 38 also illustrates four Boolean operations 3824, 3826, 3828, and 3832. The expression ((Not 3812) OR 3814) OR (3806 AND 3808) is evaluated giving the resulting objects 3820 and 3822 in scene 3832 as illustrated in FIG. 38. When step 3730 has been completed the method proceeds to step 3750. The display is refreshed as necessary.

Step 3732: Selecting data overlays. The operator selects overlays to be loaded into RAM, for display or to be operated upon by tools, from a list of all of the attributes and statistics for all of the levels and all of the sides in a pattern hierarchy. The overlays are a list representing a stack of data to be overlain during display. Logically it is similar to a stack of paper or films on a light table. The order of the overlays determines which are furthest away from the observer and which are closer (back to front in the stack).

Step 3734: Combine or rescale overlays? In this step, the operator decides if there is a need to combine or rescale the overlays prior to display.

Occasionally it is necessary to modify, rescale, or combine data sets to make visualization or computations easier. For example, if the user is visualizing the results of analyzing pattern space for a single feature and two fragments in cylindrical coordinates and the measure of interest is $\alpha$ where:

$$\alpha = \tan(L/U)$$

and L is the feature value for the lower fragment and U is the feature value for the upper fragment. In addition during visualization the user wants to compare the results to a known ratio $$R_K = (L_K/U_K).$$

To accomplish this, the user wants to create a display data set $R_D$ where $$R_D = a \tan(\alpha)$$

and then display $R_D$ and identify the locations that have a value $R_K$. To accomplish this, the invention includes a general math function which includes applying standard functions (ln, log, exp, trig functions, others); scalar math (addition, subtraction, multiplication, and division); plus math on multiple data sets (addition, subtraction, multiplication, and division).

Another typical use is to create resealed display values $V_D$ from input data values V include scaling using scalars a and b $$V_D = a*V + b$$

If the answer to the decision step is yes, then the method 3700 proceeds to step 3736; if the answer is no, method 3700 switches to step 3740.

Step 3736: Entering math expression. In this step the operator enters or selects a math expression like those described in step 3734. The application parses the expression for operations and operands, notifies the user if any errors occurred and prepares to perform the designated operations. This operation can be performed by a variety of implementations.

Figure 38B:
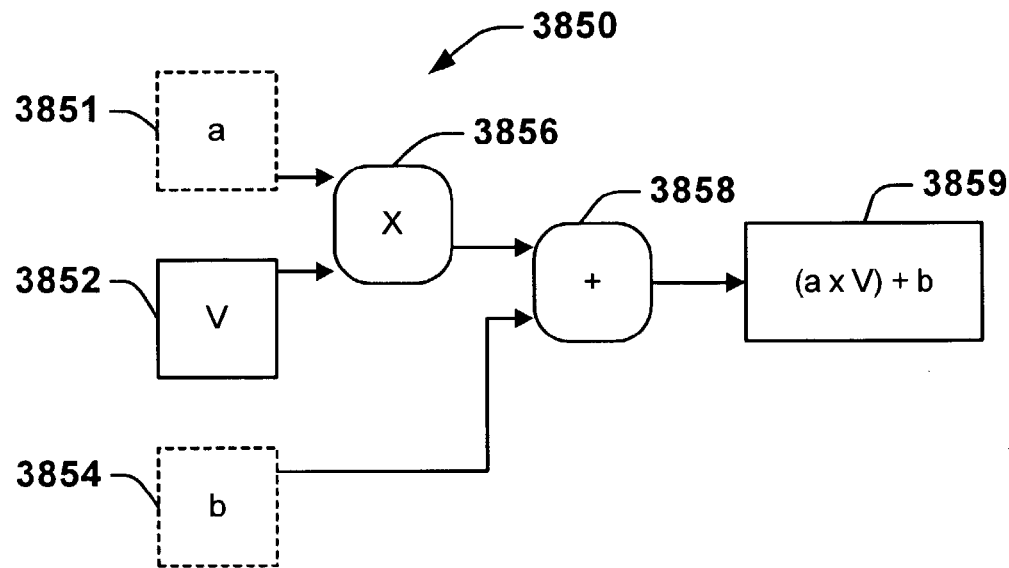
FIG. 38*b* is a diagrammatic example of overlay math according to the teachings of the present invention.
Figure 38B:
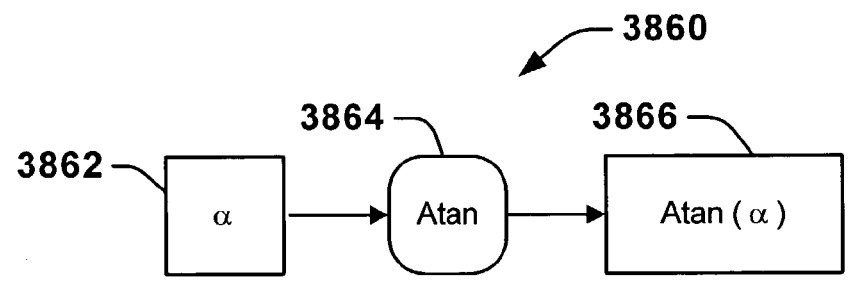
Figure 38B:
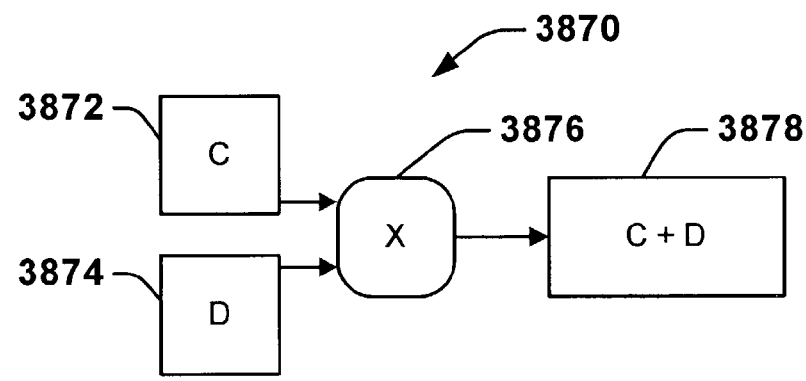

Step 3738: Combining or resealing data overlays with math expressions. In this step the application performs the math expression specified in step 3736. FIG. 38b shows two examples of this operation 3850 and 3860. In the example operation 3850 the expression is (a×V)+b is shown, where a is an input scalar 3851, V is an input overlay 3852 and b is an input scalar 3854. The operations are multiplication 3856 and addition 3858. The result is a new output overlay 3859. In the example operation 3860, the expression is Atan ($\alpha$) where $\alpha$ is an input overlay. The operation 3860 is to compute the function Atan 3864. The result of operation 3860 is a new output overlay 3866. In the last example, operation 3870, the expression is (C+D), where C 3872 and D 3874 are both input overlays. The operation is multiplication 3876, and the result is a new output overlay 3878. The display can be refreshed as necessary.

Step 3740: Use false color image? In this step the operator decides if there is a need to create false color image combinations of two to four overlays of data. One or more false color images may be made. They may be made for the purpose of performing visual clustering of pattern database information. They may also be made for a variety of data comparison purposes, an example of which is to compare a near angles stack, a mid angles stack, and far angles stack for AVA analysis. If the answer to the decision step is yes, then the method 3700 proceeds to step 3742; if the answer is no, method 3700 switches to step 3750.

Step 3750: Choose overlays and display order. In this step the operator reviews the list of pattern database information plus newly created overlays and creates a list of overlays that are to be displayed. The overlay list is arranged so that it will display in the desired ordered from back to front.

Step 3752: Choose display properties including opacity and color tables. In this step the operator reviews the display and resets all available display properties until the desired display is created.

Step 3754: Dissect Object? In this step, the operator decides if there is a need to dissect one or more objects. Dissecting objects involves using the object as a mask that is applied to the overlays to make all of the overlay data outside the object transparent, or not displayed, and to make all of the overlay data inside the object more opaque, or displayed. When displayed this way the object(s) appear to hover in space. Varying the opacity of the overlay data makes portions of the interior of the object transparent thereby dissecting the interior of the object. If the answer to the decision step is yes, then the method 3700 proceeds to step 3756; if the answer is no, method 3700 switches to step 3768.

Step 3756: Choose object(s) to be dissected. In this step, the operator reviews the list of available scenes and their associated objects. One or more objects are selected which the operator wants to dissect.

Step 3758: Display overlay(s) masked by the object(s). In this step, the operator instructs the application to create a new overlay, called a masked overlay, which masks the input overlay(s) selected in step 3750 using the input object(s) selected in step 3756. Then the application either is instructed to, or automatically, removes all of the overlays and objects from the display scene except the new masked overlay and displays the new masked overlay. In addition, the application links the overlay(s) and object(s) that were piped into the masked overlay to ensure that modifications to the input overlay(s) display properties and the input objects(s) properties propagate to the new masked overlay. A diagrammatic example is shown in FIG. 38a. The scene 3832 contains two input objects 3820 and 3822. The diagram also shows an input overlay 3810. The input overlay 3810 is masked by the objects 3820 and 3822, thereby creating an output overlay 3840, upon application of the apply mask 3834, where everything is transparent or not displayed except the portions of the overlay 3810 which lie inside the objects 3838 and 3840 of the scene 3836 which are partially or totally opaque. The display is refreshed as needed.

Step 3760: Correct interior colors? In this step, the operator visually analyzes the display created in step 3758 and decides if the input overlay(s) in the interior of the input object(s) have the correct colors. The loop formed by steps 3758, 3760, and 3762 results in repeated color adjustments until the answer to this question is yes. If the answer to the decision step is yes, then the method 3700 switches to step 3764; if the answer is no, method 3700 proceeds to step 3762.

Step 3762: Modify the interior color settings. In this step, the operator modifies the color assignments for the input overlay(s), which are being masked, with the modifications being propagated to the masked overlay that is being displayed.

Step 3764: Has the desired dissection been created? In this step, the operator visually analyzes the display created in step 3758 and decides if the input overlay(s) in the interior of the input object(s) have been correctly dissected. If the dissection is correct; portions of the interior that are not of interest are transparent, or not displayed, and the portions that are of interest are visible. If necessary, alpha assignment adjustments may be identified. The loop formed by steps 3758, 3760, 3764, and 3766 are repeated until the answer to this question is yes. If the answer to the decision step is yes, then the method 3700 switches to step 3790 and ends; if the answer is no, method 3700 proceeds to step 3766.

Step 3766: Modify the opacity of the interior. In this step, the operator modifies the alpha assignments for the input overlay(s), which are being masked, with the modifications being propagated to the masked overlay that is being displayed. The opacity is modified so that portions of the interior that are not of interest are caused to become transparent, or not displayed, and the portions that are of interest are caused to become visible.

Step 3768: Display overlay(s). In this step, the operator instructs the application to refresh the display.

Step 3770: Has the desired display been created? In this step, the operator visually analyzes the display created in step 3758 and decides if the display properties are correctly set. Usually this is primarily to ensure that the overlay(s) have the correct colors and alpha settings. The alpha settings for the overlays need to be set so that the overlays behind them in the overlay stack can be seen through the front ones to gat an affect like overlays on a light table. The loop formed by steps 3768, 3770, and 3772 results in repeated color and alpha adjustments until the answer to this question is yes. If the answer to the decision step is yes, then the method 3700 switches to step 33790 and ends; if the answer is no, method 3700 proceeds to step 3772.

Step 3772: Modify the overlay display parameters. In this step, the operator modifies the color and alpha assignments, plus other display parameters, if required, for the overlay(s) and processing returns to step 3768.

Step 3774: Create an object? In this step, the operator visually analyzes the display created in step 3768 and decides if a set of unique colors identifies an object of interest and if the operator wants to create an object to represent it. If the answer to the decision step is yes, then the method 3700 proceeds to step 3780; if the answer is no, method 3700 switches to step 3790 and the method ends.

Step 3780: Specific colors? In this step, the operator visually analyzes the display created in step 3768 and decides if a set of specific colors identifies the object of interest or if it contains a large number of colors which fall within a color range. An example of specific colors is when to object is all colored with the same red color. An example of a range is when the object has many shades of red in it. If the answer to the decision step is yes, then the method 3700 proceeds to step 3782; if the answer is no, method 3700 switches to step 3792.

Step 3782: Select example colors. In this step, the operator selects a set of example colors which occur within the object of interest. This is done by any of a wide variety of methods including but not limited to, painting across the object of interest with a paintbrush. The selection is made so that it includes the extremes of the colors within the object of interest. In addition the operator specifies the color model to be used.

Step 3784: Determine the color range. In this step the computer application determines the color range using, the operator specified color model that includes all of the colors in the sample. Examples are red, green, and blue ranges or hue, saturation, and value ranges. Others may also be used. The specific color selected depends on the color model.

Step 3786: Auto-track colors in the ranges. In this step, the computer application auto-tracks the colors in the ranges computed in step 3784. The result represents a connected body that includes voxels that have colors which lie only within the specified ranges. Any of a large number of auto-trackers that are available may be used. The object display representation can be a boundary representation of the object represented by one or more grids or meshes. The object display representation can also be a point set of voxels which lie within the objects interior. Another representation is a voxel cube where each voxel inside the object has a value designating it as a part of the object and all of the other voxels.

Step 3788: Display results. In this step, the computer application adds the display object to the display scene and redisplays.

Step 3790: More objects? In this step, the operator visually analyzes the display created in step 3788 and decides if there are more objects to be auto-tracked. If the answer to the decision step is yes, then the method 3700 proceeds to step 3780; if the answer is no, method 3700 switches to step 3724.

Step 3792: Select the specific colors. In this step, the operator selects one or more specific colors which occur within the object of interest. This is done by any of a wide variety of methods including but not limited to, clicking on a point in the object of interest or painting across the object of interest with a paintbrush.

Step 3794: Auto-track listed colors. In this step, the computer application auto-tracks the list of colors selected in step 3792. The result represents a connected body that includes voxels that have colors which lie only within the specific color list. Any of a large number of auto-trackers that are available may be used. The object display representation can be a boundary representation of the object represented by one or more grids or meshes. The object display representation can also be a point set of voxels which lie within the objects interior. Another representation is a voxel cube where each voxel inside the object has a value designating it as a part of the object and all of the other voxels Step 3790: Method 3700 ends.

When studying the boundary representation of some objects a single surface is made, also called a shrink-wrap, or a manifold representation can be made. Pattern recognition can be applied to this boundary representation to create features that can be displayed on the boundary representation, including but not limited to local dip, strike, and curvature.

The present invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for constructing a false-color image, comprising:

loading a PDB into a visualization program;

selecting from two or four data channels;

determining if any two of the data channels form a vector quantity; and if so, piping one component of the vector into the first channel;

piping one component of the vector into the second channel;

if three or more data channels were selected, then piping one component of the vector into a third channel;

if four or more data channels were selected, then piping a discriminator into a fourth channel;

displaying the results in the method;

determining if the geology of interest is isolated; and if not, then determining if the method is converging on a solution; and if so, then modifying an opacity parameter;

returning to the step of displaying the results in a program; and if the step of converging on a solution is no; then returning to the step of selecting from two to four data channels; and if the step of determining if the geology of interest is isolated is yes; then saving the results and ending the method; and if the step of determining if any three of the data channels form a vector quantity is no; then piping a secondary discriminator into the first channel; then piping a primary modifier into the second data channel; piping the secondary modifier into the third data channel; piping the primary discriminator into the fourth data channel;

determining if the geology of interest has unique colors; and if not, then determining if the process is converging on a solution; and if so, then modifying the hue mapping and modifying the range; returning to the step of displaying the results of the method; and if the step of determining the geology of interest has unique colors, then displaying the results of the method;

determining if the geology of interest has many colors; and if not, then determining whether or not the process is converging on a solution; and if so, then modifying the saturation mapping and the saturation range; then returning to the step of displaying the results of the method;

determining if the geology of interest has light colors; and if not, then converging on a solution; and if so, then modifying the value and the mapping range; and returning to the step of displaying the results of the method; and if so, then displaying the results of the method; and determining if the geology of interest is isolated; and if so, then performing the steps of saving the results; and ending the method; otherwise, determining if the method is converging on a solution; and if so, then modifying the opacity; performing the step of displaying the results of the method; and where the step of converging on a solution is no, then returning to the step of selecting from two or more data channels.

* * * * *